(12) United States Patent
Bulzacki et al.

(10) Patent No.: US 11,948,421 B2
(45) Date of Patent: Apr. 2, 2024

(54) SYSTEMS, METHODS AND DEVICES FOR MONITORING GAMING TABLES

(71) Applicant: ARB LABS INC., Toronto (CA)

(72) Inventors: Adrian Bulzacki, Mississauga (CA); Vlad Cazan, Thornhill (CA)

(73) Assignee: ARB LABS INC., Toronto (CA)

( * ) Notice: Subject to any disclaimer, the term of this patent is extended or adjusted under 35 U.S.C. 154(b) by 1084 days.

(21) Appl. No.: 16/622,676

(22) PCT Filed: Jun. 13, 2018

(86) PCT No.: PCT/CA2018/050715
§ 371 (c)(1),
(2) Date: Dec. 13, 2019

(87) PCT Pub. No.: WO2018/227294
PCT Pub. Date: Dec. 20, 2018

(65) Prior Publication Data
US 2023/0032920 A1 Feb. 2, 2023

Related U.S. Application Data

(60) Provisional application No. 62/519,637, filed on Jun. 14, 2017.

(51) Int. Cl.
*G07F 17/32* (2006.01)
*G01S 17/04* (2020.01)
*G01S 17/894* (2020.01)

(52) U.S. Cl.
CPC ............ *G07F 17/322* (2013.01); *G01S 17/04* (2020.01); *G01S 17/894* (2020.01); *G07F 17/3241* (2013.01)

(58) Field of Classification Search
CPC .......................... G07F 17/322; G07F 17/3241
See application file for complete search history.

(56) References Cited

U.S. PATENT DOCUMENTS

| 5,651,548 A | 7/1997 | French et al. |
| 5,757,876 A * | 5/1998 | Dam ..................... G06M 1/101 |
| | | 377/14 |

(Continued)

FOREIGN PATENT DOCUMENTS

| CN | 102349095 A | 2/2012 |
| CN | 105120206 A | 12/2015 |

(Continued)

OTHER PUBLICATIONS

IP Australia, Examination Report No. 1 to AU Application No. 2018285976 dated Jun. 23, 2022.

(Continued)

*Primary Examiner* — Jasson H Yoo
(74) *Attorney, Agent, or Firm* — Norton Rose Fulbright Canada LLP

(57) ABSTRACT

Embodiments described herein relate to systems, methods and devices for monitoring table activities at gaming tables in casinos and other gaming establishments. For example, embodiments described herein relate to systems, methods and devices for monitoring card game activities at gaming tables and transfers of chips between one or more players and a dealer. Embodiments described herein may include devices and systems particularly configured to monitor table activities that include betting activities and the transfer of chips (e.g. between a player and a dealer, or between a first player and a second player) at gaming tables to determine bet data including a number of chips in a betting area of the gaming table, a total value of chips in the betting area, the number of chips in a chip tray, a total value of chips in the chip tray, and so on.

20 Claims, 128 Drawing Sheets

(56) References Cited

U.S. PATENT DOCUMENTS

| | | |
|---|---|---|
| 6,517,435 B2 | 2/2003 | Soltys et al. |
| 6,517,436 B2 | 2/2003 | Soltys et al. |
| 6,520,857 B2 | 2/2003 | Soltys et al. |
| 6,530,836 B2 | 3/2003 | Soltys et al. |
| 6,530,837 B2 | 3/2003 | Soltys et al. |
| 9,795,870 B2 | 10/2017 | Ratliff |
| 2002/0072406 A1 | 6/2002 | Soltys et al. |
| 2004/0204792 A1* | 10/2004 | Taylor .................. A47L 9/2826 700/245 |
| 2004/0219975 A1 | 11/2004 | Soltys et al. |
| 2006/0030404 A1* | 2/2006 | Pohlman ................ G07F 17/32 463/29 |
| 2007/0184898 A1* | 8/2007 | Miller .................... G07D 9/002 463/29 |
| 2008/0113783 A1* | 5/2008 | Czyzewski ............ G07F 17/32 463/43 |
| 2008/0151049 A1 | 6/2008 | McCubbrey et al. |
| 2008/0180250 A1 | 7/2008 | Steil |
| 2010/0076842 A1* | 3/2010 | Berlec ................ G06Q 30/0251 367/93 |
| 2011/0128382 A1 | 6/2011 | Pennington et al. |
| 2015/0312517 A1 | 10/2015 | Hoyt et al. |
| 2016/0019684 A1 | 1/2016 | Hudman |
| 2016/0335837 A1 | 11/2016 | Yasushi |
| 2017/0039807 A1 | 2/2017 | Shigeta |
| 2017/0161987 A1 | 6/2017 | Bulzacki et al. |
| 2017/0236372 A1 | 8/2017 | Bulzacki et al. |

FOREIGN PATENT DOCUMENTS

| | | |
|---|---|---|
| CN | 106462725 A | 2/2017 |
| CN | 106463024 A | 2/2017 |
| CN | 106537217 A | 3/2017 |
| WO | 200120489 A1 | 3/2001 |

OTHER PUBLICATIONS

Chinese Search Report issued in Chinese Application No. 2018800523674 dated Feb. 7, 2021.
Extended European Search Report issued in European Application No. 18818437.8, dated Dec. 2, 2020.
Lin D-L, et al., "Color Range Images Captured by a Four-Phase CMOS Image Sensor", IEEE Transactions on Electron Devices, IEEE Service Centre, Piscataway, NJ, US., vol. 58, No. 3, Mar. 1, 2011, p. 732-739.
European Patent Office (EPO), Communication pursuant to Article 94(3) EPC issued to EP Application No. 18818437.8 dated Sep. 7, 2022.

* cited by examiner

Expanded view 2724

Chips 2716

Imaging region 2722

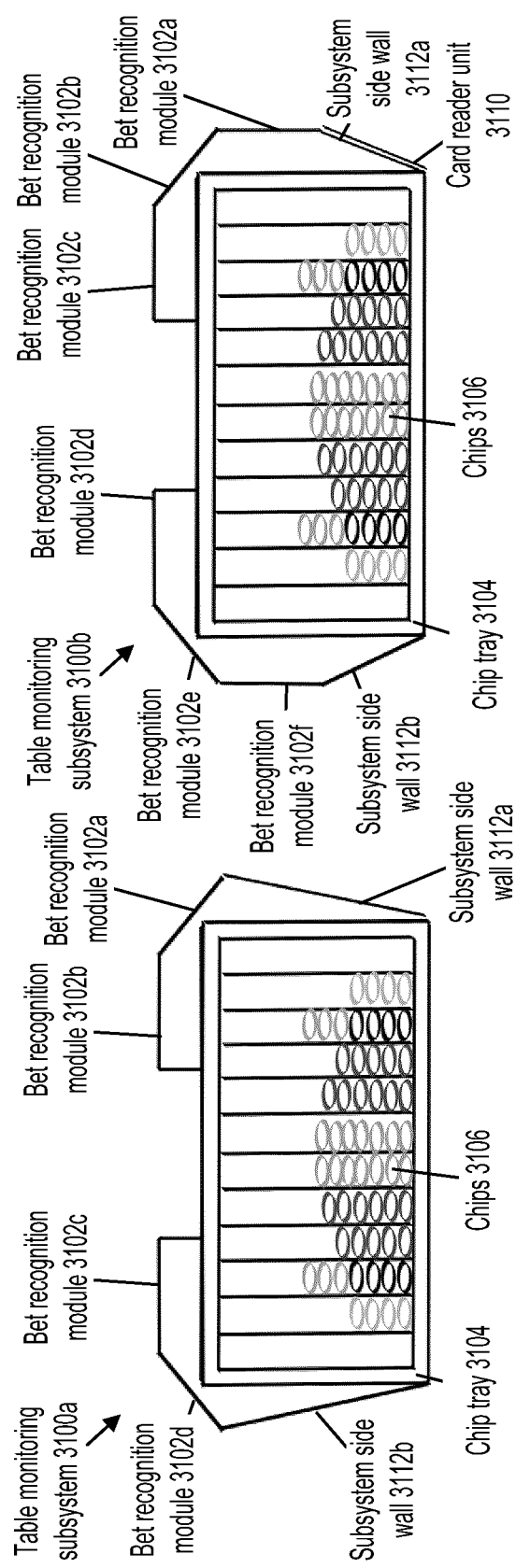
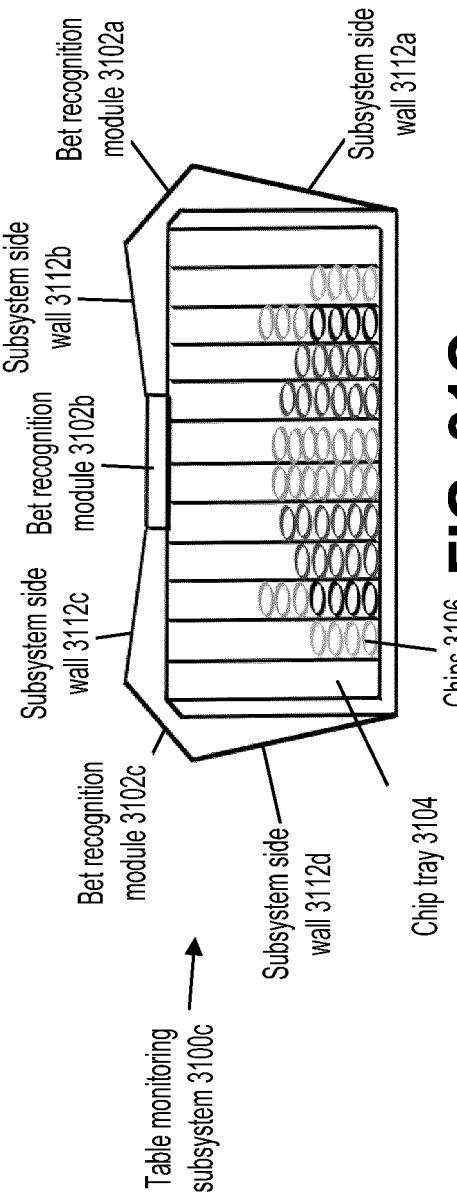
FIG. 31A
FIG. 31B
FIG. 31C

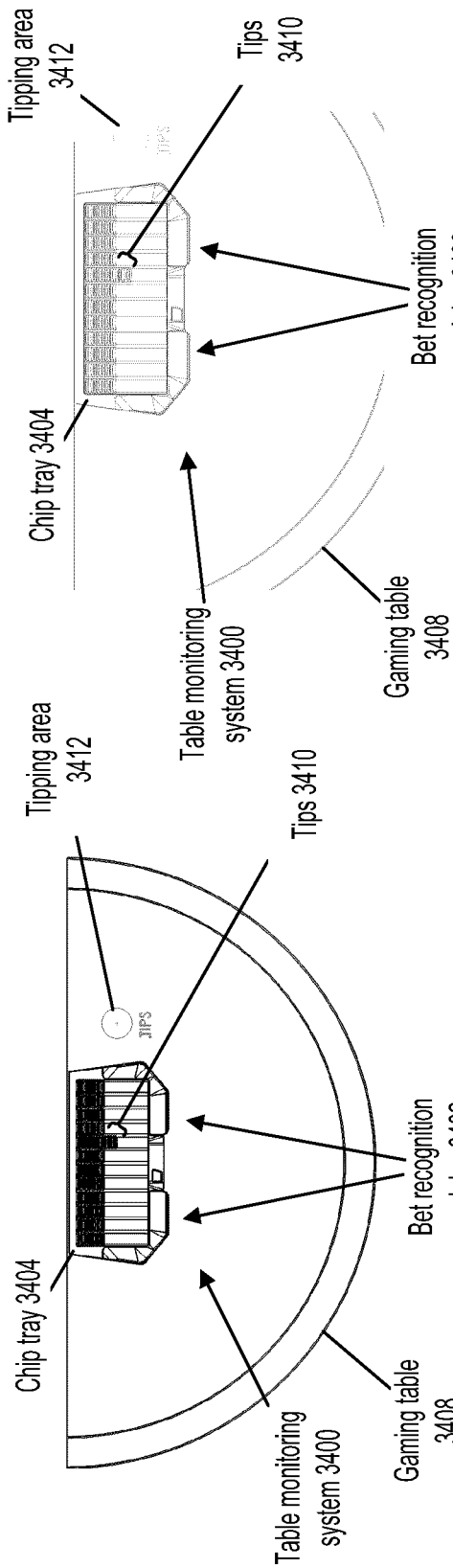
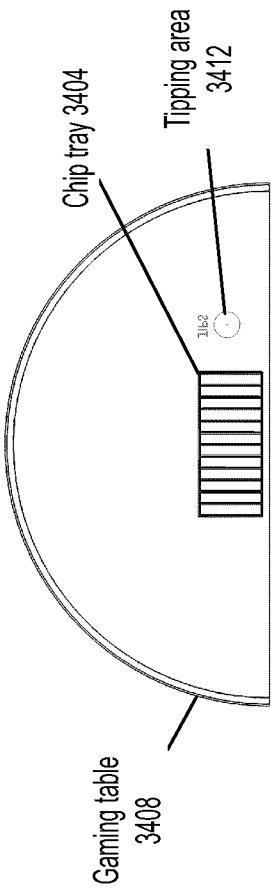
FIG. 34G
FIG. 34H
FIG. 34I

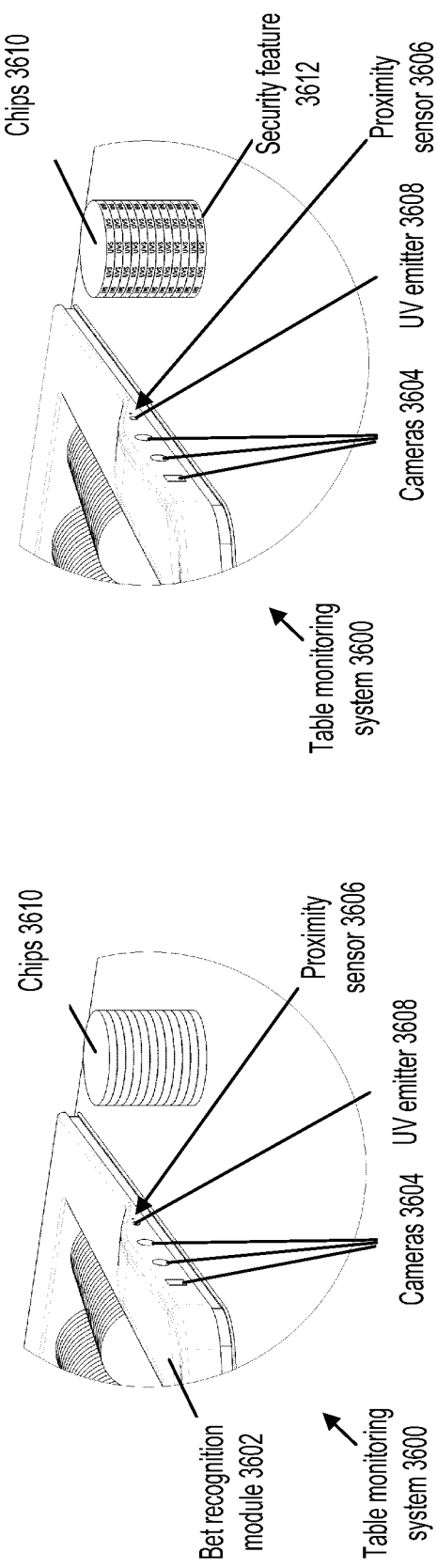
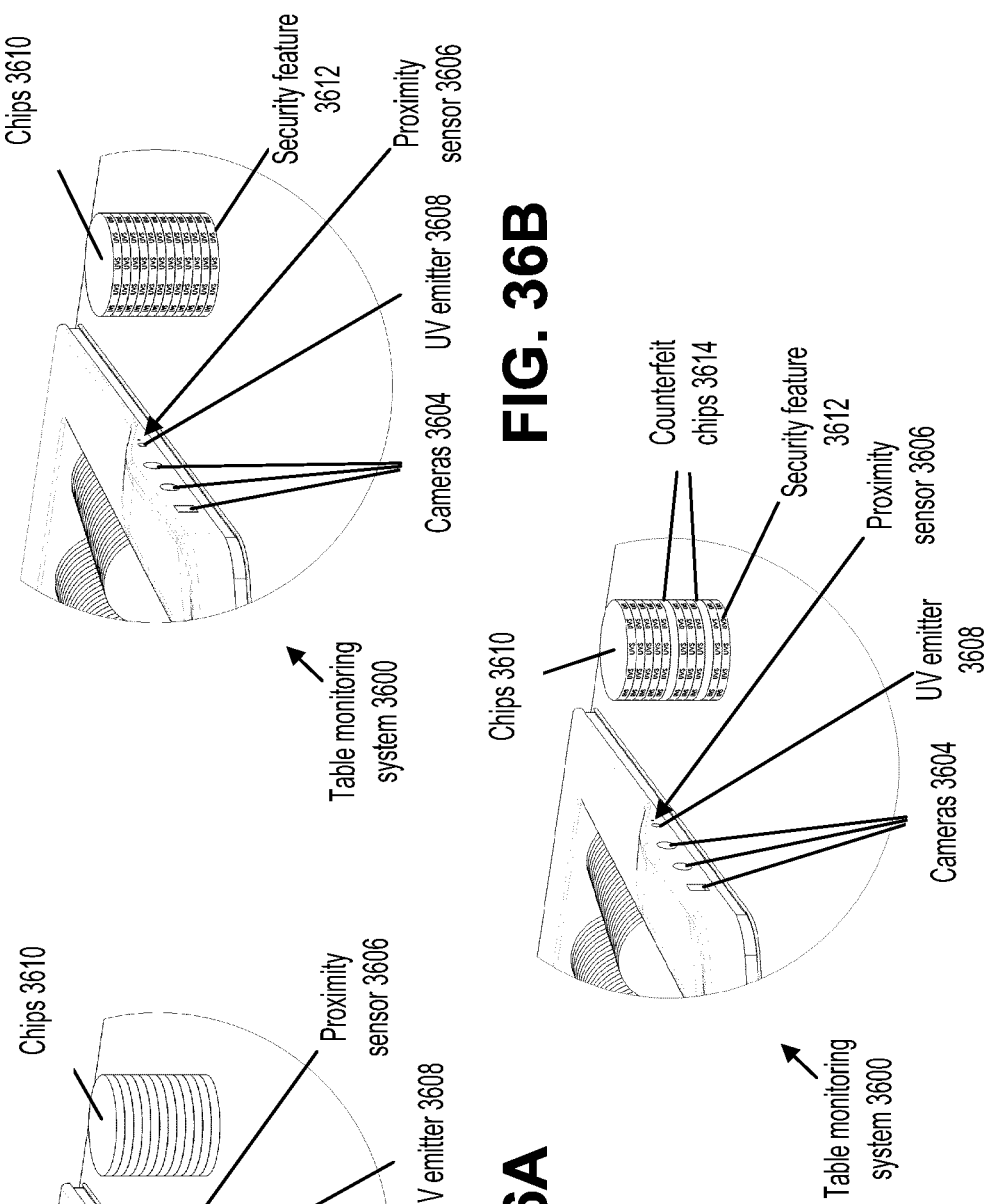
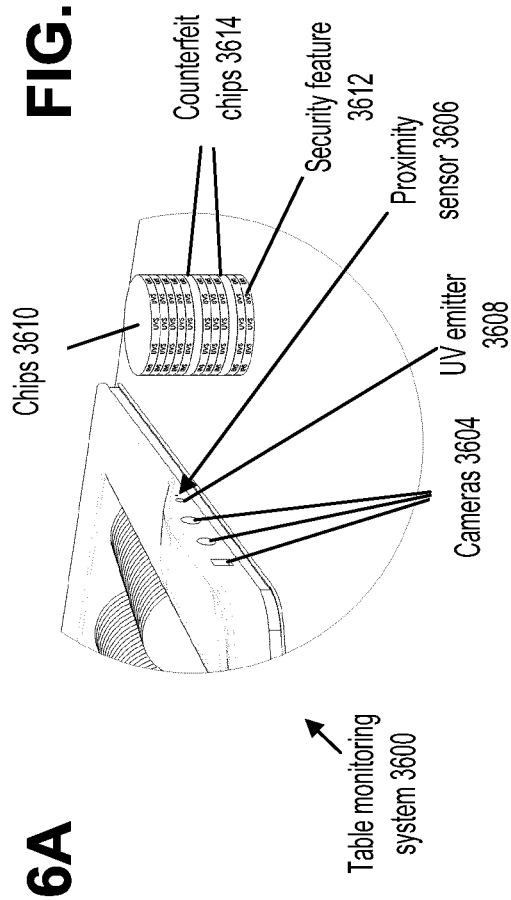
FIG. 36A
FIG. 36B
FIG. 36C

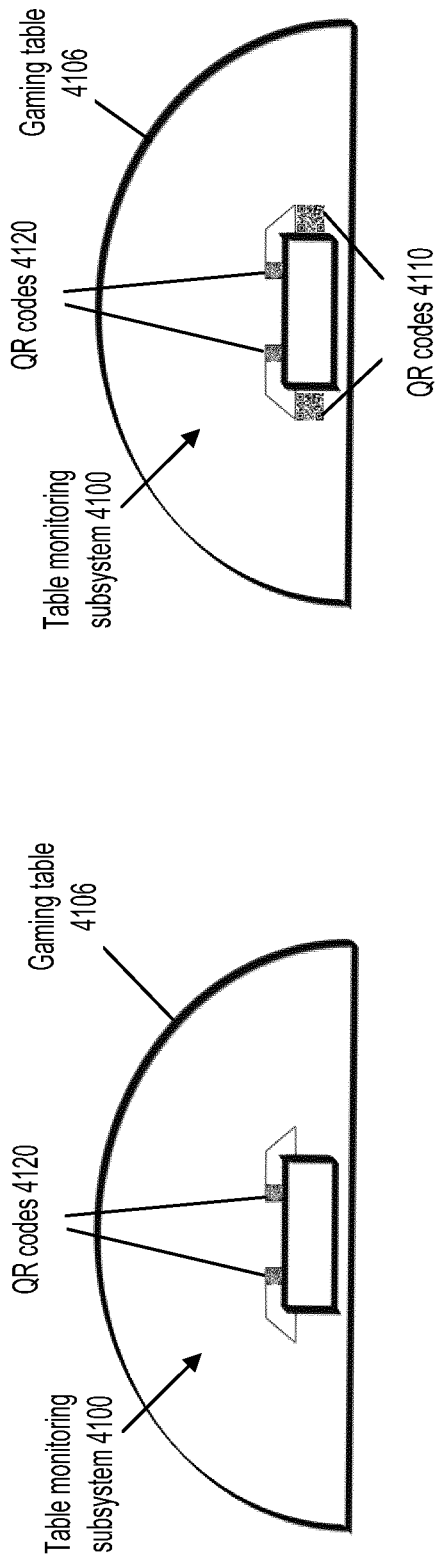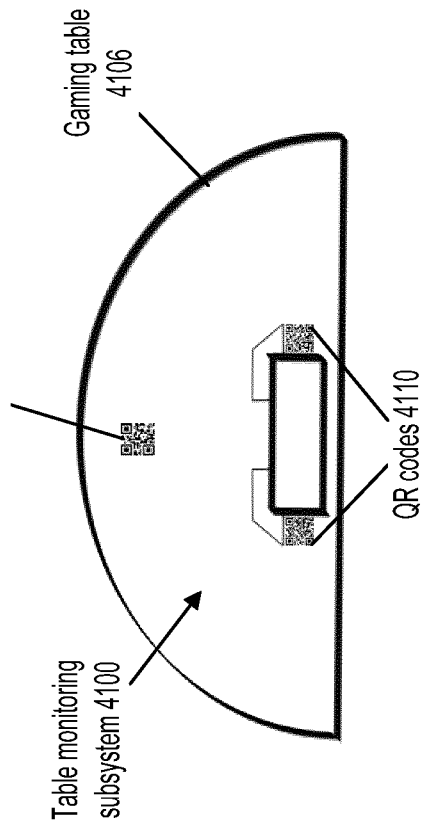

Card Shoe 4500

SYSTEMS, METHODS AND DEVICES FOR MONITORING GAMING TABLES

CROSS REFERENCE TO RELATED APPLICATIONS

This application is a non-provisional of, and claims all benefit including priority to U.S. Application No. 62/519,637 entitled SYSTEMS, METHODS AND DEVICES FOR MONITORING GAMING TABLES filed on Jun. 14, 2017, the content of which is incorporated herein in its entirety.

FIELD

Embodiments generally relate to the field of monitoring activities at gaming tables in casinos and other gaming establishments, and in particular, to monitoring game activities including betting activities and the transfer of chips between a player and a dealer at a gaming table.

INTRODUCTION

Casinos and gaming establishments may offer a variety of card games to customers. Card games involve various game activities, such as card play and betting, for example. A card game may be played at a gaming table by players, including a dealer and one or more customers. It may be desirable for casinos or gaming establishments to monitor betting activities and the transfer of chips between a player and a dealer at a gaming table for security and management purposes.

Gaming establishments are diverse in layouts, lighting, and security measures, among others. For example, betting markers, such as chips, may have varying designs and markings that not only distinguish between chip types (e.g., chip values), but also different series of chips having the same values (e.g., to reduce the risk counterfeiting and/or to enable tracking).

SUMMARY

In accordance with an aspect, there is provided a device for monitoring table activities at a gaming table with a component of: at least a first imaging component supported on or adjacent to a face of a chip tray, at least a second imaging component supported adjacent to or on a second surface of the chip tray. The at least a first imaging component and the at least second imaging component configured to capture image data corresponding to one or more chips positioned in at least one betting area on a gaming surface of the gaming table. The at least first imaging component and the at least second imaging component positioned to image a gaming surface of the gaming table on which the chip tray is affixed to the gaming table. Each of the at least first imaging component and the at least second imaging component can have an infrared radiation emitter, an infrared radiation sensitive camera, and a visible light-sensitive camera. The device can have a port to transmit captured at least visible information and captured at least infrared radiation from the at least two cameras to a processor.

In some embodiments, the infrared sensitive camera has a camera sensitive to infrared radiation with a cut-off filter lens between the infrared sensitive camera at the at least one betting area on the gaming table.

In some embodiments, the visible light emitter has a visible light emitter aligned on a lower portion of the device underneath all of the infrared emitter and lenses opening to the infrared radiation sensitive camera, and the visible light-sensitive camera.

In some embodiments, multiple components are secured to a single support physically separated from the chip tray that has the visible radiation emitter positioned to emit radiation at an angle approximately perpendicular to a forward surface of the support.

In some embodiments, at least two multiple components are symmetrically disposed on the single support.

In some embodiments, at least two multiple components are mirror-image symmetrically disposed on the single support.

In some embodiments, with respect to a nominal line centered on the support, at least two of the multiple components are angled outwardly from the midline with capture ranges of the cameras in each of the at least two multiple components overlapping on the midline.

In some embodiments, with respect to a nominal line centered on the support, at least two of the multiple components are angled outwardly from the midline with capture ranges of the cameras in each of the at least two multiple components overlapping on the midline.

In some embodiments, with respect to a nominal line centered on the support, at least two of the multiple components are angled outwardly from the midline with capture ranges of the cameras in each of the at least two multiple components overlapping on the midline.

In some embodiments, with respect to a nominal line centered on the support, at least two of the multiple components are angled outwardly from the midline with capture ranges of the cameras in each of the at least two multiple components overlapping on the midline.

In some embodiments, the component has a third camera that is sensitive to ultraviolet radiation.

In some embodiments, the infrared radiation sensitive camera and the visible light-sensitive camera have sufficient horizontal separation such that collected image data from the combination of the infrared radiation sensitive camera and the visible light-sensitive camera enables display of a visible image with depth perspective on a display screen.

In some embodiments, the infrared radiation sensitive camera and the visible light-sensitive camera have sufficient horizontal separation such that collected image data from the combination of the infrared radiation sensitive camera and the visible light-sensitive camera enables display of a visible image with depth perspective on a display screen.

In some embodiments, the device has one or more sensors responsive to activation events and deactivation events to trigger capture of the image data by the first imaging component and the second imaging component.

In some embodiments, activation events and deactivation events are configured to trigger capture of the image data by the first imaging component and the second imaging component.

In some embodiments, the device has a processor configured to pre-process the captured image data to filter at least a portion of background image data to generate a compressed set of image data of the one or more chips free of the background image data.

In some embodiments, the device has a processor configured to pre-process the captured image data to filter at least a portion of background image data to generate a compressed set of image data of the one or more chips free of the background image data.

In some embodiments, the device has four components, wherein fields of focus for all cameras in adjacent components overlap at areas on a surface of the gaming table corresponding to the betting areas.

In some embodiments, the device has four components, wherein fields of focus for all cameras in adjacent components overlap at areas on a surface of the gaming table corresponding to the betting areas.

In some embodiments, the device has four components, wherein fields of focus for all cameras in adjacent components overlap at areas on a surface of the gaming table corresponding to the betting areas.

In some embodiments, the device has four components, wherein fields of focus for all cameras in adjacent components overlap at areas on a surface of the gaming table corresponding to the betting areas.

In some embodiments, the device has a processor in communication with the port and a visual display device having a display surface facing away from the betting areas, the processor configured to convert captured at least visible information and captured at least infrared radiation from the at least two cameras into image data for display on the display device.

In some embodiments, the device has a processor in communication with the port and a visual display device having a display surface facing away from the betting areas, the processor configured to convert captured at least visible information and captured at least infrared radiation from the at least two cameras into image data for display on the display device.

In some embodiments, the device has a processor in communication with the port and a visual display device having a display surface facing away from the betting areas, the processor configured to convert captured at least visible information and captured at least infrared radiation from the at least two cameras into image data for display on the display device.

In some embodiments, the device has a processor in communication with the port and a visual display device having a display surface facing away from the betting areas, the processor configured to convert captured at least visible information and captured at least infrared radiation from the at least two cameras into image data for display on the display device.

In some embodiments, the processor is configured to compress image data combined from the combination of the infrared radiation sensitive camera and the visible light-sensitive camera and there is a communication link from the processor to a bet display component, the communication link configured to transmit the compressed set of image data to generate bet data from wagering positions on the gaming table, the betting data to be displayed on bet display component, including processor determined betting amounts for at least one betting areas.

In accordance with another aspect, there is provided a device for monitoring table activities at a gaming table. The device has an imaging component having within a single housing: an infrared radiation emitter, an infrared radiation sensitive camera, a visible light-sensitive camera, and a visible light emitter. The device further has a port to transmit captured at least visible information and captured at least infrared radiation from the at least two cameras to a processor.

In some embodiments, axes of emission from the infrared radiation emitter and the visible light emitter, and focal areas of the infrared radiation sensitive camera and the visible light-sensitive camera are adjustable to overlap at a distance within the range of 10 to 100 centimeters.

In some embodiments, a gaming table having from two to six devices can be attached to the gaming table such that at least adjacent pairs of the devices have fields of focal overlap of at least twenty percent at a distance of from 10 to 100 centimeters from outermost lenses of the infrared radiation sensitive camera and the visible light-sensitive camera.

In some embodiments, the gaming table has a communication link that is active through the port to a processor configured to capture and transmit both the captured at least visible information and captured at least infrared radiation as content of a visible image to a display in communication with the processor.

In some embodiments, separation of the infrared radiation sensitive camera and the visible light-sensitive camera on the housing is sufficient to enable the captured at least visible information and captured at least infrared radiation to be converted to data enabling display of an image with visual perspective of gaming chips at a distance of from 10 to 100 centimeters from outermost lenses of the infrared radiation sensitive camera and the visible light-sensitive camera.

In accordance with another aspect, there is provided a device for monitoring table activities at a gaming table with a first imaging component configured to be positioned or supported on a first surface of a chip tray, and a second imaging component configured to be positioned or supported on a second surface of a chip tray. The first imaging component and the second imaging component can be configured to capture image data corresponding to one or more chips positioned in at least one betting area on a gaming surface of the respective gaming table when the chip tray is affixed to the gaming table. The one or more sensors can be responsive to activation events and deactivation events to trigger capture of the image data by the first imaging component and the second imaging component. The device has a communication link and a processor configured for transmitting the captured image data or a compressed set of the captured image data to generate bet data for the gaming table, the betting data including betting amounts for the at least one betting areas.

In some embodiments, the first imaging component is positioned or supported on a first tapered corner of the chip tray and the second imaging component is positioned or supported on a second tapered corner of the chip tray.

In some embodiments, the device has a processor configured to pre-process the captured image data to filter at least a portion of background image data to generate a compressed set of image data of the one or more chips free of the background image data.

In some embodiments, each of the first imaging component and the second imaging component has an infrared radiation emitter, an infrared radiation sensitive camera, and a visible light-sensitive camera. The device has a port to transmit captured at least visible information and captured at least infrared radiation from the at least two cameras to the processor.

In some embodiments, the first imaging component and the second imaging component can be positioned substantially parallel to the gaming surface of the gaming table when the chip tray is affixed to the gaming table.

In some embodiments, each of the first imaging component and the second imaging component has a plurality of cameras selected from the group consisting of a red-green-blue camera, an infrared camera, an auxiliary camera, a high resolution camera, and an ultraviolet camera.

In some embodiments, each of the first imaging component and the second imaging component has an emitter configured to emit light detectable by at least one of the plurality of cameras.

In some embodiments, the device has a third imaging component positioned or supported on the first surface of the chip tray, a fourth imaging component positioned or supported on the second surface of the chip tray.

In some embodiments, the device has a card reader unit having an opening and a channel to receive a card, and a contact image sensor and an optical flow sensor mounted to the channel to capture image data corresponding to the card.

In some embodiments, the device has the chip tray having a first tapered corner as part of the first surface and a second tapered corner as part of the second surface.

In some embodiments, the first imaging component has a first camera and a second camera, the first camera having a first field of view, the second camera having a second field of view, the first imaging component having a first bet recognition module and a second bet recognition module connected at an angle, the first camera housed within the first bet recognition module and the second camera housed within the second bet recognition module so that the first field of view overlaps with the second field of view based on the angle.

In some embodiments, the second imaging component has a first camera and a second camera, the first camera having a first field of view, the second camera having a second field of view, the first imaging component having a first bet recognition module and a second bet recognition module connected at an angle, the first camera housed within the first bet recognition module and the second camera housed within the second bet recognition module so that the first field of view overlaps with the second field of view based on the angle.

In some embodiments, the imaging component is positioned to capture the image data at an offset angle relative to a plane of the gaming surface of the respective gaming table; and wherein the offset angle permits the imaging component to capture the image data from sidewalls of the one or more chips.

In some embodiments, the offset angle is an angle selected from the group of angles consisting of about −5 degrees, about −4 degrees, about −3 degrees, about −2 degrees, about −1 degrees, about 0 degrees, about 1 degrees, about 2 degrees, about 3 degrees, about 4 degrees, and about 5 degrees; and the altitude is an altitude selected from the group of altitudes consisting of about 0.2 cm, about 0.3 cm, about 0.4 cm, about 0.5 cm, about 0.6 cm, about 0.7 cm, about 0.8 cm, about 0.9 cm, and about 1.0 cm.

In some embodiments, the device has an illumination strip extending from the first tapered corner to the second tapered corner of the chip tray, the illumination strip to provide a reference illumination.

In some embodiments, the device has an illumination strip to provide a reference illumination and a restrictor configured to restrict a beam angle of the reference illumination.

In some embodiments, the device has an illumination strip adapted to provide a reference illumination on the one or more chips, the illumination strip positioned at a substantially horizontal angle to provide illumination on the sidewalls of the one or more chips; the substantially horizontal angle selected such that the presence of shadows on the one or more chips is reduced.

In some embodiments, the illumination strip is controllable by the processor and configured to provide the reference illumination in accordance with control signals received from the processor. The control signals, when processed by the illumination strip, cause the illumination strip to change an intensity of the reference illumination based at least on ambient lighting conditions, the control signals adapted to implement a feedback loop wherein the reference illumination on the one or more chips is substantially constant despite changes to the ambient lighting conditions.

In some embodiments, the device has a body that joins the first imaging component and the second imaging component.

In some embodiments, the first imaging component and the second imaging component are joined together by a third imaging component interposed therebetween, the third imaging component configured to capture image data corresponding to the one or more chips positioned in at least one betting area on a gaming surface of the respective gaming table.

In some embodiments, the infrared sensitive camera can be a camera sensitive to infrared radiation with a cut-off filter lens between the infrared sensitive camera at the at least one betting area on the gaming table.

In some embodiments, the visible light emitter can be a visible light emitter aligned on a lower portion of the device underneath all of the infrared emitter and lenses opening to the infrared radiation sensitive camera, and the visible light-sensitive camera.

In some embodiments, multiple components are secured to a single support physically separated from the chip tray that has the visible radiation emitter positioned to emit radiation at ab angle approximately perpendicular to a forward surface of the support.

In some embodiments, at least two multiple components are symmetrically disposed on the single support.

In some embodiments, at least two multiple components are mirror-image symmetrically disposed on the single support.

In some embodiments, with respect to a nominal line centered on the support, at least two of the multiple components are angled outwardly from the midline with capture ranges of the cameras in each of the at least two multiple components overlapping on the midline.

In some embodiments, with respect to a nominal line centered on the support, at least two of the multiple components are angled outwardly from the midline with capture ranges of the cameras in each of the at least two multiple components overlapping on the midline.

In some embodiments, with respect to a nominal line centered on the support, at least two of the multiple components are angled outwardly from the midline with capture ranges of the cameras in each of the at least two multiple components overlapping on the midline.

In some embodiments, with respect to a nominal line centered on the support, at least two of the multiple components are angled outwardly from the midline with capture ranges of the cameras in each of the at least two multiple components overlapping on the midline.

In some embodiments, the first imaging component has a third camera that is sensitive to ultraviolet radiation.

In some embodiments, the infrared radiation sensitive camera and the visible light-sensitive camera have sufficient horizontal separation such that collected image data from the combination of the infrared radiation sensitive camera and the visible light-sensitive camera enables display of a visible image with depth perspective on a display screen.

In some embodiments, the infrared radiation sensitive camera and the visible light-sensitive camera have sufficient horizontal separation such that collected image data from the combination of the infrared radiation sensitive camera and the visible light-sensitive camera enables display of a visible image with depth perspective on a display screen.

In some embodiments, the device has one or more sensors responsive to activation events and deactivation events to trigger capture of the image data by the first imaging component and the second imaging component.

In some embodiments, activation events and deactivation events are configured to trigger capture of the image data by the first imaging component and the second imaging component.

In some embodiments, the device has four components, wherein fields of focus for all cameras in adjacent components overlap at areas on a surface of the gaming table corresponding to the betting areas.

In some embodiments, the device has four components, wherein fields of focus for all cameras in adjacent components overlap at areas on a surface of the gaming table corresponding to the betting areas.

In some embodiments, the device has four components, wherein fields of focus for all cameras in adjacent components overlap at areas on a surface of the gaming table corresponding to the betting areas.

In some embodiments, the device has four components, wherein fields of focus for all cameras in adjacent components overlap at areas on a surface of the gaming table corresponding to the betting areas.

In some embodiments, the device has a processor in communication with the port and a visual display device having a display surface facing away from the betting areas, the processor configured to convert captured at least visible information and captured at least infrared radiation from the at least two cameras into image data for display on the display device.

In some embodiments, the device has a processor in communication with the port and a visual display device having a display surface facing away from the betting areas, the processor configured to convert captured at least visible information and captured at least infrared radiation from the at least two cameras into image data for display on the display device.

In some embodiments, the device has a processor in communication with the port and a visual display device having a display surface facing away from the betting areas, the processor configured to convert captured at least visible information and captured at least infrared radiation from the at least two cameras into image data for display on the display device.

In some embodiments, the device has a processor in communication with the port and a visual display device having a display surface facing away from the betting areas, the processor configured to convert captured at least visible information and captured at least infrared radiation from the at least two cameras into image data for display on the display device.

In some embodiments, the processor is configured to compress image data combined from the combination of the infrared radiation sensitive camera and the visible light-sensitive camera and there is a communication link from the processor to a bet display component, the communication link configured to transmit the compressed set of image data to generate bet data from wagering positions on the gaming table, the betting data to be displayed on bet display component, including processor determined betting amounts for at least one betting areas.

In some embodiments, the device has a lammer rack releasably mountable to the first imaging component and the second imaging component, the lammer rack having at least one vertical channel for receiving lammers therein.

In some embodiments, the first imaging component and the second imaging component are joined together by a third imaging component interposed therebetween, the third imaging component configured to capture image data corresponding to one or more chips positioned in at least one betting area on a gaming surface of the respective gaming table.

In some embodiments, an optical sensor is mounted along an axial length of each of the at least one vertical channel to capture image data corresponding to the lammers received in the channels.

In some embodiments, the first imaging component and the second imaging component are mountable on the gaming table.

In some embodiments, the first imaging component and the second imaging component are mountable on a metal plate for mounting to the gaming table.

In some embodiments, the first imaging component and the second imaging component are mountable to the chip tray.

In some embodiments, the first imaging component has a first body, the second imaging component has a second body, and the chip tray has a third body, and wherein the first body, the second body, and the third body are integrally formed to define a device chassis.

In some embodiments, the first imaging component and the second imaging component are configured to capture image data corresponding to chips in a channel of the chip tray.

In some embodiments, the third imaging component and the fourth imaging component are configured to capture image data corresponding to chips in a channel of the chip tray.

In some embodiments, the first imaging component is configured to determine one or more depth values corresponding to one or more distances from a reference point to the one or more chips, each of the depth values corresponding to the distance to a corresponding chip.

In some embodiments, the imaging component determines the one or more depth values by using at least one of Doppler radar measurements, parallax measurements, infrared thermography, shadow measurements, light intensity measurements, relative size measurements, and illumination grid measurements.

In some embodiments, the first imaging component has at least two sensors configured to determine the one or more depth values by measuring stereo parallax.

In some embodiments, the processor is configured to determine a presence of one or more obstructing objects that are partially or fully obstructing the one or more chips from being imaged by the imaging component or sensed by the one or more sensors, the presence of the one or more obstructing objects being determined by continuously monitoring the one or more depth values to track when the one or more depth values abruptly changes responsive to the obstruction.

In some embodiments, at least one of the processor is configured to, responsive to positively determining the presence of the one or more obstructing objects that are partially or fully obstructing the one or more chips from being imaged by the imaging component or sensed by the one or more sensors, aggregate a plurality of captured images over a duration of time and to compare differences between each of the plurality of captured images to estimate the presence of the one or more chips despite the presence of the one or more obstructing objects that are partially or fully obstructing the one or more chips from being imaged.

In some embodiments, at least one of the processor and the game monitoring server are configured to, responsive to positively determining the presence of the one or more obstructing objects that are partially or fully obstructing the one or more chips from being sensed by the one or more sensors, aggregate a plurality of captured images over a duration of time and to compare differences between each of the plurality of captured images to estimate the presence of the one or more chips despite the presence of the one or more obstructing objects that are partially or fully obstructing the one or more chips from being sensed by the one or more sensors.

In some embodiments, a compressed set of image data free of background image data is obtained by using an estimated chip stack height in combination with the more one or more depth values to determine a chip stack bounding box that is used for differentiating between the background image data and chip image data during the pre-processing.

In some embodiments, the activation events and deactivation events are triggered by a signal received from an external transmitter.

In some embodiments, the external transmitter is a transmitting device coupled to a dealer shoe that transmits a signal whenever the dealer shoe is operated.

In some embodiments, the device has an interface engine adapted to provision an interface providing real or near-real-time betting data to a dealer, the real or near-real-time betting data based on the betting data extracted by the game monitoring server from the captured image data, the betting data including one or more estimated values for each stack of chips in one or more betting areas of the gaming surface.

In accordance with another aspect, there is provided a device for monitoring game activities at a gaming table with a first imaging component configured to be positioned or supported on a surface of the gaming table, and a second imaging component configured to be positioned or supported on the surface of the gaming table. The first imaging component and the second imaging component can be configured to capture image data corresponding to one or more chips positioned in at least one betting area on the surface of the gaming table when affixed to the gaming table. The device has a ratchet bar extendable through the gaming table and receivable by a securing block below the gaming table for mounting the device to the gaming surface of the gaming table, one or more sensors responsive to activation events and deactivation events to trigger capture of the image data by the first imaging component and the second imaging component, a processor configured to pre-process the captured image data to filter at least a portion of background image data to generate a compressed set of image data of the one or more chips free of the background image data, and a communication link configured for transmitting the compressed set of image data to generate betting data for the gaming table, the betting data including betting amounts for the at least one betting areas.

In accordance with another aspect, there is provided a tray for monitoring chips in the tray, the tray having a body defining a channel for receiving the chips, a tray imaging component configured to capture image data of chips in the channel, one or more sensors responsive to activation events and deactivation events to trigger capture of the image data by the tray imaging component, and a communication link configured for transmitting the compressed set of image data to generate tray chip data for the tray, the tray chip data including an amount of chips received in the tray.

In some embodiments, the tray imaging component has a time of flight sensor mounted to a front end of the channel, the time of flight sensor directing a laser to the chips received in the channel for determining a depth of the chips in the channel.

In some embodiments, the tray imaging component has a camera mounted to a front end of the tray for detecting the image data corresponding to chips received in the channel.

In some embodiments, the tray imaging component has an optic sensor axially mounted to a base of the channel for detecting the image data corresponding to chips received in the channel.

Many further features and combinations thereof concerning embodiments described herein will appear to those skilled in the art following a reading of the instant disclosure.

DESCRIPTION OF THE FIGURES

Embodiments will now be described, by way of example only, with reference to the attached figures, wherein in the figures:

FIGS. 31A-31E illustrate schematic diagrams of example table monitoring subsystems mounted to example chips trays according to some embodiments.

FIGS. 34A-34M illustrate schematic diagrams of tips being monitored by a table monitoring subsystem according to some embodiments.

FIGS. 36A-36C illustrate schematic diagrams of a portion of an example table monitoring subsystem configured to verify chips on a gaming table according to some embodiments.

FIGS. 41A-41B illustrate schematic diagrams of chips on a gaming table being monitored by a table monitoring subsystem and an overhead camera according to some embodiments.

FIG. 41C illustrates schematic diagrams of QR codes mounted on a table monitoring subsystem according to some embodiments.

FIGS. 41D-41E illustrate schematic diagrams of QR codes mounted on a gaming table and a table monitoring subsystem according to some embodiments.

FIG. 42A illustrates a perspective view of another example table monitoring subsystem according to some embodiments.

FIG. 42B illustrates a top view of the table monitoring subsystem of FIG. 42A according to some embodiments.

FIG. 42C illustrates a bottom view of the table monitoring subsystem of FIG. 42A according to some embodiments.

FIG. 42D illustrates a left view of the table monitoring subsystem of FIG. 42A according to some embodiments.

FIG. 42E illustrates a right view of the table monitoring subsystem of FIG. 42A according to some embodiments.

FIG. 42F illustrates a front view of the table monitoring subsystem of FIG. 42A according to some embodiments.

FIG. 42G illustrates a back view of the table monitoring subsystem of FIG. 42A according to some embodiments.

FIG. 43A illustrates a perspective view of another example table monitoring subsystem according to some embodiments.

FIG. 43B illustrates a top view of the table monitoring subsystem of FIG. 43A according to some embodiments.

Figure 43A:
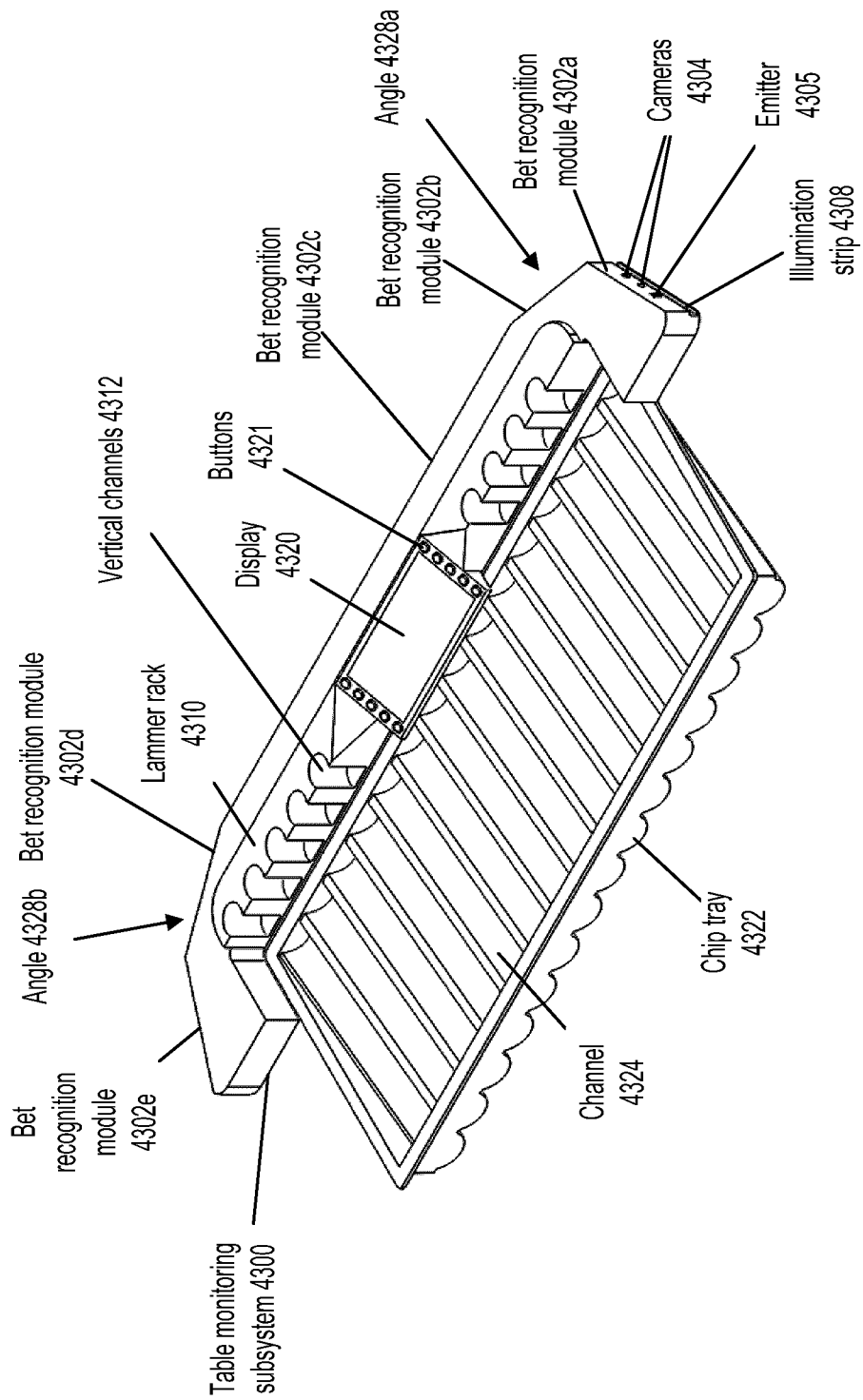
Figure 43B:
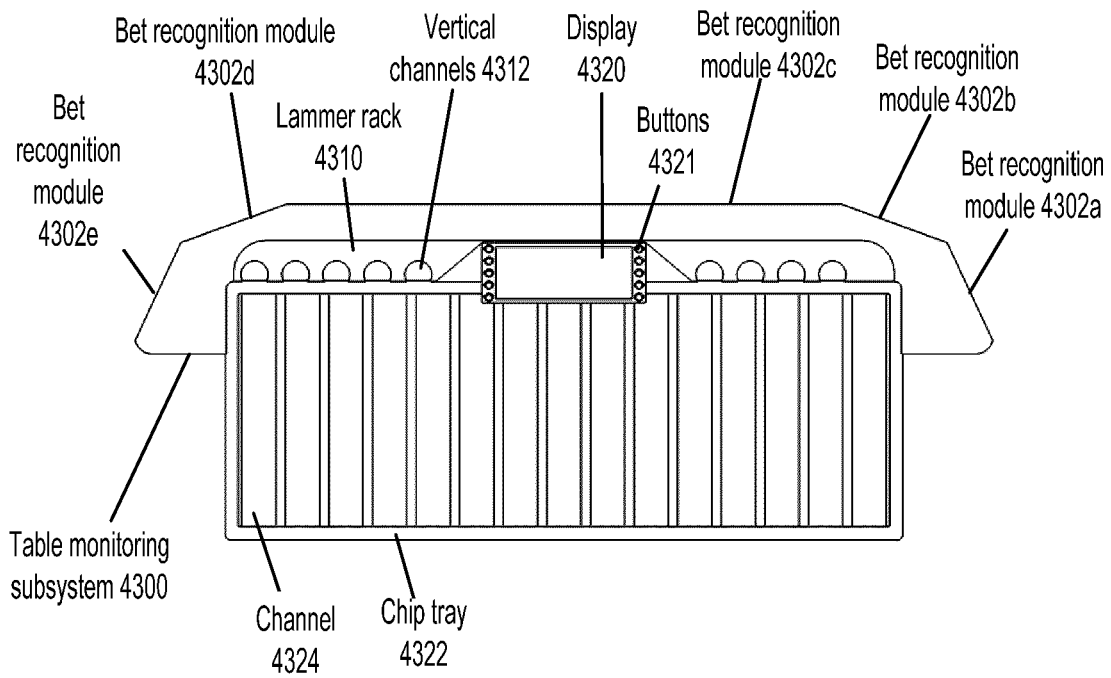
Figure 43C:
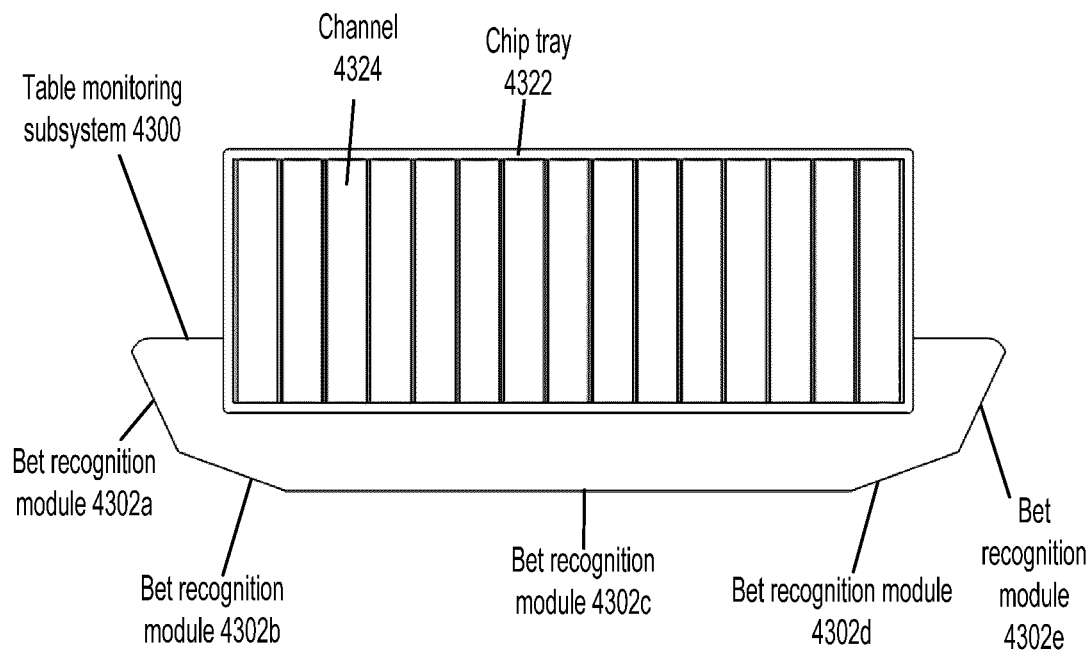

FIG. 43C illustrates a bottom view of the table monitoring subsystem of FIG. 43A according to some embodiments.

Figure 43D:
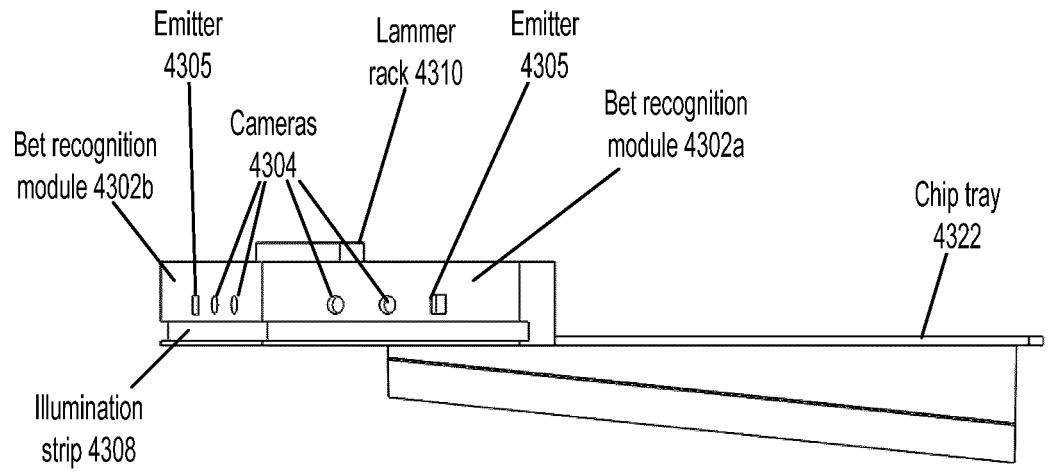

FIG. 43D illustrates a left view of the table monitoring subsystem of FIG. 43A according to some embodiments.

Figure 43E:
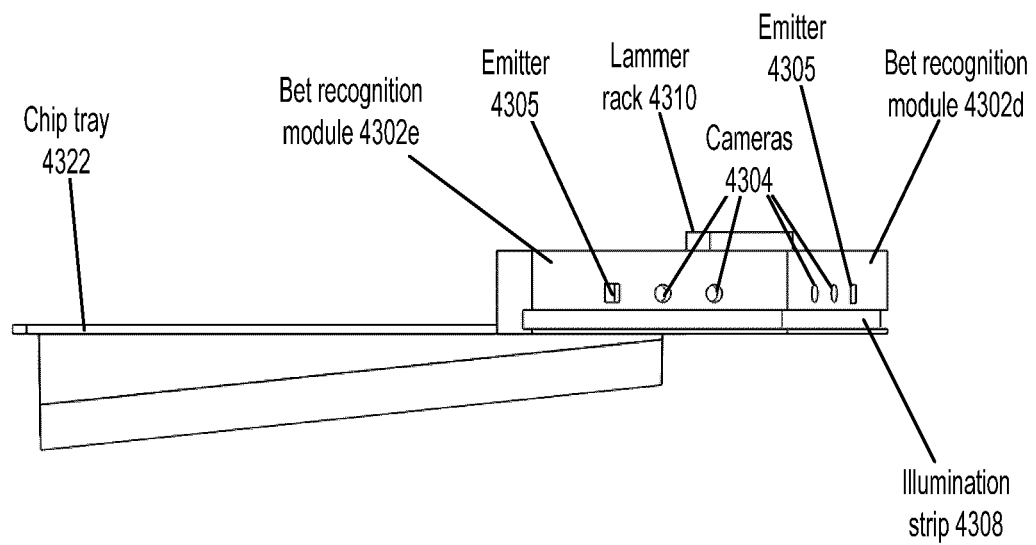

FIG. 43E illustrates a right view of the table monitoring subsystem of FIG. 43A according to some embodiments.

Figure 43F:
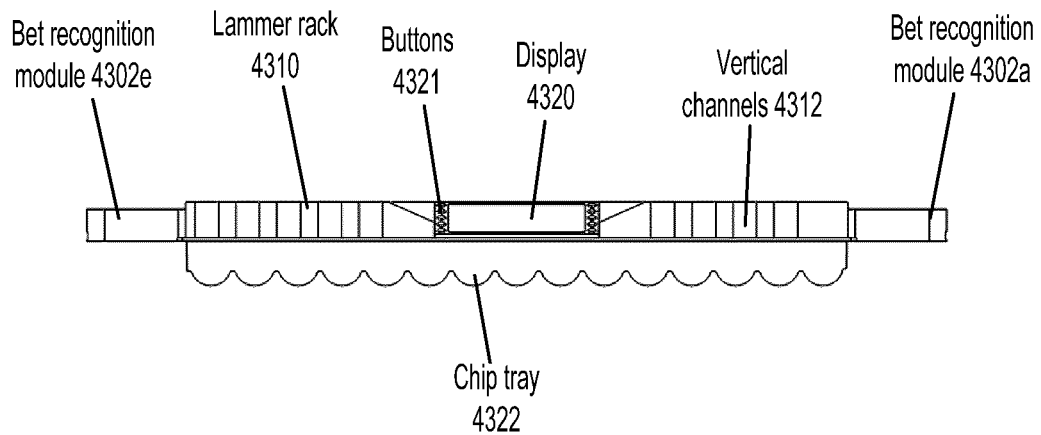

FIG. 43F illustrates a front view of the table monitoring subsystem of FIG. 43A according to some embodiments.

Figure 43G:
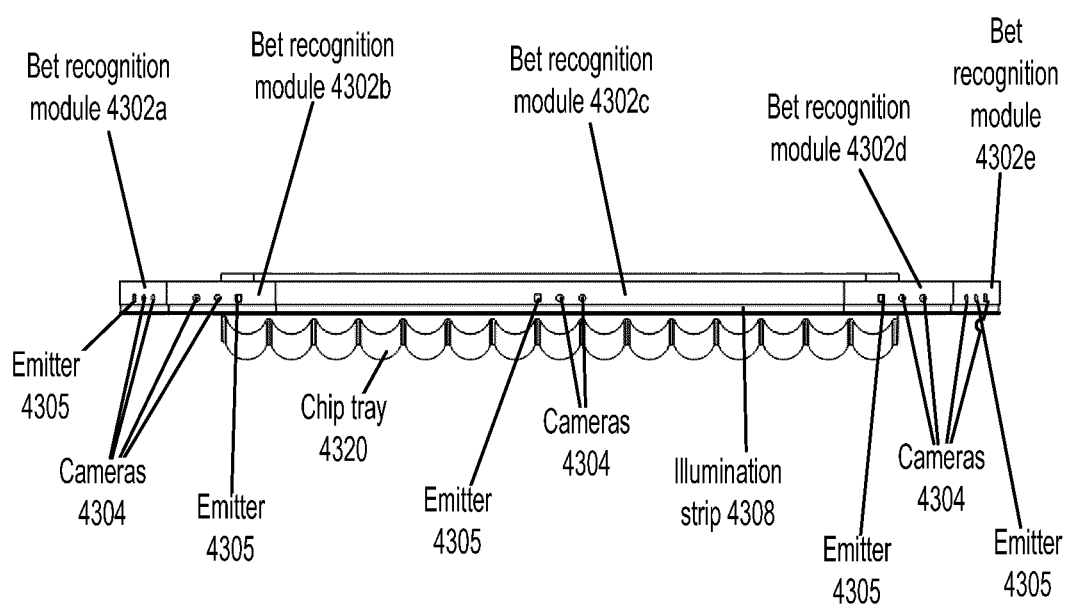

FIG. 43G illustrates a back view of the table monitoring subsystem of FIG. 43A according to some embodiments.

Figure 44A:
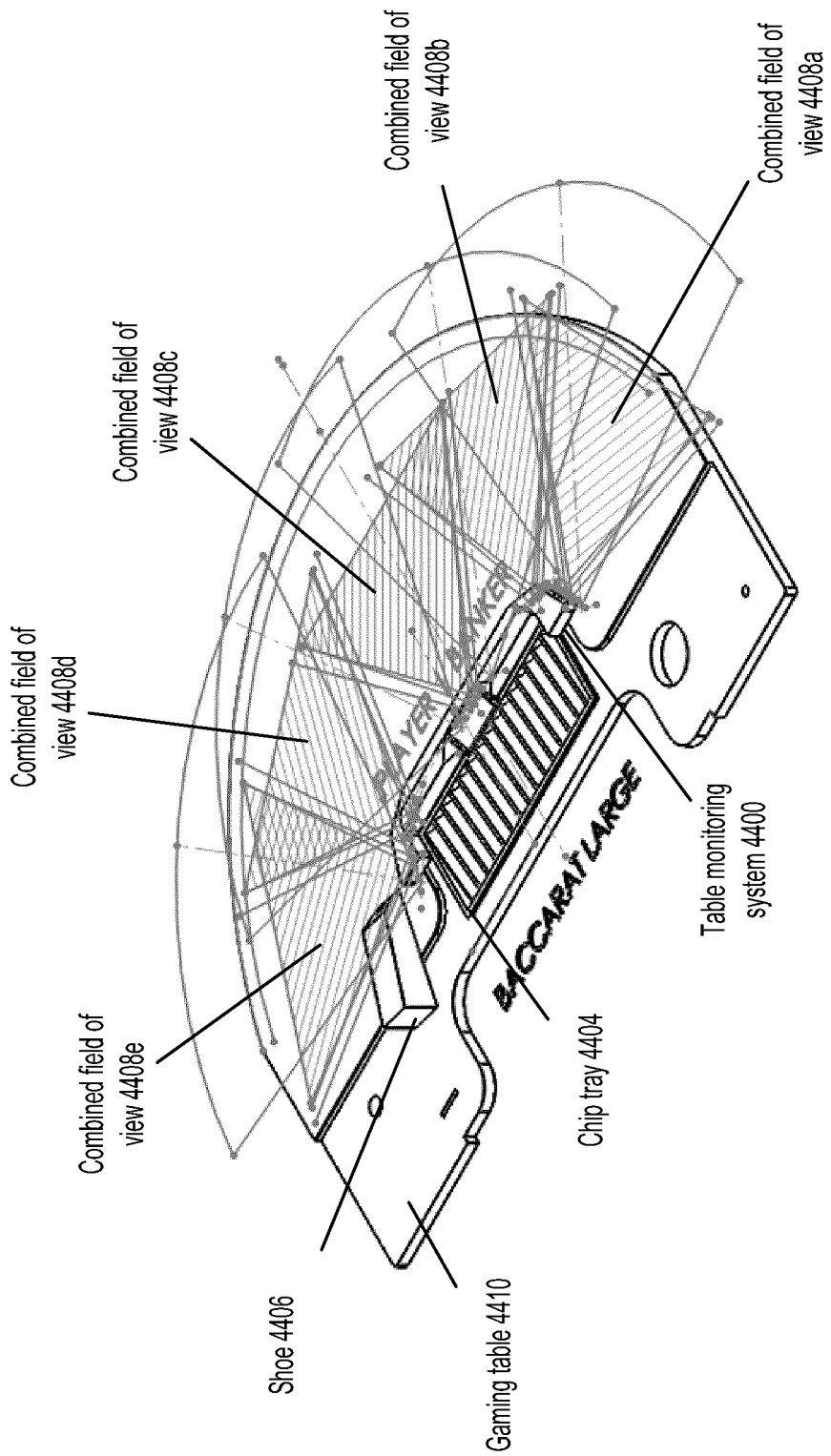

FIG. 44A illustrates a perspective view of another example table monitoring subsystem according to some embodiments.

Figure 44B:
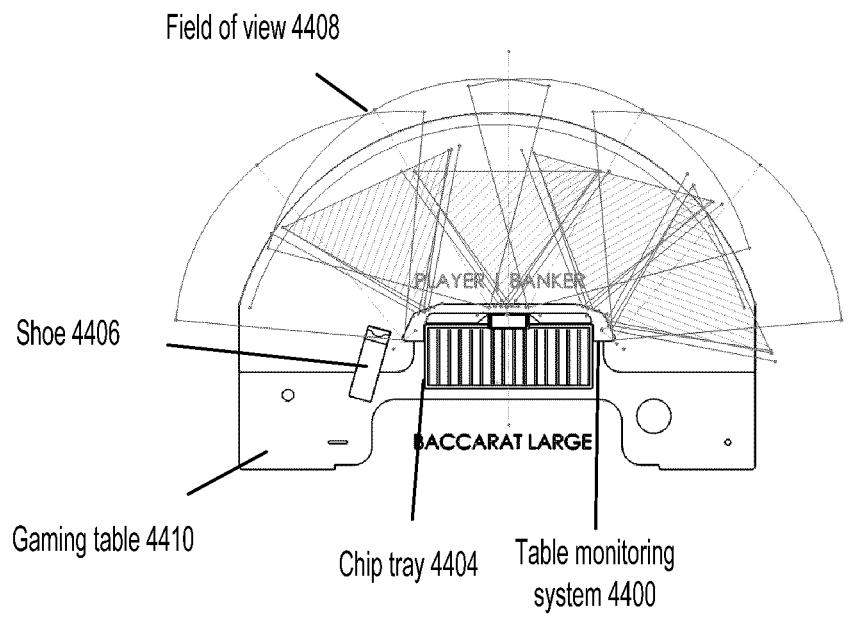

FIG. 44B illustrates a top view of the table monitoring subsystem of FIG. 44A according to some embodiments.

Figure 44C:
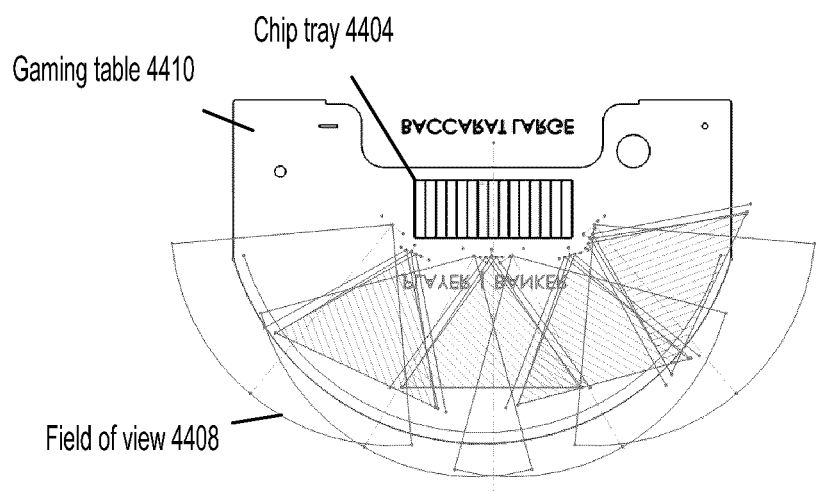

FIG. 44C illustrates a bottom view of the table monitoring subsystem of FIG. 44A according to some embodiments.

Figure 44D:
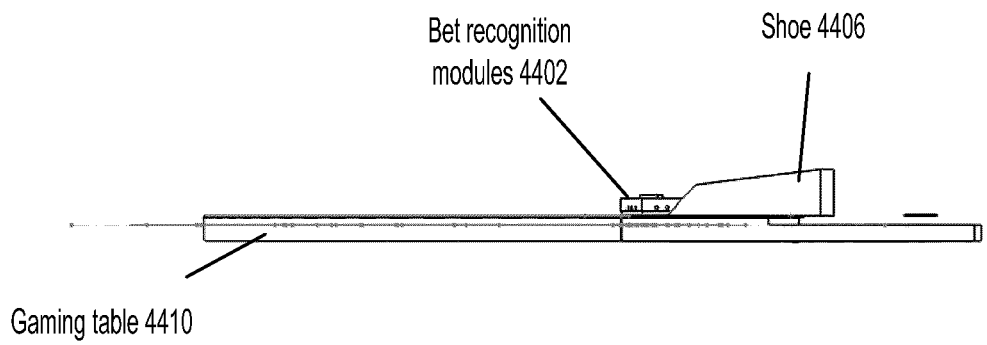

FIG. 44D illustrates a left view of the table monitoring subsystem of FIG. 44A according to some embodiments.

Figure 44E:
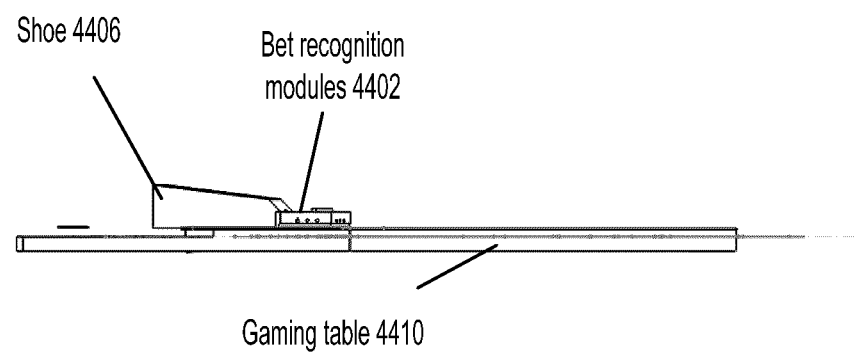

FIG. 44E illustrates a right view of the table monitoring subsystem of FIG. 44A according to some embodiments.

Figure 44F:
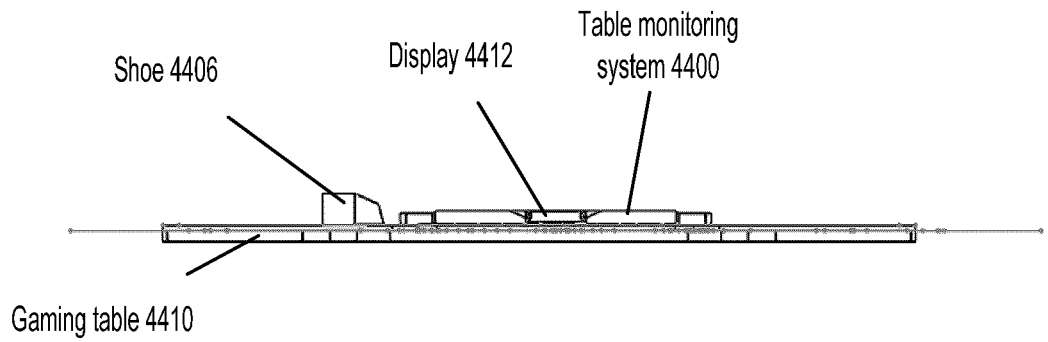

FIG. 44F illustrates a front view of the table monitoring subsystem of FIG. 44A according to some embodiments.

Figure 44G:
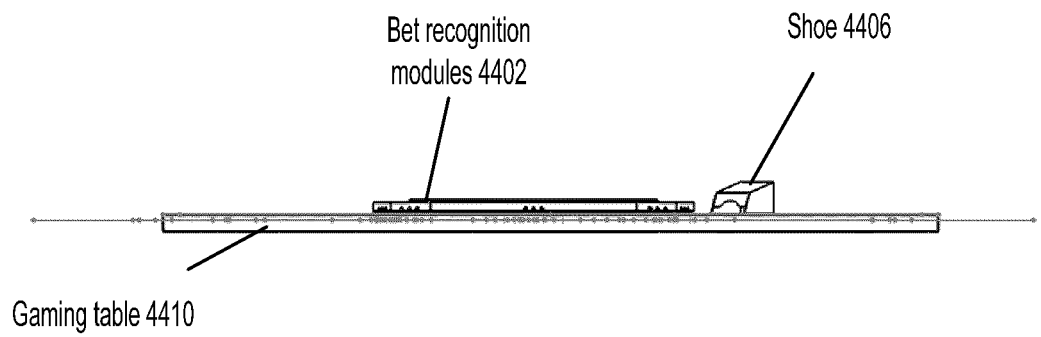

FIG. 44G illustrates a back view of the table monitoring subsystem of FIG. 44A according to some embodiments.

FIGS. 45A to 45I illustrate schematic diagrams of shoe devices according to some embodiments.

Figure 46A:
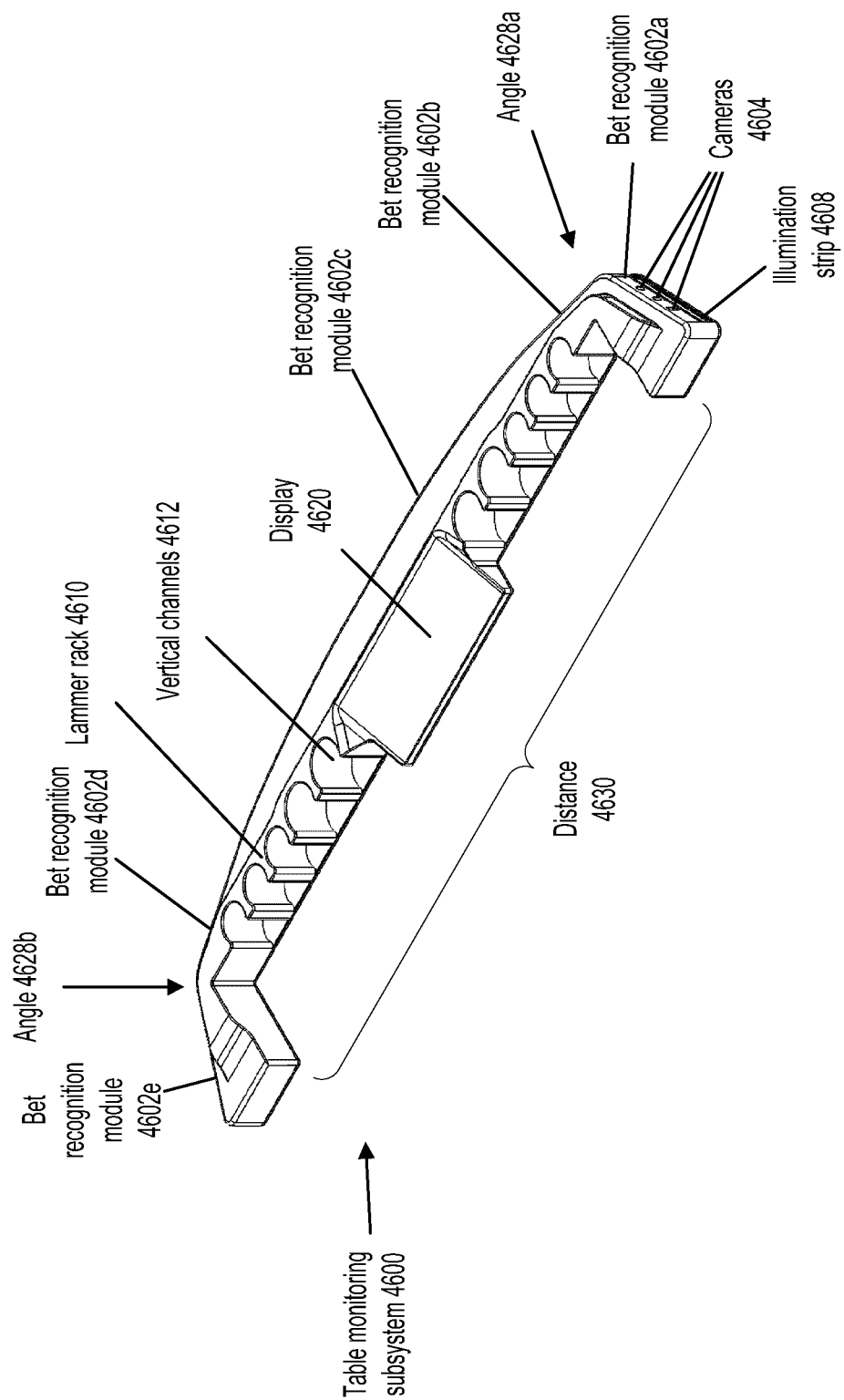

FIG. 46A illustrates a perspective view of another example table monitoring subsystem according to some embodiments.

Figure 46B:
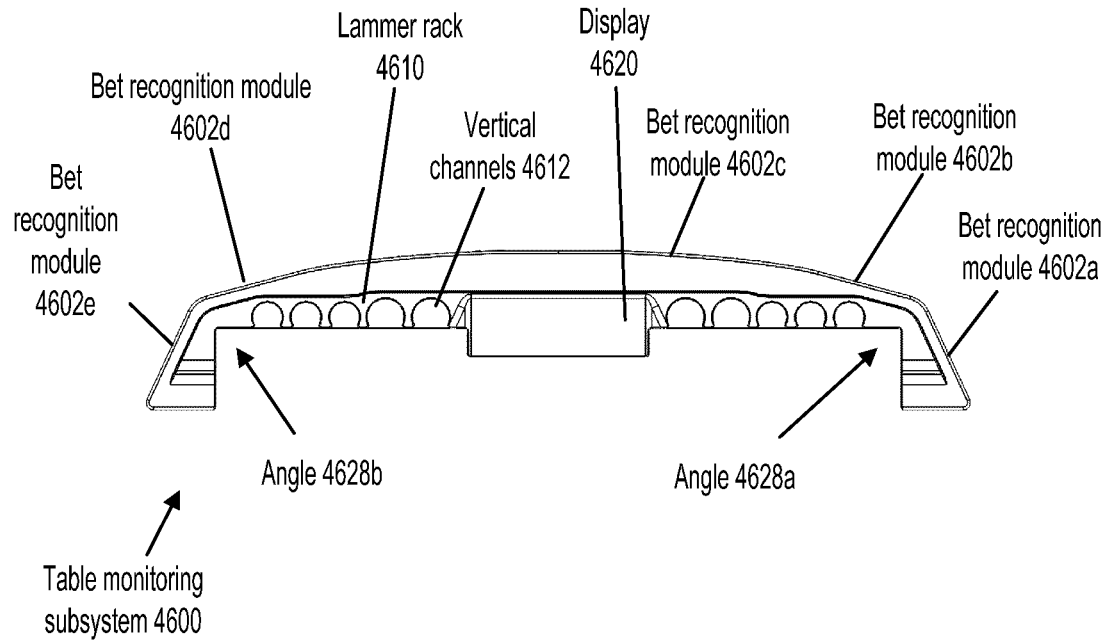

FIG. 46B illustrates a top view of the table monitoring subsystem of FIG. 46A according to some embodiments.

Figure 46C:
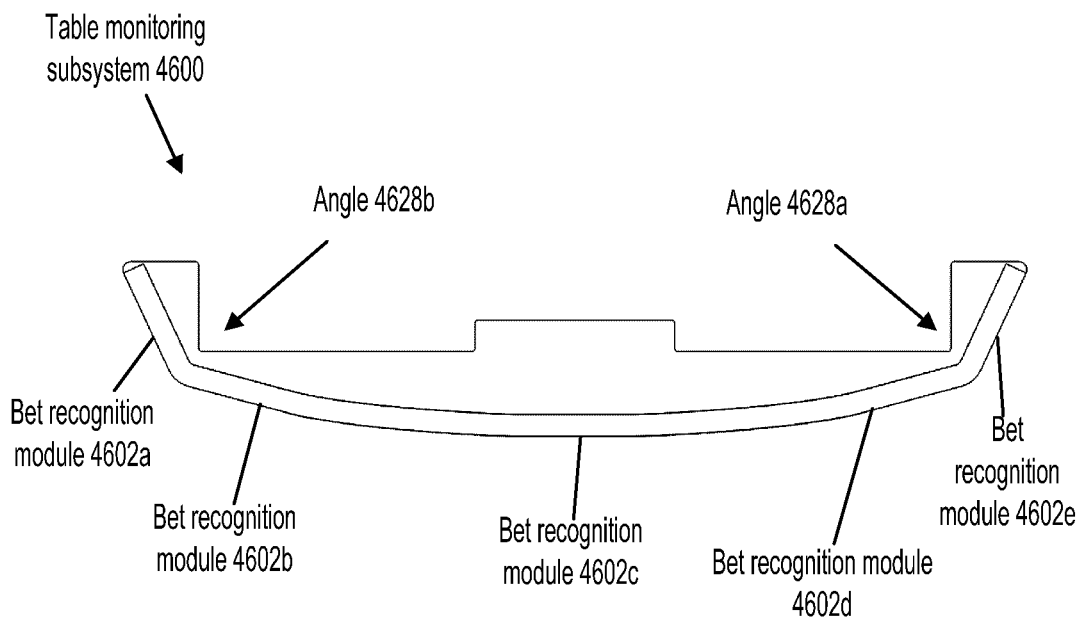

FIG. 46C illustrates a bottom view of the table monitoring subsystem of FIG. 46A according to some embodiments.

Figure 46D:
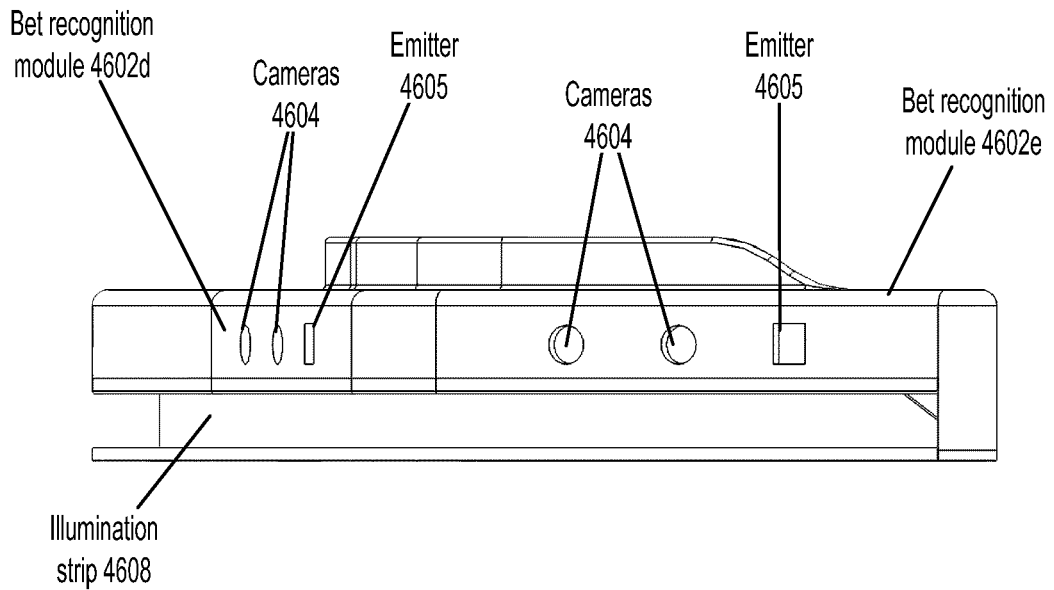

FIG. 46D illustrates a left view of the table monitoring subsystem of FIG. 46A according to some embodiments.

Figure 46E:
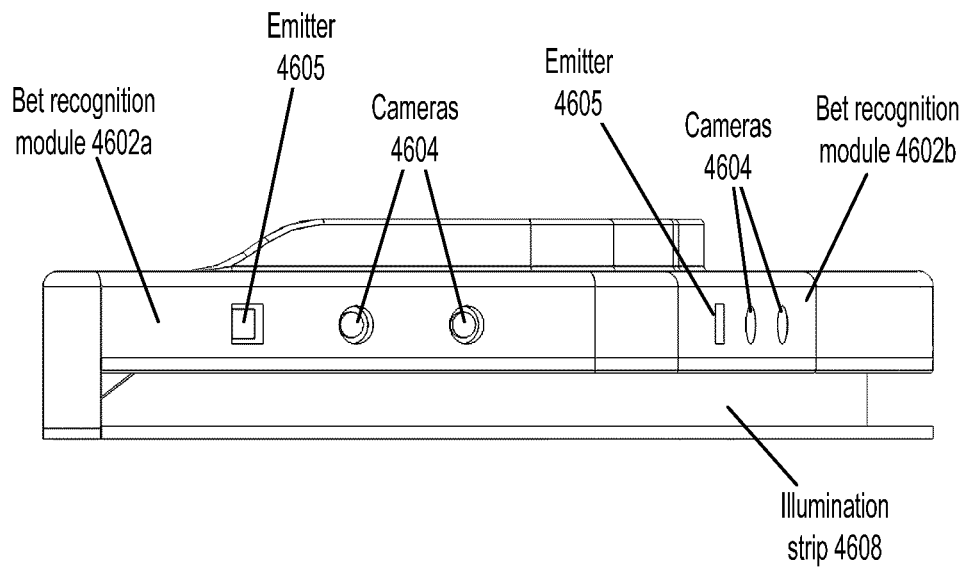

FIG. 46E illustrates a right view of the table monitoring subsystem of FIG. 46A according to some embodiments.

Figure 46F:
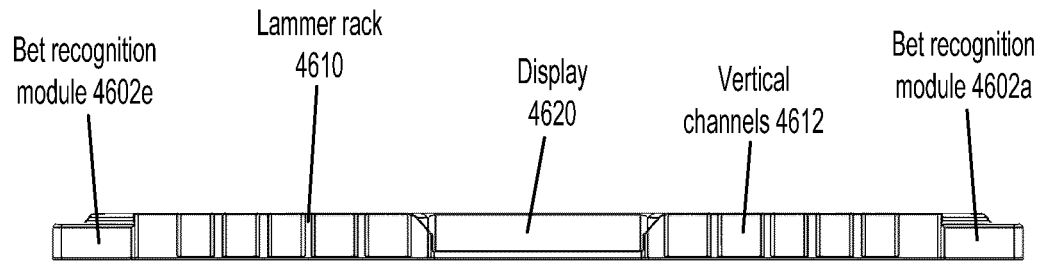

FIG. 46F illustrates a front view of the table monitoring subsystem of FIG. 46A according to some embodiments.

Figure 46G:
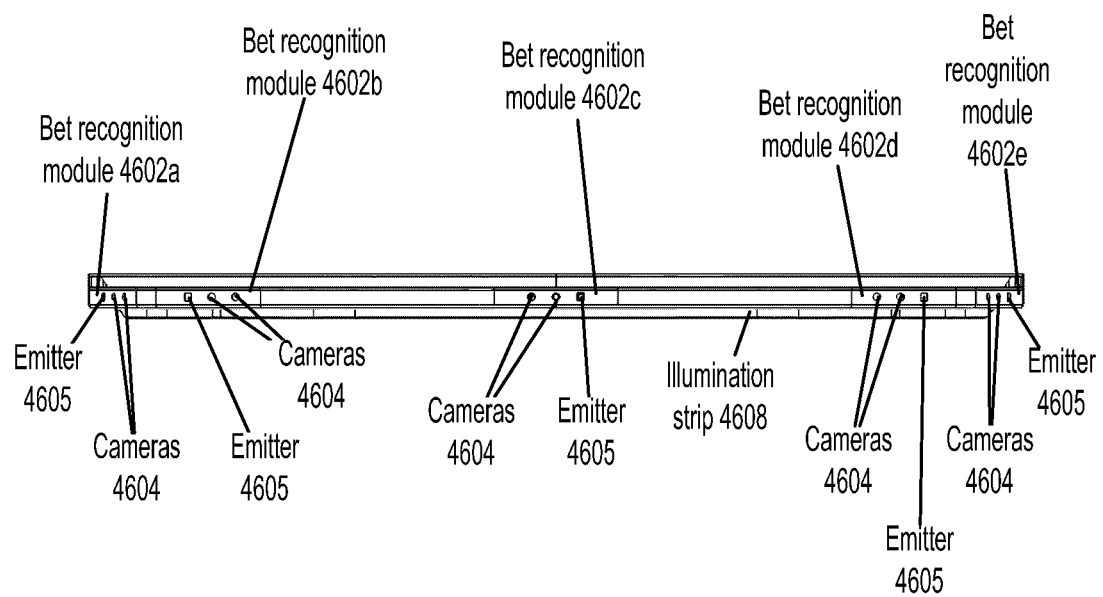

FIG. 46G illustrates a back view of the table monitoring subsystem of FIG. 46A according to some embodiments.

Figure 47A:
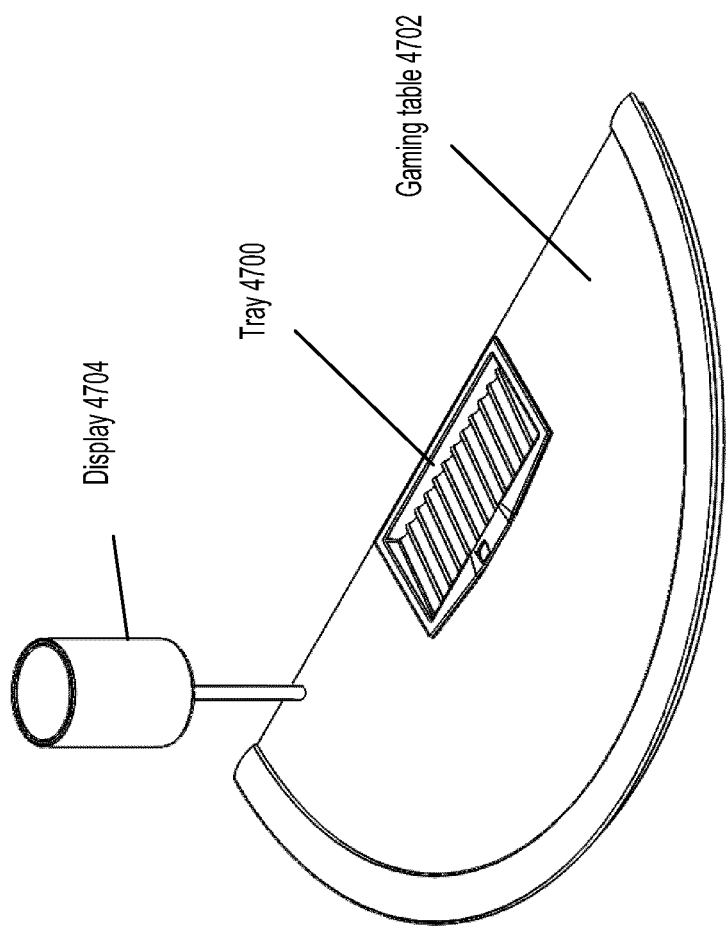

FIG. 47A illustrates a perspective view of an example gaming table with a side display according to some embodiments.

Figure 47B:
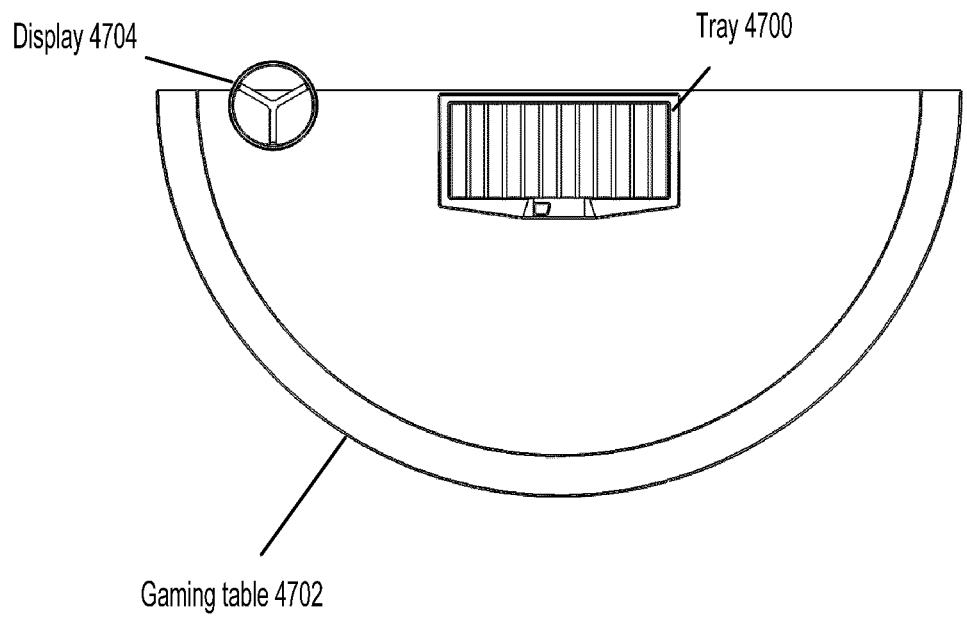

FIG. 47B illustrates a top view of the gaming table of FIG. 47A according to some embodiments.

Figure 47C:
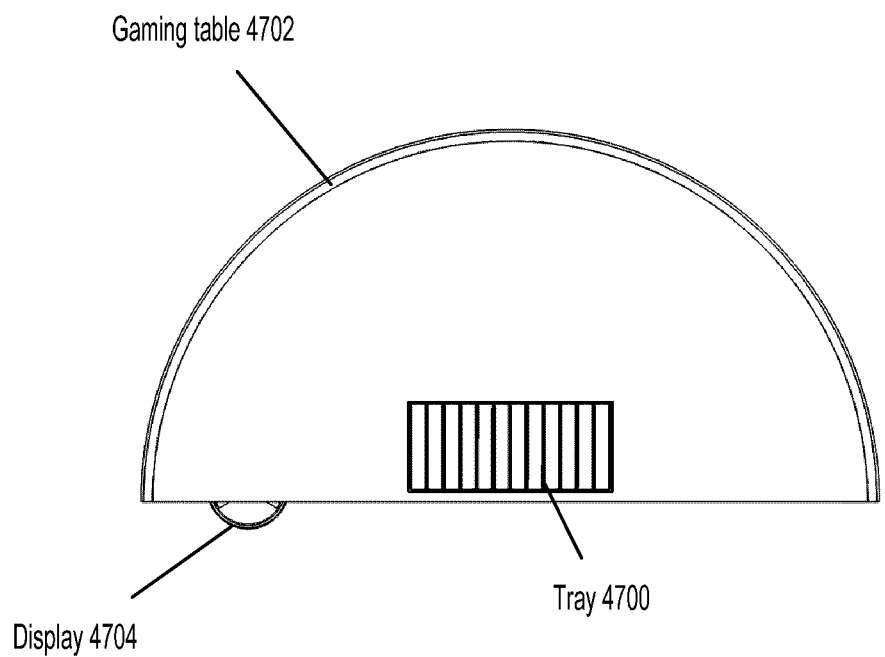

FIG. 47C illustrates a bottom view of the gaming table of FIG. 47A according to some embodiments.

Figure 47D:
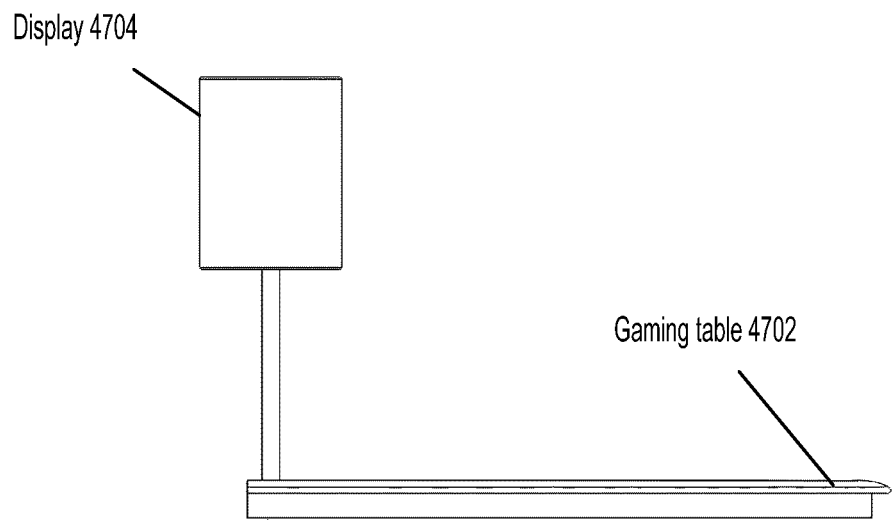

FIG. 47D illustrates a left view of the gaming table of FIG. 47A according to some embodiments.

Figure 47E:
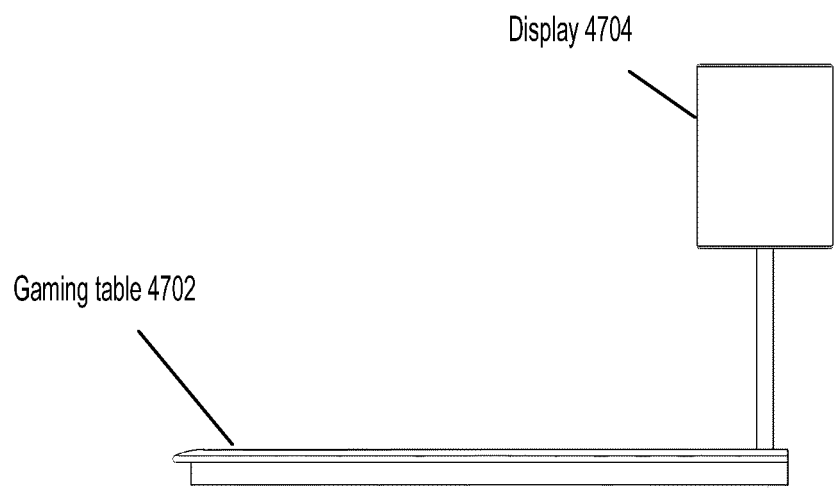

FIG. 47E illustrates a right view of the gaming table of FIG. 47A according to some embodiments.

Figure 47F:
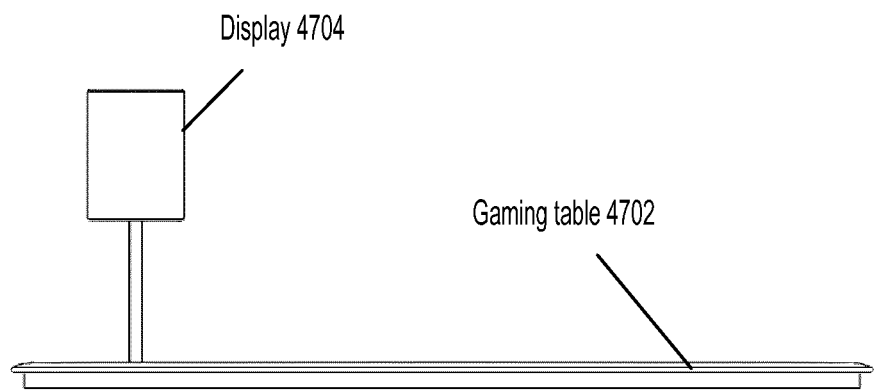

FIG. 47F illustrates a front view of the gaming table of FIG. 47A according to some embodiments.

Figure 47G:
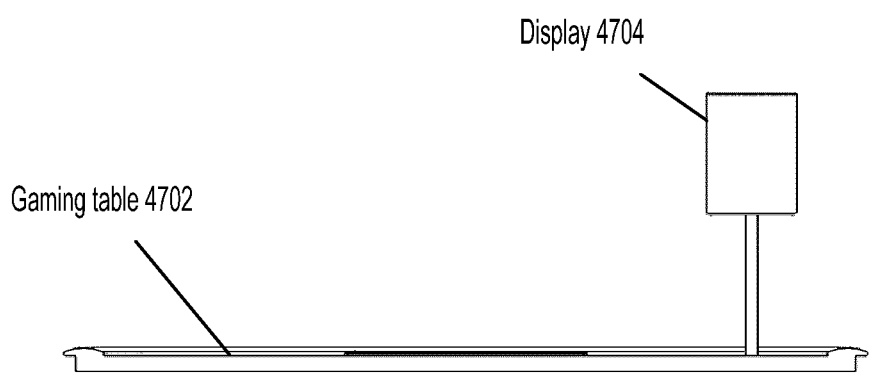

FIG. 47G illustrates a back view of the gaming table of FIG. 47A according to some embodiments.

Figure 48A:
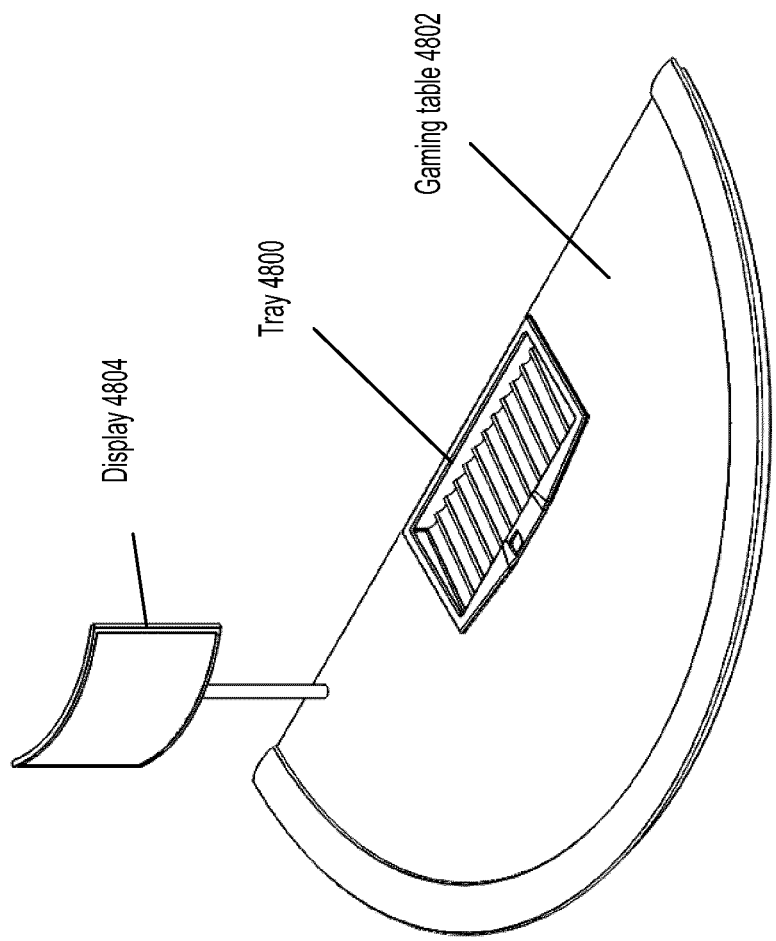

FIG. 48A illustrates a perspective view of another example gaming table with a side display according to some embodiments.

Figure 48B:
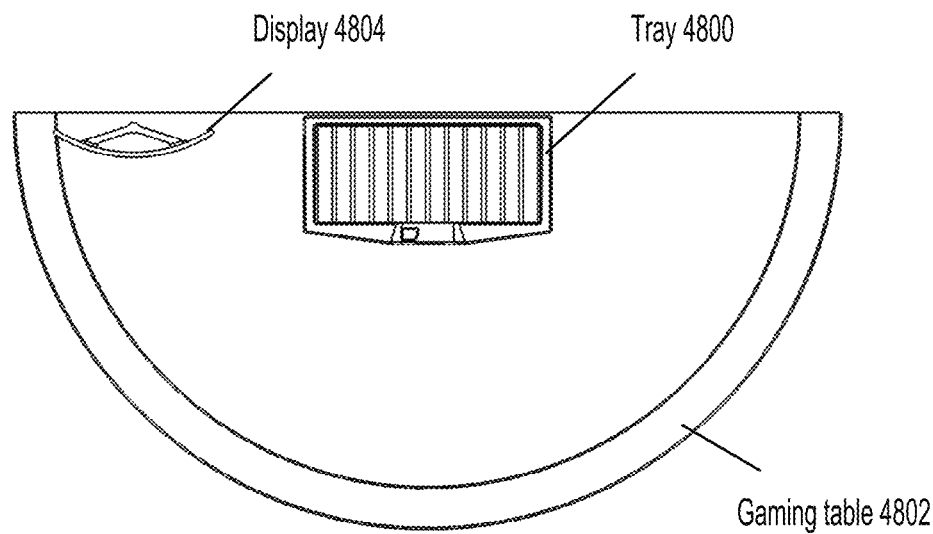

FIG. 48B illustrates a top view of the gaming table of FIG. 48A according to some embodiments.

Figure 48C:
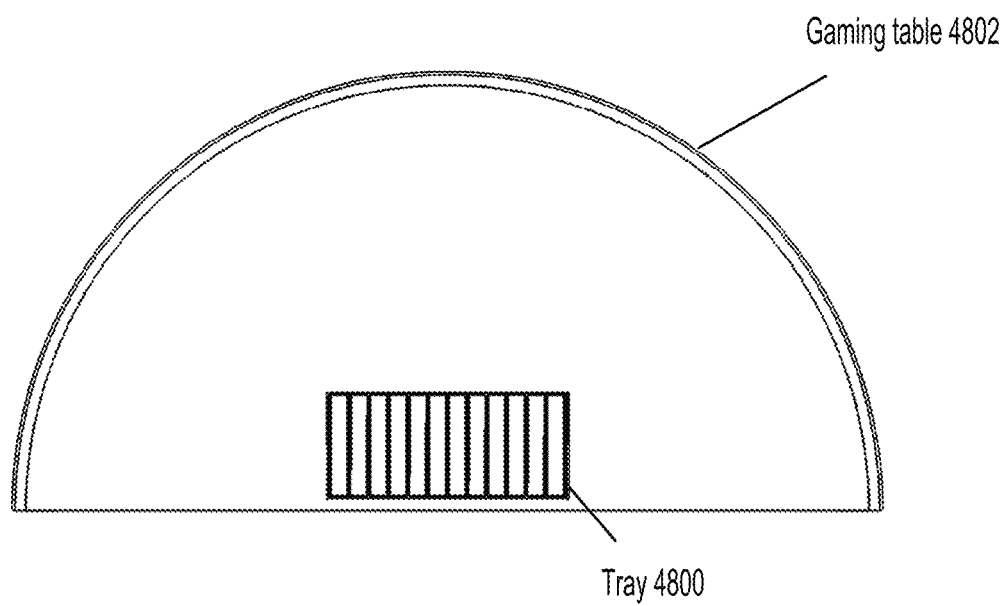

FIG. 48C illustrates a bottom view of the gaming table of FIG. 48A according to some embodiments.

Figure 48D:
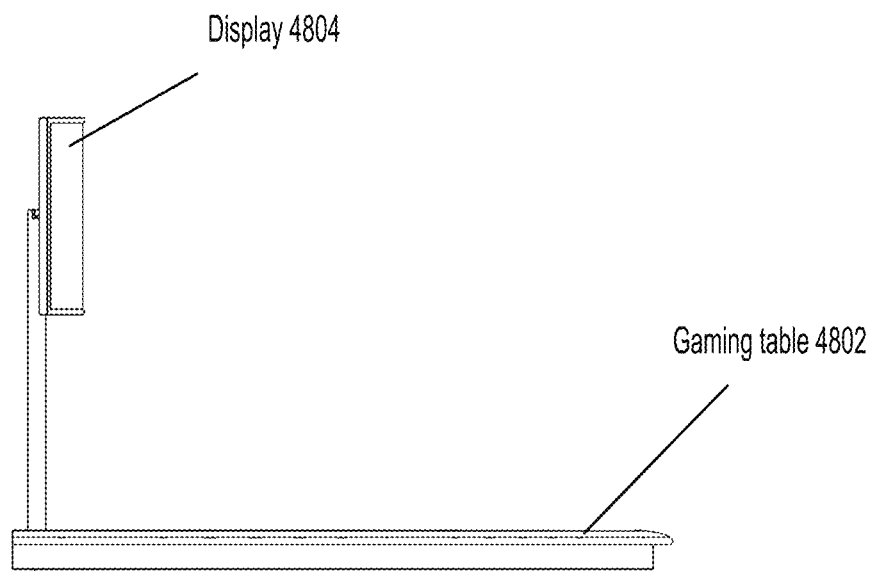

FIG. 48D illustrates a left view of the gaming table of FIG. 48A according to some embodiments.

Figure 48E:
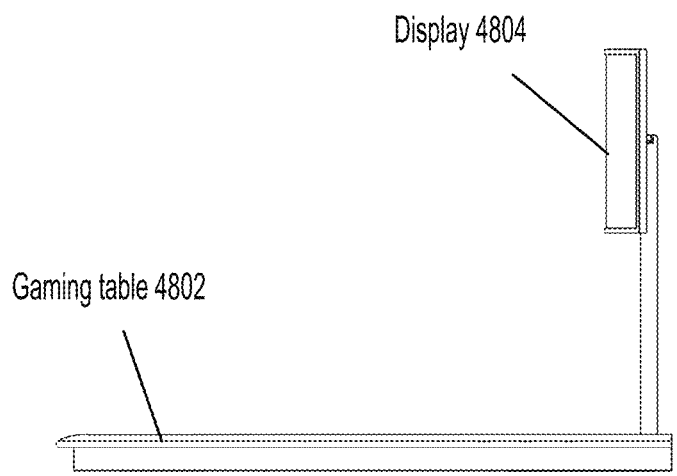

FIG. 48E illustrates a right view of the gaming table of FIG. 48A according to some embodiments.

Figure 48F:
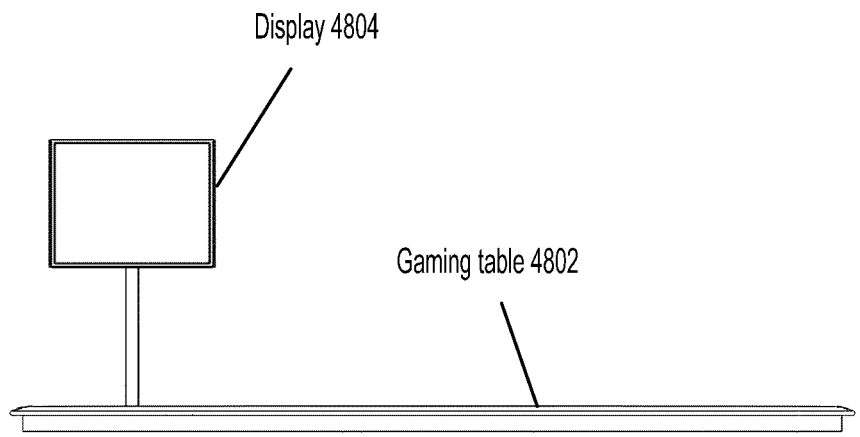

FIG. 48F illustrates a front view of the gaming table of FIG. 48A according to some embodiments.

Figure 48G:
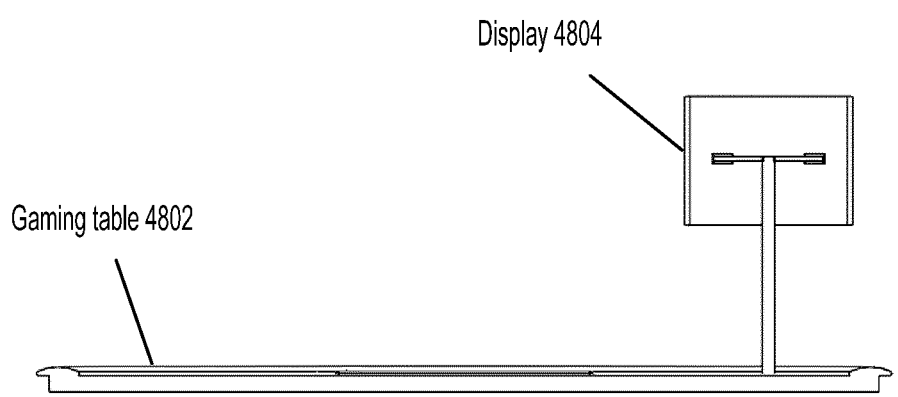

FIG. 48G illustrates a back view of the gaming table of FIG. 48A according to some embodiments.

Figure 49:
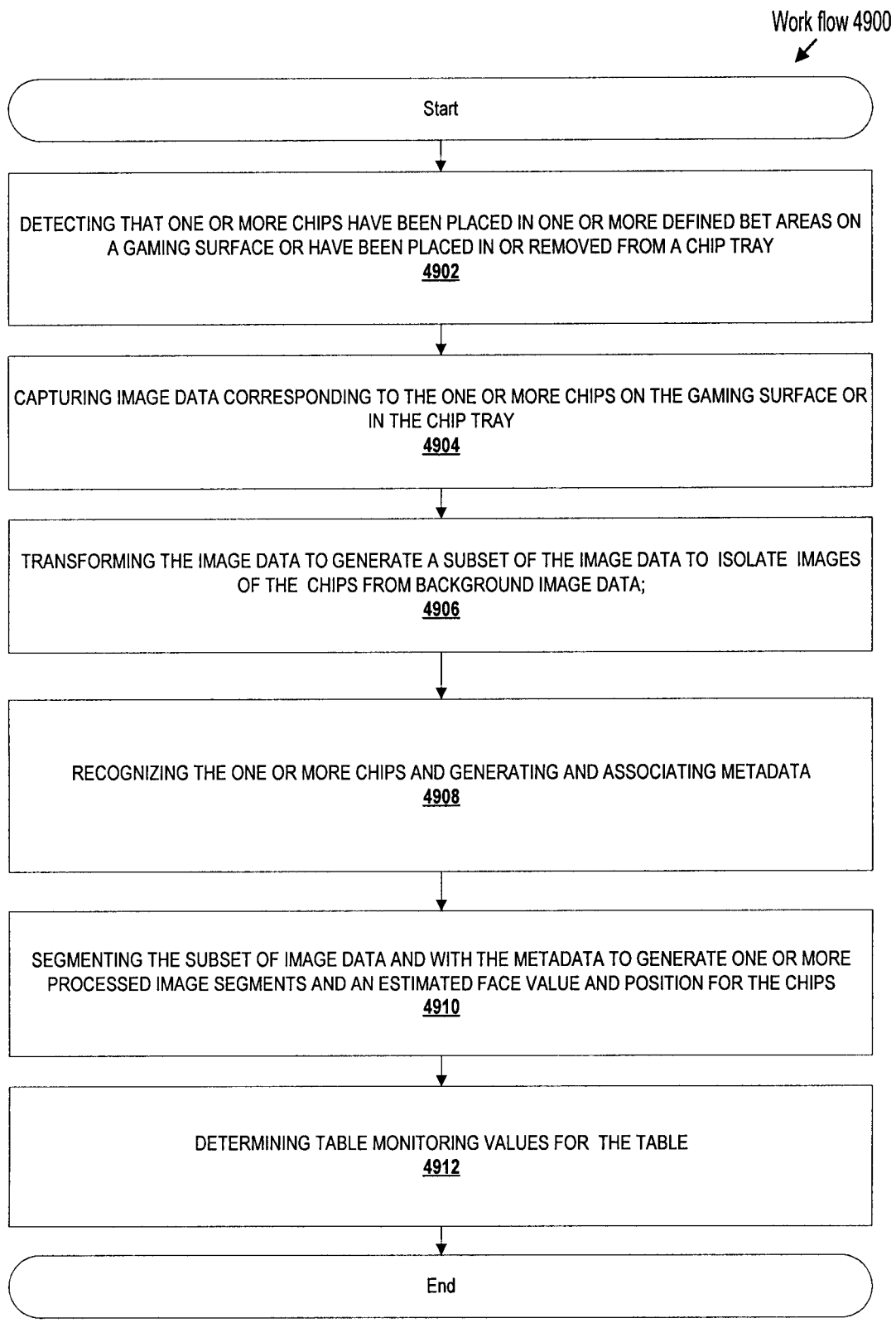

FIG. 49 is an example workflow, according to some embodiments.

DETAILED DESCRIPTION

Embodiments described herein relate to systems, methods and devices for monitoring table activities at gaming tables in casinos and other gaming establishments. For example, embodiments described herein relate to systems, methods and devices for monitoring card game activities at gaming tables and transfers of chips between one or more players and a dealer. Each player, including the dealer and customer(s), may be dealt a card hand. Embodiments described herein may include devices and systems particularly configured to monitor table activities that include betting activities and the transfer of chips (e.g. between a player and a dealer, or between a first player and a second player) at gaming tables to determine bet data including a number of chips in a betting area of the gaming table, a total value of chips in the betting area, the number of chips in a chip tray, and a total value of chips in the chip tray.

In an aspect, embodiments can include at least a device for monitoring table activities at a gaming table, such gaming activity including but not limited to placement of wagers, side bets, ante wagers, play wagers, and additional wagers.

The at least one two imaging components and the at least second imaging component are positioned to image a gaming surface of the gaming table on which the chip tray is affixed to the gaming table. The device may be retrofit to a gaming table by physical attachment of the device into or onto a gaming table, also adding a processor and visual display system as needed.

The data, including bet data and the number and value of chips in the chip tray, may be used by casino operators and third parties for data analytics, security, customer promotions, casino management, and so on. Games are not necessarily limited to card games, and may include dice games, event betting, other table games, among others.

In accordance with an aspect of embodiments described herein, table monitoring devices may be used to retrofit gaming tables. The monitoring devices may be integrated with the gaming tables to provide a smooth working area in a manner that does not catch on cards or chips. The monitoring device may not require changing of a gaming table top as it may be integrate with the structure of existing gaming tables. An example of a monitoring device is a table monitoring subsystem, as described herein.

Tracking bet activities and the transfer of chips that are on-going at a gaming facility is a non-trivial task that has myriad financial consequences. Accurate bet tracking and chip transfers is important as it may be used to more closely monitor the revenues and outflows of the gaming facility, identify patterns (e.g., theft, collusion), and provide an enhanced gaming experience. For example, tracked bet information, in the form of betting records, may be used to determine compensation levels for loyal players (e.g., the accurate provisioning of "comps" in relation to overall casino returns), rebates, etc., or track dealer and/or game performance. As another example, by tracking the amount of chips in a chip tray, casino operators can be alerted to when trays need to be refilled with chips, or if chips have been incorrectly removed from the trays.

Bets are often performed in conjunction with games (e.g., baccarat, poker, craps, roulette) or events (e.g., horse racing, professional sports, political outcomes). Chips are often transferred after the games or events are over (e.g. after a player wins a game, chips are transferred from a dealer to the player; after a winner has been determined upon conclusion of an event, chips are transferred to the winner). Traditionally, some bets are placed with the aid of specially configured markers (e.g., chips). These bet markers may have various colours, markings, and/or patterns on them, and are often distinguished from one another so that it is easy to track the value of each of the markers (e.g., denominations, characteristics). Some of the markers are designed with a particular facility in mind, and accordingly, may vary from facility to facility. For example, facilities may include casinos, gaming halls, among others.

Betting markers, such as chips, may have varying designs and markings that not only distinguish between chip types (e.g., chip values, denominations), but also different series of chips having the same values (e.g., to reduce the risk counterfeiting and/or to enable tracking). For example, such variations may be purposefully and periodically introduced such that counterfeiters may have a harder time successfully copying chip designs.

Accordingly, a flexible implementation may be preferable so that a diverse range of conditions and chips can be used with the system. For example, in some embodiments, a system is provided that is configured for interoperation with a diverse range of chip types, and also to flexibly adapt in view of modifications to chip designs and markings. In such embodiments, the system is not "hard coded" to associate specific colours, markings, and/or patterns with chip values, but rather, applies machine-learning to dynamically associate and create linkages as new chip types are introduced into the system. Interoperability may be further beneficial where a single system can be provisioned to different gaming facilities having different needs and environments, and the system may, in some embodiments, adapt flexibly in response to such differences (e.g., by modifying characteristics of a reference illumination on the chips, adapting defined feature recognition linkages, adapting imaging characteristics, image data processing steps, etc.).

The bet markers, such as chips, when used for betting, are often provided in physical form and placed individually or in "stacks" that are provided in specific betting areas on tables so that a dealer can see that a player has made a bet on a particular outcome and/or during a betting round. A game or event may include multiple betting rounds, where a player is able to make a particular bet in conjunction with a phase and/or a round in the game or event. The betting may result in a win, loss, push, or other outcome, and the player may be paid chips equivalent to an amount of winnings.

At a gaming table, the bet markers, such as chips, of a facility (e.g. casino, gaming hall, etc.) are overseen by a dealer, pit boss, or an employee of the facility and are often provided in physical form and placed channels provided in a chip tray on the gaming table. Upon conclusion of a game or event, the transfer of chips is determined based on the result of the game or event. For example, the game or event may result in a win for a player, so the player may be paid chips equivalent to an amount of winnings, in part, from the facility's chips that are in the chip tray. As another example, the game or event may result in a loss for the player, so the chips used by the player to make bets during the game or event are lost to the casino, and are placed in the channels of the chip tray.

The ability to track bets and chip transfers in real or near-real time may be of commercial and financial importance to a gaming facility. Inaccurate tracking of bets and chip transfers may lead to increased management overhead and/or an inability to accurately track betting, winnings, and losses, which may, for example, lead to missed opportunities to enhance player experience, or missed malicious behavior trends. For example, analyzing betting patterns and chip transfers may indicate that some players are "gaming the system" by placing suspicious bets (e.g., due to card counting, hole carding), or may indicate particularly profitable bets for the gaming facility (e.g., Blackjack insurance bets). The bet tracking and chip transfer information may be utilized in conjunction with other types of backend systems, such as a hand counting system, a security management system, a player compensation system (e.g., for calculating when complimentary items/bonuses are provided), etc. Bet recognition and chip transfer information may also be used in gaming training systems, where players can be informed that their betting was not efficient or suboptimal based on computer-based simulation and calculation of odds (e.g., for Texas Hold-em poker, efficient betting may be determined based on mathematical odds and table positioning, especially for structured betting games and/or pot-limit and limit games, and may also be influenced by the presence of rule modifications).

In some embodiments, bet tracking information and chip transfer information is collected using machine-vision capable sensors that may be present on a gaming table or surface, or other type of gaming machine. These machine-vision capable sensors monitor betting areas and the chip tray to determine the types of chips placed in them, and estimate the value of bets, tracking betting as betting progresses from round to round and from game to game, and estimating the winnings and losses for the players and the gaming facility. As many gaming facilities have invested significantly into their existing chips, tables, chip trays, technologies and/or layouts, some embodiments described herein are designed for flexibility and interoperation with a variety of existing technologies and architectures. Machine vision is not limited to imaging in the visual spectrum, but may also include, in various embodiments, imaging in other frequency spectra, RADAR, SONAR, etc. Machine vision may include image processing techniques, such as filtering, registration, stitching, thresholding, pixel counting, segmentation, edge detection, optical character recognition, among others.

Accordingly, a table monitoring subsystem may benefit from being able to be retrofit into existing tables and/or layouts, and interface with other table and/or gaming facility management systems (e.g., to communicate information regarding betting activities). Machine-learning techniques (e.g., random forests) may be utilized and refined such that visual features representative of different chip values are readily identified, despite variations between different facilities, lighting conditions and chip types. For example, such a system may not necessarily need to have hard-coded reference libraries of what chips should look like for each value, and instead, may be flexibly provisioned during the calibration process to build a reference library using real-world images of chips to train a base set of features. Accordingly, in some embodiments, the system may be utilized without a priori knowledge of the markers present on the various betting markers, such as chips. This may be useful where a system may need to account for introduced variations in chip design, which, for security reasons, are not distributed ahead of introduction.

A potential challenge with tracking bets and chip transfers is that there are a diversity of betting markers, objects on a gaming surface, lighting conditions that may lead to complexities in relation to accurately determining what bet markers are present, and further, what value should be attributed to a chip. Bets may be placed off-center by players, chips may not be uniformly stacked in a betting area or in a channel of a chip tray, chips may be obscuring one another, players or dealers may obscure chips using their hands, players may be deliberately modifying their bets (e.g., surreptitiously adding to a bet after cards have been dealt to obtain a higher payout), dealers may be deliberately taking chips from the chip tray, etc. Table monitoring, such as bet recognition and tracking chip transfers, also is preferably conducted with minimal disruption to the operations of the gaming facility or player experience.

There may also be limitations on the amount of available computing resources, and given that many gaming tables operate with a high volume of games per hour, there is limited time available for processing (especially where table monitoring data, such as bet data or chip transfer data, is being tracked in real or near-real time). Gaming facilities may have computational resources available at different locations, and these locations may need to communicate with one another over limited bandwidth connections. For example, there may be some computing components provided at or near a gaming table such that pre-processing may be conducted on sensory data, so that a compressed and/or extracted set of data may be passed to a backend for more computationally intensive analysis. In some embodiments, the backend may revert computed information back to the computing components provided at or near a gaming table so that a dealer or a pit-boss, or other gaming facility employee may use an interface to monitor betting activities (e.g., to determine "comp" amounts, track suspicious betting patterns, identify miscalculated payouts).

Table monitoring subsystems may utilize sensors positioned at a variety of different locations to obtain information. For example, the table monitoring subsystem may utilize cameras housed in one or more bet recognition modules of the table monitoring subsystem. As another example, the table monitoring subsystem may utilize cameras directed towards the chip tray or sensors mounted to the channels of the chip tray. As another example, table monitoring subsystem may utilize overhead cameras, such as existing security cameras to calibrate the imaging components of the bet recognition modules. As another example, the table monitoring subsystem may utilize sensors embedded in the gaming table to identify placement of objects on the gaming table or track hand positioning and gestures of players and dealers.

Figure 1A:
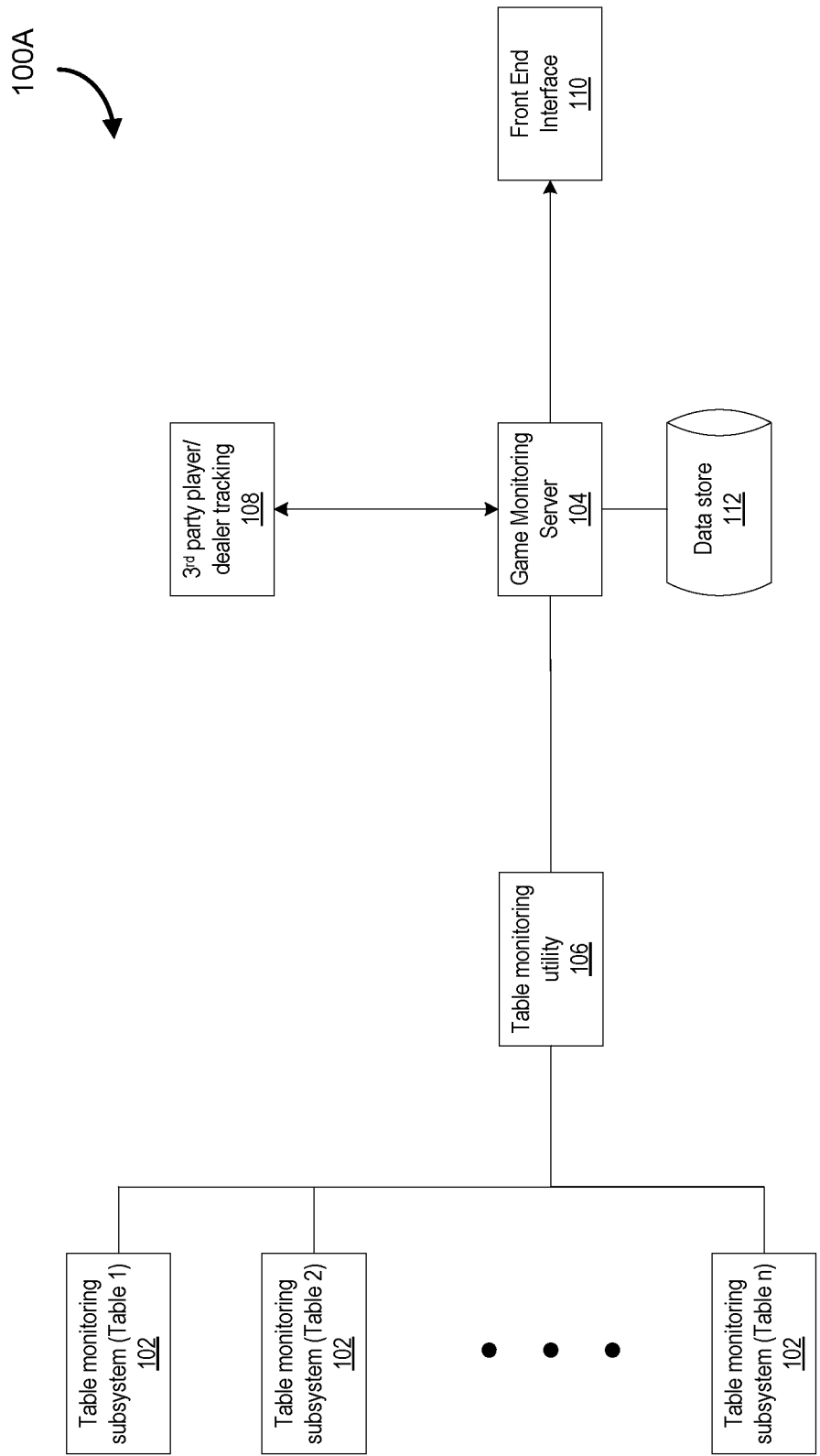
FIGS. 1A, 1B, and 1C illustrate block diagrams of a system for monitoring game activities at gaming tables according to some embodiments.

FIG. 1A illustrates a block diagram of a system 100A for monitoring table activities at gaming tables according to some embodiments. The system 100A may be configured such that sensors and/or imaging components are utilized to track betting activities and transfers of chips, generating image and sensory data that is sent to a backend for processing. The betting activities may be provided in the form of chips being placed in betting areas. The chip transfers may be provided in the form of chips being placed in or removed from channels of a chip tray. The sensors and/or imaging components may include machine-vision sensors, including cameras, adapted for capturing images of the betting areas.

As depicted, the system 100A includes table monitoring subsystems 102 (1 to N) integrated with gaming tables (1 to N). The table monitoring subsystems 102 may include various sensors and imaging components, among other physical hardware devices.

Each table monitoring subsystem 102 has an imaging component for capturing image data for the gaming table surface. The gaming table surface has defined betting areas, and the imaging component captures image data for the betting areas. A transceiver transmits the captured image data over a network and receives calibration data for calibrating the table monitoring subsystem 102 for the betting areas. Table monitoring subsystem 102 may also include a sensor component and a scale component, in some embodiments. The image data may, for example, focus on a particular region of interest or regions of interest that are within the field of view of the sensor component.

In some embodiments, each table monitoring subsystem 102 has an imaging component for capturing image data for the chip tray. The chip tray has one or more channels, and the imaging component captures image data for the channels. A transceiver transmits the captured image data of the chip tray over a network and receives calibration data for calibrating the table monitoring subsystem 102 for the channels of the chip tray.

In some embodiments, the table monitoring subsystems 102 are hardware electronic circuitry that is coupled directly in or indirectly to a gaming surface. In some embodiments, the table monitoring subsystem 102 is integrated into the gaming surface. The table monitoring subsystem 102 may be provided as a retrofit for existing gaming surfaces (e.g., screwed in, integrally formed with a chip tray that is mounted to the gaming table).

The table monitoring subsystem 102 may further include illuminating components or other peripheral components utilized to increase the accuracy of the bet recognition and chip transfers. For example, an illumination strip may be provided that provides direct illumination to chip stacks in betting areas or chips in the chip tray such that the imaging component is more able to obtain consistent imagery, which may aid in processing and/or pre-processing of image data. Another peripheral component may include the use of pressure sensitive sensors at the betting area and/or in the chip tray to denote when there are chips present in the betting area or in a channel of the chip tray, and in some embodiments, the weight of the chips (e.g., which can be used to infer how many chips, which can be cross-checked against the image data).

The table monitoring subsystem 102 may have one or more processors and computational capabilities directly built into the table monitoring subsystem 102. In some embodiments, these computational capabilities may be limited in nature, but may provide for image pre-processing features that may be used to improve the efficiency (e.g., file-size, relevancy, redundancy, load balancing) of images ultimately provided to a backend for downstream processing. The table monitoring subsystem 102 may also include some storage features for maintaining past data and records. Some implementations provide for a very limited window of processing time (e.g., fast betting rounds or game resolution), and the pre-processing aids in speeding up computation so that it may be conducted in a feasible manner in view of resource constraints.

In some embodiments, the table monitoring subsystem 102 contains multiple physical processors, each of the physical processors associated with a corresponding imaging component and/or a sensor and adapted to track a particular bet area or a particular channel of a chip tray. In such an embodiment, the system has increased redundancy as the failure of a processor may not result in a failure of the entirety of bet recognition capabilities, and the system may also provide for load balancing across each of the physical processors, improving the efficiency of computations. Each imaging component or sensor may be tracked, for example, using an individual processing thread.

The system includes a game monitoring server 104 with a processor coupled to a data store 112. In some embodiments, the game monitoring server 104 resides on, near or proximate the gaming surface or gaming table. For example, the game monitoring server 104 may include a computing system that is provided as part of a dealer terminal, a computer that is physically present at a gaming station, etc.

The game monitoring server 104 processes the image data received from the table monitoring subsystems 102 over the network to detect, for each betting area, a number of chips and a final bet value for the chips, and for the chip tray, a number of chips in the channels and the value of the chips in the channels. The game monitoring server 104 may also process other data including sensor data and scale data, as described herein.

The game monitoring server 104 is configured to aggregate game activity data (e.g. the number and amount of bets placed on the gaming table, the number of chips placed in or removed from the chip tray) received from table monitoring subsystems 102 and transmit commands and data to table monitoring subsystems 102 and other connected devices. The game monitoring server 104 processes and transforms the game activity data from various table monitoring subsystems 102 to compute table monitoring data, including bet data, winnings and losses for the gaming facilities and players, and to conduct other statistical analysis.

The game monitoring server 104 may connect to the table monitoring subsystems 102 via a table monitoring utility 106. The table monitoring utility 106 aggregates image data received from multiple table monitoring subsystems 102 for provision to the game monitoring server 104 in a tiered manner. In some example embodiments, game monitoring server 104 may connect to multiple table monitoring utilities 106.

Each table monitoring subsystem 102 may be linked to a particular gaming table and monitor table activities at the gaming table. A gaming table may be retrofit to integrate with table monitoring subsystem 102. Table monitoring subsystem 102 includes one or more imaging components as described herein. In some embodiments, table monitoring subsystem 102 may also include sensors or scales to detect chips.

Table monitoring utility 106 connects table monitoring subsystem 102 to the game monitoring server 104. Table monitoring utility 106 may act as a hub and aggregate, pre-process, normalize or otherwise transform table activity data, including image data of the gaming tables and the chip tray. In some embodiments, table monitoring utility 106 may relay data. Table monitoring utility 106 may be linked to a group of gaming tables, or a location, for example.

Table monitoring utility 106, for example, may be a backend server cluster or data center that has a larger set of available computing resources relative to the game monitoring server 104. The table monitoring utility 106 may be configured to provide image data in the form of extracted and/or compressed information, and may also receive accompanying metadata tracked by the table monitoring subsystem 102, such as timestamps, clock synchronization information, dealer ID, player ID, image characteristics (e.g., aperture, shutter speed, white balance), tracked lighting conditions, reference illumination settings, among others.

This accompanying metadata, for example, may be used to provide characteristics that are utilized in a feedback loop when bet outcomes are tracked. For example, the type of image characteristics or reference illumination characteristics of the table monitoring utility 106 may be dynamically modified responsive to the confidence and/or accuracy of image processing performed by the table monitoring utility 106. In some embodiments, the table monitoring utility 106 extracts from the image data a three-dimensional representation of the betting or chip transferring and may be used to track not only betting values but also chip positioning, orientation, among others. This information may, for example, be used to track patterns of betting, winnings, and losses, and relate the patterns to hand outcomes, the provisioning of complimentary items, player profile characteristics, etc.

Figure 2:
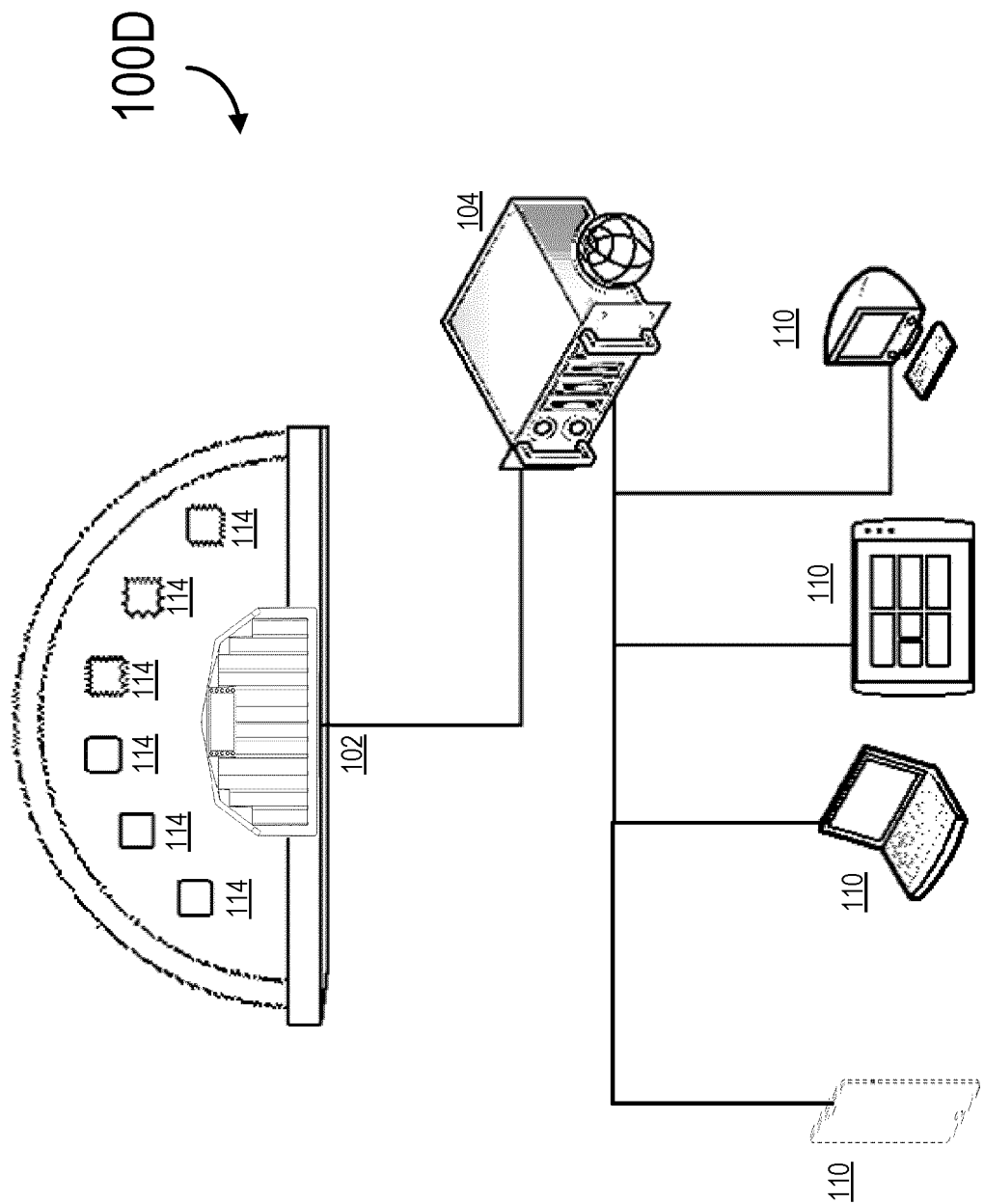
FIG. 2 illustrates a block diagram of another system for monitoring game activities at gaming tables according to some embodiments.

The system 100A may also include a front end interface 110 to transmit calculated bet data and chip transfer data, and receive game event requests from different interfaces. As shown in FIG. 2, front end interface 110 may reside on different types of devices, such as a computer, a personal digital assistant, a laptop, or a smart phone. Front end interface 110 may provide different reporting services and graphical renderings of table monitoring data for client devices. Graphical renderings of table monitoring data, including bet data and chip transfer data, may be used, for example, by various parties and/or stakeholders in analyzing betting trends and monitoring activities at a gaming table. Gaming facilities may track the aggregate amounts of bets, winnings, and losses, by account, demographic, dealer, game type, bet type, gaming table, etc. Dealers may utilize betting information and chip transfer information on a suitable interface to verify and/or validate betting and chip transfers that are occurring at a table. Pit bosses may use the betting information and chip transfer information to more accurately determine when complementary items should be dispensed and provided, etc.

Front end interface 110 may provide an interface to game monitoring server 104 for end user devices and third-party systems 108. Front end interface 110 may generate, assemble and transmit interface screens as web-based configuration for cross-platform access. An example implementation may utilize Socket.io for fast data access and real-time data updates.

Front end interface 110 may assemble and generate a computing interface (e.g., a web-based interface). A user can use the computing interface to subscribe for real time event data feeds for particular gaming tables, via front end interface 110. The interface 110 may include a first webpage as a main dashboard where a user can see all the live gaming tables and bet data and chip transfer data in real time, or near real time. For example, the main dashboard page may display bet data, winnings, losses, tips given to a dealer, hand count data, player count data, dealer information, surveillance video image, and so on. Bet data and chip transfer data may include, for example, total average and hourly average bets per hand, player, or dealer, per hour bet data for each gaming table in real time, total average and hourly chips received in or taken out of a chip tray per hand, player, or dealer, per hour chip transfer data for each gaming table in real time, and so on. The display may be updated in real-time.

The interface may include a management page where management users can perform management related functions. For example, the interface may enable management users to assign dealers to inactive gaming tables or close live gaming tables. An on and off state of a gaming table may send a notification to all instances of the interface. If a user is on the monitor management page when a new gaming table is opened, the user may see the live gaming table updated on their display screen in real-time. The management page may also shows surveillance images of each gaming table, and other collected data. The surveillance images may be used or triggered upon detection of particular patterns of table monitoring data, such as bet data, at a gaming table, for example.

Front end interface 110 may include a historical data webpage, which may display historical bet data of a selected gaming table. It may allow the user to browse the historical bet data by providing a date range selecting control. The bet data and chip transfer data may be organized hourly, daily, monthly, and so on depending on the range the user chooses. The bet data along with the chip transfer data and a theoretical earning coefficient may be used to estimate the net earnings of the gaming table over the selected date period.

A server and client model may be structured based on receiving and manipulating various sorts of table monitoring data, such as betting data, chip transfer data, player data, dealer data, and so on. The interface may be expanded to process other types of table monitoring data (e.g. the bet data, the chip transfer data, etc.) such as average bets per hands on a table. Table monitoring data can be displayed on the monitor or management page in an additional graph, for example. The date range selection tool may be used for analyzing the added data along with the table monitoring data. Similarly, the main dashboard may show real-time statistics of both the bet data, chip transfer data, and additional table monitoring data.

In some embodiments, the table monitoring utility 106 may receive activation/deactivation signals obtained from various external devices, such as an external card shoe, a hand counting system, a player account registration system, a pit boss/employee manual triggering system, etc. These external devices may be adapted to transmit signals representative of when a game event has occurred or has terminated. For example, a specially configured dealer shoe may be operated to transmit signals when the dealer shoe is shaken, repositioned, activated, etc., or a hand counting system may be interoperating with the table monitoring utility 106 to indicate that a new round of betting has occurred, etc. In some embodiments, betting may be triggered based on the particular game being played in view of pre-defined logical rules establishing when betting rounds occur, when optional betting is possible (e.g., side-bets, insurance bets, progressive bets), etc.

The system 100A may also integrate with one or more third party systems 108 for data exchange. For example, a third party system 108 may collect dealer monitoring data which may be integrated with the table monitoring data generated by game monitoring server 104. As another example, a third party system 108 may collect player monitoring data which may be integrated with the table monitoring data generated by game monitoring server 104.

Figure 1B:
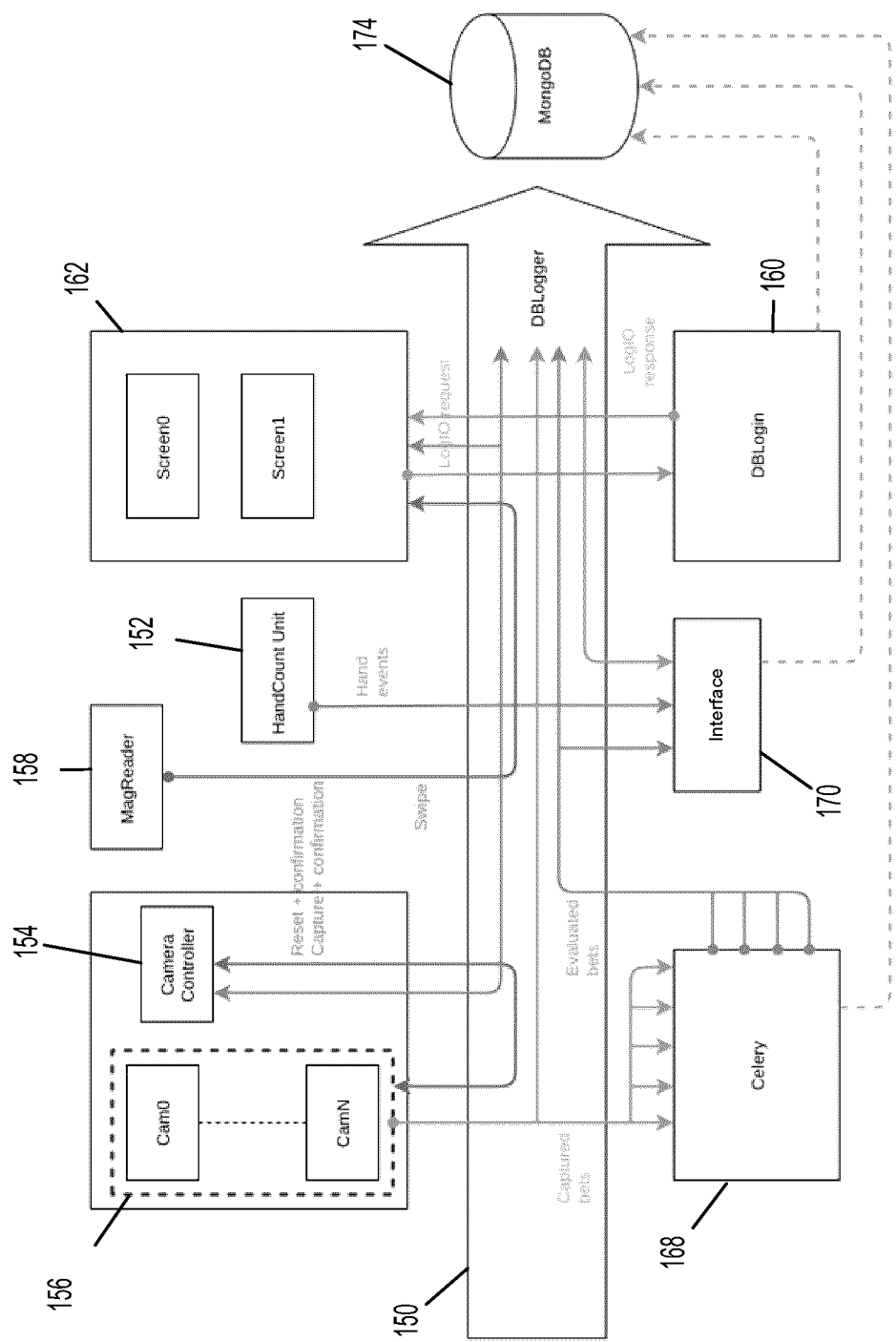
Figure 1C:
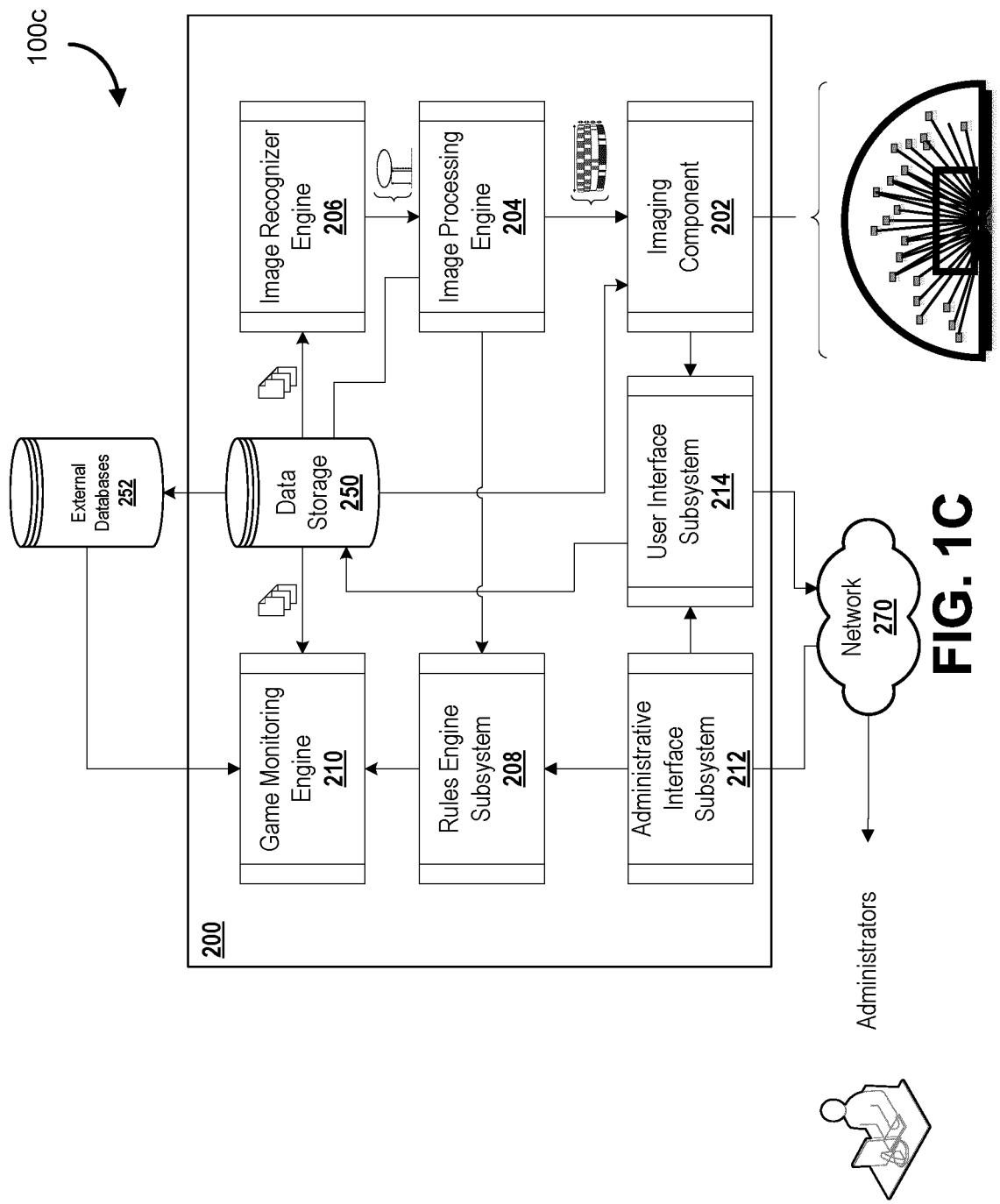

FIG. 1B is an example block schematic of a system 100b for monitoring table activities, according to some embodiments. The components shown may reside in different platforms or devices. FIG. 1C is an example block schematic 100c illustrative of some components of a table monitoring subsystem 200, according to some embodiments.

In some embodiments, the system 100b has a distributed backend system, with some components as data producers, and other components as data consumers. The data produced resides in a data queue 150, and is withdrawn from the data queue 150 to be processed. The order in which the data is processed is based on a priority scheme. In some examples, the data queue 150 is RabbitMQ™. In this manner, the system 100b may generate and process data asynchronously.

In some embodiments, the system 100b comprises a HandCount Unit 152, which detects hand events, triggering events, activation events, or deactivation events, to trigger a Camera Controller 154 to send a control command for a Camera Set 156 to capture image data, which is transmitted back to the Camera Controller 154. The trigger events trigger Camera Controller 154 to send a control command to the Camera Set 156. The trigger events can include detection that one or more chips are placed in a bet area on a gaming table, or placement or removal of chips from a chip tray. The HandCount Unit 152 may also log the hand events, trigger events, activation events, or deactivation events, and may transmit the logs to a MongoDB database 174 for storage. The hand events, trigger events, activation events, or deactivation events may be transmitted to the Screen Set 162 to be displayed at one or more of the screens. The HandCount Unit 152 may also transmit the detected hand events, triggering events, activation events, or deactivation events.

The Camera Controller 154 sends control commands to the Camera Set 156 for the Camera Set 156 to capture image data, and receives the image data captured by the Camera Set 156 and transmitted from the Camera Set 156. In some embodiments, the Camera Controller 154 may pre-process the image data to ensure that the image data does not correspond to obstructed objects, such as chips obscured by a dealer's hands. The Camera Controller 154 may determine that the image data corresponds to obstructed objects, and may send a reset control command to the Camera Set 156 to re-capture the image data. The Camera Controller 154 may determine that the image data corresponds to an unobscured object, and may send a control command to the Camera Set 156 to transmit the captured image data to the Classifier Set 168. As depicted in FIG. 1B, the Camera Set 156 may transmit the image data to the MongoDB database 174 for storage.

In some embodiments, the Camera Set 156 may comprise an imaging component 202 as depicted in FIG. 1C, including one or more sensors to detect and/or obtain image data representative of chips in a betting areas and/or chips in a chip tray. The imaging components 202 may be, for example, cameras, sensors, and may collect image data in the form of video, pictures, histogram data, in various formats. The image data may have particular characteristics tracked in the form of associated metadata, such as shutter speeds, camera positions, imaging spectra, reference illumination characteristics, etc. In some embodiments, the imaging components may provide an initial pre-processing to perform preliminary feature recognition, optical character recognition, etc. For example, the gaming surface may have visual indicators which may be tracked as reference markers by the imaging components (e.g., optical position markers indicative of betting areas where bets may be placed).

In some embodiments, the system 100b comprises a Mag Reader 158 for monitoring swiping of a magnetic card for a player or dealer to log into the system 100b. When a player or dealer is logged in, the Mag Reader 158 generates a signal that is sent to the DBLogin 160 and the Interface 170. Data corresponding to the person or dealer logging into the system 100b may be transmitted to the Screen Set 162 to be displayed.

In some embodiments, the Mag Reader 158 may be an external component to the table monitoring subsystems and/or bet recognition modules as described in greater detail below. The Mag Reader 158 may be mounted to a gaming table to the left or right side of a dealer. The Mag Reader 158 may be ergonomically positioned and oriented such that the dealer does not need to move to the Mag Reader 158. The Mag Reader 158 may be mounted at a 45° angle, so the deader may swipe a card away from them when swiping the card through the Mag Reader 158. The dealer may swipe the card horizontally or vertically relative to the gaming table. In some embodiments, the Mag Reader 158 may be a component of the table monitoring subsystem and/or bet recognition modules. Where a bet recognition module comprises the Mag Reader 158, one or more Mag Reader 158 may be positioned on the two outermost sides of the bet recognition module. The dealer may swipe the card vertically towards themselves when the Mag Reader 158 is a component of the bet recognition module. An identification card for a dealer and/or a player may be swiped through the Mag Reader 158 for the dealer and/or player to log into the system. An indication of the dealer and/or player logging into the system may be rendered on a screen of the table monitoring subsystem or the bet recognition module, such as one or more screens of the Screen Set 162. The dealer may toggle the table monitoring subsystem or bet recognition, for example, by pressing one or more buttons on the table monitoring subsystem or bet recognition or pressing one or more buttons rendered on the display, to be in a log-in mode, such that the system may expect data corresponding to identification of a dealer and/or player is being input into the system.

The signal from the MagReader 158 may be similar to a signal coming from a keyboard. When a card is swiped through the MagReader 158, it generates a signal based on the magnetic strip of the card, wherein the digital contents of the signal may be a data string that may include ASCII characters as containers for data, which may be a players card number, their first name, birthdays or staff identification (for example: ";0000023462?", where ";" and "?" are the containers, and the dealer number is "23462").

The DBLogin 160 receives log-in and log-out information of a player or dealer from the Mag Reader 158 and the Screen Set 162 to request logging in or logging out of the system 100b. The DBLogin 160 may compare the received log-in and log-out information with approved log-in and log-out information, which may be stored in MongoDB database 174 and retrieved by the DBLogin 160. The DBLogin 160 may determine that the received log-in and log-out information matches approved log-in and log-out information, and may transmit a response signal to the Screen Set 162 and allow the player or dealer corresponding to the received log-in and log-out information to log into or log out of the system 100b.

In some embodiments, the system 100b comprises a Screen Set 162, a set of screens for displaying real time table monitoring data, based on data transmitted from the Camera Controller 154, Mag Reader 158, and DBLogin 160. The Screen Set 162 is also configured to capture input from the player or the dealer for logging in or logging out of the system 100b. The Screen Set 162 transmits a signal corresponding to the player or dealer's log in or log out request to the DBLogin 160, and receives a signal corresponding to an approval or disapproval response for the player or dealer to log into or out of the system 100b.

In some embodiments, the system 100b has a BetDataPort 164 for processing live table monitoring data from the classifier. The BetDataPort 164 receives and processes data from the Classifier Set 168, and the processed data is transmitted to one or more screens of the Screen Set 162, Interface 170, MongoDB database 174, and a real time monitor of the Interface 170.

In some embodiments, the system 100b comprises a Monitor 166, an interface for monitoring all input and output activity. The Monitor 166 receives data from the BetDataPort 164 and the LogIOPort 160. The Monitor 166 may be a systems monitor on the game monitoring server 104 or on the gaming table that processes the data received from the BetDataPort 164 and the LogIOPort 160 to confirm that data is being transmitted and the components of the system 100b are operational.

In some embodiments, the system 100b comprises a Classifier Set 168 to identify chip denomination and number of chips. This data is generated by self-learning, labeling and training live chip data of the system 1008. The Classifier Set 168 processes the data captured from the Camera Set 156 and generates a signal corresponding to the chip denomination and number of chips. The Classifier Set 168 transmits this signal to the Interface 170, and to the MongoDB database 174 for storage.

In some embodiments, the Classifier Set 168 comprise an image processing engine 204, as depicted in FIG. 1C. The image processing engine 204 may be configured to receive the images and to extract features from the images. In some embodiments, the image processing engine 204 segments and/or pre-processes the raw image data to remove noise, artifacts, and/or background/foreground imagery. For example, the image processing engine 204 may be configured to visually identify the pixels and/or regions of interest (e.g., by using a combination of depth data and similarity/size information) regarding the chips. Specific stacks of chips, such as chips stacked on a betting area or in a channel of a chip tray, may be identified, along with their constituent chips. The chips may have "bounding boxes" drawn over them, indicative of the pixels to be used for analysis. Similarly, in some embodiments, "bounding boxes" are drawn over entire stacks of chips. The image processing engine 204 may extract features from the bounding boxes and, for example, create a compressed transform representative of a subset of the image information. For example, in some embodiments, various vertical, horizontal, or diagonal lines of information may be drawn through a determined stack of chips, and samples may be obtained through tracking the image pixels proximate to and/or around a determined centroid for each of the chips.

In some embodiments, to account for variations in markings (e.g., vertical stripes), the pixels (e.g., horizontal pixels) estimated to comprise a particular chip are blurred and/or have other effects performed on them prior to extraction such that the centroid and its surrounding pixels are representative of the chip as a whole.

The image processing engine 204 may also extract out a particular height of the chips, and this information may be utilized to determine the general size and/or makeup of the stack of chips. For example, knowledge of the chip stack, distance, and height of specific chips may permit for the segmentation of pixel information on a per-chip basis.

In some embodiments, the Classifier Set 168 comprises an image recognizer engine 206, as depicted in FIG. 1C. The image recognizer engine 206 may obtain the extracted and compressed information from the image processing engine 204, applying recognition techniques to determine the actual chip value for each chip in the relevant region of interest. As the image recognizer engine 206 receives a set of features, the image recognizer engine 206 may be configured to utilize a classifier to determine how well the feature set corresponds to various reference templates. In some embodiments, the classifier provides both an estimated value and a confidence score (e.g., a margin of error indicative of the level of distinction between potential chip value candidates). Where the chip value cannot be reliably ascertained through the reference templates, a notification may be provided to either request re-imaging with varied characteristics, or to generate an error value. For example, features may be poorly captured due to changes in ambient lighting and/or environmental shadows, and the notification from the classifier may control a reference lighting source to activate and/or modify illumination to potentially obtain a more useful set of image features.

In some embodiments, the image recognizer engine 206 may dynamically provision computing resources to be used for recognition. For example, if the image recognizer engine 206 identifies that a larger amount of processing will be required in view of a large volume of poor quality image data, it may pre-emptively request additional processing resources in view of a requirement to complete processing within a particular timeframe. Conversely, in some embodiments, where image data is of sufficiently high quality to quickly and accurately conclude that a chip is a particular type of chip, processing resources may be freed up.

In some embodiments, the Classifier Set 168 comprises a rules engine subsystem 208, as depicted in FIG. 1C. A rules engine subsystem 208 may be provided in relation to classification of chip image data/features to chip values. The rules engine subsystem 208 may, for example, include tracked linkages and associations that are used by the classifier to determine a relationship between a particular reference feature set. In some embodiments, the rules engine subsystem 208 includes weighted rules whose weights dynamically vary in view of updated reference feature sets or accuracy feedback information (e.g., indicated false positives, false negatives, true positives, true negatives), among others. The rules engine subsystem 208 may also include logical processing rules that control operation of various characteristics of the classifier, the reference illumination, processing characteristics, etc.

In some embodiments, the Classifier Set 168 may comprise a game monitoring engine 210, as depicted in FIG. 1C. A game monitoring engine 210 may obtain the tracked chip/bet values for each bet and/or for the chips in the chip tray, for example, from a plurality of imaging components 202, processing engines 204, and/or recognizer engines 206, and maintain an inventory of table monitoring data, which may be stored in a data storage 250. The game monitoring engine 210 may be adapted to provide real or near-real-time feedback, and also to perform various analyses (e.g., overnight processing). The game monitoring engine 210 may identify patterns from combining table monitoring data with other data, such as player profile information, demographics, hand counting information, dealer tracking information, etc. Further details on the Classifier Set 168 for determining how well image data captured on the gaming table corresponds to reference templates is described in U.S. patent application Ser. No. 15/309,102 and PCT Application No. PCT/CA2016/050442, the entire contents of which are hereby incorporated by reference.

In some embodiments, the Classifier Set 168 may process data based on a distributed task queue based on distributed message passing. The Classifier Set 168 may process data asynchronously or synchronously. The Classifier Set 168 may support scheduling or operate in real time. In some examples, the Classifier Set 168 may process data using the Celery™ distributed task queue. As the Camera Set 156 captures data from the gaming table, the Camera Set 156 may deposit the captured image data at the Classifier Set 168. The Camera Set 156 may continue to capture additional data from the gaming table, and later poll the Classifier Set 168 to see if the Classifier Set 168 has processed the captured image data. If the Classifier Set 168 has processed the image data, the image data may be transmitted to the Interface 170 or MongoDB database 174.

In some embodiments, the system 100b comprises the Interface 170, an interface comprising real time and batch data. Real time data is populated on demand as the game is being played on the gaming table and batch data is requested from the MongoDB database 174 though a cache. The Interface 170 is configured to receive data from the Hand-Count Unit 152, the Classifier Unit 168, and the MongoDB 174. The Interface 170 processes the data and stores the relevant data in the MongoDB 174.

The Interface 170 is an interface allows for the presentation of processed data based on data captured from the gaming table, such as through a browser accessible at a location in the casino, such as in the pit, on the table signage, or on the display screens of the bet recognition module.

In some embodiments, the Interface 170 may be a data interface, such as in a server room. In some embodiments, the Interface 170 may be a graphical interface, such as a web interface display from the data interface, or an integrated screens display from the data interface.

In some embodiments, the Interface 170 comprises an administrative interface subsystem 212 and a user interface subsystem 214. The administrative interface subsystem 212 may be provided for administrative users to control how the system operates and/or to request particular analyses and/or reports. The user interface subsystem 214 may provide, for example, various graphical interfaces for understanding and/or parsing the tracked bet recognition data. The graphical interfaces may, for example, be configured to generate notifications based on tracked discrepancies, etc. The various components may interoperate through a network 270. The game monitoring server 104 connects to other components in various ways including directly coupled and indirectly coupled via the network. The network (or multiple networks) is capable of carrying data and can involve wired connections, wireless connections, such as the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, or a combination thereof. The network may involve different network communication technologies, standards and protocols, such as, for example, G2S protocols.

In some embodiments, the system 100b comprises MongoDB database 174. Image data and processed bet data may be stored at the MongoDB database 174.

The system 100b may undergo an initial calibration at the point of assembly when the system components as described herein are connected together. Configuration files are unified and stored on one local database, such as MongoDB database 174. If one of the components of the system 100b fails, it does not affect the remainder of the system 100b. The failed component may be replaced and the system 100b may continue to monitor activities at the gaming table.

Serial numbers are used to identify the data being produced by the cameras and sensors described herein.

Aspects of game monitoring server 104 may be implemented by Classifier Set 168, Interface 170, and MongoDB database 174. Aspects of the table monitoring subsystem 102 may be implemented by Hand Count Unit 152, Camera Set 156, Camera Controller 154, Mag Reader 158, and Screen Set 162.

The system 100b may be operable as long as its components are in data communication, such as through a network. Accordingly, the system 100b has a modular architecture, allowing for components to be installed or uninstalled without disruption to the system 100b. For example, a camera configured to capture image data of chips at the gaming table, a camera configured to capture image data of chips in the chip tray, and one or more bet recognition modules may be connected to the system 100b and the data produced from them may be processed by the system 100b without changes to the architecture.

The data produced by the system 100b is a binary data stream, rather than a particular file type. For example, image data captured by the Camera Set 156 is not saved as a JPEG or PNG file. Rather, the image data is transmitted as a binary stream of data. Accordingly, the system 100b may process data from a plurality of sources, such as cameras for capturing image data corresponding to chips on the gaming table, cameras for capturing image data corresponding to chips in the chip tray, data from a card reader unit, sensors mounted on the gaming table, sensors mounted on the chip tray, infrared sensors, a switch, electromagnetic sensors, and the like, providing greater flexibility with the operating system and architecture.

In some example embodiments, game monitoring server 104 may connect directly to table monitoring subsystems 102. FIG. 2 illustrates a schematic diagram of another system 100D for monitoring table activities at gaming tables according to some embodiments. System 100D may include table monitoring subsystem 102 at gaming table with defined bet areas 114 on the gaming table surface. In this example, table monitoring subsystem 102 directly connects to game monitoring server 104 to provide image data for the gaming table surface, the bet areas 114, and/or the chip tray.

Figure 3:
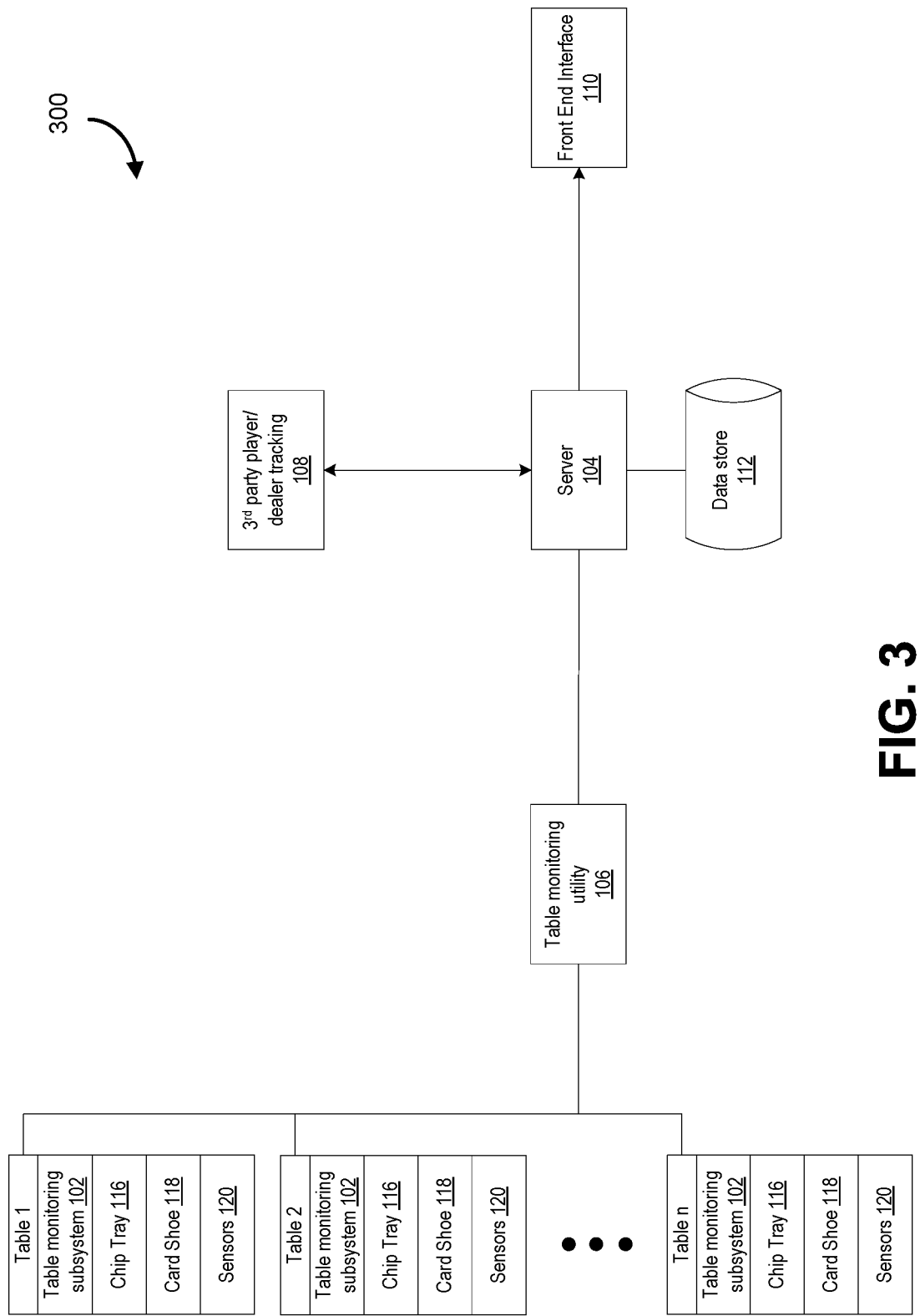
FIG. 3 illustrates a block diagram of another system for monitoring game activities at gaming tables according to some embodiments.

FIG. 3 illustrates a block diagram of a system 300 for monitoring table activities at gaming tables according to some embodiments involving table monitoring data. Card game activities may generally include dealing card hands, betting, playing card hands, winning chips, losing chips, and so on. Each player, including the dealer and customers, may be dealt a card hand. For a card game, each active player may be associated with a card hand. The card hand may be dynamic and change over rounds of the card game through various plays. A complete card game may result in a final card hand for remaining active players, final bets, determination of winning card hands amongst those active players' hands, and determination of a winning prize based on winning card hands and the final bets. At different rounds or stages of the game different players make bets by placing chips in bet regions on the gaming table surface.

Table monitoring subsystem 102, a chip tray 116, a card shoe 118, and sensors 120 may be integrated at each gaming table for capturing data, such as image data for chips and cards used during the game, and data for bets and monitoring the transfer of chips at the particular gaming table. Table monitoring subsystem 102, chip tray 116, card shoe 118, and sensors 120 may collect the data and transmit the data to server 104 for server 104 to calculate bet data and chip transfers for different hands and players.

Table monitoring subsystem 102 may determine table monitoring data over a time period, using timestamps, for example. Server 104 may correlate the table monitoring data (e.g. bet data, chip transfer data, data of cards used during a game, etc.) using timestamps or time periods, for example. The information may be stored on data store 112, and presented on front enter interface 110.

Table monitoring subsystem 102 may associate table monitoring data with a particular gaming table, dealer, customers, geographic location, subset of gaming tables, game type, and so on. Similarly, chip tray 116, card shoe 118, and sensors 120 may associate data with a particular gaming table, dealer, customers, geographic location, subset of gaming tables, game type, and so on. For example, table monitoring data may be associated with a timestamp and gaming table identifier to link data structures for further data analysis, processing and transformation.

Metadata is collected alongside image data and may be associated (e.g., using pointers, labels, metadata tags) with the image data to indicate additional information, such as checksums (e.g., for redundancy and immutability), timestamps, player information, hand count information, bet round information, lighting conditions, reference lighting characteristics, confidence score associated with image data, sensors in use, processor in use, etc.

Image data, along with other metadata may be encapsulated in the form of information channels that may be use for transmission and/or otherwise encoded. In some embodiments, 10 or more channels of information are provided by the table monitoring subsystem 102, and the channels may include, for example, image data taken with different color balances and parameters, image data from different sensors, metadata, etc.

Each table monitoring subsystem 102 may transmit image data or other table monitoring data to table monitoring utility 106 for provision to game monitoring server 104. Each chip tray 116, card shoe 118, and sensors 120 may transmit table monitoring data from a sensor array to table monitoring utility 106 for provision to game monitoring server 104.

The chip tray 116 and card shoe 118 may include sensors, such as, for example, tray monitoring cameras, laser sensors with optical emitters and receivers, and optic sensors. Laser sensors, instead of other types such as ambient light sensors, may be advantageous to reduce the effect of lighting in the environment, to not require special table top felt material, to waterproof the device, and so on. Ambient light sensors may not work well if a part of the table is not well lit, as these types of sensors are looking for darkness for object detection. The chip tray 116 and card shoe 118 may use optical receiver and emitter sensors that look for light for object detection. Additional types of sensors include radio frequency and optics. The sensors may be organized to form a sensor array. The chip tray 116 and card shoe 118 may further include an infrared receiver and infrared emitter or transmitter for electronic data exchange. The sensors are particularly configured and positioned relative to the play area and bet area on the gaming table. For example, sensors of the chip tray 116 may be positioned proximate to the chip tray 116 and directed towards the channels of the chip tray 116. The device may be configured to provide a particular distance between sensor and chips in the channels, such as a one centimeter distance, for example.

Table monitoring subsystem 102 may retrieve image data captured by the imaging component and may retrieve additional data from sensors and cameras used for monitoring table activities. Table monitoring subsystem 102, a chip tray 116, a card shoe 118, and sensors 120 generate table monitoring data for provision to game monitoring server 104. Table monitoring data may include image data of chips placed on a betting area, image data of chips placed or removed from a chip tray, bet data, the amount of chips won or lost for a game or event, the amount of chips received in a chip tray, the amount of chips removed from a chip tray, the value of cards used in the game, detection of hand movement around the table, and hand count data events, such as hand start event data and hand stop event data, and so on. Hand start event data indicates the start of a new hand. Hand stop event data indicates the end of a hand. Table monitoring data may be linked by timestamps. The table monitoring data may be used to compute values of bets, the value of chips in a chip tray, and other data values. The sensors of table monitoring subsystem 102 may be positioned on the gaming table to detect table monitoring activities and trigger hand start events and hand stop events. The sensors may deliver real-time data regarding card play activity, including hand start event data and hand stop event data. The imaging components may also deliver real-time image data regarding table monitoring activities. The imaging component of table monitoring subsystem 102 may be mounted or integrated into gaming table to capture real-time image data for bet areas and the chip tray on the gaming table surface.

In some embodiments, the clocks of the table monitoring subsystem 102, chip tray 116, card shoe 118, sensors 120, and game monitoring server 104 are synchronized together to ensure that data is readily interpretable regardless of source.

Table monitoring subsystem 102 may be configured with particular trigger events, such as detection of chips or objects in defined bet areas on the gaming table by sensors, or detection of chips or objects placed or removed from a chip tray by sensors. The trigger events may trigger imaging component to capture image data for calculating bet values for the chips.

A timing or threshold value may be set off to trigger transmission of table monitoring data used to calculate bet data and count the chips in the chip tray. An example trigger may be sensor activation for a threshold value, for example two, three or four seconds. Another example trigger may be sensor deactivation for a threshold value.

Table monitoring data may include bet data, player count data and chip transfer data, which may be valuable for casinos for security, management, and data analytics. For example, a casino may determine a link between a game and a dealer, and also a dealer and a customer, through the table monitoring data. A casino may provide real-time compensation to players using the table monitoring data. Accordingly, the systems, devices and methods in accordance with embodiments described herein may provide various levels of granularity and specificity for table monitoring data, using the bet data, player count data and chip transfer data, and other generated game activity data values. There may further be third party player tracking and/or dealer tracking data 108 that may be utilized in relation to performing analysis and reporting.

Figure 4:
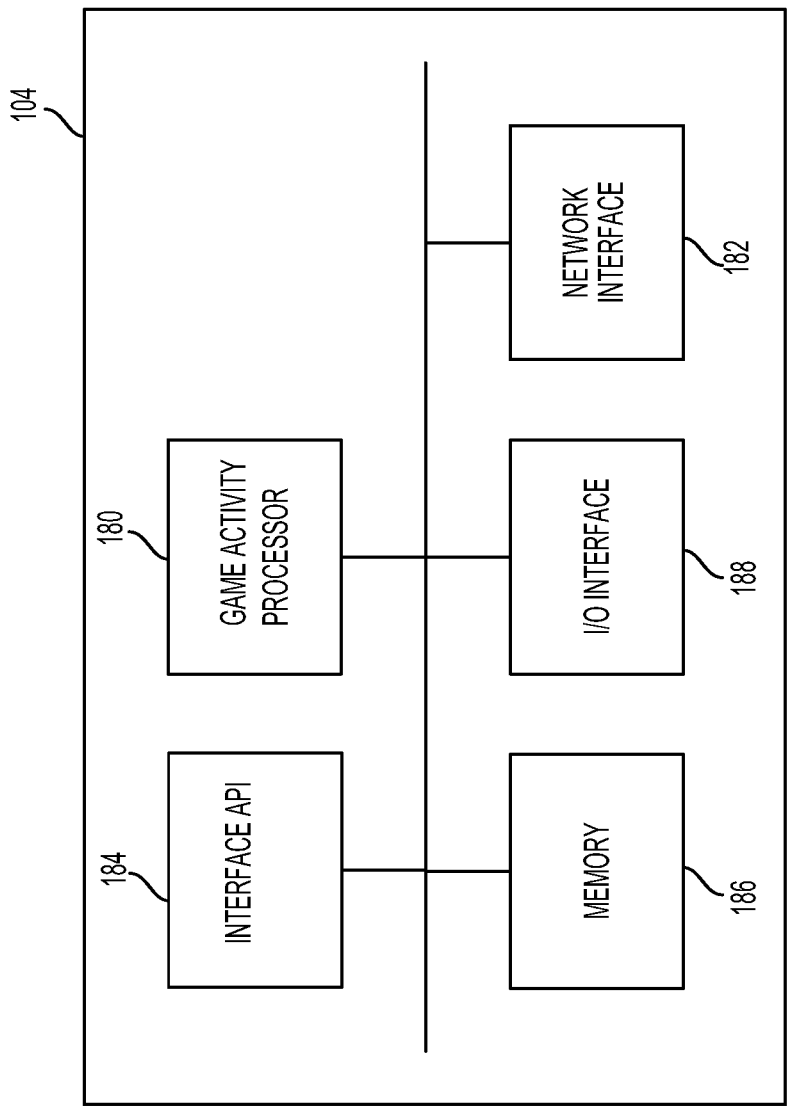
FIG. 4 illustrates a schematic of a game monitoring server according to some embodiments.

FIG. 4 is an illustration of a schematic of a game monitoring server 104 according to some embodiments.

Game monitoring server 104 is configured to collect table monitoring data including bet data and chip transfer data. The chip transfer data may be used to determine the numbers of chips placed in and removed from a chip tray for a particular gaming table for a particular period of time (e.g. due to winnings and losses of a player or a dealer). Table monitoring data may be associated with a time stamp (e.g., start time, stop time, current time) and table identifier. The table monitoring data may also be associated with a particular player (e.g. dealer, customer) and a player identifier may also be stored in the data structure.

For simplicity, only one game monitoring server 104 is shown but system may include more game monitoring servers 104. The game monitoring server 104 includes at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, set-top box, embedded device, computer expansion module, personal computer, laptop, or computing devices capable of being configured to carry out the methods described herein.

As depicted, game monitoring server 104 includes at least one game activity processor 180, an interface API 184, memory 186, at least one I/O interface 188, and at least one network interface 182.

Game activity processor 180 processes the table monitoring data including image data, bet data, chip transfer data, and so on, as described herein. Each processor 180 may be, for example, a microprocessor or microcontroller, a digital signal processing (DSP) processor, an integrated circuit, a field programmable gate array (FPGA), a reconfigurable processor, a programmable read-only memory (PROM), or any combination thereof.

Memory 186 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 188 enables game activity processor 180 to interconnect with one or more input devices, such as a keyboard, mouse, camera, touch screen and a microphone, or with one or more output devices such as a display screen and a speaker.

Each network interface 182 enables game activity processor 180 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Application programming interface (API) 184 is configured to connect with front end interface 110 to provide interface services as described herein.

Game activity processor 180 is operable to register and authenticate user and client devices (using a login, unique identifier, and password for example) prior to providing access to applications, network resources, and data. Game activity processor 180 may serve one user/customer or multiple users/customers.

Figure 5:
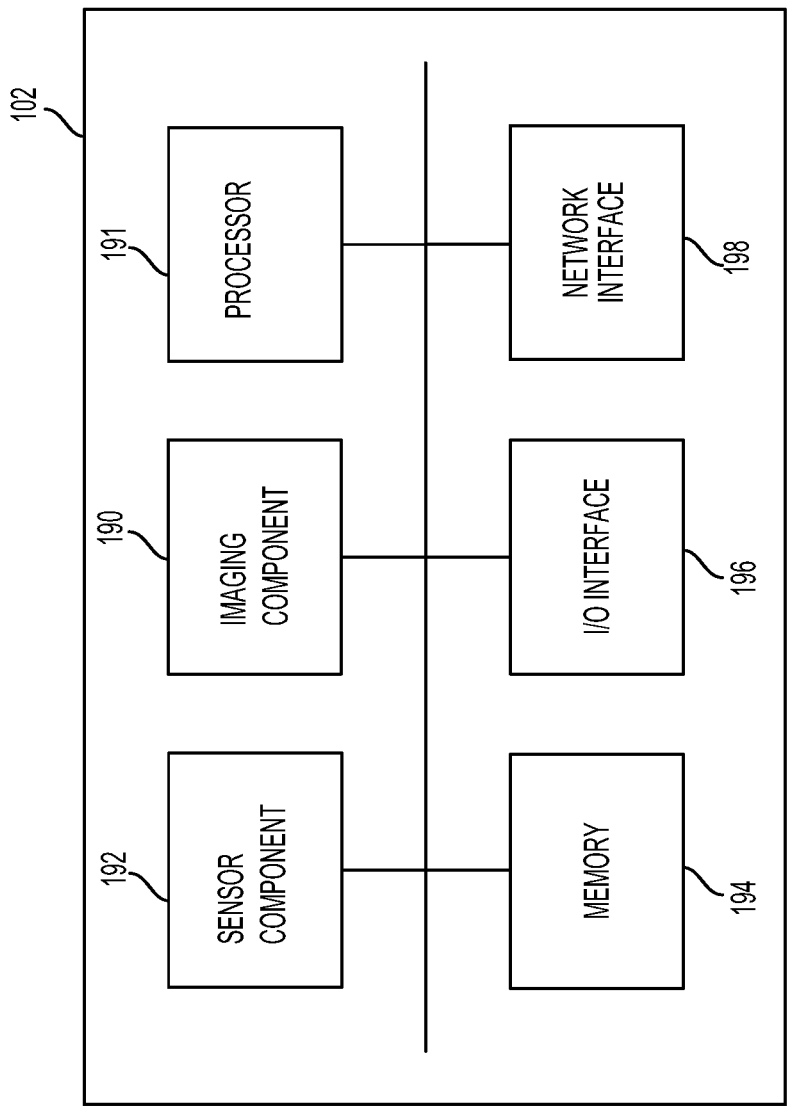
FIG. 5 illustrates a schematic of a table monitoring subsystem according to some embodiments.

FIG. 5 illustrates a schematic of a table monitoring subsystem 102 according to some embodiments.

As depicted, table monitoring subsystem 102 may include an imaging component 190, sensor component 192, processor 191, memory 194, at least one I/O interface 196, and at least one network interface 198.

Processor 191 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 194 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 196 enables table monitoring subsystem 102 to interconnect with one or more input devices, such as a keyboard, mouse, camera, touch screen and a microphone, or with one or more output devices such as a display screen and a speaker.

Each network interface 198 enables table monitoring subsystem 102 to communicate with other components, to exchange data with other components, to access and connect to network resources, to serve applications, and perform other computing applications by connecting to a network.

Table monitoring subsystem 102 may also include a scale component. Table monitoring subsystem 102 may monitor chips and cards on the gaming table using scales. A scale may be placed underneath the casino table, or underneath the area on which the chips or cards are placed, such as a betting area or channels of a chip tray. The scale may take measurements during the time periods when no movement of the chips or cards is done. For example, players may place the cards or chips on the table or a dealer may place chips in the chip tray, upon seeing a particular gesture, a scale may read the weight and the system may determine, based on the weight, as well as the monitoring mechanism, the number of cards or chips on the table or tray. The weight reading may be done at a later point, to confirm that no cards or chips were taken off of the table, or to consider if cards or chips have been taken off the table. The scale may take measurements of the weight responsive to a command by the system. As such, the system may determine when the chips or cards are not touched by the dealer or the player, thereby ensuring that a correct measurement is taken and, in response to such a determination, sending a command to measure the weight of the chips or cards. As an example, based on the weight and the coloring of the chips, the system may determine the present amount of the chips the user may have. This may be an example of table monitoring activity.

Using these techniques, the system may monitor and track the chips of the dealers and the chips of the players, may track the progress of each player, may be able to see when and how each player is performing, and may also monitor new hands to determine hand count. The system may therefore know the amount of chips gained or lost in real time at any given time, and may also know the number of cards in each player's hand, and so on.

As described herein, embodiments described herein may provide systems, methods and devices with table monitoring capabilities. Table monitoring data may be generated and collected as bet data and chip transfer data. For example, a game may involve betting chips and system may detect chips placed on a betting, placed in a chip tray, or removed from a chip tray, using table monitoring subsystem 120.

The table monitoring subsystem 120 may capture image data for bet data in response to chip detection in a betting region, and/or may capture image data for chip transfer data in response to chips being placed in or removed from a chip tray.

In some embodiments, one or more table monitoring subsystems described herein may be used together for capturing data to monitor bets being made and the transfer of chips at a gaming table.

Figure 6A:
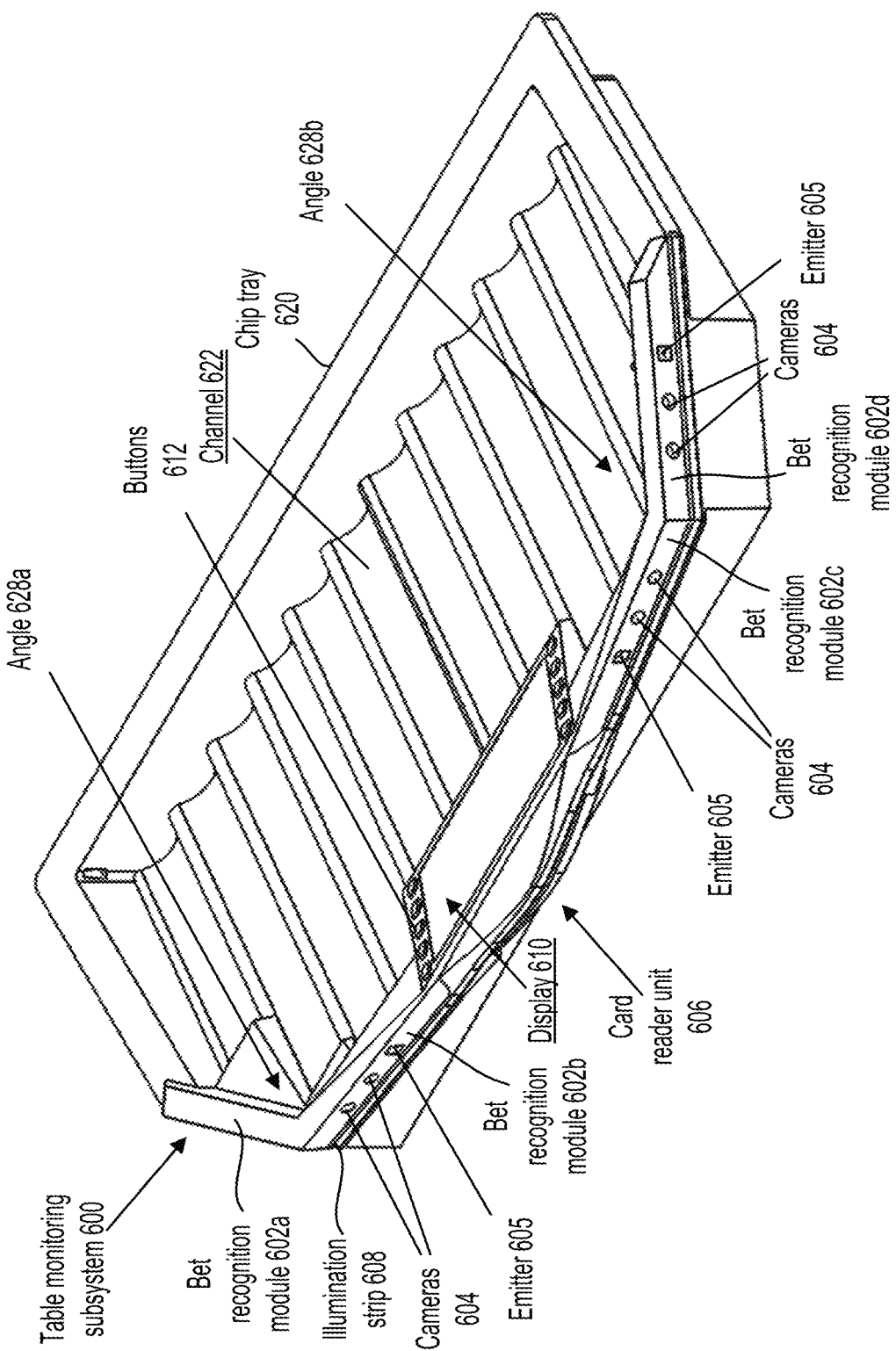
FIG. 6A illustrates a perspective view of an example table monitoring subsystem according to some embodiments.
Figure 6B:
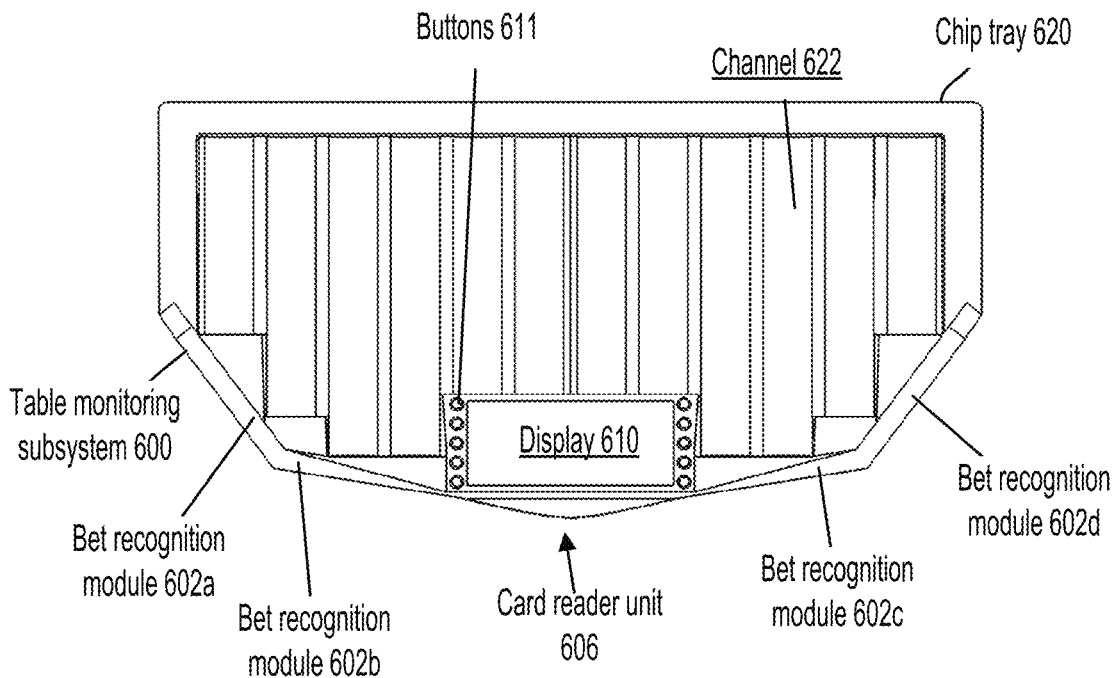
FIG. 6B illustrates a top view of the table monitoring subsystem of FIG. 6A according to some embodiments.

FIG. 6A to FIG. 6G depicts an example table monitoring subsystem 600 according to some embodiments. The table monitoring subsystem 600 comprises a first imaging component and a second imaging component. As depicted in FIG. 6A, the first imaging component is positioned on a first tapered corner of a chip tray 620, and the second imaging component is positioned on a second tapered corner of the chip tray 620.

The chip tray 620 comprises one or more channels 622 for receiving chips. When playing a game at a gaming table, one or more chips used to bet during the game may be placed in the channels 622 if a player loses the game, or one or more chips may be removed from the channels 622 to give to a winning player. The channels 622 are dimensioned to be complementary to the shape of the chips. For example, where the chips are generally circular discs, the channel 622 is round to promote placing the chips in the channel 622 and stacking the chips in the channel 622. As depicted in FIG. 6A, the channels 622 of the chip tray 620 may be separated, such that chips of different denominations or values may be placed in different channels 622.

In some embodiments, imaging components (e.g., cameras, emitters) are placed and positioned to have a substantially horizontal sensor angle when viewing the chips. Substantially horizontal may mean substantially parallel to a plane of the gaming surface.

The first and second imaging components of the table monitoring subsystem 600 may be adapted such that the imaging component is directed towards the betting areas from or near the perspective of a dealer. Such a configuration may be helpful in ensuring that the chips are less obstructed, and provide a sufficient view of the sidewalls of the chips. An "offset angle" may be provided where the imaging components, while "looking" substantially parallel at the sidewalls of the chips, due to the stacked nature of chips, may aid in obtaining as many pixels as possible.

As described, the imaging component angle may be important to ensure that as many pixels of information can be extracted from a machine-vision image that are representative of chips. The imaging component itself may also require to be off-set from the gaming surface (e.g., at a particular altitude or height) such that the sensing is not blocked by the presence of objects on the gaming surface, such as playing cards, dice, markers, etc. For example, a card may be curled at a corner, and a sensor placed directly horizontal and in contact with the gaming surface may end up being obstructed by the cards (and thus unable to read the value of the chips). The horizontal angle, for example, may be an angle between −5 to 5 degrees, and the altitude may be between 0.2 cm to 1.0 cm. While the image obtained may be direct for some chips, there is nonetheless some angle for chips that are at the top or the bottom of the stack.

The imaging component of the table monitoring subsystem 600 may be defined by one or more bet recognition modules. In some embodiments, the imaging component comprises a bet recognition module 602 for capturing image data corresponding to one or more chips positioned in a betting area of the gaming table. As depicted in FIG. 6A, the first imaging component comprises a bet recognition module 602a and a bet recognition module 602b joined to bet recognition module 602a, and the second imaging component comprises a bet recognition module 602c and a bet recognition module 602d joined to bet recognition module 602c. In some embodiments, bet recognition module 602a and bet recognition module 602b may not be joined together. In some embodiments, bet recognition module 602c and bet recognition module 602d may not be joined together.

In some embodiments, the imaging component of the table monitoring subsystem 600 comprises one or more bet recognition modules 602. As depicted in FIG. 6A, the bodies of the first and second imaging components are joined to define an integral body of the table monitoring subsystem 600. In some embodiments, the first and second imaging components are separate.

As depicted in FIG. 6A, bet recognition modules 602a and 602b share a common housing, and bet recognition modules 602c and 602d share a common housing. In some embodiments, each bet recognition module 602 of the table monitoring subsystem 600 may be within a single housing.

To capture image data, the bet recognition modules 602 comprise one or more cameras 604. In some embodiments, the bet recognition modules 602 further comprises an emitter 605 for emitting a particular wavelength of light to be detected by one or more of the cameras 604. In some embodiments, the cameras 604 may comprise the emitter 605 for emitting the radiation detectable by the cameras 604. In other embodiments, the cameras 604 and the emitters 605 are separate. For example, one camera 604 is a red green blue (RGB) camera, and another camera 604 is an infrared camera, and the emitter 605 emits infrared light that is detectable by the infrared camera 604.

In some embodiments, the bet recognition modules 602 have an infrared radiation emitter, an infrared radiation-sensitive camera, a visible light-sensitive camera, and a visible light emitter (e.g. illumination strip 608). In some embodiments, table monitoring subsystem 600 and/or each of the bet recognition modules 602 have a port to transmit image data, corresponding to the captured at least visible information and captured at least infrared radiation from the cameras 604 (e.g. an infrared radiation-sensitive camera and a visible light-sensitive camera), to the processor.

In some embodiments, the RGB camera 604 captures image data corresponding to the colour, pattern, and markings of a chip to be processed by the table monitoring server 104, and the infrared camera 604 captures depth data (e.g. coordinates in space) corresponding to the depth of the chip relative to the infrared camera 604. In some embodiments, the RGB and infrared cameras 604 are in data and electrical communication as one circuit. An example bet recognition module 602 is the Intel™ SR 300 module. An imaging component with cameras for capturing depth data may use infrared time of flight or infrared projection of structured light or speckled pattern.

As depicted in FIG. 6A, the bet recognition modules 602A and 602B define an angle 628A therebetween, and the bet recognition modules 602C and 602D define an angle 628B therebetween. The angles 628A and 628B substantially correspond to the first and second tapered corners of the chip tray 620, such that the geometry and shape of the table monitoring subsystem 600 is complementary to the geometry and shape of the chip tray 620 upon which the table monitoring subsystem 600 is positioned.

The geometry and shape of the table monitoring subsystem 600 is a function, in part, of the game being played on the gaming table, the viewing angle of the cameras and sensors of the imaging component, and the shape of the gaming table itself. The geometry and shape of the table monitoring subsystem 600 is such that the imaging components of the table monitoring subsystem 600 may capture image data of chips positioned at all relevant areas of the gaming table (e.g. betting areas). In some embodiments, the accuracy of the generated table monitoring data is improved by capturing image data of the centre of the chips. Further, the geometry and shape of the table monitoring subsystem 600 is such that the imaging components of the table monitoring subsystem 600, when positioned on the chip tray 620, appear complementary to the geometry and shape of the chip tray 620.

For example, the table monitoring subsystem 600 as depicted in FIG. 6A to 6G may be used at a gaming table that is generally semi-circular in shape, such as a gaming table used for playing blackjack. The cameras and sensors of the imaging components of the table monitoring subsystem 600 may have about a 90° viewing angle. In this example, the angle 628A and 628B is approximately 45°, so the field of view of the cameras and sensors of the imaging component sufficiently overlap with the gaming table, such that the cameras and sensors may capture image data of the chips positioned on the gaming table, such as the chips used to make a bet. As another example, the viewing angle of the cameras and sensors of the imaging components of the table monitoring subsystem 600 has a different viewing angle (e.g. about 120°). In this example, the angle 628A and 628B would be such that the field of view of the cameras and sensors of the imaging component sufficiently overlap with the gaming table, such that the cameras and sensors may capture image data the chips positioned on the gaming table. In some embodiments, where the viewing angle of the imaging component is not equal to 90°, the image data captured by the imaging component may correspond to an image that is warped around its perimeter, and it may require additional processing resources for the game monitoring server 104 to process the image data.

In some embodiments, the field of view of the cameras and sensors of the imaging component are configured to capture image data 20 centimeters to 2 meters from the imaging component.

In some embodiments, the table monitoring subsystem 600 comprises a card reader unit 606 for capturing image data corresponding to one or more cards used during the play of a game. The image data of the one or more cards may be processed to determine the orientation of the one or more cards, the value and suit of the one or more cards, which may then be processed to determine the quality of hand comprising the one or more cards. For example, the table monitoring subsystem 600 comprising the card reader unit 606 is used at a gaming table for playing blackjack.

In some embodiments, the card reader unit 606 is removably mounted to the table monitoring subsystem 600. As depicted in FIG. 6A, the card reader unit 606 may be positioned generally under a display 610 of the table monitoring subsystem 600. In some embodiments, the card reader unit 606 may be positioned elsewhere on the table monitoring subsystem 600.

Figure 14:
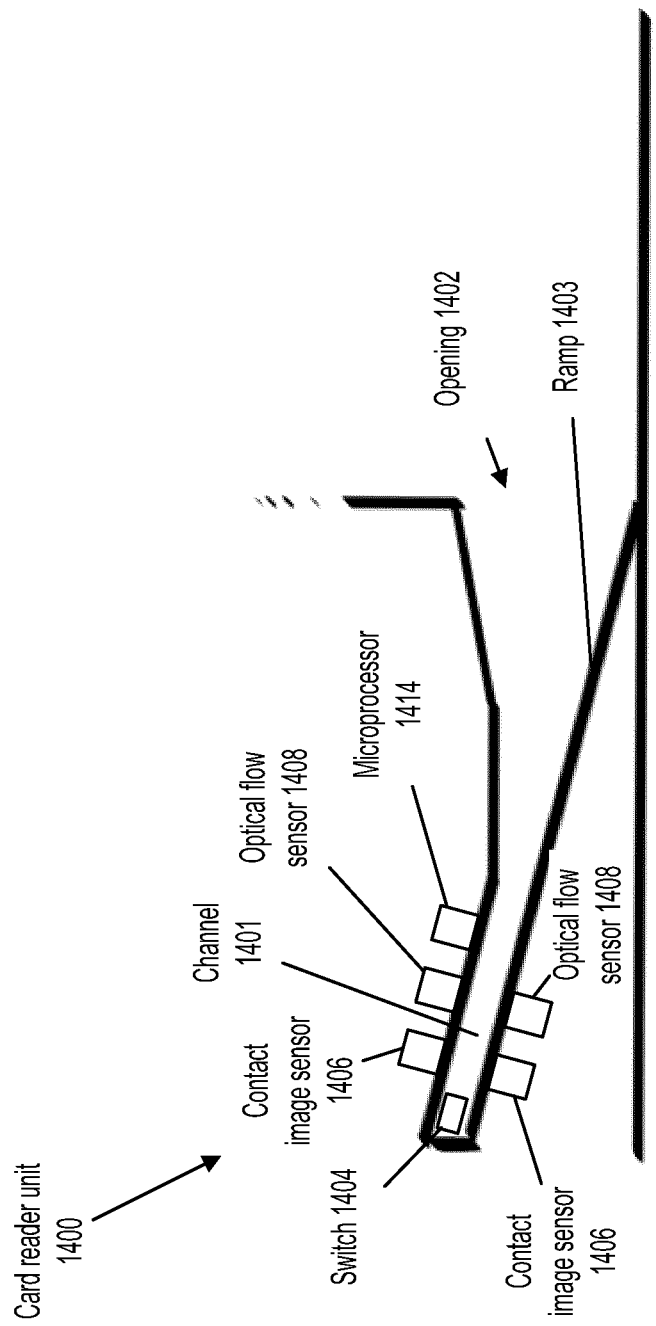
FIG. 14 illustrates a schematic diagram of an example card reader unit according to some embodiments.
Figure 15:
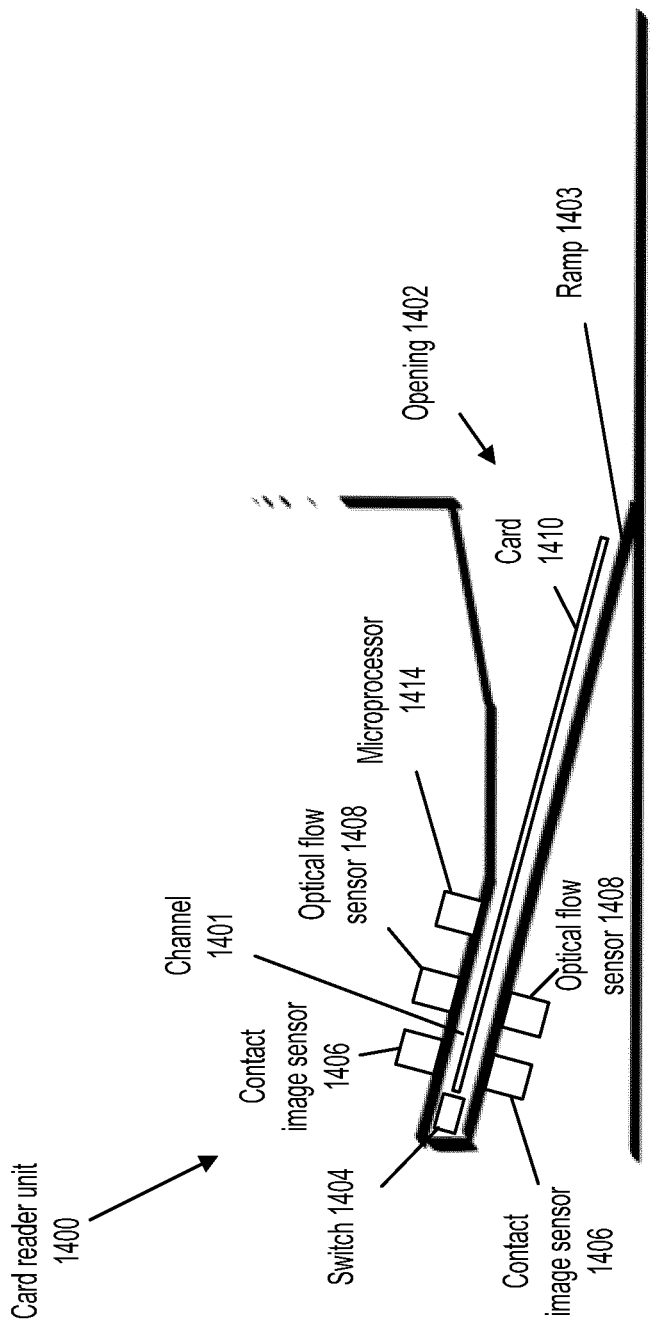
FIG. 15 illustrates a schematic diagram of a card inside the card reader unit of FIG. 14 according to some embodiments.

FIG. 14 illustrates a schematic diagram of an example card reader unit 1400, such as card reader unit 606, according to some embodiments, and FIG. 15 illustrates a schematic diagram of a card 1410 inside the card reader unit 1400. The card reader unit 1400 comprises a channel 1401 with an opening 1402 for receiving the card 1410. The card 1410 may be slid over the table and into the opening 1402. When the card 1410 is inserted into the opening 1402, at least a portion of the card 1410 may be off the gaming table. The height and width of the channel 1401 and the opening 1402 is such that it may receive one or more cards 1410 at least partially stacked above one another either in a landscape orientation or a portrait orientation.

In some embodiments, the card reader unit 1400 comprises a ramp 1403 for inserting the card 1410 into the channel 1401. In other embodiments, the card reader unit 1400 does not comprise the ramp 1403, and the channel 1401 is generally parallel to the surface of the gaming table. For example, the card reader 606 of the table monitoring subsystem 600 may not have a ramp 1403.

The card reader unit 1400 further comprises a contact image sensor 1406 and an optical flow sensor 1408 for capturing image data corresponding to the card. The optical flow sensor 1408 may capture data corresponding to the speed or drag of the card as it is being inserted into the card reader 1400, such that the image data from the contact image sensor 1406 and an optical flow sensor 1408 may together be processed to generate an image of the card, whether the card is being inserted quickly through the card reader unit 1400, or slowly through the card reader unit 1400. As shown in FIG. 14 and FIG. 15, the card reader unit 1400 may comprise two contact image sensors 1406 and optical flow sensors 1408, mounted on either side of the channel 1401 and opposing each other. In this configuration, image data may be captured for two playing cards, one stacked on top of the other, with the top card facing upwards, and the bottom card facing downwards.

In some embodiments, the card reader unit 1400 comprises a switch 1404 mounted at the end of the channel 1401 opposite the opening 1402. The switch 1404 may be a dummy button or a sensor that indicates that the card has reached the terminal end of the channel 1401. When the card contacts the switch 1404, the switch 1404 may generate a signal for the contact image sensor 1406 and the optical flow sensor 1408 to capture image data corresponding to the card 1410 received in the channel 1401.

Figure 16:
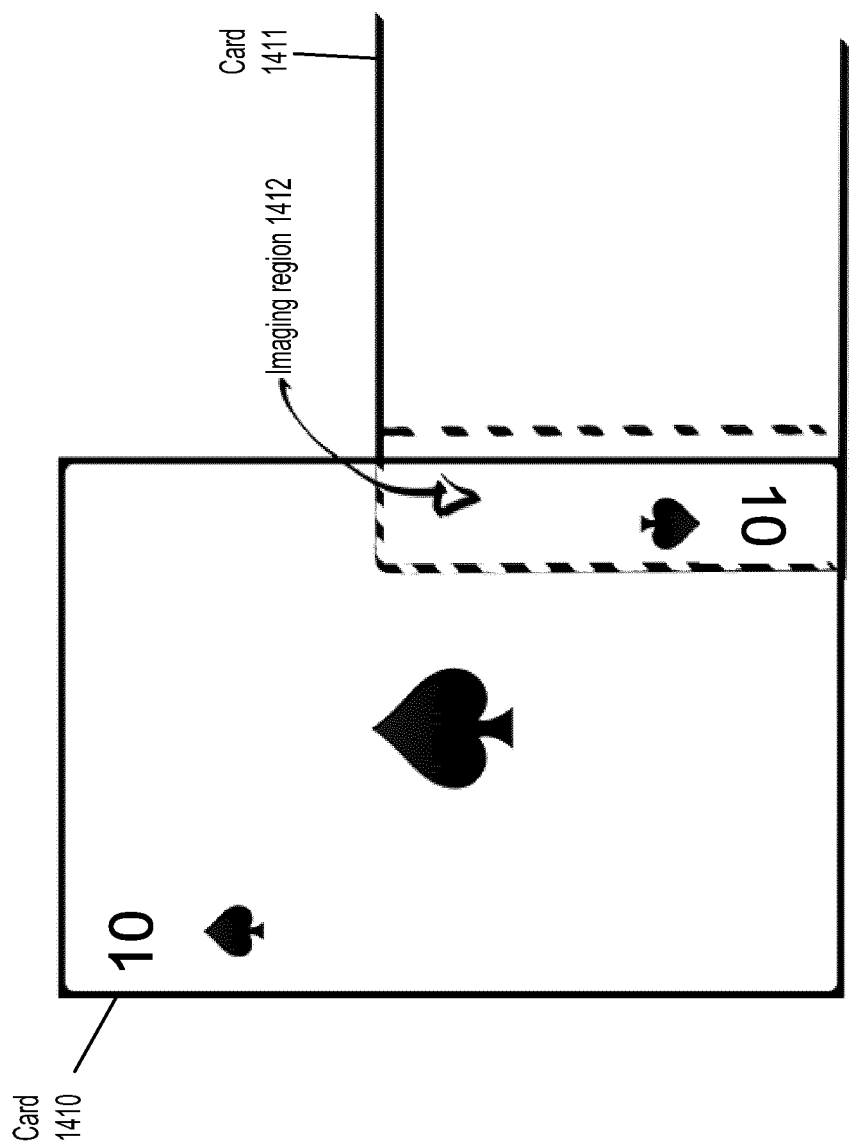
FIG. 16 illustrates a schematic diagram of a region of a card being monitored by the card reader unit of FIG. 14 according to some embodiments.
Figure 17:
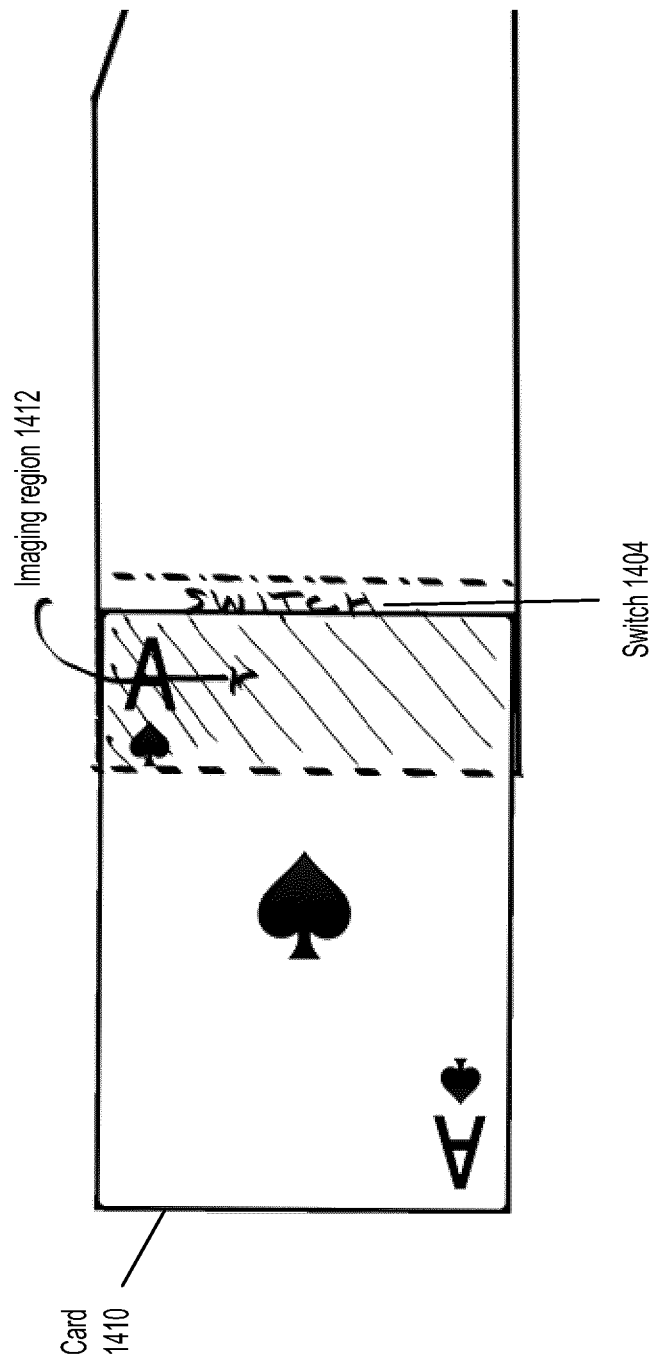
FIG. 17 illustrates a schematic diagram of another region of a card being monitored by the card reader unit of FIG. 14 according to some embodiments.

In some embodiments, the orientation of the card may be associated with the value of the card. As depicted in FIG. 16, a face-up card 1410 in portrait orientation with a value of 10 is stacked on top of a face-down card 1411. In some embodiments, when the image data captured by the contact image sensor 1406 and the optical flow sensor 1408 is processed by the game monitoring server 104, the game monitoring server 104 determines that the card 1410 is in the portrait orientation, and further determine that the value of the card is 10 based on the portrait orientation. As depicted in FIG. 17, the face-up card 1410 in landscape orientation with a value that is not 10 is stacked on top of the face-down card 1411. In some embodiments, when the image data captured by the contact image sensor 1406 and the optical flow sensor 1408 is processed by the game monitoring server 104, the game monitoring server 104 determines that the card 1410 is in the landscape orientation, and further determine that the value of the card is not 10, based on the landscape orientation. This may reduce the amount of computational resources required to determine the value of the card 1410 and the quality of the hand comprising the card 1410 and 1411. This may also promote ease of use of the card reader unit 1400 by dealers whose practice is to orient cards with a value of 10 in portrait orientation, and to orient cards with a value that is not 10 in landscape orientation, prior to inserting the card into a card reader unit for image capture.

Playing cards, such as those used when playing blackjack, may have standardized features, such as an indication of the value and suit at a corner of the card. As depicted in FIG. 16 and FIG. 17, the contact image sensor 1406 and the optical flow sensor 1408 may capture image data at a particular imaging region 1412, such as at the corner of the card, to capture image data corresponding to the value and suit of the card, and to reduce the amount of image data to be processed for determining the value and suit of the card.

In some embodiments, the card reader unit 1400 comprises a microprocessor 1414, as depicted in FIG. 14 and FIG. 15 for processing the image data captured by the contact image sensor 1406 and the optical flow sensor 1408. In other embodiments, the image data captured by the contact image sensor 1406 and the optical flow sensor 1408 may be transmitted to the game monitoring server 104 for processing.

In some embodiments, the imaging component may be utilized in combination with an illumination strip, such as illumination strip 608. The illumination strip (e.g., lights, LEDs, infrared lights, ultraviolet lights) providing a "reference illumination" against the sidewall of the chips.

For example, the illumination strip may be placed above or below the imaging component and may provide illumination in all or a portion of the field of view of the imaging component. The illumination provided may be static (e.g., a regular light) or controlled (e.g., a controllable light). The illumination characteristics may be modified (e.g., filters applied, the amount of total light controlled, the spectral makeup of the light may change, etc.). The illumination characteristics may be used in various ways, for example, to ensure that at a minimum number of pixels are able to be captured per chip, to ensure that there is constant reference illumination despite changes in ambient lighting, etc.

In some embodiments, illumination characteristics are modified in response to requests from the system. For example, the system may determine that there indeed are chips providing in a particular area, but the system is experiencing difficulty in assessing the value of the chips (e.g., due to environmental, ambient illumination, distortions, etc.). For example, chips may be covered by shadows (especially the bottom chips of a stack) and due to the shadowing, may appear to be indistinguishable from other chips or erroneously recognized. The classifier may identify a low level of confidence in the recognition and in response, generate a control signal to modify the illumination characteristics of the illumination strip.

A control system may note that the table monitoring subsystem is having difficulty (e.g., by an increase in error rate, failing to meeting a pre-defined threshold of pixels required to make an accurate determination) and issue a control command to the illumination strip to control the illumination device to more actively "light up" the chips so that a better picture may be taken for conducting image recognition.

Similarly, table monitoring subsystems may be designed to operate in environments where the amount of environmental and ambient lighting varies quite frequently. Light may be provided from natural sources (e.g., windows), or from artificial sources. Ambient lighting may occur from artificial sources that are incident to the table monitoring subsystems, such as the lights provided on other machines, room lighting, etc. In some embodiments, a gaming facility may purposefully modify the lighting conditions to impress upon the players a particular ambience or theme. Individuals at the facility may be smoking, casting shadows, etc.

These variations may significantly impact the ability of the table monitoring subsystem to perform table monitoring. A commercial consideration as to how the table monitoring subsystem functions is the ability to operate the table monitoring subsystem in a variety of different environments having different lighting conditions. For example, a table monitoring subsystem may require some level of portability as the table monitoring subsystem may be moved around a gaming facility over its lifetime, or sold and/or moved between different gaming facilities.

In some embodiments, the illumination strip 608 provides the reference illumination, and the reference illumination may be provided in a substantially horizontal view relative to the sidewalls of the chips. The reference illumination may provide more direct and relatively unobstructed illumination to the chip sidewalls, making any machine-vision interpretable markings more visible and easy to distinguish. As an example in the context of machine vision, particular colors may be difficult to distinguish from one another (e.g., red from pink), and similarly, striped markings may also be difficult to process as poor lighting may impact the ability to determine how thick a line is, etc. This problem may be particularly exacerbated if the machine-vision is not operating in the same range wavelengths as human vision, for example, if the machine vision operates in infrared, ultraviolet ranges, monochromatic ranges, etc.

The reference illumination may be provided in proximate to or substantially at the same location as the imaging components. For example, the reference illumination may be provided in the form of an illumination strip running across a sensor housing. As depicted in FIG. 6A, the illumination strip 608 extends along a side of the table monitoring subsystem 600 that faces the players. In some embodiments, each bet recognition module 602 comprises an illumination strip 608. In some embodiments, the reference illumination is provided in the form of spaced-apart light sources.

In some embodiments, the reference illumination in accordance with control signals such that the reference illumination characteristics (intensity, spread, spectral makeup, etc.) may be modified and monitored to dynamically adjust and/or control for variations from light provided from other sources For example, control signals may be provided, which when processed by the illumination strip, the illumination strip changes an intensity of the reference illumination based at least on ambient lighting conditions. The control signals may be adapted to implement a feedback loop wherein the reference illumination on the one or more chips is substantially constant despite changes to the ambient lighting conditions.

In some embodiments, rather than, or in combination with changing the reference illumination to provide a constant lighting condition, the reference illumination is adapted to monitor a confidence level associated with the table monitoring from machine-vision images that are provided to a backend system. For example, if the backend image processing system indicates that there are significant accuracy and/or confidence issues, the backend image processing system may be configured to generate a control signal requesting modifications to the reference illumination relative to the chips themselves. Outcomes may be monitored, for example, by using a feedback loop, and controlled such that an optimal amount of reference lighting is provided. In some embodiments, the reference illumination is not constant, but is rather adjusted to ensure that a sufficiently high level of confidence is obtained during image processing. In some embodiments, reference illumination may be provided in a strobe fashion and/or otherwise intermittently used when image processing capabilities are impacted (e.g., a transient shadow passes by, the chips are momentarily obstructed by the hand of a player or the dealer, etc.).

The reference illumination, to save energy, may, in some embodiments, be controlled such that it can be turned on whenever additional illumination is required.

Figure 11:
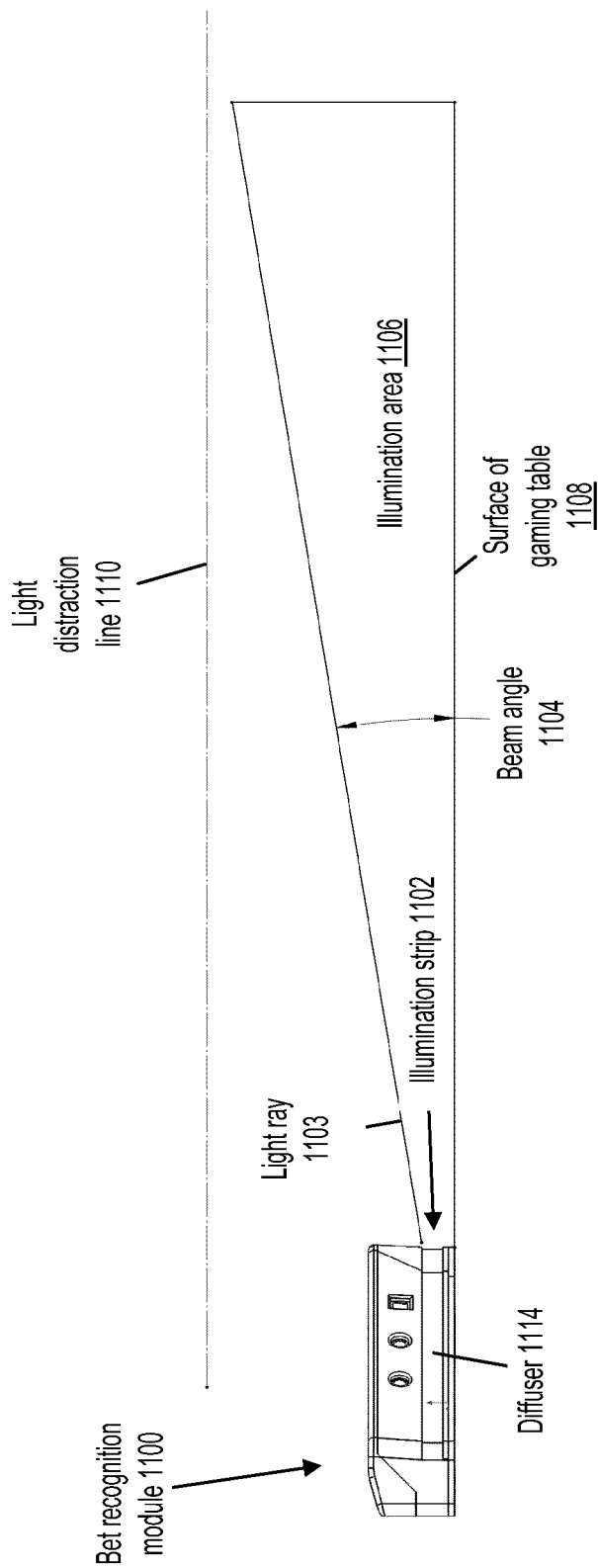
FIG. 11 illustrates a schematic diagram of an illumination area below a light distraction line according to some embodiments.
Figure 12:
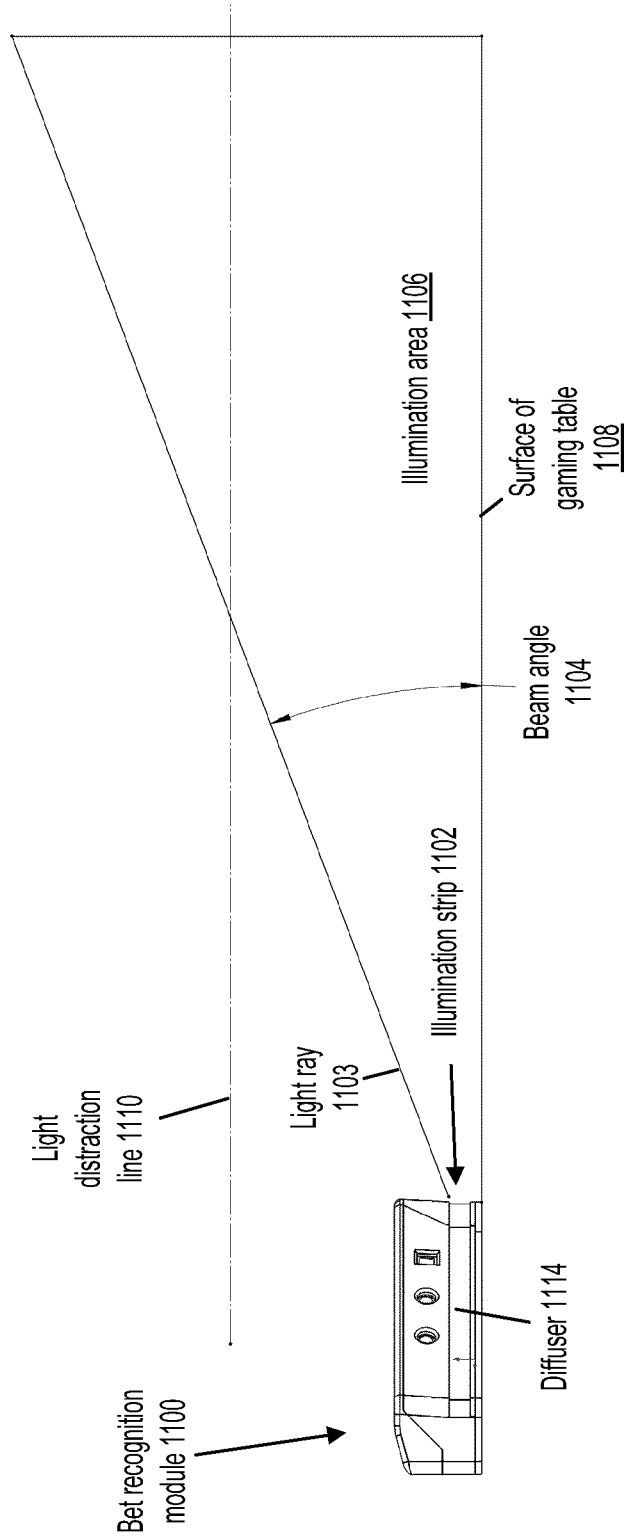
FIG. 12 illustrates a schematic diagram of an illumination area above the light distraction line according to some embodiments.

FIG. 11 depicts a bet recognition module 1100 of a table monitoring subsystem. The bet recognition module 1100 has an illumination strip 1102 generally aligned with the surface 1108 of a gaming table. The illumination strip 1102 emits a light ray 1103 and illuminates an illumination area 1106. The light ray 1103 and the surface of the gaming table 1108 define a beam angle 1104 therebetween. Based on the illumination characteristics of the light from the illumination strip 1102, the light ray 1103 may extend beyond a light distraction line 1110, such that the light ray 1103 may be directed towards a user and may distract the user, as depicted in FIG. 12. In some embodiments, as depicted in FIG. 11, the illumination strip 1102 comprises a diffuser 1114 for reducing the beam angle 1104 of the light ray 1103, such that the light ray 1103 does not extend past the light distraction line 1110.

Figure 13:
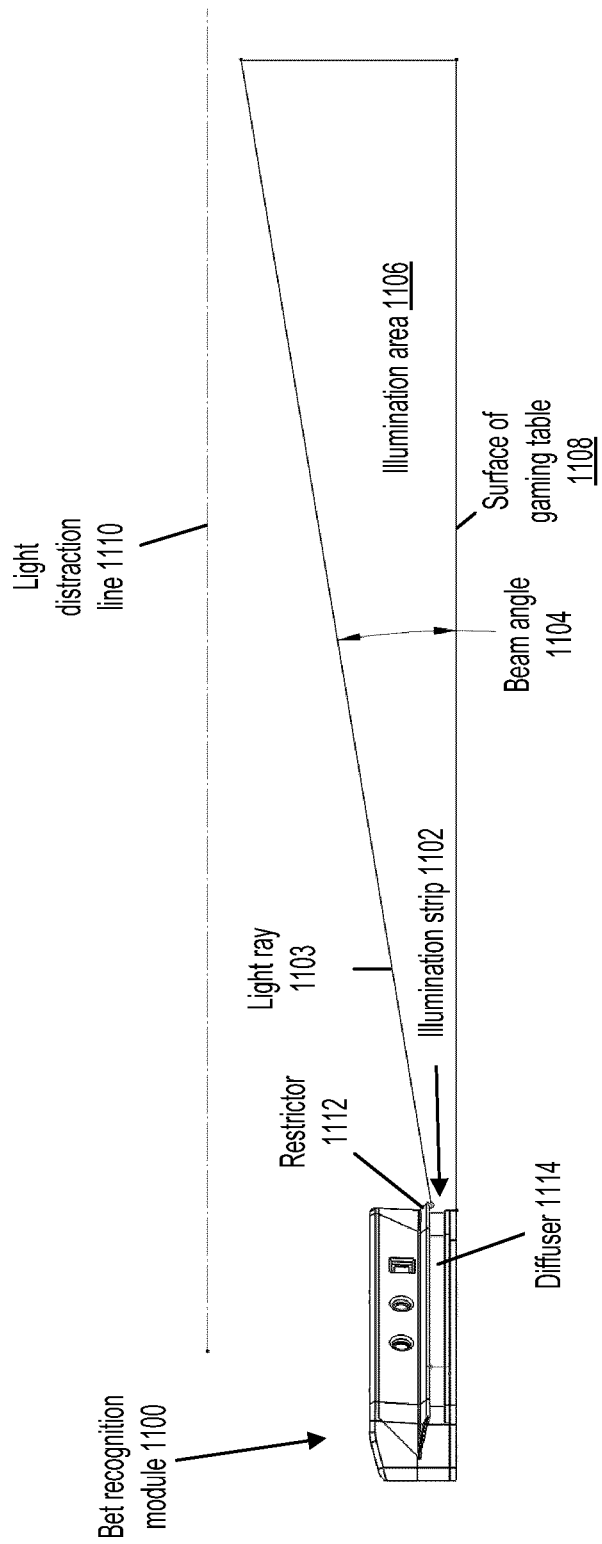
FIG. 13 illustrates a schematic diagram of a restricted illumination area according to some embodiments.

In some embodiments, as depicted in FIG. 13, the bet recognition module 1100 may comprise a restrictor 1112 positioned immediately above the illumination strip 1102 for reducing the beam angle 1104 of the light ray 1103, such that the light ray 1103 does not extend beyond the light distraction line 1110 and distract the user.

In some examples, the beam angle 1104 may be reduced by the diffuser 1114 and/or the restrictor 1112, such that the light ray 1103 does not extend past the bumper of the gaming table. In some examples, the bumper of the gaming table is approximately 20 chips in height relative to the surface 1108 of the gaming table.

In some embodiments, the table monitoring subsystem comprises one or more displays for displaying data processed by the game monitoring server 104, such as displaying bets made by a player and the amount of chips in a chip tray. In some embodiments, the dealer or user may log into the system using an identification name or number. In such embodiments, the name, identification, and data related to the player or dealer may be displayed on the display. As depicted in FIG. 6A, the table monitoring subsystem 600 comprises a display 610 positioned generally in the middle of the table monitoring subsystem 600. The display 610 may be a capacitive touch screen display. In some embodiments, the display 610 may be a resistive touch screen or a stylus touch screen. Where the display 610 is a touch screen, the game monitoring server 104 may be configured to send a command to display one or more buttons on the display 610. Based on detection of a touch on the display 610 corresponding to the location of a button displayed on the display 610, the display 610 may send a command to the game monitoring server 104 for the game monitoring server 104 to display table monitoring data on the display 610 corresponding to the button displayed on the display 610.

In some embodiments, the table monitoring subsystem comprises one or more physical buttons 612. As depicted in FIG. 6A, table monitoring subsystem 600 comprises a plurality of buttons 612 positioned adjacent the display 610. Each of the buttons 612 may be programmed to trigger displaying data processed by the game monitoring server 104 on the display 610.

Figure 6C:
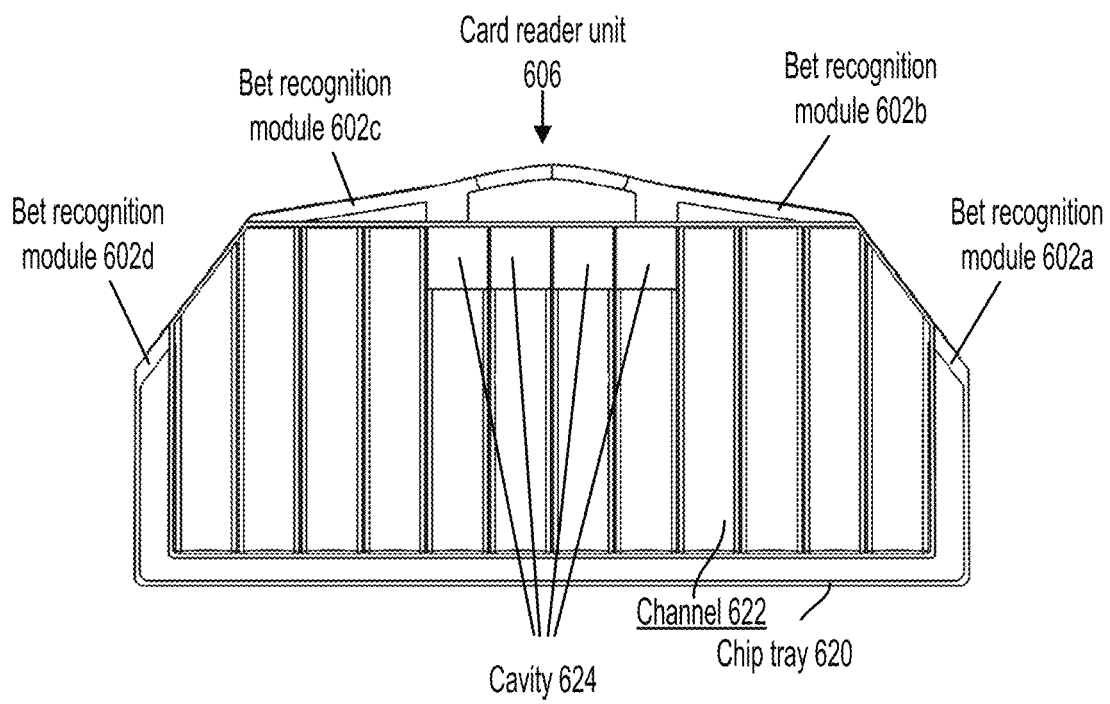
FIG. 6C illustrates a bottom view of the table monitoring subsystem of FIG. 6A according to some embodiments.
Figure 6D:
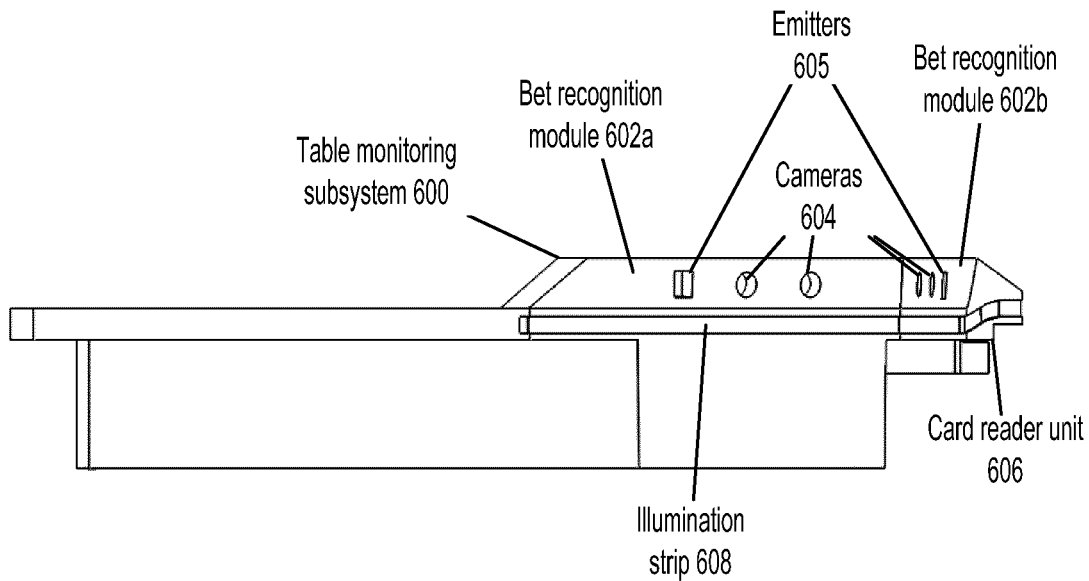
FIG. 6D illustrates a left view of the table monitoring subsystem of FIG. 6A according to some embodiments.
Figure 6E:
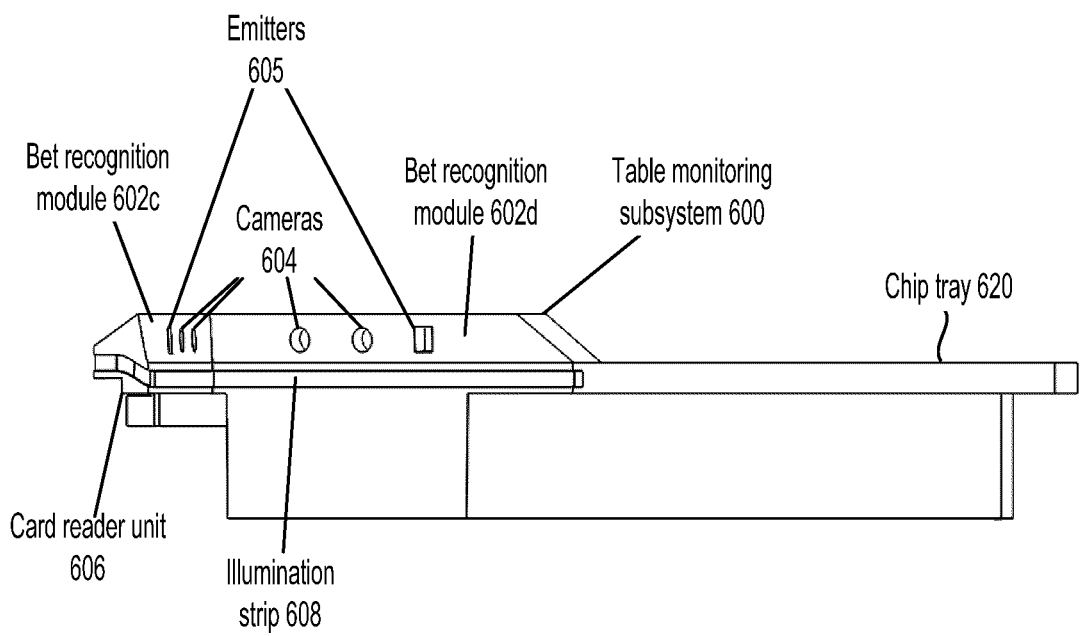
FIG. 6E illustrates a right view of the table monitoring subsystem of FIG. 6A according to some embodiments.
Figure 6F:
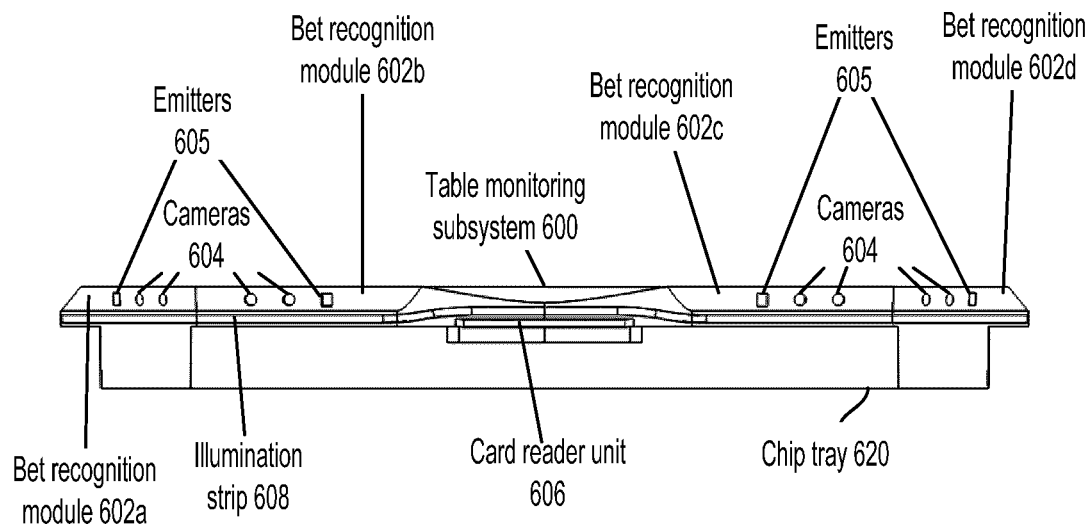
FIG. 6F illustrates a front view of the table monitoring subsystem of FIG. 6A according to some embodiments.
Figure 6G:
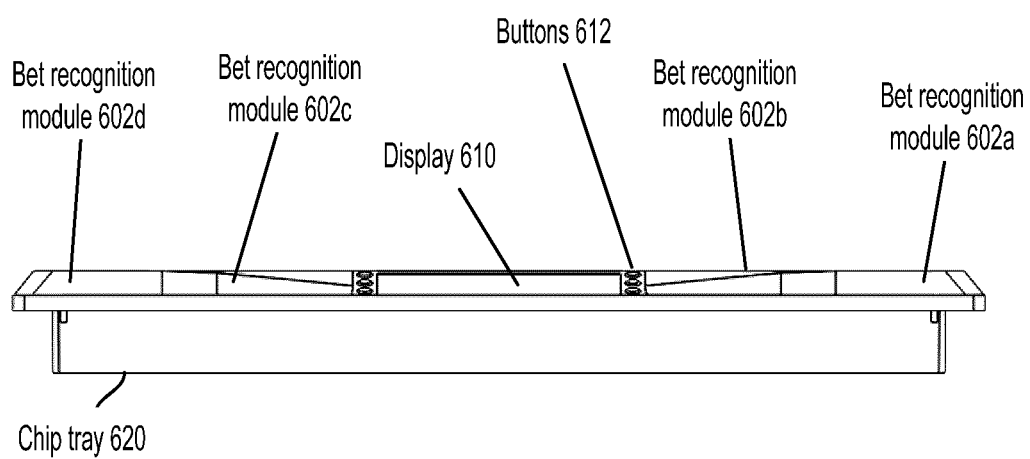
FIG. 6G illustrates a back view of the table monitoring subsystem of FIG. 6A according to some embodiments.

As depicted in FIG. 6A and FIG. 6C, the table monitoring subsystem 600 may be positioned on the chip tray 620, which comprises one or more cavities for receiving one or more components of the table monitoring subsystem 600, such that the table monitoring subsystem 600 may be positioned in a complementary manner to the chip tray 620. As depicted in FIG. 6C, the chip tray 620 comprises four cavities 624 for receiving the display 610 and cable and wires that may be extending from the display 610. In some embodiments, the cavities 624 may be a recess or channel for receiving one or more components of the table monitoring subsystem 600.

In some embodiments, the table monitoring subsystem 600 has a processor configured to pre-process the captured image data by the bet recognition modules 602. In some embodiments, the processor filters out at least a portion of background image data to generate a compressed set of image data of the one or more chips free of the background image data.

In some embodiments, the table monitoring subsystem 600 comprises a communication link configured for transmitting the captured image data to the game monitoring server 104. In some embodiments, where the table monitoring subsystem 600 comprises the processor, the communication link is configured to transmit the compressed set of image data for the game monitoring server 104 to generate table monitoring data, including bet data, for the gaming table, the betting data including betting amounts for the at least one betting areas.

In some embodiments, each of the bet recognition modules 602 comprises the processor configured to pre-process the captured image data by the bet recognition modules 602 and the communication link configured for transmitting the captured image data to the game monitoring server 104.

In some embodiments, the table monitoring subsystem 600 and/or the bet recognition modules 602 has a component such as an image capture component such as any camera, video capture element, or image radiation detector. The image capture component may include at least a first and second imaging component, which may be supported on or adjacent to a face of a chip tray, such as chip tray 620. At least a first imaging component of the table monitoring subsystem 600 may be supported on or adjacent to a face of the chip tray, and at least a second imaging component may be supported adjacent to or on a second surface of the chip tray. The orientation of light capturing opening (typically through a lens) faces towards player positions, especially at playing surface levels where wagers (e.g., chips, tokens, coins, etc.) are placed on the gaming table surface. The image-capture components may be supported on or in the gaming table, physically separate from the dealer's chip tray or attached to the chip tray. The at least first imaging component and the at least second imaging component may be configured to capture image data corresponding to one or more chips positioned in at least one betting area on a gaming surface of the gaming table, the at least one of the two imaging components and the at least second imaging component positioned to image a gaming surface of the gaming table on which the chip tray is affixed to the gaming table. The at least a first imaging component and the at least second imaging component may be configured to capture image data corresponding to a position, volume or area where one or more chips positioned in at least one betting area on a gaming surface of the gaming table.

In some embodiments, each of the at least first imaging component and the at least second imaging component comprises cameras 604 and emitters 605, such as an infrared radiation emitter, an infrared radiation sensitive camera, and a visible light-sensitive camera. In some embodiments, the table monitoring subsystem 600 and/or the bet recognition module 602 further comprises a port to transmit captured at least visible information and captured at least infrared radiation from the at least two cameras to a processor. A visible light emitter, such as illumination strip 608, may be associated with each imaging component or be separately provided (as an overhead, backlight from dealer's position, side lighting, etc.).

The cameras 604 of the bet recognition module 602, such as the infrared sensitive camera, may have a camera sensitive to infrared radiation with a cut-off filter lens between the infrared sensitive camera at the at least one betting area on the gaming table. The infrared sensitivity may include any range of wavelengths between 720 and 2000 nm, preferably wavelengths between 760 and 1600 nm, and inclusive of any single wavelength or range of between 10 nm, 20 nm or 50 nm in bandwidth.

In some embodiments, the visible light emitter, such as the illumination strip 608, has a visible light emitter aligned on a lower portion of the table monitoring subsystem 600 and/or the bet recognition module 602. The visible light emitter may be positioned underneath (or on the support at the sides of the cameras 604, lenses, and emitters 605) at least one of the cameras 604 and emitters 605. In some embodiments, the visible light emitter may be positioned underneath all of the cameras 604 and emitters 605. In some embodiments, the visible light emitter is aligned on a lower portion of the device underneath the infrared emitter and lenses opening to the infrared radiation sensitive camera, and the visible light-sensitive camera.

In some embodiments, the one or more imaging components may be secured to a single support. The support may be physically separate from the chip tray. The support may further secure the visible radiation emitter. The visible radiation emitter may be positioned to emit visible radiation at an angle approximately perpendicular to a forward surface of the support and approximately parallel to the gaming table surface. The forward surface of the support may be the surface facing at least one betting area of the gaming table. By "approximately" with respect to angles is meant less than 40 degrees, preferably less than 30 degrees and preferably less than or equal to 20 degrees or less than or equal to 15 degrees. The single support may be a distinct rail, ridge, wall or even the front of the chip tray.

In some embodiments, where the imaging components are secured to the support, at least two of the imaging components are symmetrically disposed on the single support. In some embodiments, at least two of the imaging components are mirror-image symmetrically disposed on the single support.

When there are more than two components, the imaging components may be evenly distributed (such as with respect to their volumes or areas of coverage by the image range, image perspective and image angles of the cameras). The orientation and ordering of cameras and emitters may not be consistent, symmetrical, at the same heights, and equally displaced as long as the processor is configured to interpret the respect source of signals (e.g., distinguishing between and among visible, infrared and ultraviolet radiation so that the processor can properly interpret, compress and/or then display the image data). The cameras may be used in conjunction with a heuristic or self-learning software program to assure that the processor/computer/logic circuit, field programmable gated array or ASIP accurately interprets images data as respective value chips. These programs may be live user manipulated in training the processor or be performed by a programmed operation.

For example, on one component the camera and emitter order may be IR-visible-IR/emitter, and the adjacent component may be visible-IR, ultraviolet or IR-emitter and the next component (e.g., the system may have 2, 3, 4 or more components distributed with overlapping fields of view over the betting areas of the table) may have a different distribution of IR-emitter-visible camera-IR camera.

In some embodiments, the support may define a nominal center line. The center line may define two halves of the support. The device may be designed such that, with respect to the nominal line centered on the support, at least two (usually in pairs of two, for example, if four components are present) of the multiple components are angled outwardly from the midline with capture ranges of the cameras 604 in each of the at least two multiple components overlapping on the midline.

In some embodiments, the bet recognition module 602 may further include an ultraviolet radiation-sensitive camera. For example, the bet recognition module 602 may comprise three cameras 604, such as the infrared radiation sensitive camera, the visible light-sensitive camera, and the ultraviolet radiation-sensitive camera. The combination of a third range of radiation may assist in providing even further detail, depth, perspective and discrimination between chips, give higher resolution to the images, and may improve accuracy in wager determination at each wagering position.

In some embodiments, the bet recognition module 602 comprises the infrared radiation sensitive camera, the visible light-sensitive camera. The infrared radiation sensitive camera and the visible light-sensitive camera (and ultraviolet radiation-sensitive camera, if present) have sufficient horizontal and/or vertical separation such that collected image data from the combination of the infrared radiation sensitive camera and the visible light-sensitive camera may enable display of a visible image with depth perspective on a display screen, such as display 610. The cameras 604 may provide image contrast, clear chip differentiation, edge determination and three-dimensional image data. Lenses of the cameras 604 may be separated by as little as a millimeter, preferably at least as much as a centimeter, as the adjacent pairs of imaging components have overlapping fields of view and known angles of view which are integrated, combined, mathematically manipulated, compressed, stored, and transmitted for display, by itself or with wager value interpreted data which may also be stored or displayed.

In some embodiments, the table monitoring subsystem 600 and/or the bet recognition modules 602 comprise one or more sensors responsive to activation events and deactivation events to trigger capture of the image data by the first imaging component and the second imaging component. The table monitoring subsystem 600 and/or the bet recognition modules 602 may sense activation events and deactivation events that may be configured to trigger capture of the image data by the first imaging component and the second imaging component.

In some embodiments, the table monitoring subsystem 600 and/or the bet recognition modules 602 may comprise the processor in communication with the port and a visual display device, such as display 610, having a display surface facing away from the betting areas of the gaming table (so that the dealer or pit boss may see the display, which includes a vertical display). The processor may be configured to convert captured at least visible information and captured at least infrared radiation from the at least two cameras into image data for display on the display device.

In some embodiments, the processor may be mounted to the table monitoring subsystem 600 and/or the bet recognition modules 602, or may be proximate the gaming table. In some embodiments, the processor may be the game monitoring server 104.

In some embodiments, the table monitoring subsystem 600 and/or the bet recognition module 602 comprises the processor (there may be one or more processors) that is configured to compress image data combined from the combination of the infrared radiation sensitive camera and the visible light-sensitive camera. In some embodiments, there is a communication link from the processor to a bet display component, the communication link configured to transmit the compressed set of image data to generate bet data from wagering positions on the gaming table. The betting data may be displayed on bet display component, including processor determined betting amounts for at least one betting areas.

Figure 7A:
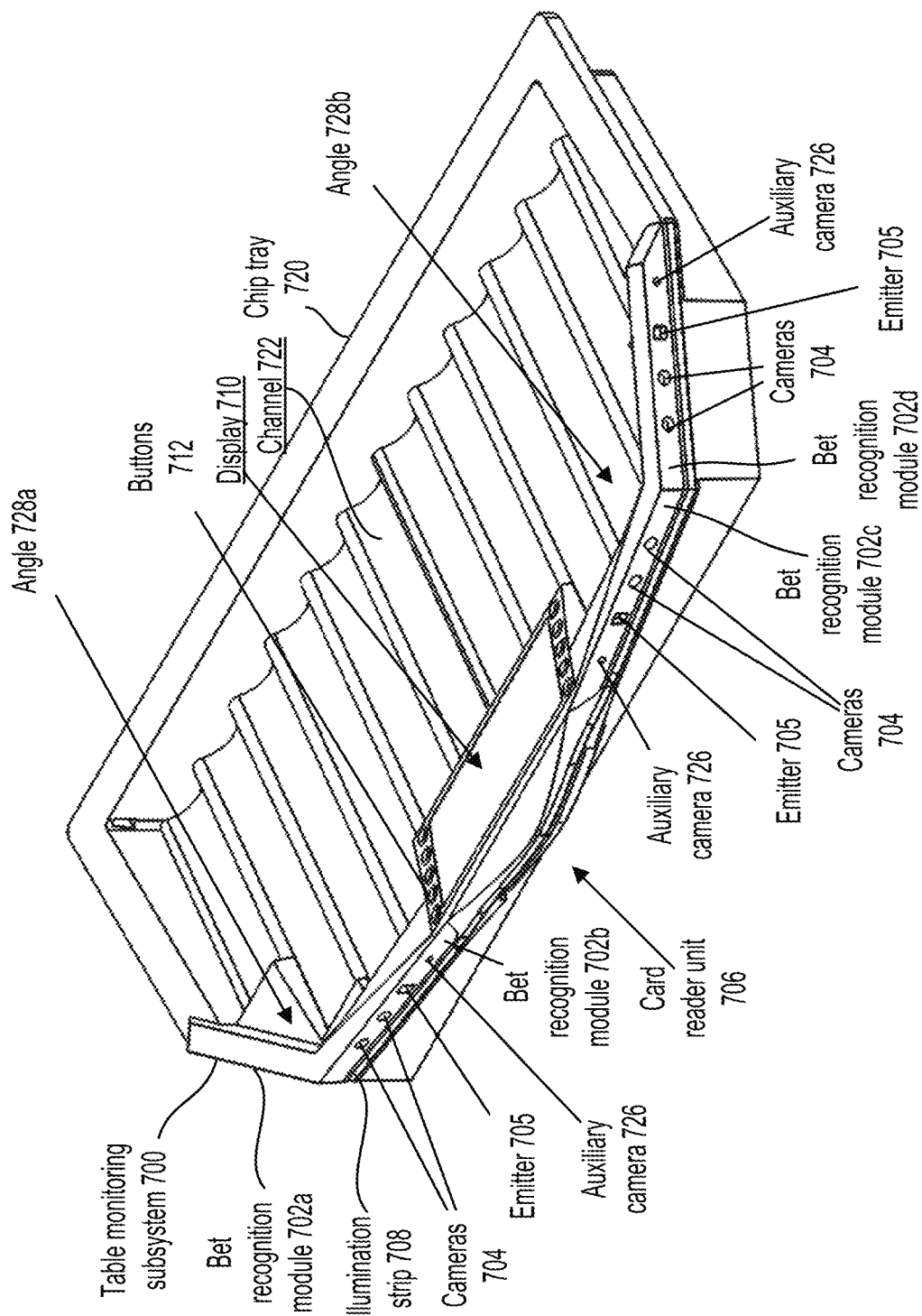
FIG. 7A illustrates a perspective view of another example table monitoring subsystem according to some embodiments.
Figure 7B:
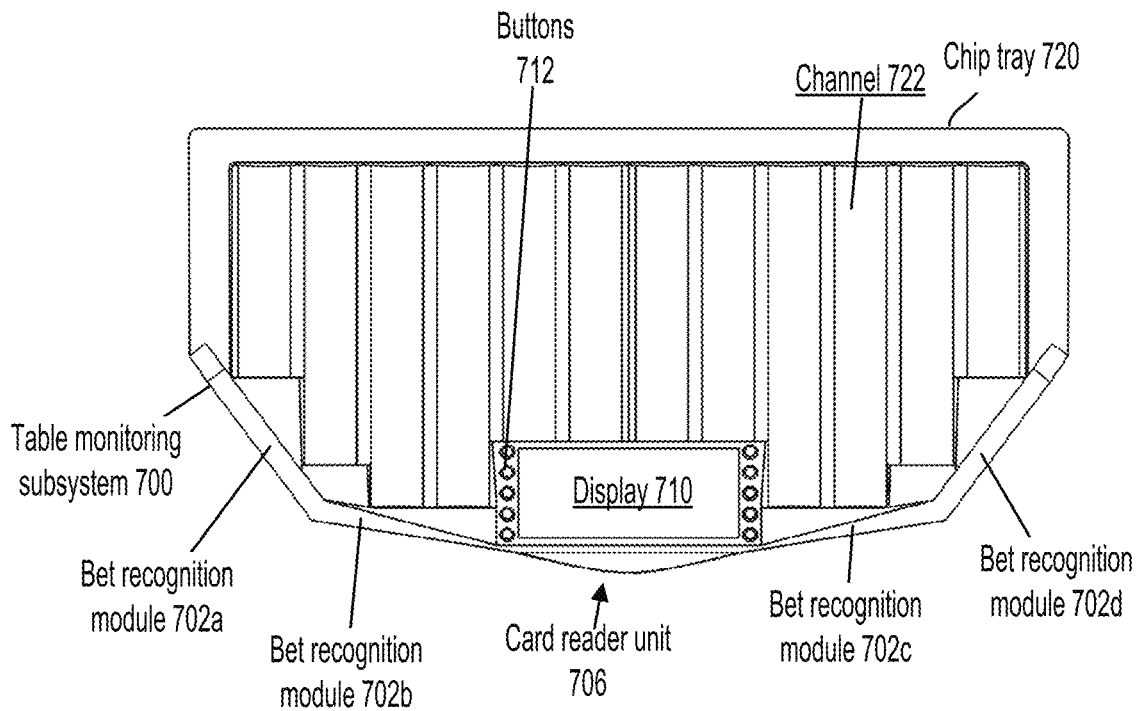
FIG. 7B illustrates a top view of the table monitoring subsystem of FIG. 7A according to some embodiments.

FIG. 7A to 7G depicts another example table monitoring subsystem 700 according to some embodiments. The table monitoring subsystem 700 is generally similar to table monitoring subsystem 600, except the imaging component of the table monitoring subsystem 700 further comprises an auxiliary camera. The table monitoring subsystem 700 comprises a first imaging component and a second imaging component. As depicted in FIG. 7A, the first imaging component is positioned on a first tapered corner of a chip tray 720, and the second imaging component is positioned on a second tapered corner of the chip tray 720. The chip tray 720 comprises one or more channels 722 for receiving chips.

The imaging component of the table monitoring subsystem 700 comprises four bet recognition module 702*a*, 702*b*, 702*c*, and 702*d*. Each bet recognition module 702 comprises one or more cameras 704 and an emitter 705 to capture image data. As depicted in FIG. 7A, the bodies of the first and second imaging components are joined to define an integral body of the table monitoring subsystem 700.

As depicted in FIG. 7A, similar to table monitoring subsystem 600, the bet recognition modules 702A and 702B define an angle 728A therebetween, and the bet recognition modules 702C and 702D define an angle 728B therebetween. The angles 728A and 728B substantially correspond to the first and second tapered corners of the chip tray 720, such that the geometry and shape of the table monitoring subsystem 700 is complementary to the geometry and shape of the chip tray 720 upon which the table monitoring subsystem 700 is positioned.

Similar to table monitoring subsystem 600, the table monitoring subsystem 700 comprises a card reader unit 706 generally similar to card reader unit 606 for capturing image data corresponding to one or more cards used during the play of a game.

Similar to table monitoring subsystem 600, the table monitoring subsystem 700 comprises an illumination strip 708 generally similar to illumination strip 608 and may provide illumination in all or a portion of the field of view of the imaging component.

Similar to table monitoring subsystem 600, the table monitoring subsystem 700 comprises a display 710 and buttons 712 generally similar to display 610 and buttons 612 for displaying data processed by the game monitoring server 104.

Figure 7C:
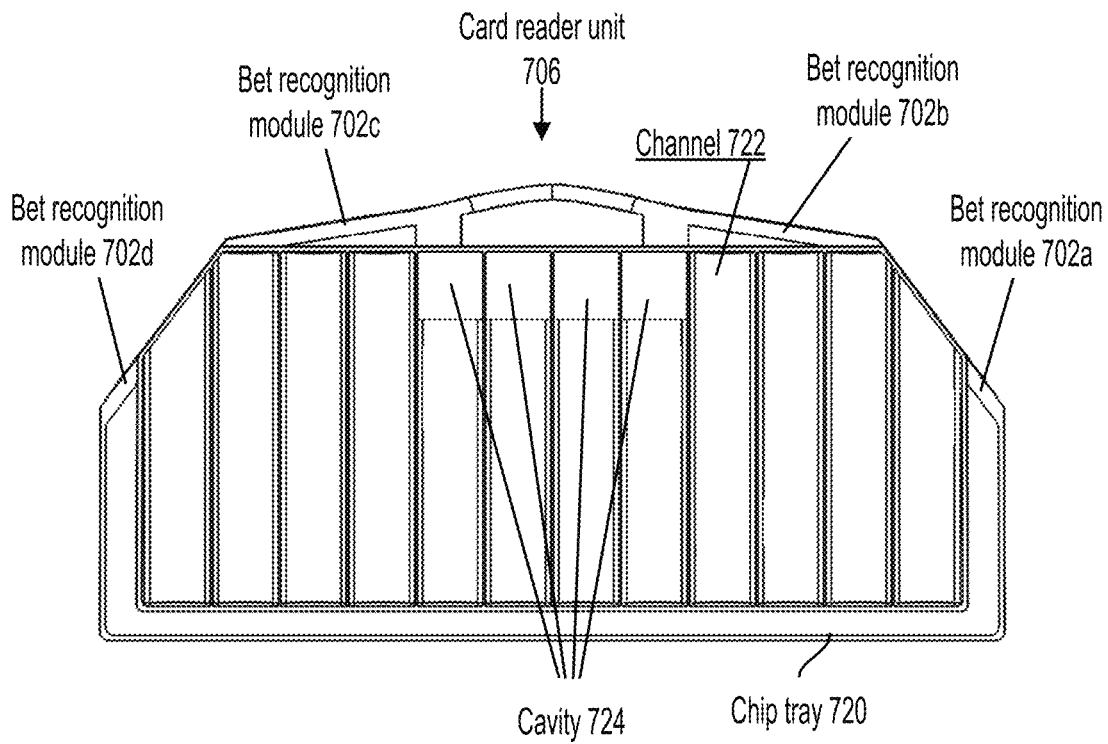
FIG. 7C illustrates a bottom view of the table monitoring subsystem of FIG. 7A according to some embodiments.
Figure 7D:
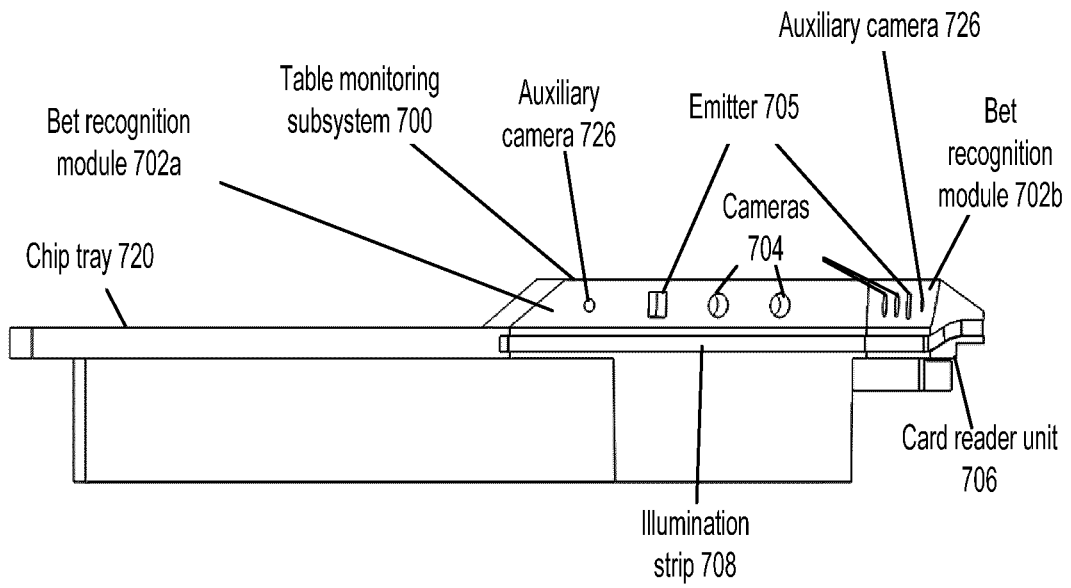
FIG. 7D illustrates a left view of the table monitoring subsystem of FIG. 7A according to some embodiments.
Figure 7E:
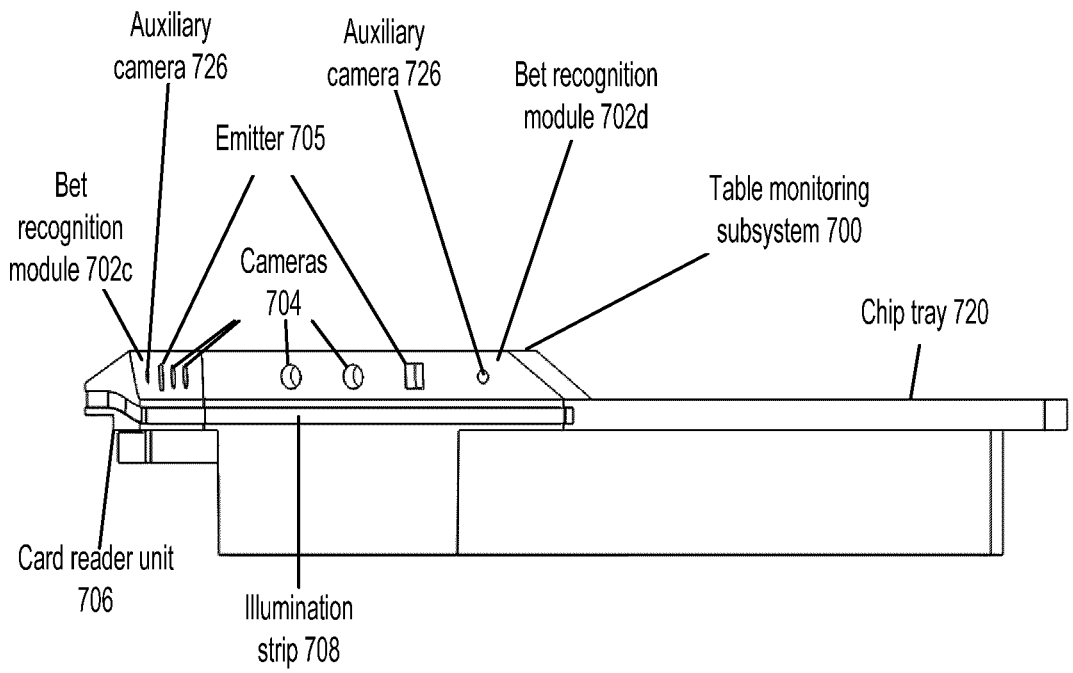
FIG. 7E illustrates a right view of the table monitoring subsystem of FIG. 7A according to some embodiments.

Similar to chip tray 620, the chip tray 720 comprises one or more cavities 728, as depicted in FIG. 7C, for receiving one or more components of the table monitoring subsystem 700.

Figure 7F:
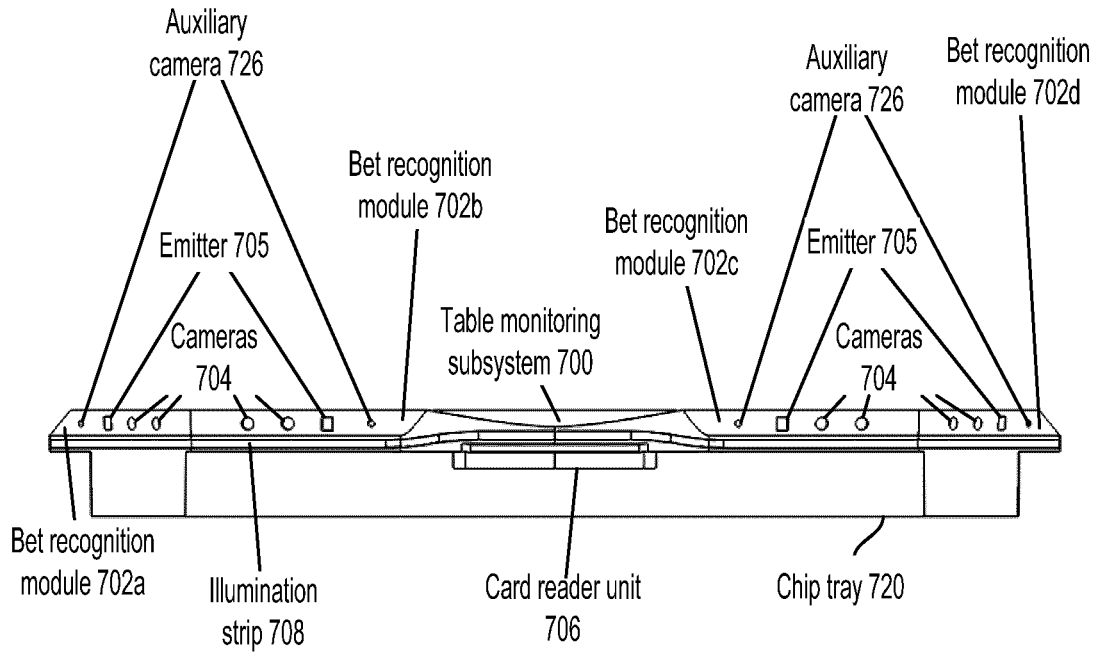
FIG. 7F illustrates a front view of the table monitoring subsystem of FIG. 7A according to some embodiments.
Figure 7G:
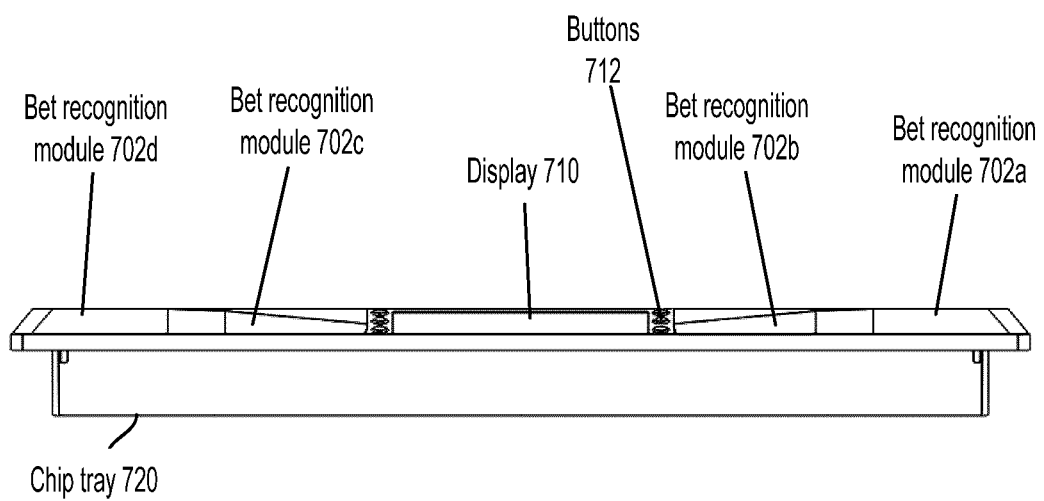
FIG. 7G illustrates a back view of the table monitoring subsystem of FIG. 7A according to some embodiments.

In some embodiments, the bet recognition modules 702a, 702b, 702c, and 702d further comprise an auxiliary camera 726, as depicted in FIG. 7A and FIG. 7F. In some embodiments, the auxiliary camera 726 is a high resolution camera for capturing image data with greater detail and accuracy. In some embodiments, the auxiliary camera 726 is an ultraviolet (UV) camera for detecting UV light reflecting from the chips on the gaming table, such as from security features on the chips that reflect UV light.

Figure 8:
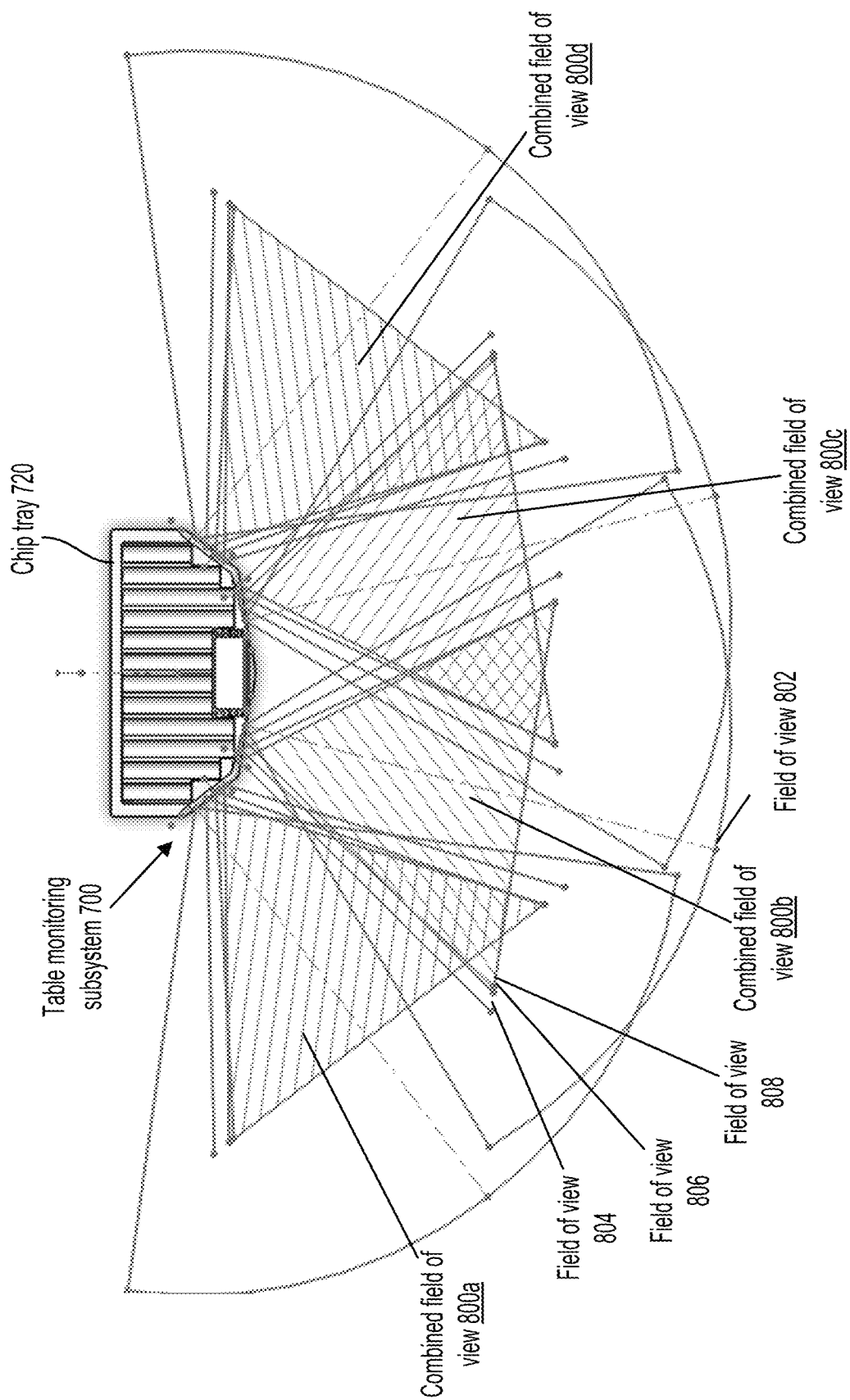
FIG. 8 illustrates a schematic diagram of a field of view of the table monitoring subsystem of FIG. 7A according to some embodiments.

FIG. 8 illustrates a schematic diagram of a field of view of the table monitoring subsystem 700 according to some embodiments. As depicted in FIG. 8, the table monitoring subsystem 700 is positioned on a first tapered corner and a second tapered corner of the chip tray 720.

In some embodiments, the two cameras 704 of the bet recognition modules 702 of table monitoring subsystem 700 have fields of view 804 and 806. In some embodiments, the emitter 705 has a field of view 808. In some embodiments, the auxiliary camera 726, such as a high resolution camera, has a field of view 802. FIG. 8 depicts a combined field of view 800 for the bet recognition module 702, where the fields of view 804, 806, 808, and 802 overlap.

In some embodiments, at least a portion of the field of views of adjacent bet recognition modules overlap. Bet recognition module 702a has a combined field of view 800a; bet recognition module 702b has a combined field of view 800b; bet recognition module 702c has a combined field of view 800c; and bet recognition module 702d has a combined field of view 800d. As depicted in FIG. 8, a portion of combined field of view 800a overlaps with combined field of view 800b, a portion of combined field of view 800b overlaps with combined field of view 800c, and a portion of combined field of view 800c overlaps with combined field of view 800d.

Figure 9:
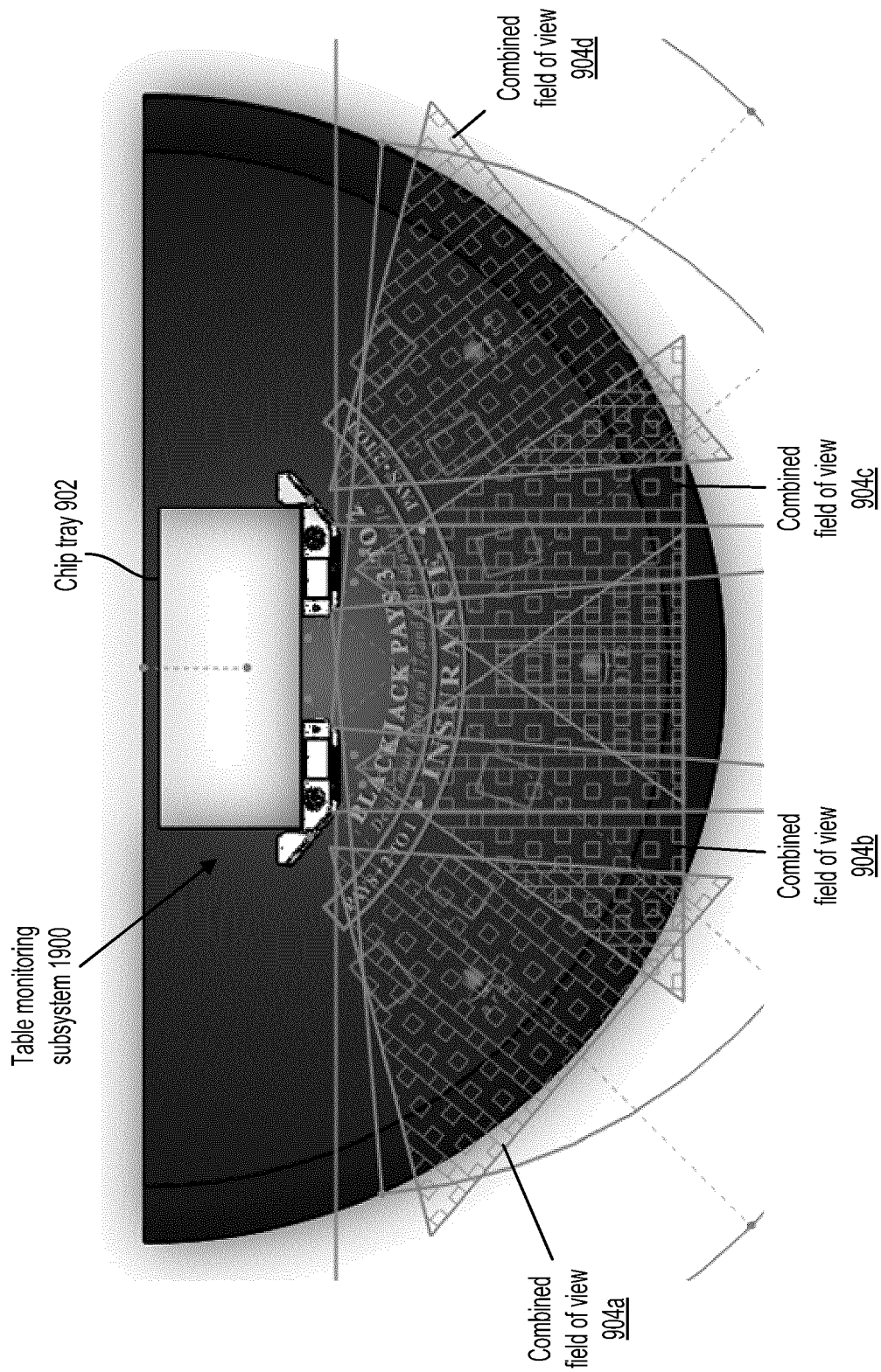
FIG. 9 illustrates a schematic diagram of a field of view of another example table monitoring subsystem according to some embodiments.
Figure 10:
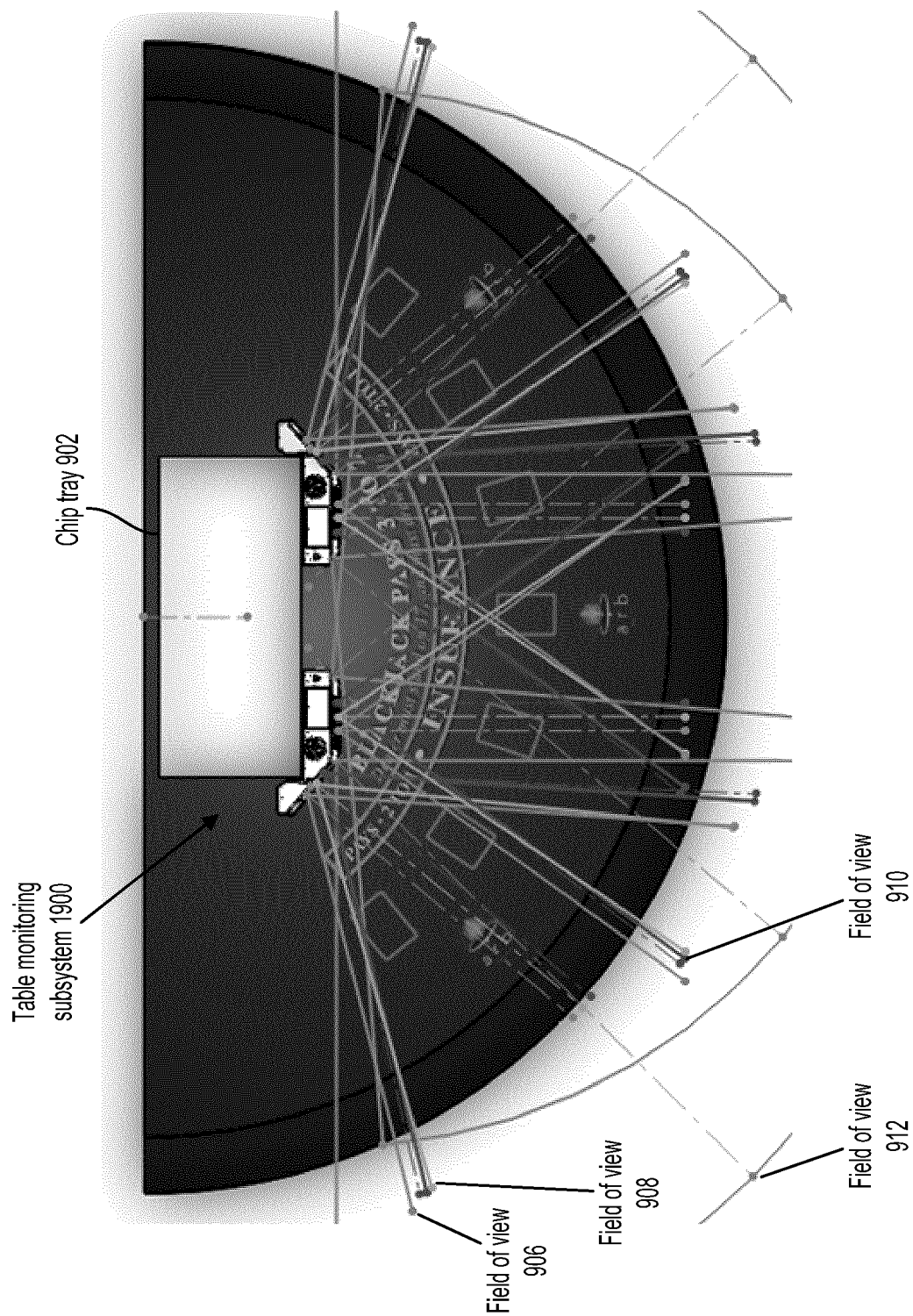
FIG. 10 illustrates a schematic diagram of a field of view of each bet recognition module of the example table monitoring subsystem of FIG. 9 according to some embodiments.

FIG. 9 illustrates a schematic diagram of a field of view of another example table monitoring subsystem 1900 (depicted in greater detail in FIG. 19A to FIG. 19G and described in greater detail herein), and FIG. 10 illustrates a schematic diagram of a field of view of each bet recognition module of the table monitoring subsystem 1900. As depicted in FIG. 9, the table monitoring subsystem 1900 is positioned on a first corner and a second corner of the chip tray 902.

Similar to table monitoring subsystem 700, the table monitoring subsystem 1900 comprises four bet recognition modules 1902a, 1902b, 1903c, and 1902d. As depicted in FIG. 10, the two cameras 1904 of the bet recognition modules 1902 of table monitoring subsystem 1900 have fields of view 906 and 908. In some embodiments, the emitter 1905 has a field of view 910. In some embodiments, the auxiliary camera 1916, such as a high resolution camera, has a field of view 912. FIG. 9 depicts a combined field of view 900 for the bet recognition modules 1902, where the fields of view 906, 908, 910, and 912 overlap.

As depicted in FIG. 9, the combined fields of view 904a, 904b, 904c, and 904d of the bet recognition modules 1902a, 1902b, 1902c, and 1902d may substantially cover the surface of a semi-circular gaming table where chips may be placed (e.g. where bets may be made), depending on the radius of the semi-circular gaming table.

In some embodiments, the emitters (e.g. an infrared radiation emitter, a visible light emitter) of the bet recognition modules comprise axes of emission, and the cameras (e.g. infrared radiation-sensitive camera, visible light-sensitive camera) of the bet recognition modules comprises focal areas. In some embodiments, the axes of emission from the emitters and the focal areas of the cameras may be adjustable to overlap at a distance within the range of 10 to 100 centimeters.

In some embodiments, a gaming table may have one or more bet recognition modules mounted thereon. For example, a gaming table may have two to six bet recognition modules mounted thereon. In such examples, adjacent pairs of the bet recognition modules may have fields of focal overlap of at least twenty percent at a distance from 10 to 100 centimeters from the outermost lenses of the cameras of the bet recognition modules.

The communication link of the bet recognition modules mounted to the gaming table may be active through the port to the processor configured to capture and transmit both the captured at least visible information and captured at least infrared radiation as content of a visible image to a display in communication with the processor.

In some embodiments, the separation of the cameras of the bet recognition modules mounted to the gaming table, such as the infrared radiation sensitive camera and the visible light-sensitive camera, relative to the housing of the bet recognition modules may be sufficient to enable the captured at least visible information and captured at least infrared radiation to be converted to data enabling display of an image with visual perspective at a distance of from 10 to 100 centimeters from outermost lenses of the cameras. In some embodiments, the captured at least visible information and captured at least infrared radiation may correspond to gaming chips placed on the gaming table.

In some embodiments, the table monitoring subsystem 600 comprises four (or more) imaging components, such as four bet recognition modules 602. The fields of focus for the cameras in adjacent imaging components overlap at areas on the surface of the gaming table corresponding to the betting areas.

Figure 18A:
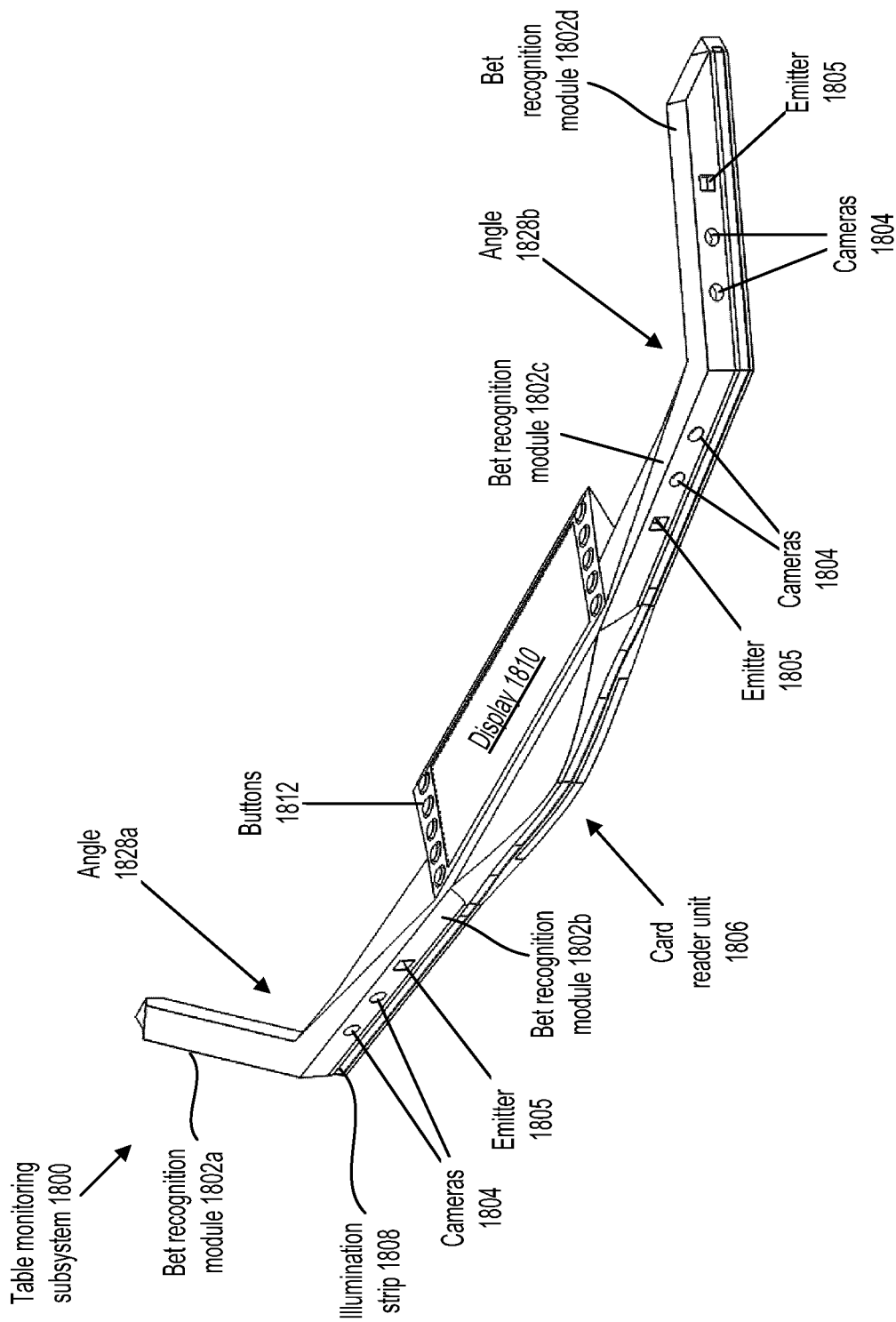
FIG. 18A illustrates a perspective view of an example table monitoring subsystem according to some embodiments.
Figure 18B:
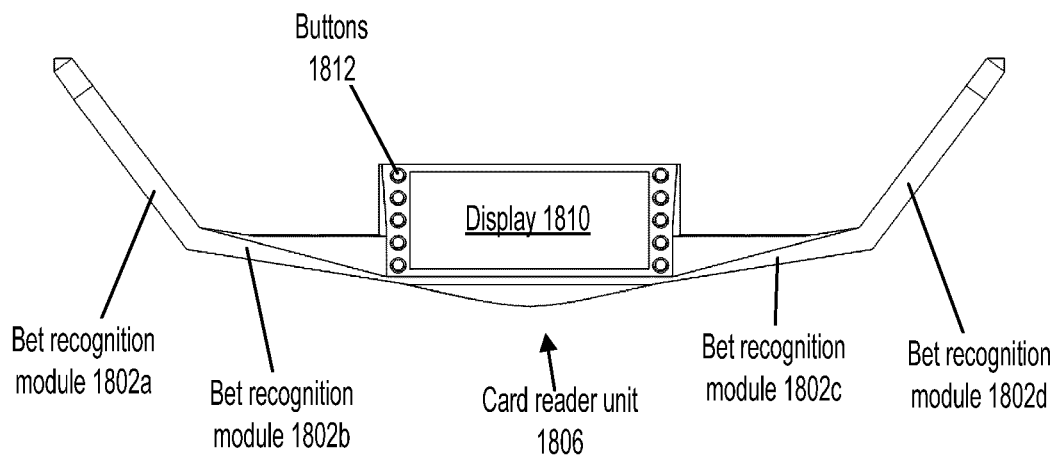
FIG. 18B illustrates a top view of the table monitoring subsystem of FIG. 18A according to some embodiments.
Figure 18C:
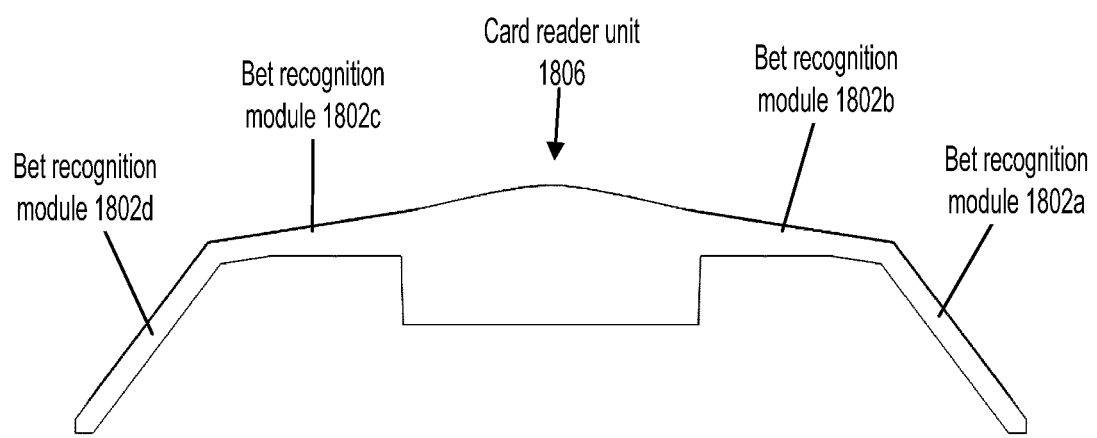
FIG. 18C illustrates a bottom view of the table monitoring subsystem of FIG. 18A according to some embodiments.
Figure 18D:
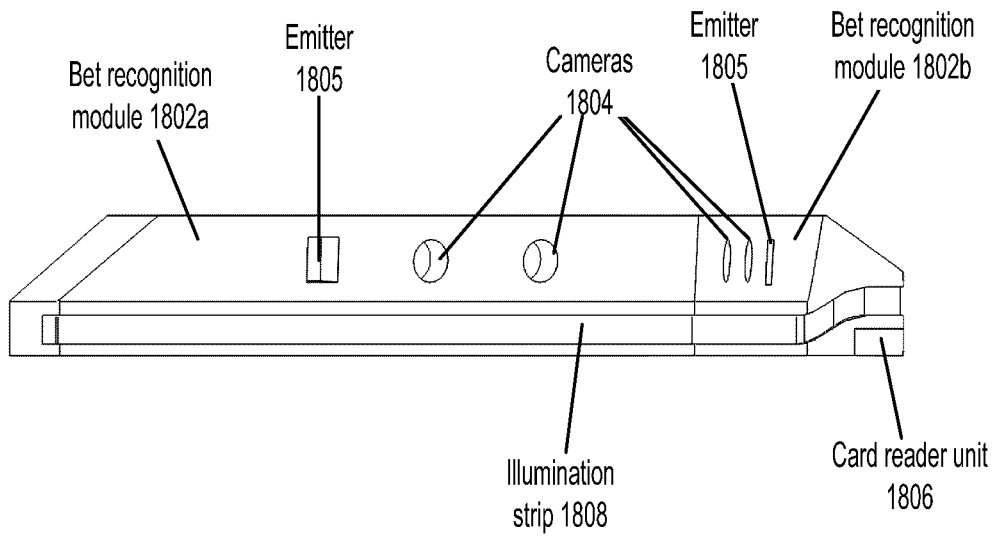
FIG. 18D illustrates a left view of the table monitoring subsystem of FIG. 18A according to some embodiments.
Figure 18E:
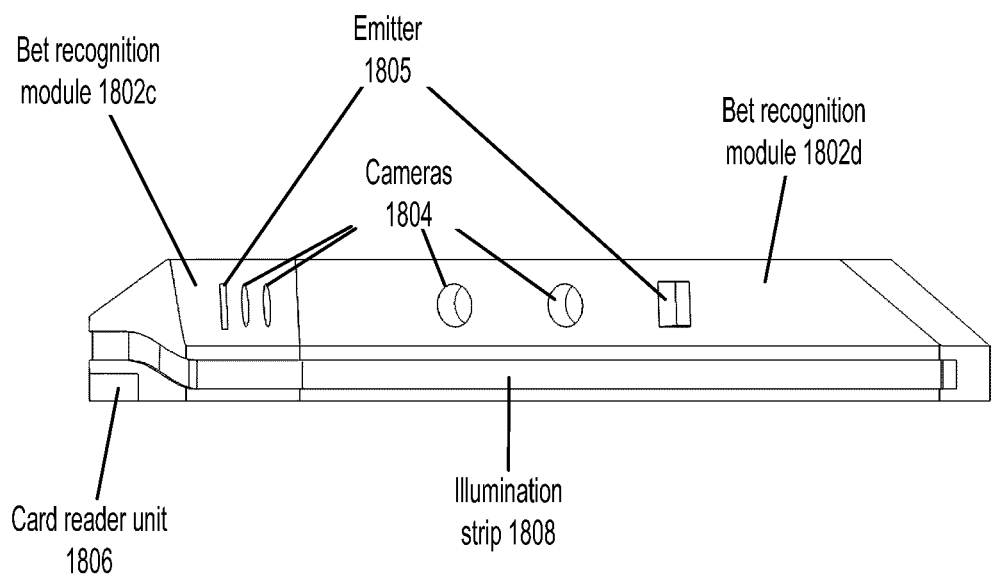
FIG. 18E illustrates a right view of the table monitoring subsystem of FIG. 18A according to some embodiments.
Figure 18F:
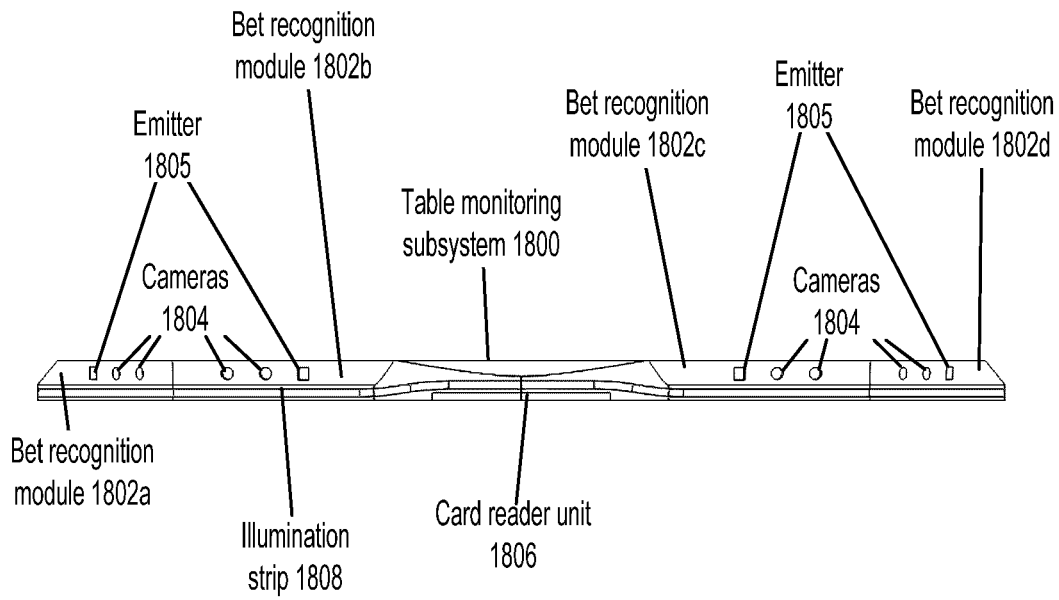
FIG. 18F illustrates a front view of the table monitoring subsystem of FIG. 18A according to some embodiments.
Figure 18G:
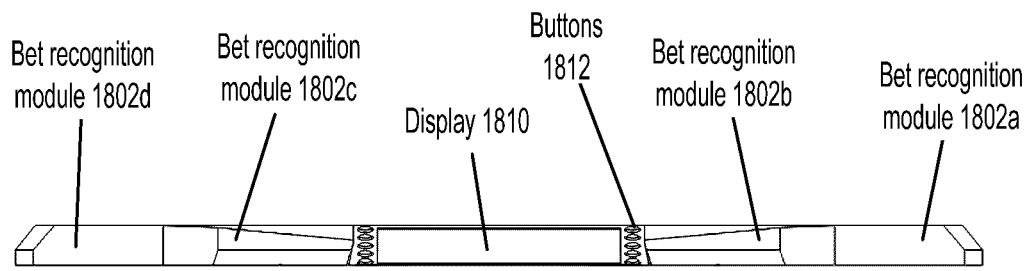
FIG. 18G illustrates a back view of the table monitoring subsystem of FIG. 18A according to some embodiments.

FIG. 18A to 18G depicts another example table monitoring subsystem 1800 according to some embodiments. The table monitoring subsystem 1800 is generally similar to table monitoring subsystem 600. The table monitoring subsystem 1800 comprises a first imaging component and a second imaging component. As depicted in FIG. 18A, the first imaging component is positionable on a first tapered corner of a chip tray, and the second imaging component is positionable on a second tapered corner of a chip tray.

Similar to table monitoring subsystem 600, the imaging component of the table monitoring subsystem 1800 comprises four bet recognition modules 1802a, 1802b, 1802c, and 1802d. Each bet recognition module 1802 comprises one or more cameras 1804 and an emitter 1805 to capture image data. As depicted in FIG. 18A, the bodies of the first and second imaging components are joined to define an integral body of the table monitoring subsystem 1800.

Similar to table monitoring subsystem 600, as depicted in FIG. 18A, for the table monitoring subsystem 1800, the bet recognition modules 1802a and 1802b define an angle 1828a therebetween, and the bet recognition modules 1802c and 1802d define an angle 1828b therebetween. The angles 1828a and 1828a may substantially correspond to first and second tapered corners of a chip tray, such that the table monitoring subsystem 1800 is positionable on the chip tray, and such that the geometry and shape of the table monitoring subsystem 1800 is complementary to the geometry and shape of the chip tray upon which the table monitoring subsystem 1800 is positionable.

Similar to table monitoring subsystem 600, the table monitoring subsystem 1800 comprises a card reader unit

1806 generally similar to card reader unit 606 for capturing image data corresponding to one or more cards used during the play of a game.

Similar to table monitoring subsystem 600, the table monitoring subsystem 1800 comprises an illumination strip 1808 generally similar to illumination strip 608 and may provide illumination in all or a portion of the field of view of the imaging component.

Similar to table monitoring subsystem 600, the table monitoring subsystem 1800 comprises a display 1810 and buttons 1812 generally similar to display 610 and buttons 612 for displaying data processed by the game monitoring server 104.

FIG. 19A to FIG. 19G depict another example table monitoring subsystem 1900 according to some embodiments. The table monitoring subsystem 1900 is generally similar to table monitoring subsystems 600 and 1800, except the imaging components of table monitoring subsystem 1900 are separate and are not joined to define an integral body of the table monitoring subsystem 1900.

Figure 19A:
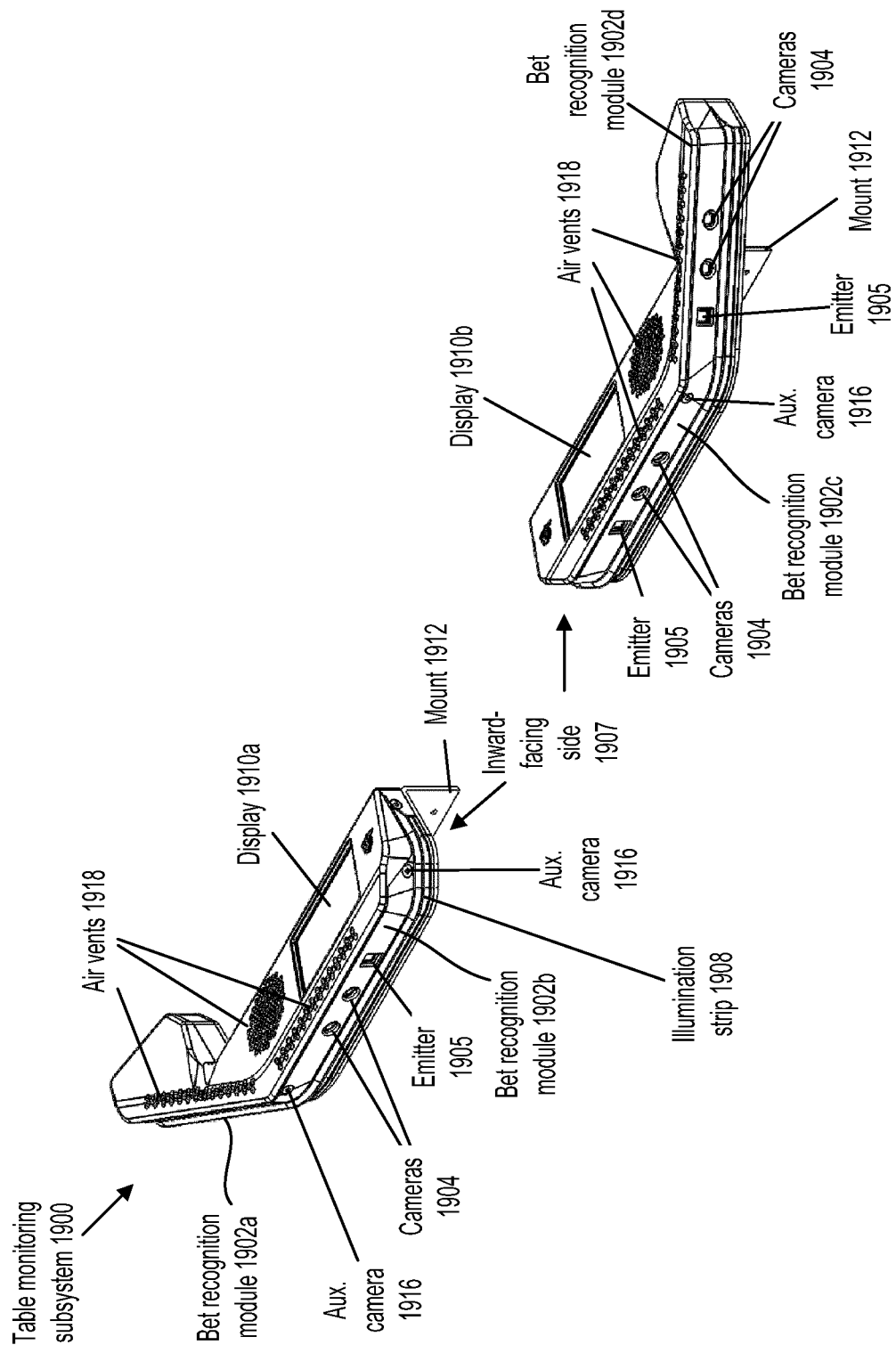
FIG. 19A illustrates a perspective view of another example table monitoring subsystem according to some embodiments.

The imaging components of the table monitoring subsystem 1900 comprise four bet recognition module 1902*a*, 1902*b*, 1902*c*, and 1902*d*. As depicted in FIG. 19A, the first imaging component comprises bet recognition module 1902*a* and bet recognition module 1902*b*, and the second imaging component comprises bet recognition module 1902*c* and bet recognition module 1902*d*. Each bet recognition module 1902 comprises one or more cameras 1904 and an emitter 1905 to capture image data. As depicted in FIG. 19A, the bodies of the first and second imaging components are separate from each other.

Figure 19B:
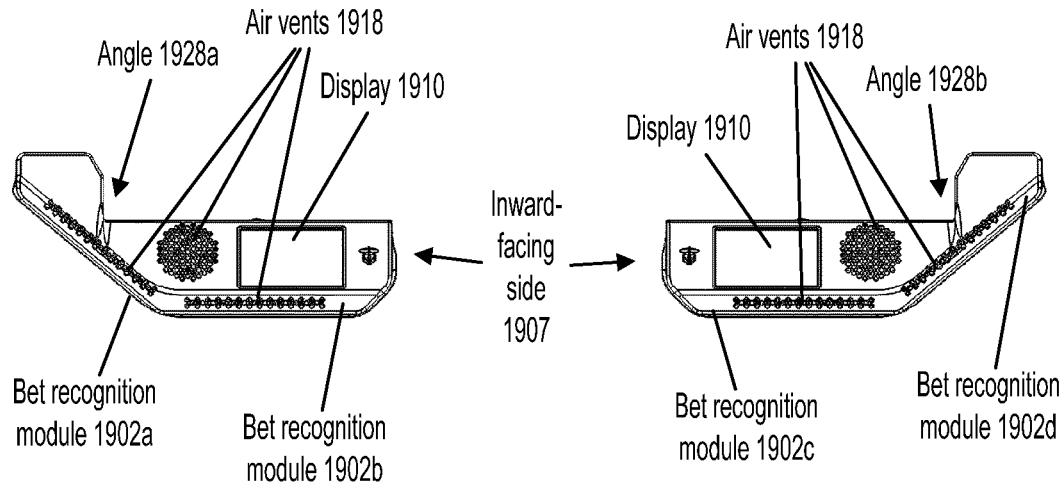
FIG. 19B illustrates a top view of the table monitoring subsystem of FIG. 19A according to some embodiments.
Figure 19C:
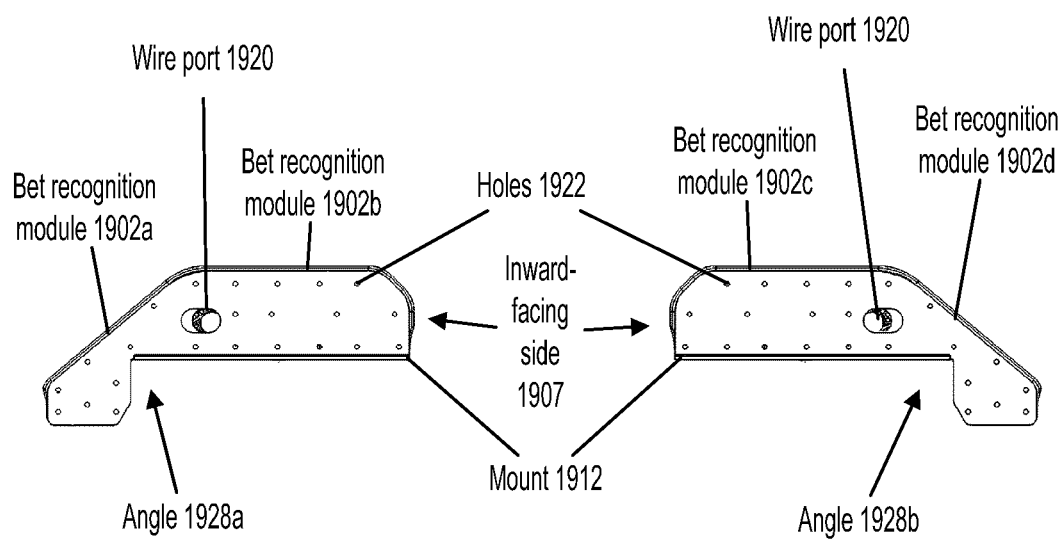
FIG. 19C illustrates a bottom view of the table monitoring subsystem of FIG. 19A according to some embodiments.

Similar to table monitoring subsystem 600, as depicted in FIG. 19B and FIG. 19C, for the table monitoring subsystem 1900, the bet recognition modules 1902*a* and 1902*b* define an angle 1928*a* therebetween, and the bet recognition modules 1902*c* and 1902*d* define an angle 1928*b* therebetween. As depicted in FIG. 19B and FIG. 19C, the angles 1928*a* and 1928*b* may be approximately 90°. In some embodiments, the first imaging component and the second imaging component may be positionable on corners of a chip tray that are approximately 90°, for example, as depicted in FIG. 9 and FIG. 10.

In some embodiments, the table monitoring subsystem 1900 may comprise a card reader unit generally similar to card reader unit 606 of the table monitoring subsystem 600 for capturing image data corresponding to one or more cards used during the play of a game. Where the table monitoring subsystem 1900 comprises a card reader unit, it may be positioned on either inward-facing side 1907 of the table monitoring subsystem 1900, as depicted in FIG. 19A.

Figure 19D:
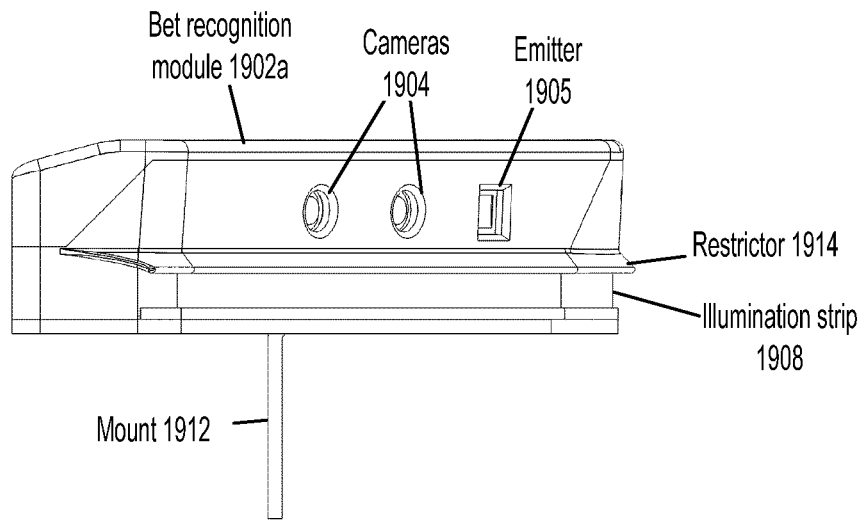
FIG. 19D illustrates a left view of the table monitoring subsystem of FIG. 19A according to some embodiments.
Figure 19E:
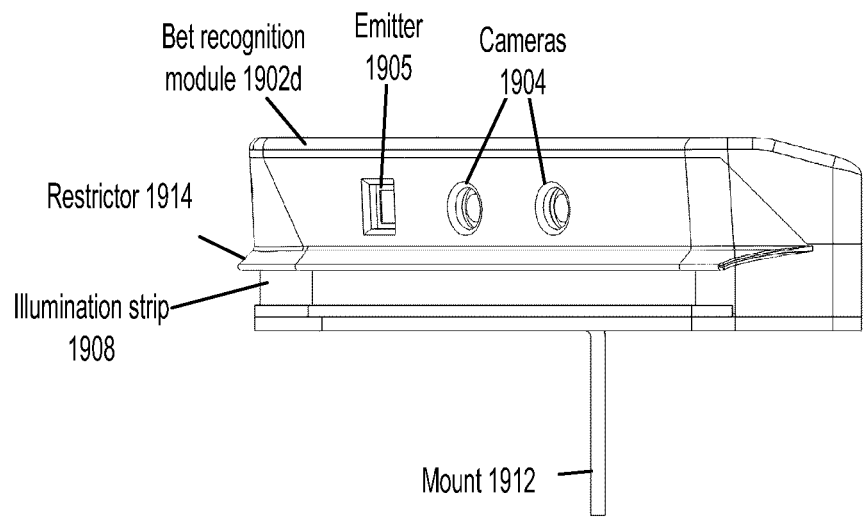
FIG. 19E illustrates a right view of the table monitoring subsystem of FIG. 19A according to some embodiments.

Similar to table monitoring subsystem 600, the table monitoring subsystem 1900 comprises an illumination strip 1908 and a restrictor 1914, as depicted in FIG. 19D and FIG. 19E, generally similar to illumination strip 608 and restrictor 1112. The illumination strip 1908 and the restrictor 1914 may provide illumination in all or a portion of the field of view of the imaging component that may not distract a user sitting at the gaming table.

Similar to table monitoring subsystem 600, the table monitoring subsystem 1900 comprises a display 1910 generally similar to display 610 for displaying data processed by the game monitoring server 104. Where the table monitoring subsystem 1900 comprises two or more separate imaging components, each imaging component may have a display 1910. As depicted in FIG. 19A to 19G, the first imaging component comprises a display 1910*a*, and the second imaging component comprises a display 1910*b*.

In some embodiments, the table monitoring subsystem 1900 may comprise buttons generally similar to buttons 612 for triggering the display 1910 to display data processed by the game monitoring server 104.

Figure 19F:
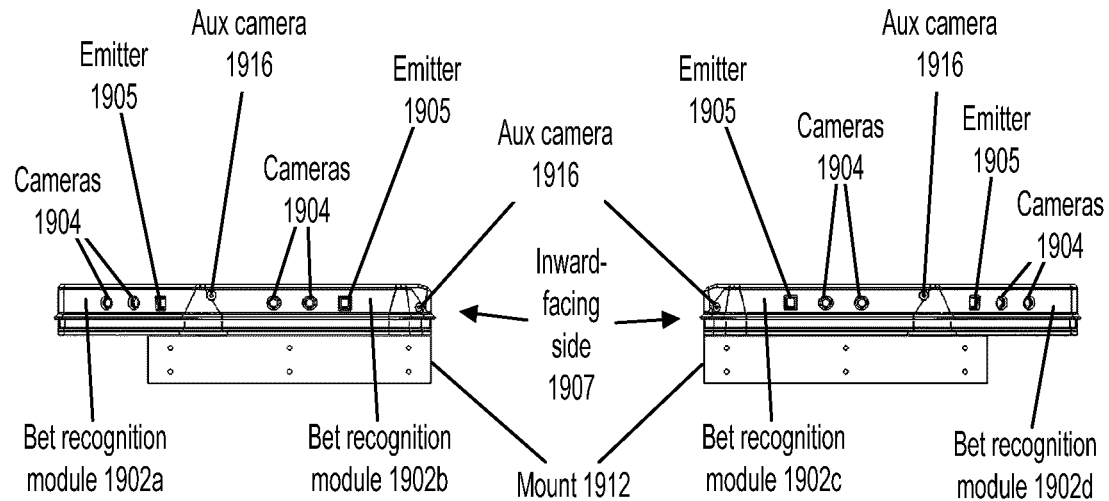
FIG. 19F illustrates a front view of the table monitoring subsystem of FIG. 19A according to some embodiments.
Figure 19G:
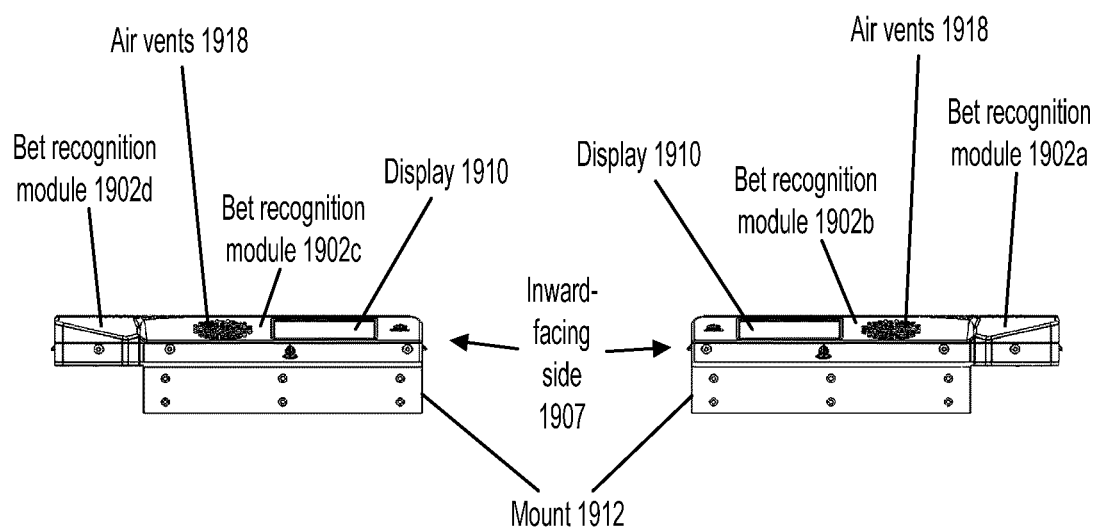
FIG. 19G illustrates a back view of the table monitoring subsystem of FIG. 19A according to some embodiments.

In some embodiments, similar to table monitoring subsystem 700, the bet recognition modules 1902*a*, 1902*b*, 1902*c*, and 1902*d* further comprise an auxiliary camera 1926, as depicted in FIG. 19A and FIG. 19F. In some embodiments, the auxiliary camera 1926 is a high resolution camera for capturing image data with greater detail and accuracy. In some embodiments, the auxiliary camera 1926 is an ultraviolet (UV) camera for detecting UV light reflecting from the chips on the gaming table, such as from security features on the chips that reflect UV light.

In some embodiments, the table monitoring subsystem may be mounted to a chip tray or a gaming table, such that when the table monitoring subsystem is mounted to the chip tray or the gaming table, the imaging components are components of the table monitoring subsystem. As depicted in FIG. 19A, and FIGS. 19C-19G, a mount 1912 may be fastened to the base of the first imaging component and the second imaging component for mounting the table monitoring subsystem 1900. In some embodiments, the mount 1912 is an L-bracket.

The base of the imaging component of the table monitoring subsystem may be configured for mounting on a surface. In some embodiments, as depicted in FIG. 19C, the first and second imaging components of the table monitoring subsystem 1900 comprises a plurality of holes 1922 for receiving one or more fasteners, such as screws, nuts and bolts, and the like. In some embodiments, the mount 1912 may be fastened to the imaging components of the table monitoring subsystem 1900 using the holes 1922. In some embodiments, the imaging components of the table monitoring subsystem 1900 may be directly fastened to the tray or gaming table.

In some embodiments, the imaging component of the table monitoring subsystem may comprise one or more ports for guiding wires, cables, circuits, and the like, therethrough, such that the wires, cables and circuits are organized. As depicted in FIG. 19C, each imaging component of the table monitoring subsystem 1900 comprises a wire port 1920, such that the wires, cables, and circuits for two bet recognition modules (bet recognition modules 1902*a* and 1902*b* for the first imaging component, and bet recognition modules 1902*c* and 1902*d* for the second imaging component) are guided through one wire port 1920. In some embodiments, each bet recognition module 1902 may comprise one or more wire ports 1920. Where the table monitoring subsystem 1900 is mounted to the mount 1912, the wire port 1920 may extend through the mount 1912.

In some embodiments, the imaging component of the table monitoring subsystem may comprise air vents. As depicted in FIG. 19A, each of the first and second imaging components comprise a plurality of air vents 1918 for venting the bet recognition modules 1902.

FIG. 20A to 20G depicts another example table monitoring subsystem 2000 according to some embodiments. The table monitoring subsystem 2000 is generally similar to table monitoring subsystem 600, except the table monitoring subsystem 2000 comprises one imaging component comprising one bet recognition module 2002.

In some embodiments, one or more of the table monitoring subsystem 2000 may be used to capture image data at an area of the gaming table of particular interest. For example, the table monitoring subsystem 2000 may be positioned relative to the gaming table such that the field of view of the imaging component of table monitoring subsystem 2000 overlaps at least in part with an obscured area of the gaming table. The obscured area of the gaming table may be obscured by a card shoe, for example. In such embodiments, the table monitoring subsystem 2000 may be used with one or more table monitoring subsystems described herein to capture image data for monitoring table activities at the gaming table, such that the image data may be processed by the game monitoring server 104 to generate bet data, chip transfer data, and other table monitoring data. For example, the table monitoring subsystem 2000 may be used with table monitoring subsystem 1800 or 1900, where the table monitoring subsystem 1800 or 1900 is positioned on a corner of a chip tray, and the table monitoring subsystem 2000 is positioned offset relative to the table monitoring subsystem 1800 or 1900 and the chip tray to capture image data at an obscured area of the gaming table.

The table monitoring subsystem 2000 comprises one imaging component. As depicted in FIGS. 20A to 20G, the table monitoring subsystem 2000 comprises one bet recognition module 2002. The bet recognition module 2002 is similar to the bet recognition modules 602 of table monitoring subsystem 600. The bet recognition module 2002 comprises one or more cameras 2004 and an emitter 2005 to capture image data.

Similar to table monitoring subsystem 600, the table monitoring subsystem 2000 comprises an illumination strip 2008 generally similar to illumination strip 608 and may provide illumination in all or a portion of the field of view of the imaging component.

Similar to table monitoring subsystem 600, the table monitoring subsystem 2000 comprises a display 2010 generally similar to display 610 for displaying data processed by the game monitoring server 104.

In some embodiments, the table monitoring subsystem 2000 may comprise buttons generally similar to buttons 612 for triggering the display 2010 to display data processed by the game monitoring server 104.

Figure 20A:
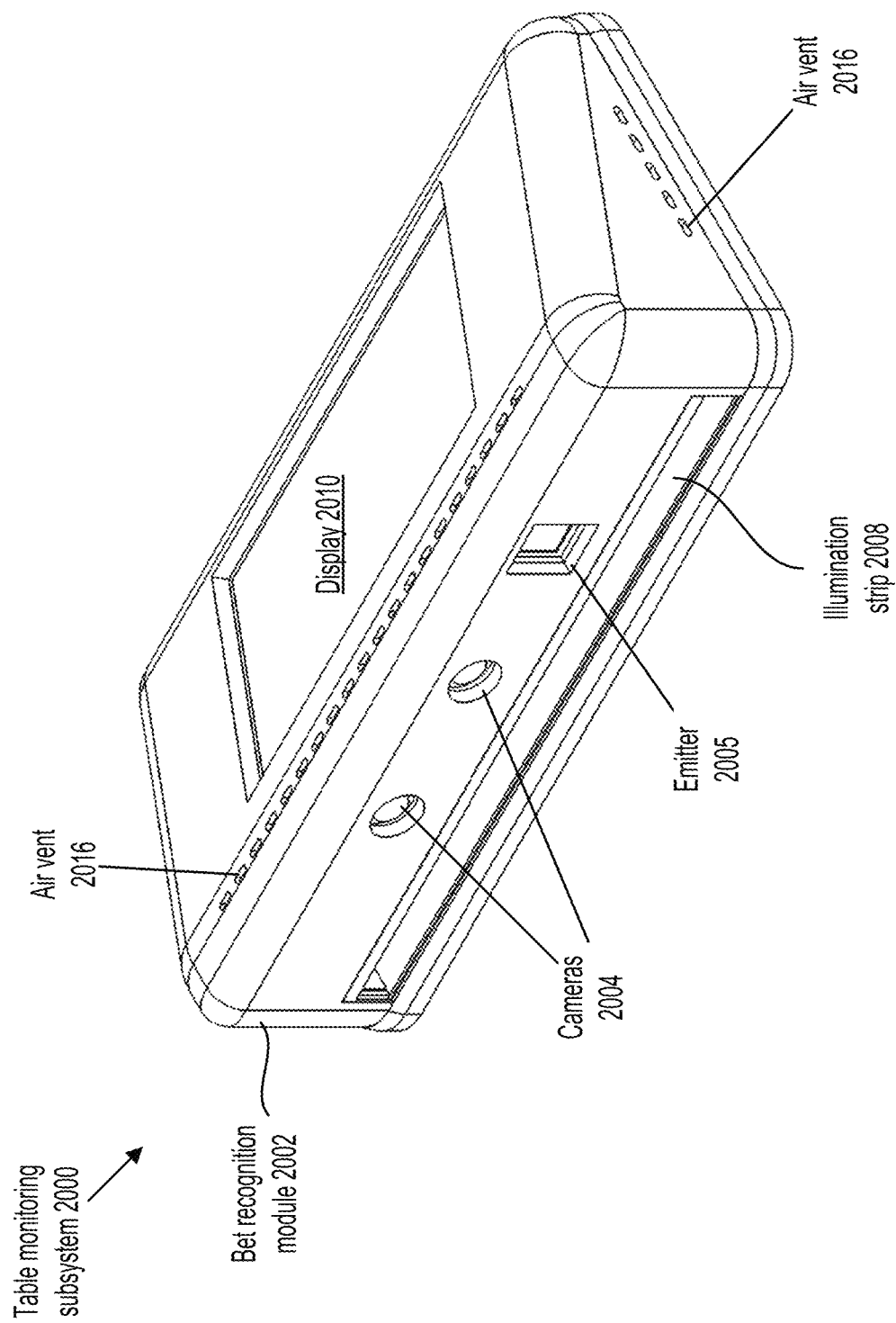
FIG. 20A illustrates a perspective view of another example table monitoring subsystem according to some embodiments.
Figure 20B:
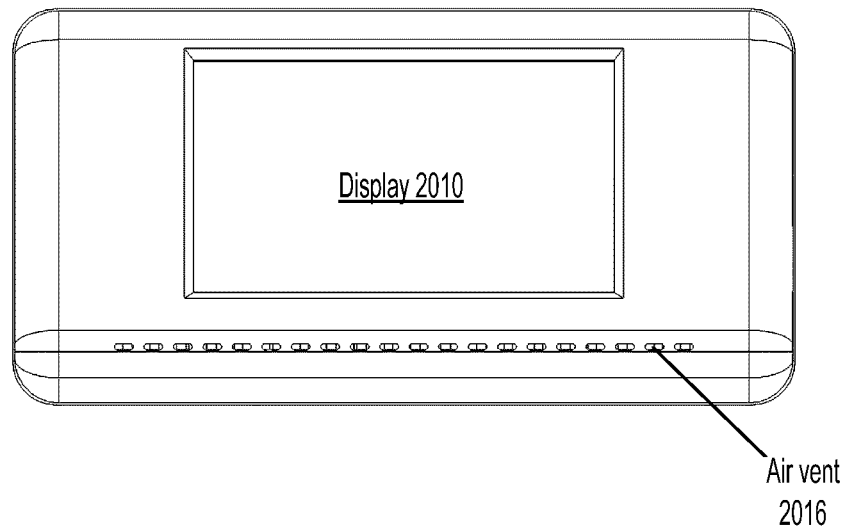
FIG. 20B illustrates a top view of the table monitoring subsystem of FIG. 20A according to some embodiments.
Figure 20C:
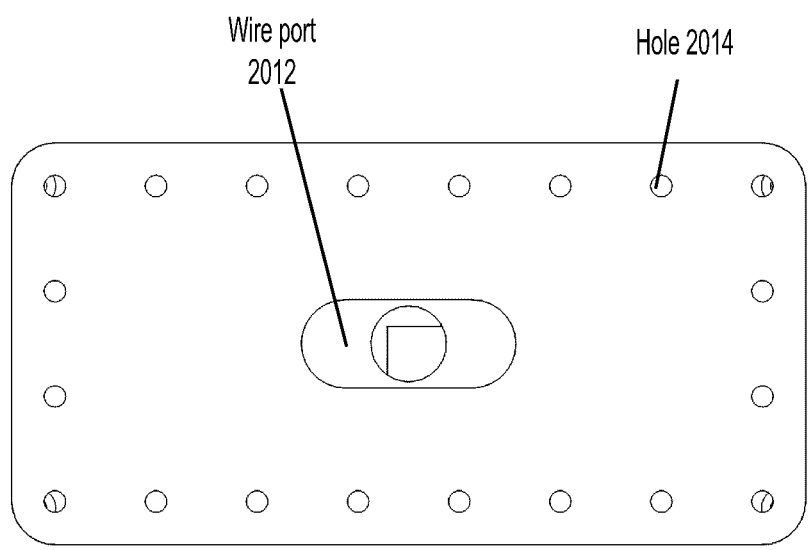
FIG. 20C illustrates a bottom view of the table monitoring subsystem of FIG. 20A according to some embodiments.

Similar to table monitoring subsystem 1900, the base of the imaging component of the table monitoring subsystem 2000 may be configured for mounting on a surface. In some embodiments, as depicted in FIG. 20C, the imaging components of the table monitoring subsystem 2000 comprises a plurality of holes 2014 for receiving one or more fasteners, such as screws, nuts and bolts, and the like. In some embodiments, the imaging component of the table monitoring subsystem 2000 may be directly fastened to the tray or gaming table, or may be fastened to one or more mounts or plates for fastening to the tray or gaming table.

Similar to table monitoring subsystem 1900, the imaging component of the table monitoring subsystem 2000 may comprise one or more ports for guiding wires, cables, circuits, and the like, therethrough, such that the wires, cables and circuits are organized. As depicted in FIG. 20C, the imaging component of the table monitoring subsystem 2000 comprises a wire port 2012, such that the wires, cables, and circuits for the bet recognition module 2002 are guided through one wire port 2012. In some embodiments, the bet recognition module 2002 may comprise more than one wire port 2012.

Figure 20D:
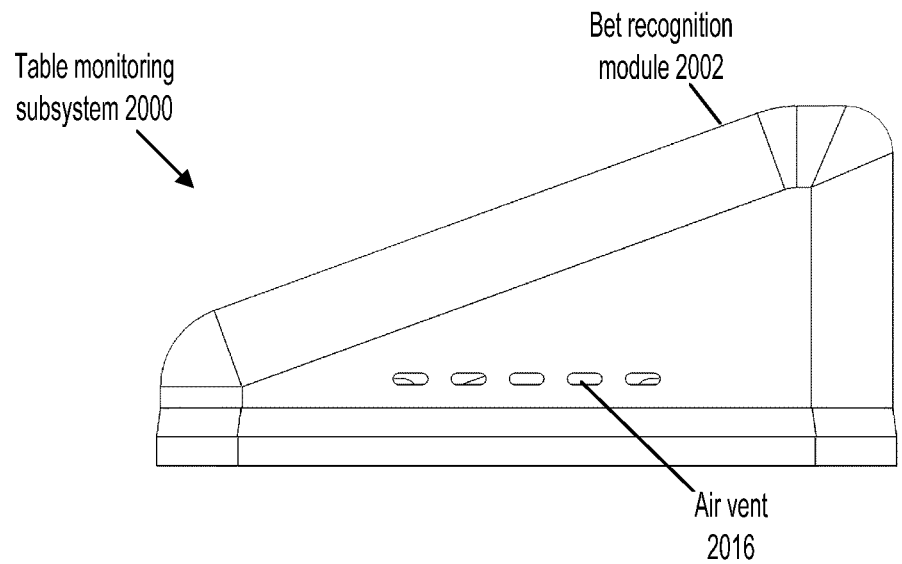
FIG. 20D illustrates a left view of the table monitoring subsystem of FIG. 20A according to some embodiments.
Figure 20E:
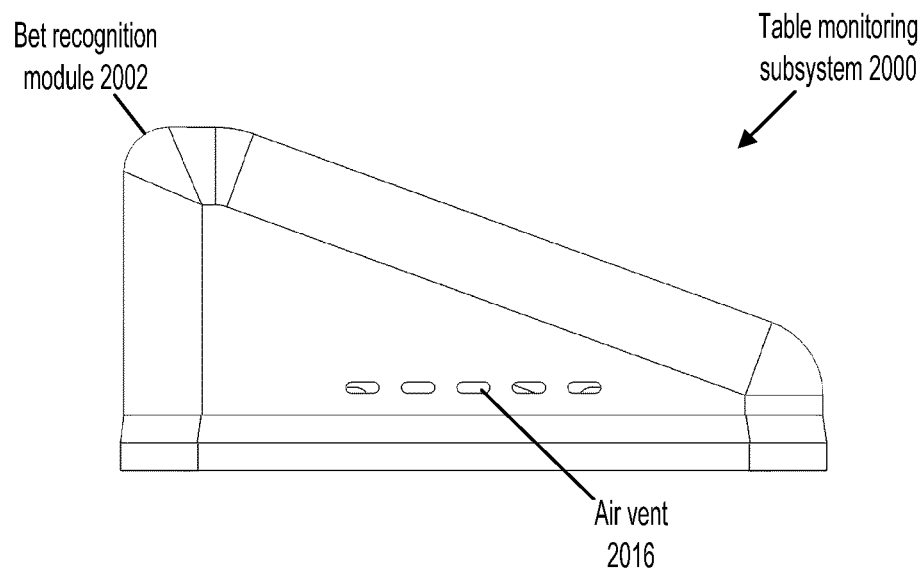
FIG. 20E illustrates a right view of the table monitoring subsystem of FIG. 20A according to some embodiments.
Figure 20F:
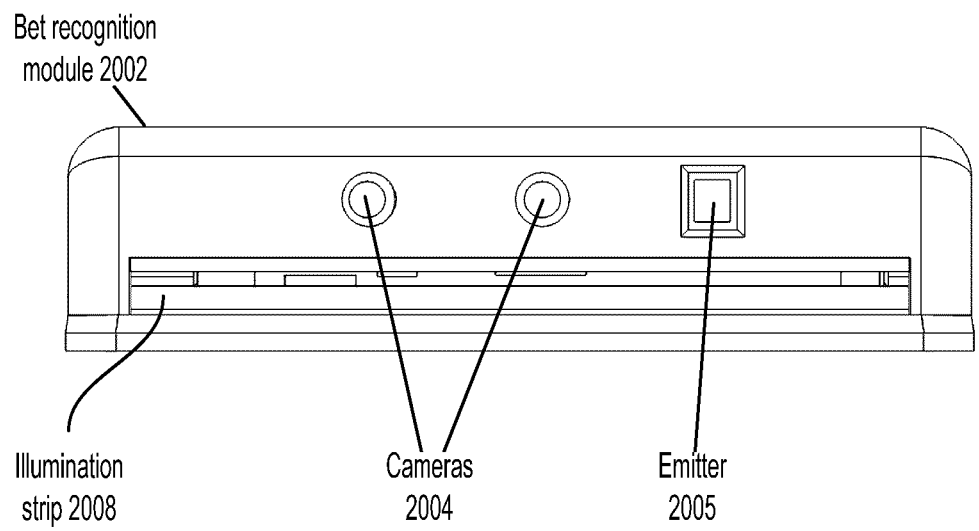
FIG. 20F illustrates a front view of the table monitoring subsystem of FIG. 20A according to some embodiments.
Figure 20G:
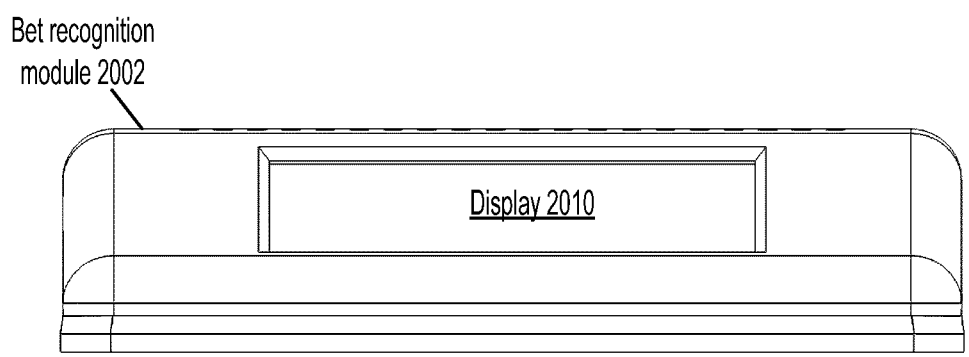
FIG. 20G illustrates a back view of the table monitoring subsystem of FIG. 20A according to some embodiments.

Similar to table monitoring subsystem 1900, the imaging component of the table monitoring subsystem 2000 may comprise air vents. As depicted in FIGS. 20A, 20D, and 20E, the table monitoring subsystem 2000 comprises air vents 2016 along the top face and side faces of the table monitoring subsystem 2000 for venting the bet recognition modules 2002.

FIG. 21A to 21G depicts another example table monitoring subsystem 2100 according to some embodiments. The table monitoring subsystem 2100 is generally similar to table monitoring subsystem 2000, except that the height of the table monitoring subsystem 2100 relative to the surface of the gaming table is adjustable. That is, the vertical distance between the cameras and emitters of the table monitoring subsystem 2100 and the surface of the gaming table is adjustable.

Similar to table monitor subsystem 2000, in some embodiments, one or more of the table monitoring subsystem 2100 may be used to capture image data at an area of the gaming table of particular interest. For example, the table monitoring subsystem 2100 may be positioned relative to the gaming table such that the field of view of the imaging component of table monitoring subsystem 2100 overlaps at least in part with an obscured area of the gaming table. In such embodiments, the table monitoring subsystem 2100 may be used with one or more table monitoring subsystems described herein to capture image data for monitoring table activities at the gaming table, such that the image data may be processed by the game monitoring server 104 to generate bet data, chip transfer data, and other table monitoring data.

The table monitoring subsystem 2100 comprises one imaging component. As depicted in FIGS. 21A to 21G, the table monitoring subsystem 2100 comprises one bet recognition module 2102. The bet recognition module 2102 is similar to the bet recognition modules 2002 of table monitoring subsystem 2000. The bet recognition module 2102 comprises one or more cameras 2104 and an emitter 2105 to capture image data.

Similar to table monitoring subsystem 2000, the table monitoring subsystem 2100 comprises an illumination strip 2108 generally similar to illumination strip 2008 and may provide illumination in all or a portion of the field of view of the imaging component.

Figure 21A:
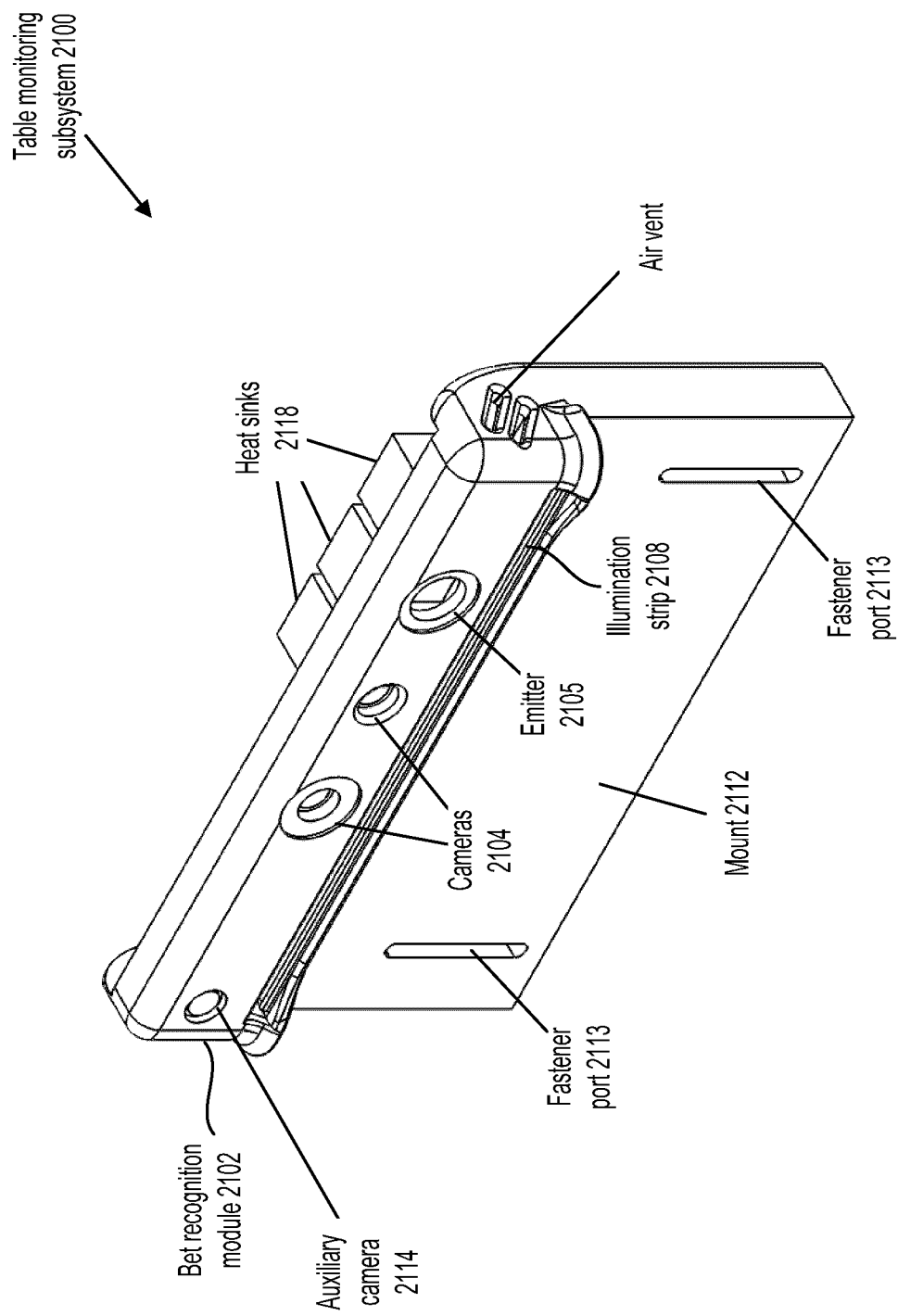
FIG. 21A illustrates a perspective view of another example table monitoring subsystem according to some embodiments.
Figure 21B:
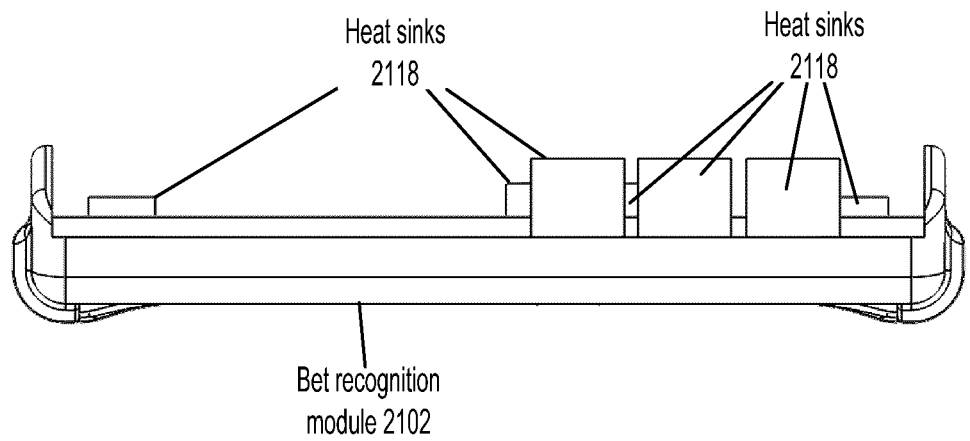
FIG. 21B illustrates a top view of the table monitoring subsystem of FIG. 21A according to some embodiments.
Figure 21C:
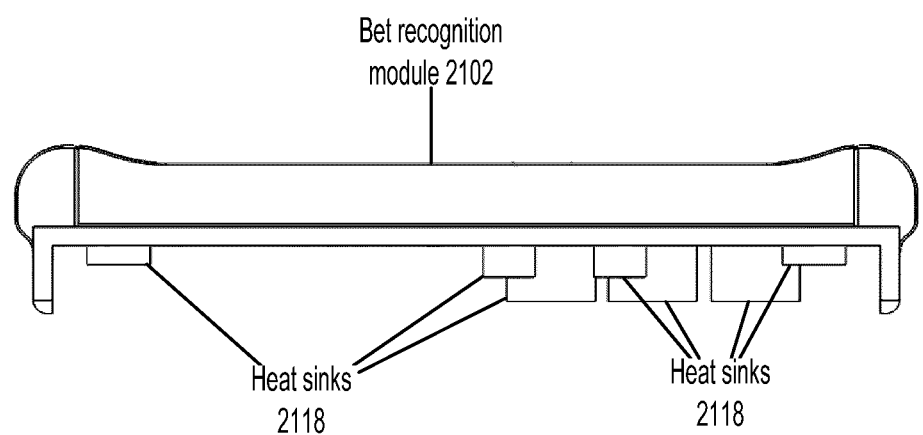
FIG. 21C illustrates a bottom view of the table monitoring subsystem of FIG. 21A according to some embodiments.
Figure 21D:
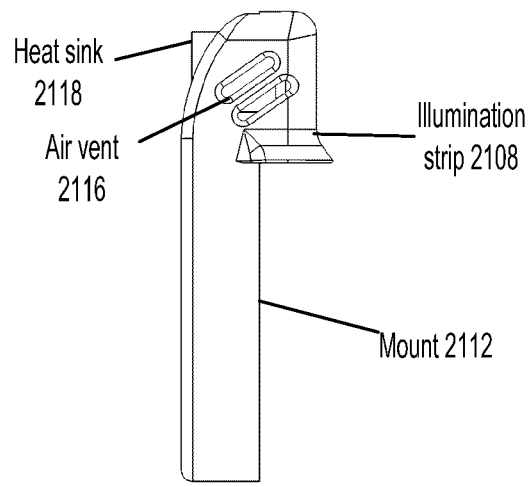
FIG. 21D illustrates a left view of the table monitoring subsystem of FIG. 21A according to some embodiments.
Figure 21E:
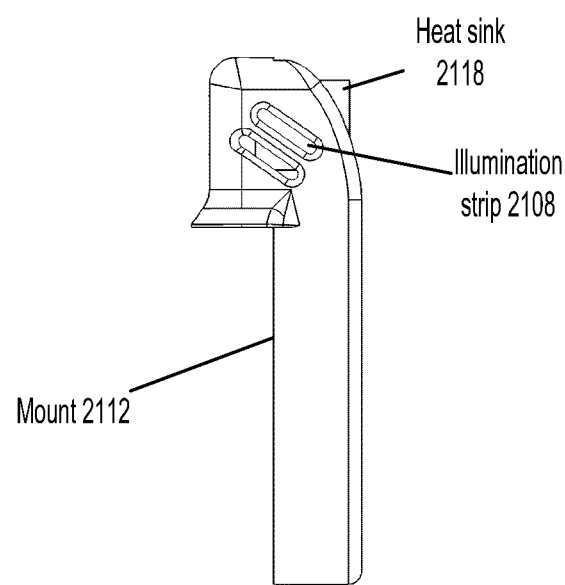
FIG. 21E illustrates a right view of the table monitoring subsystem of FIG. 21A according to some embodiments.
Figure 21F:
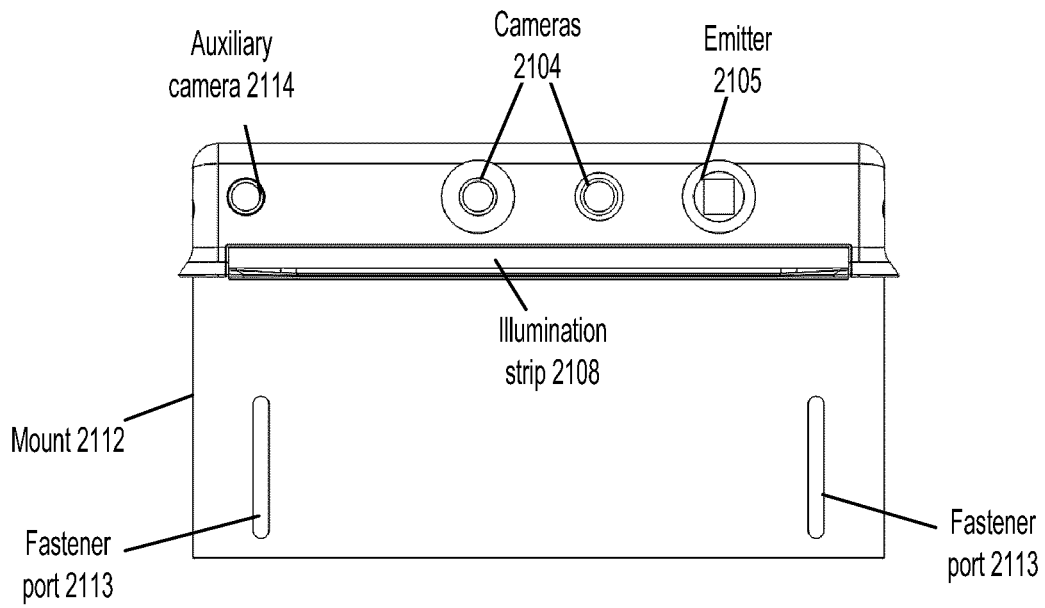
FIG. 21F illustrates a front view of the table monitoring subsystem of FIG. 21A according to some embodiments.

In some embodiments, similar to table monitoring subsystems 700 and 1900, the bet recognition module 2102 further comprise an auxiliary camera 2114, as depicted in FIG. 21A and FIG. 21F. In some embodiments, the auxiliary camera 2114 is a high resolution camera for capturing image data with greater detail and accuracy. In some embodiments, the auxiliary camera 2114 is an ultraviolet (UV) camera for detecting UV light reflecting from the chips on the gaming table, such as from security features on the chips that reflect UV light.

In some embodiments, the table monitoring subsystem may be mounted to a chip tray or a gaming table, such that when the table monitoring subsystem is mounted to the chip tray or the gaming table, the imaging components are components of the table monitoring subsystem. As depicted in FIG. 21A, and FIGS. 21D-21G, the table monitoring subsystem 2100 comprises a mount 2112 extending generally downwardly relative to the imaging component of the table monitoring subsystem 2100 for mounting the table monitoring subsystem 2100. In some embodiments, the mount 2112 is an extension from the bet recognition module 2102.

In some embodiments, to mount the table monitoring subsystem 2100 to a chip tray or a gaming table, the chip tray or gaming table may have a channel having a shape and geometry similar to the cross-sectional shape and geometry of the mount 2112, such that the mount 2112 may be received through the channel of the chip tray or gaming table. As depicted in FIG. 21A, the mount 2112 has a generally rectangular cross-sectional shape and geometry. In some embodiments, the chip tray or gaming table may have a channel having a generally rectangular shape and geometry for receiving the mount 2112 therethrough.

To adjust the height of the table monitoring subsystem 2100 relative to the surface of the gaming table, the mount 2112 may comprise one or more fastener ports 2113, as depicted in FIG. 21A. In some embodiments, the fastener ports 2113 are slots that extend along the height of the table monitoring subsystem 2100 and through the mount 2112.

The fastener ports 2113 may receive one or more fasteners, such as screws, nuts and bolts, and the like, for mounting the table monitoring subsystem 2100 to the chip tray or the gaming table. In some embodiments, the table monitoring subsystem 2100 may be directly fastened to the tray or gaming table, or may be fastened to one or more mounts or plates for fastening to the tray or gaming table.

To adjust the height of the table monitoring subsystem 2100, the fasteners received in the fastener ports 2113 may be loosened, such that the table monitoring subsystem 2100 is not mounted to the chip tray or the gaming table, so the height of the table monitoring subsystem 2100 may be adjusted. After the height of the table monitoring subsystem 2100 is adjusted, the table monitoring subsystem 2100 may be fastened again to the chip tray or the gaming table.

Figure 21G:
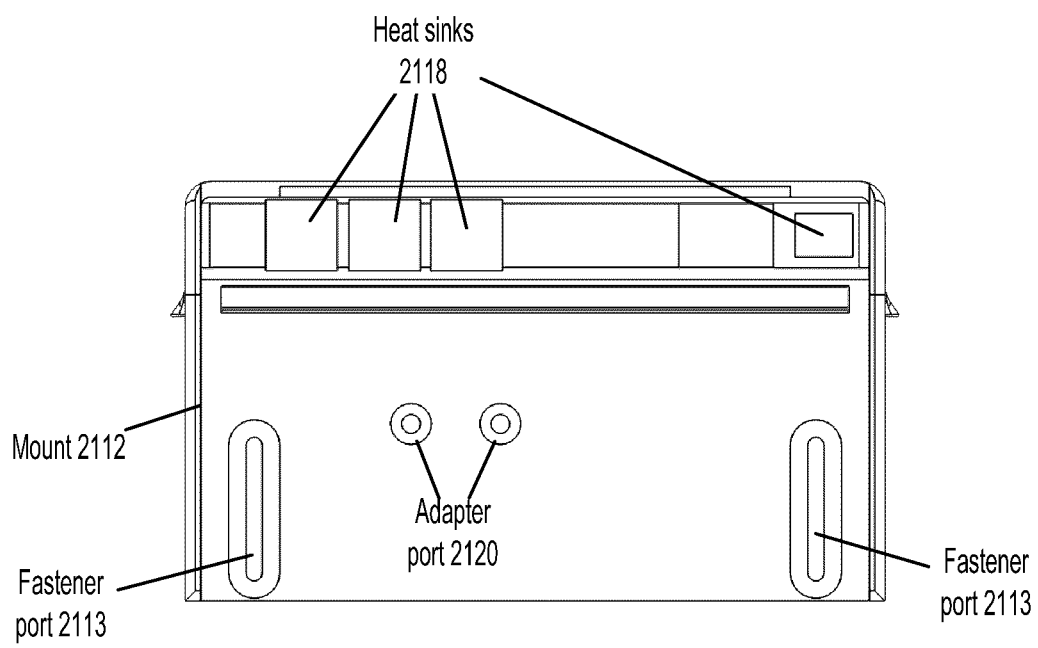
FIG. 21G illustrates a back view of the table monitoring subsystem of FIG. 21A according to some embodiments.
Figure 22A:
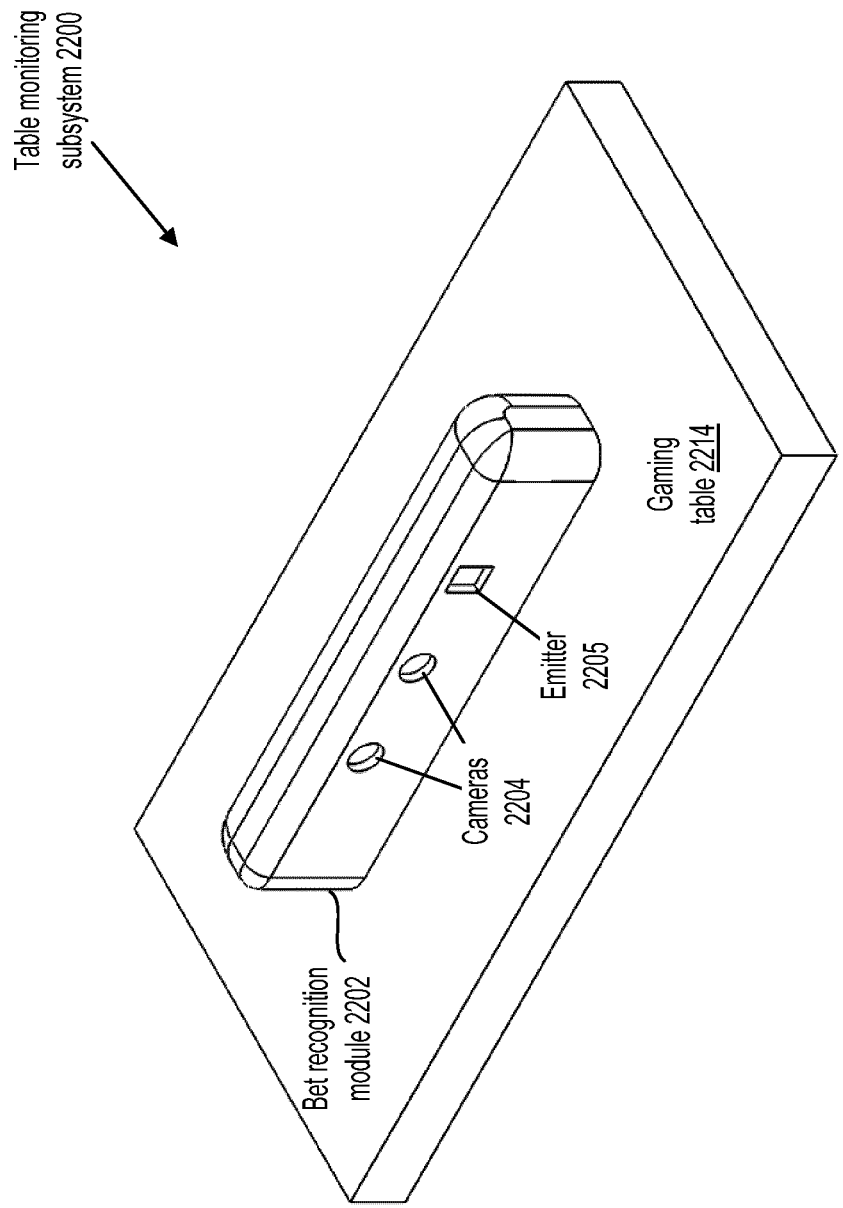
FIG. 22A illustrates a perspective view of another example table monitoring subsystem according to some embodiments.
Figure 22B:
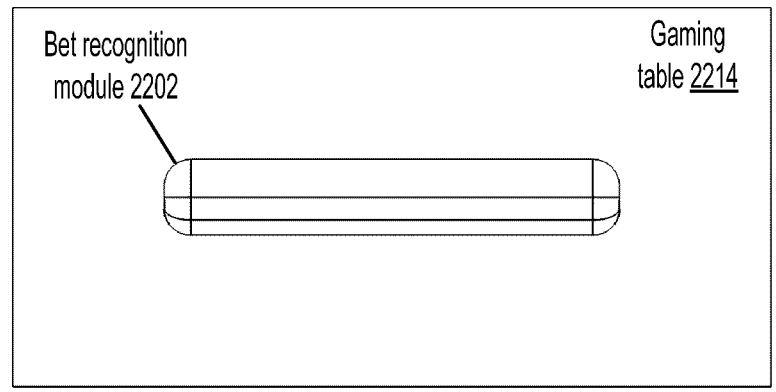
FIG. 22B illustrates a top view of the table monitoring subsystem of FIG. 22A according to some embodiments.
Figure 22C:
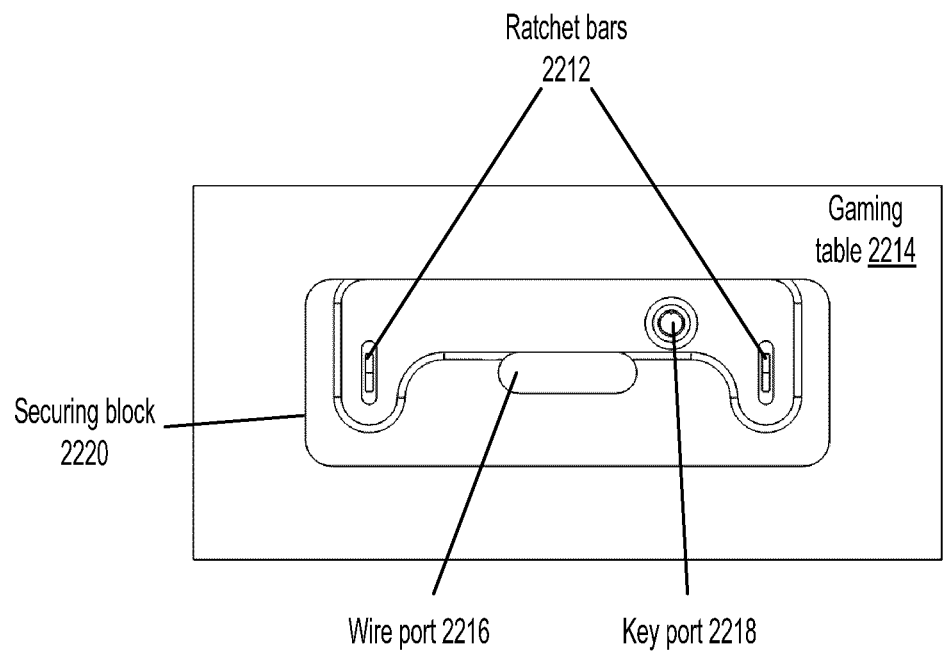
FIG. 22C illustrates a bottom view of the table monitoring subsystem of FIG. 22A according to some embodiments.
Figure 22D:
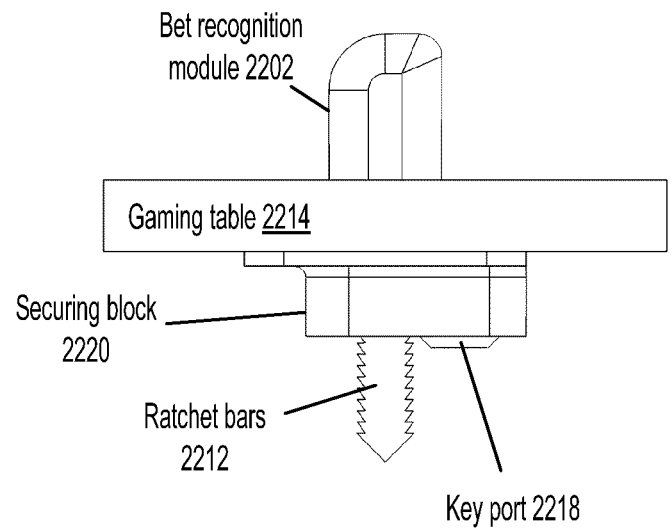
FIG. 22D illustrates a left view of the table monitoring subsystem of FIG. 22A according to some embodiments.
Figure 22E:
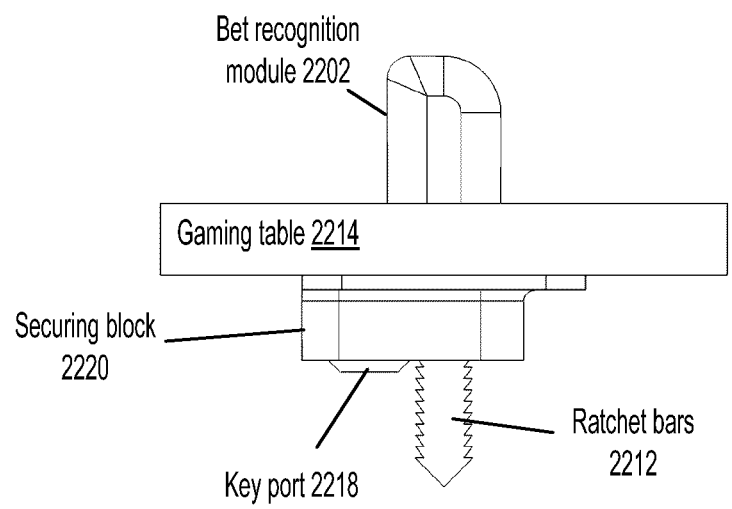
FIG. 22E illustrates a right view of the table monitoring subsystem of FIG. 22A according to some embodiments.
Figure 22F:
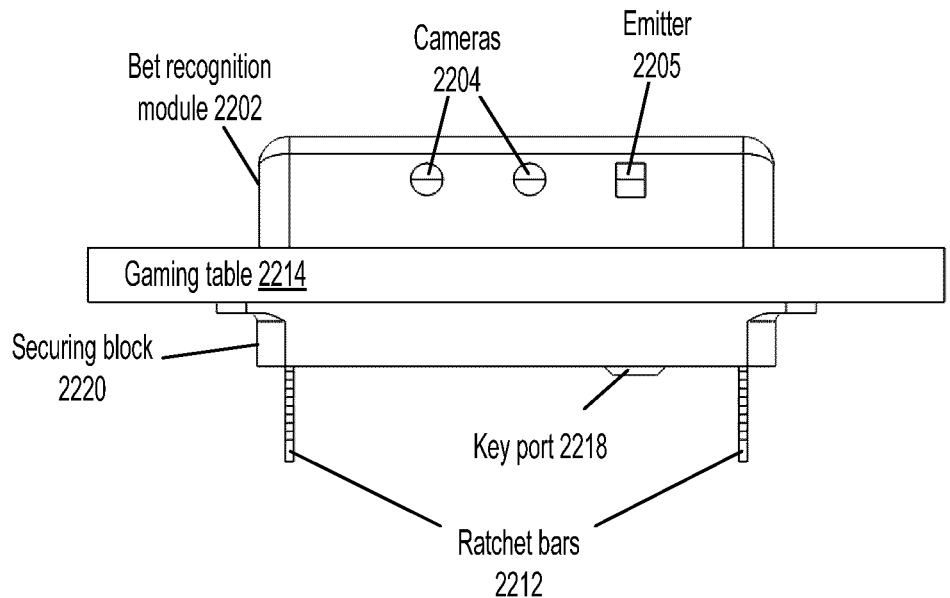
FIG. 22F illustrates a front view of the table monitoring subsystem of FIG. 22A according to some embodiments.
Figure 22G:
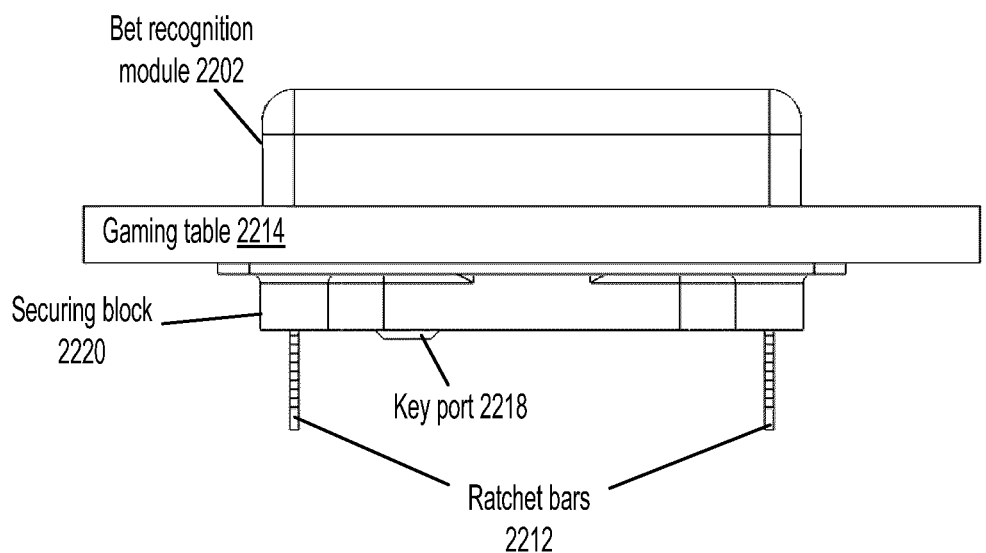
FIG. 22G illustrates a back view of the table monitoring subsystem of FIG. 22A according to some embodiments.
Figure 22H:
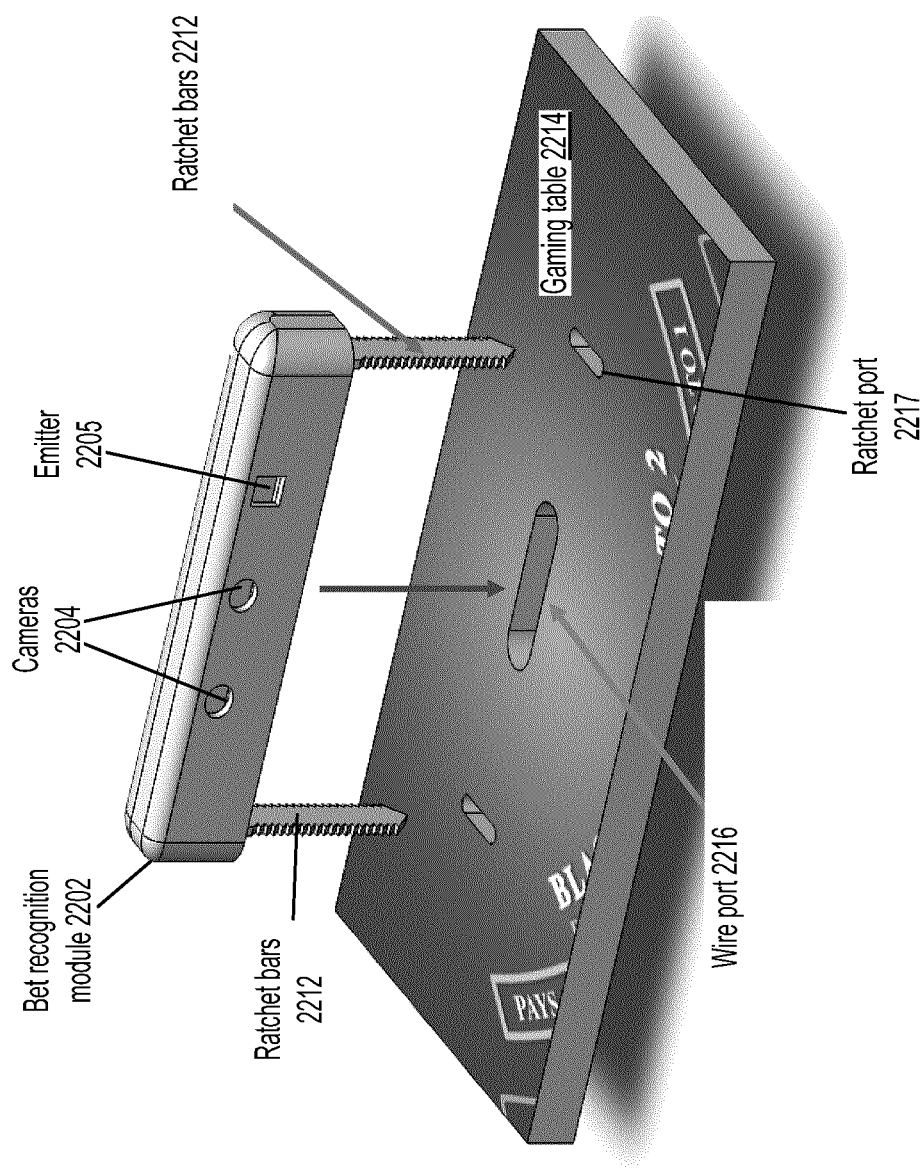
FIG. 22H illustrates a schematic diagram of the table monitoring subsystem of FIG. 22A to be mounted to a gaming table according to some embodiments.
Figure 22I:
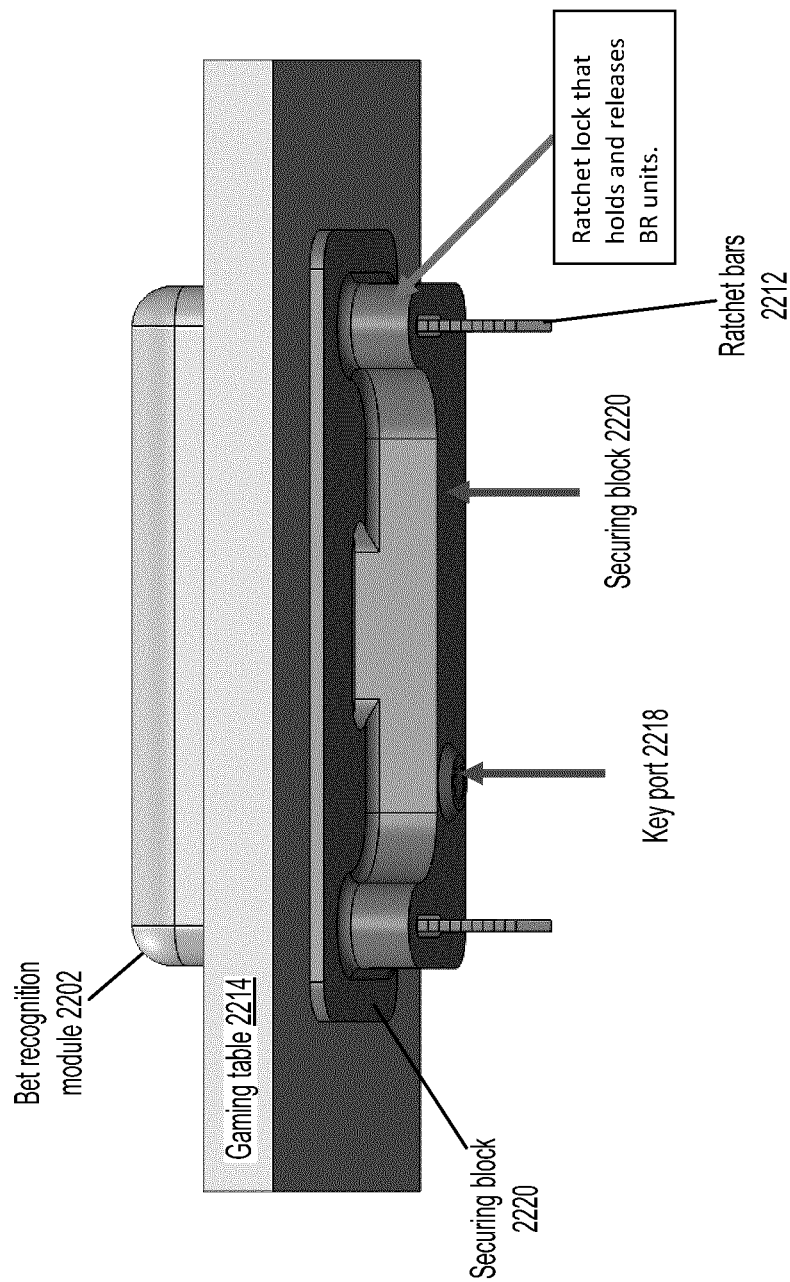
FIG. 22I illustrates a schematic diagram of the table monitoring subsystem of FIG. 22A mounted to a gaming table according to some embodiments.

In some embodiments, the table monitoring subsystem may comprise a converter port such that various inputs may be received in the table monitoring subsystem for transmitting data or power to and from the table monitoring subsystem. As depicted in FIG. 21G, the table monitoring subsystem 2100 comprises two adapters 2120. In some embodiments, the adapters 2120 are ribbon cable to USB 3.0 adapters.

Similar to table monitoring subsystem 2000, the imaging component of the table monitoring subsystem 2100 may comprise air vents. As depicted in FIGS. 21A, 21D, and 21E, the table monitoring subsystem 2100 comprise air vents 2116 along the side of the table monitoring subsystem 2100 for venting the bet recognition module 2102.

To draw heat from the cameras 2104, auxiliary camera 2114, and emitter 2105, the table monitoring subsystem 2100 may comprise one or more heat sinks 2118 mounted to the cameras 2104, auxiliary camera 2114, and emitter 2105, as depicted in FIGS. 21B, 21C, and 21G.

FIG. 22A to 22I depicts another example table monitoring subsystem 2000 according to some embodiments. The table monitoring subsystem 2200 is generally similar to table monitoring subsystems 2000 and 2100, except that the table monitoring subsystem 2200 may be mounted to a surface of a gaming table 2214 with a ratchet system.

Similar to table monitor subsystems 2000 and 2100, in some embodiments, one or more of the table monitoring subsystem 2200 may be used to capture image data at an area of the gaming table of particular interest. For example, the table monitoring subsystem 2200 may be positioned relative to the gaming table such that the field of view of the imaging component of table monitoring subsystem 2200 overlaps at least in part with an obscured area of the gaming table. In such embodiments, the table monitoring subsystem 2200 may be used with one or more table monitoring subsystems described herein to capture image data for monitoring table activities at the gaming table, such that the image data may be processed by the game monitoring server 104 to generate bet data, chip transfer data, and other table monitoring data.

The table monitoring subsystem 2200 comprises one imaging component. As depicted in FIGS. 22A to 22I, the table monitoring subsystem 2200 comprises one bet recognition module 2202. The bet recognition module 2202 is similar to the bet recognition modules 2002 of table monitoring subsystem 2000 and the bet recognition modules 2102 of table monitoring subsystem 2100. The bet recognition module 2202 has one or more cameras 2204 and an emitter 2205 to capture image data.

Similar to table monitoring subsystems 2000 and 2100, the table monitoring subsystem 2200 may comprise an illumination strip 2208 generally similar to illumination strips 2008 and 2108 and may provide illumination in all or a portion of the field of view of the imaging component.

In some embodiments, the table monitoring subsystem may be mounted to a gaming table, such that when the table monitoring subsystem is mounted to the chip tray or the gaming table, the imaging components are components of the table monitoring subsystem. As depicted in FIG. 22A, and FIGS. 22C-22I, the table monitoring subsystem 2200 comprises ratchet bars 2212 extending generally downwardly relative to the imaging component of the table monitoring subsystem 2200 for mounting the table monitoring subsystem 2200 to the gaming table 2214.

In some embodiments, to mount the table monitoring subsystem 2200 to gaming table 2214, the gaming table may have a channel, such as a ratchet port 2217, having a shape and geometry for receiving the ratchet bars 2212 through the ratchet port 2217. In some embodiments, as depicted in FIG. 22D to FIG. 22I, the length of the ratchet bars 2212 is longer than the thickness of the gaming table 2214, such that the ratchet bars 2212 extend through the gaming table 2214. As long as the ratchet bars 2212 extend through the gaming table 2214, the table monitoring subsystem 2200 may be mounted to the gaming table 2214. Where the gaming table comprises a felt surface, the felt may also be cut for receiving the ratchet bars 2212 through the felt. In some embodiments, a profiling tool may be used to create the ratchet ports 2217 through the gaming table 2214 and the cuts through the felt of the gaming table 2214.

A securing block 2220 may be used to secure the table monitoring subsystem 2200 to the gaming table 2214. The securing block 2220 may have teeth complementary to the ratchet bars 2214 for locking the securing block 2220 to the ratchet bars 2214. From below the gaming table 2214, the securing block 2220 may be engaged with the ratchet bars 2214 that are extending through the gaming table 2214, as depicted in FIG. 22F to FIG. 22I. In some embodiments, when the securing block 2220 engages with the ratchet bars 2214, a "click" may indicate that the securing block 2220 is engaged to the ratchet bars 2214. To ensure that the securing block 2220 is fully engaged with the ratchet bars 2214, the securing block 2220 may need to be pushed up, and/or the ratchet bars 2214 may need to be pulled down.

When the table monitoring subsystem 2200 is secured to the gaming table 2214 with the securing block 2220, the table monitoring subsystem 2200 may be flush and level with the gaming table 2214.

In some embodiments, the securing block 2220 may be mounted to the bottom of the gaming table 2214 and aligned with the ratchet port 2217, such that the ratchet bars 2212 of the table monitoring subsystem 2200 engages with the securing block 2220 when the ratchet bars are received through the ratchet port 2217.

For the securing block 2220 to release the table monitoring subsystem 2200, a key may be received in a key port 2218 to disengage the securing block 2220. In some embodiments, a solenoid may be used to disengage the securing block 2220 remotely. In some embodiments, the key port and comprise a "hold" function that hols the lock of the securing block 2220 open while the table monitoring subsystem 2200 is removed. Upon insertion of another table monitoring subsystem 2200, the securing block 2220 may lock onto the other table monitoring subsystem 2200.

In some embodiments, the securing block 2220 may comprise an RFID tag to unlock the table monitoring subsystem 2200 locked with the securing block 2220. When an RFID reader is proximate the RFID tag, the RFID tag may generate a signal based on the radio energy transmitted by the reader. The generated signal may be transmitted to the game monitoring server 104, and the game monitoring server 104 may determine if the RFID reader is complementary to the RFID tag. For example, the RFID reader may be a reader issued by the gaming facility that is used to unlock the table monitoring subsystem 2200 from the gaming table 2214. If the RFID reader is complementary to the RFID tag, the game monitoring server 104 may transmit a signal to the securing block 2200 to disengage from the ratchet bars 2212 and unlock the table monitoring subsystem 2200 from the gaming table 2214.

To guide the wires, cables, and circuits of the table monitoring subsystem 2200 through the gaming table 2214, the gaming table 2214 may comprise a wire port 2216. A profile tool may be used to create the wire port 2216.

In some embodiments, the table monitoring subsystem 2200 may be connected to the backend system after mounting to the gaming table 2214. In some embodiments, the table monitoring subsystem 2200 may comprise a quick-change plug that engages with a complementary quick-change board mounted to the gaming table 2214 when properly installed to reduce the mounting time of the table monitoring subsystem 2200 on the gaming table 2214. The wires, cables, and circuits of the table monitoring subsystem 2200 are in electrical and data communication with the quick-change plug. Similarly, the wires, cables, and circuits for transmitting data to the game monitoring server 104 are in electrical and data communication with the quick-change board. When the quick-change plug is received in the quick-change board, the table monitoring subsystem 2200 may transmit data to the game monitoring server 104. The surfaces of the quick-change plug and the quick-change board that are in contact may comprise a conductive pad to promote electrical and data communication between the table monitoring subsystem 2200 and the game monitoring server 104. In the embodiments where the table monitoring subsystem 2200 comprises a quick change plug, wires, cables and circuits of the table monitoring subsystem 2200 may not need to be guided through a wire port 2216. In some embodiments, the quick-change board may be mounted to the gaming table 2214 using the securing block 2220 as described herein.

Figure 23A:
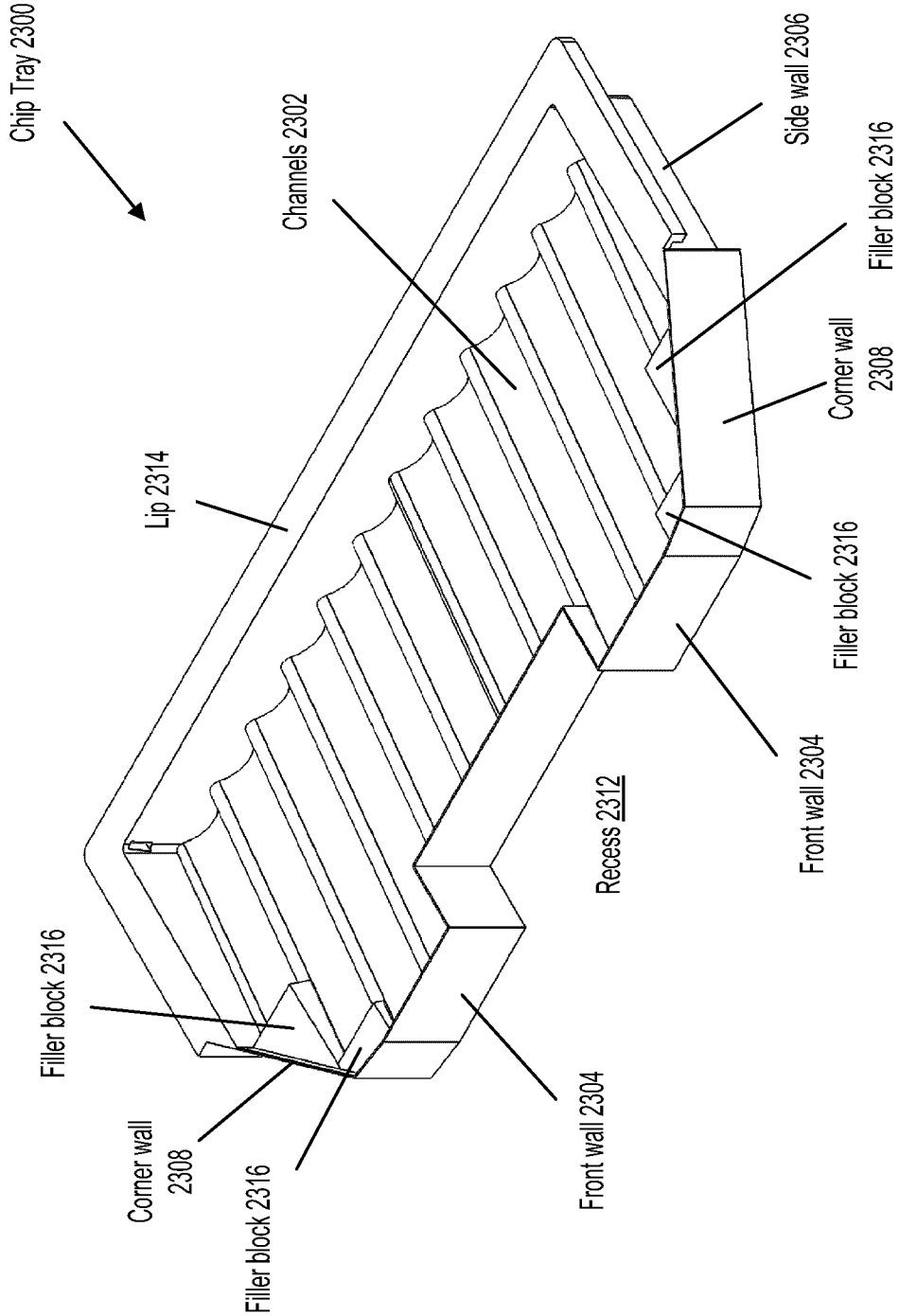
FIG. 23A illustrates a perspective view of an example chip tray according to some embodiments.
Figure 23B:
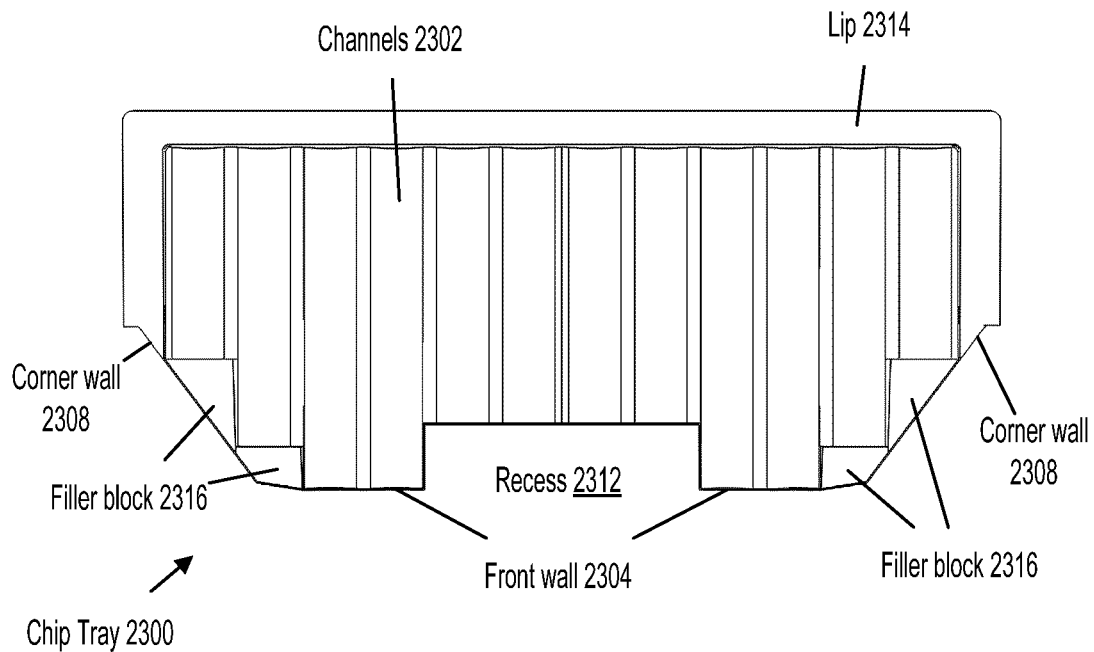
FIG. 23B illustrates a top view of the chip tray of FIG. 23A according to some embodiments.
Figure 23C:
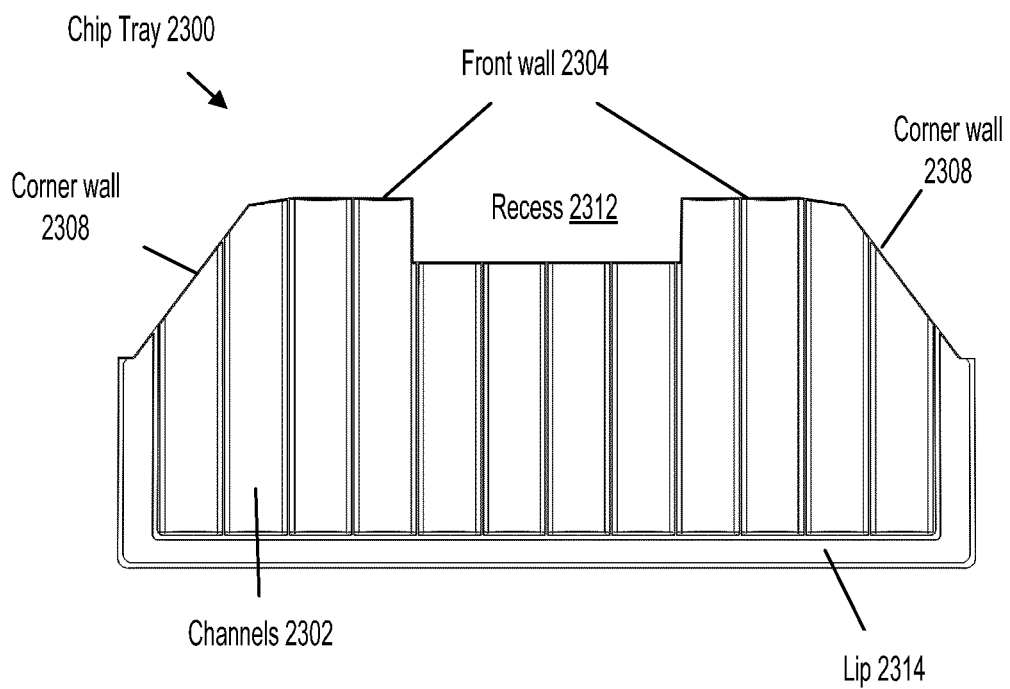
FIG. 23C illustrates a bottom view of the chip tray of FIG. 23A according to some embodiments.
Figure 23D:
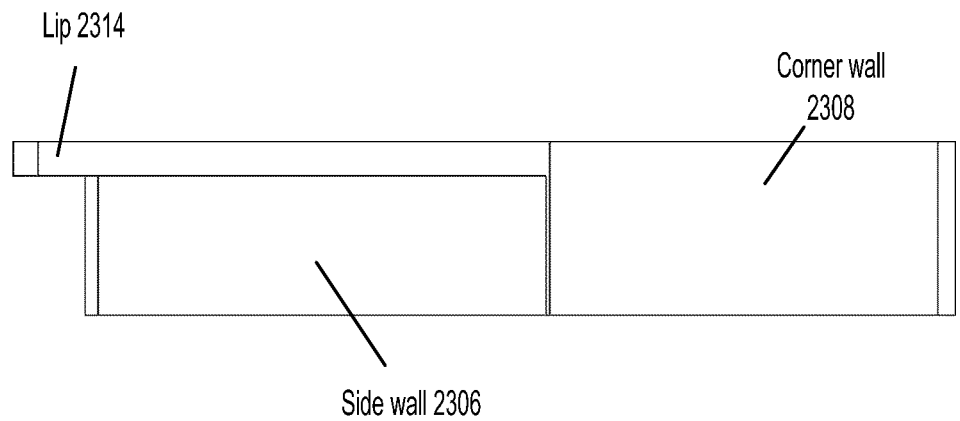
FIG. 23D illustrates a left view of the chip tray of FIG. 23A according to some embodiments.
Figure 23E:
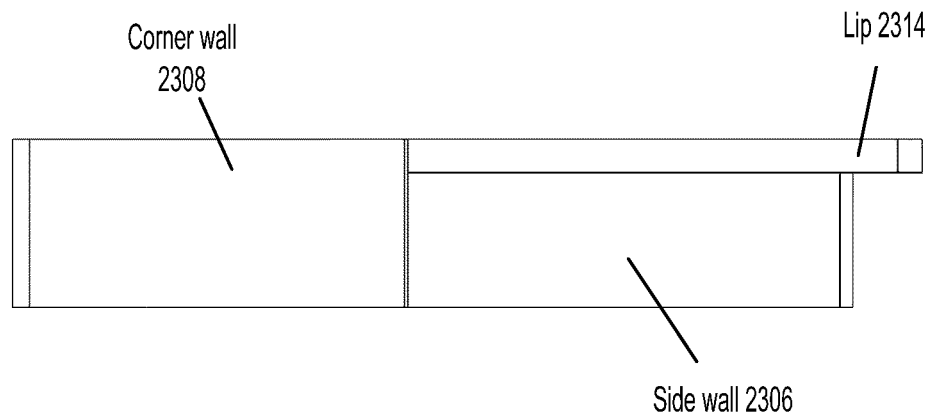
FIG. 23E illustrates a right view of the chip tray of FIG. 23A according to some embodiments.
Figure 23F:
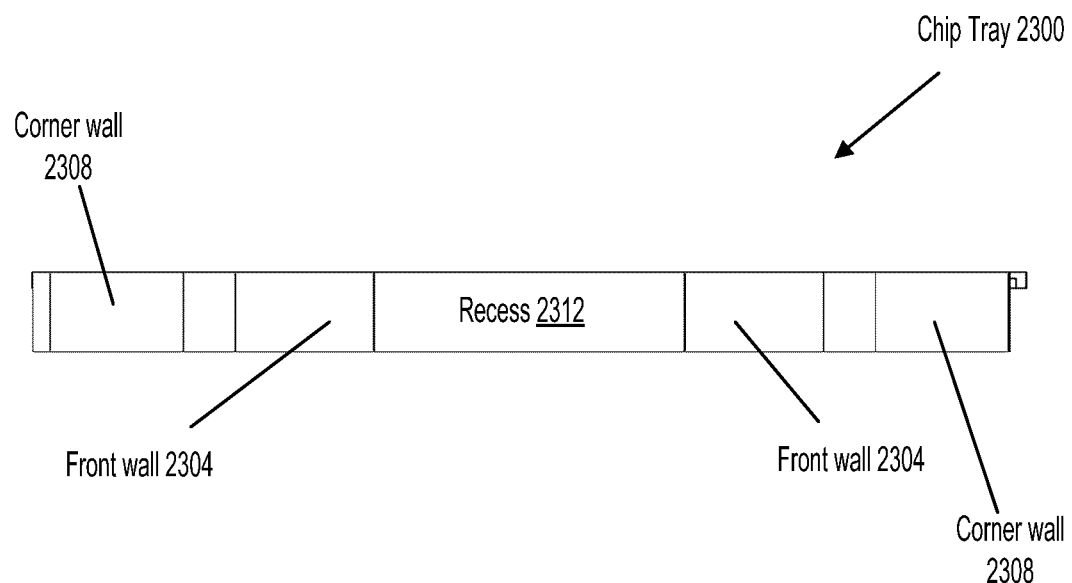
FIG. 23F illustrates a front view of the chip tray of FIG. 23A according to some embodiments.
Figure 23G:
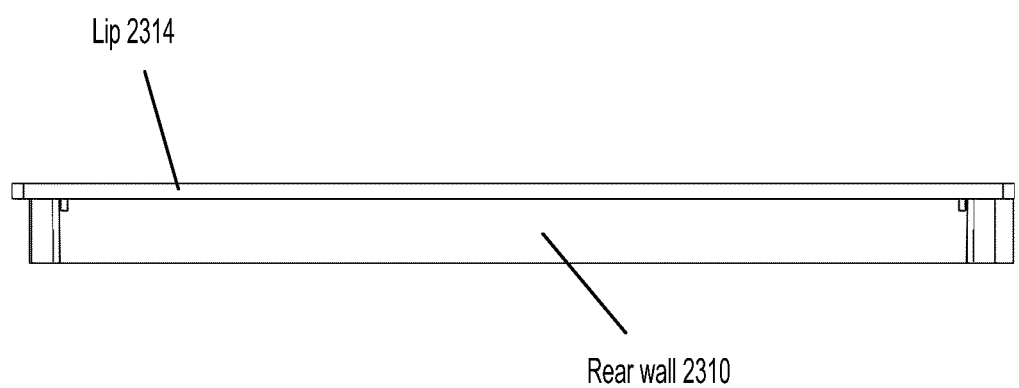
FIG. 23G illustrates a back view of the chip tray of FIG. 23A according to some embodiments.

FIG. 23A to 23G depicts an example chip tray 2300 according to some embodiments. The chip tray 2300 is generally similar to the chip tray 620 as depicted in FIG. 6A. The chip tray 2300 comprises a body defining one or more channels 2302 for receiving chips. The channels 2302 are shaped based on the shape of the chips. As depicted in FIG. 23A, the channels 2302 are rounded for receiving chips shaped like circular discs.

The body of the chip tray 2300 further defines a front wall 2304, a side wall 2306, a corner wall 2308, and a rear wall 2310. As depicted in FIG. 23A, the corner wall 2308 is tapered relative to the front wall 2304 and the side wall 2306.

In some embodiments, the shape and geometry of the chip tray 2300, defined in part by the front wall 2304, side wall 2306, corner wall 2308, and rear wall 2310, may be complementary to a table monitoring subsystem that may be positionable on the chip tray 2300.

The geometry and shape of the chip tray 2300 is a function, in part, of the game being played on the gaming table, the viewing angle of the cameras and sensors of the imaging component of a table monitoring subsystem positionable on the chip tray 2300, and the shape of the gaming table itself. The geometry and shape of the chip tray 2300 is such that the imaging components of a table monitoring subsystem positionable on the chip tray 2300 may capture image data of chips positioned at all relevant areas of the gaming table (e.g. betting areas). In some embodiments, the accuracy of the generated table monitoring data is improved if the image data captured by the table monitoring subsystem is of the centre of the chips. Further, the geometry and shape of the chip tray 2300 is such that the imaging components of a table monitoring subsystem, when positioned on the chip tray 2300, appear complementary to the geometry and shape of the chip tray 2300.

For example, the chip tray 2300 as depicted in FIG. 23A to 23G may be used at a gaming table that is generally semi-circular in shape, such as a gaming table used for playing blackjack. The cameras and sensors of the imaging components of a table monitoring subsystem may have about a 90° viewing angle. In this example, the taper of the corner wall 2308 relative to the front wall 2304 and the side wall 2306 is approximately 45°, so the field of view of the cameras and sensors of the imaging component sufficiently overlap with the gaming table, such that the cameras and sensors may capture image data of the chips positioned on the gaming table, such as the chips used to make a bet. As another example, the viewing angle of the cameras and sensors of the imaging components of a table monitoring subsystem has a different viewing angle (e.g. about 120°). In this example, the taper of the corner wall 2308 relative to the front wall 2304 and the side wall 2306 be such that the field of view of the cameras and sensors of the imaging component sufficiently overlap and cover the chips positioned on the gaming table.

The chip tray 2300 is mountable to a gaming table. In some embodiments, the chip tray 2300 may be fastened to one or more sides of the gaming table using fasteners such as screws, nuts and bolts, and the like. In some embodiments, the gaming table may be manufactured or cut such that the gaming table has walls that define a shape and geometry generally similar to the shape and geometry of the body of the chip tray 2300, such that when the chip tray 2300 is mounted to the gaming table, the rear wall 2310 is generally flush with one or more walls of the gaming table.

In some embodiments, the game table may comprise a recess having a shape and geometry generally similar to the shape and geometry of the chip tray 2300, such that the recess may receive the chip tray 2300 therein.

In some embodiments, the body of the chip tray 2300 defines a recess 2312 at the front of the chip tray 2300, as depicted in FIG. 23A. In some embodiments, the recess 2312 may receive a display, wires, cables, and circuits of a table monitoring subsystem that is positionable on the chip tray 2300.

In some embodiments, the chip tray 2300 comprises a lip 2314 around at least a portion of the perimeter of the chip tray. As depicted in FIG. 23A, the chip tray 2300 comprises lip 2314 extend along the side walls 2306 and the rear wall 2310. When the chip tray 2300 is mounted to the gaming table, the lip 2314 may rest on the surface of the gaming table to support the chip tray 2300 against the gaming table.

As depicted in FIG. 23A, the corner wall 2308 extends into one or more of the channels 2302, such that chips may not be received in the portion of the channels 2302 that the corner wall 2308 extends into. In some embodiments, the chip tray 2300 comprises one or more filler blocks 2316 for filling the space of the channels 2308 where chips cannot be received.

In some embodiments, the chip tray comprises a tray imaging component configured to capture image data corresponding to chips in the channels of the chip tray. In some embodiments, the tray imaging component comprises a time of flight sensor, a camera, a flatbed scanner, or a combination thereof. In some embodiments, the table monitoring subsystem comprises the tray imaging component configured to capture image data corresponding to chips in the channels of the chip tray. In some embodiments, the tray imaging component is a component of both the table monitoring subsystem and the chip tray.

FIG. 24A to 24H depict an example chip tray 2400 according to some embodiments. The chip tray 2400 is generally similar to the chip tray 2300 as depicted in FIG. 23A, except the chip tray 2400 has a generally rectangular shape. The chip tray 2400 comprises a body defining one or more channels 2402 for receiving chips 2416.

Figure 24A:
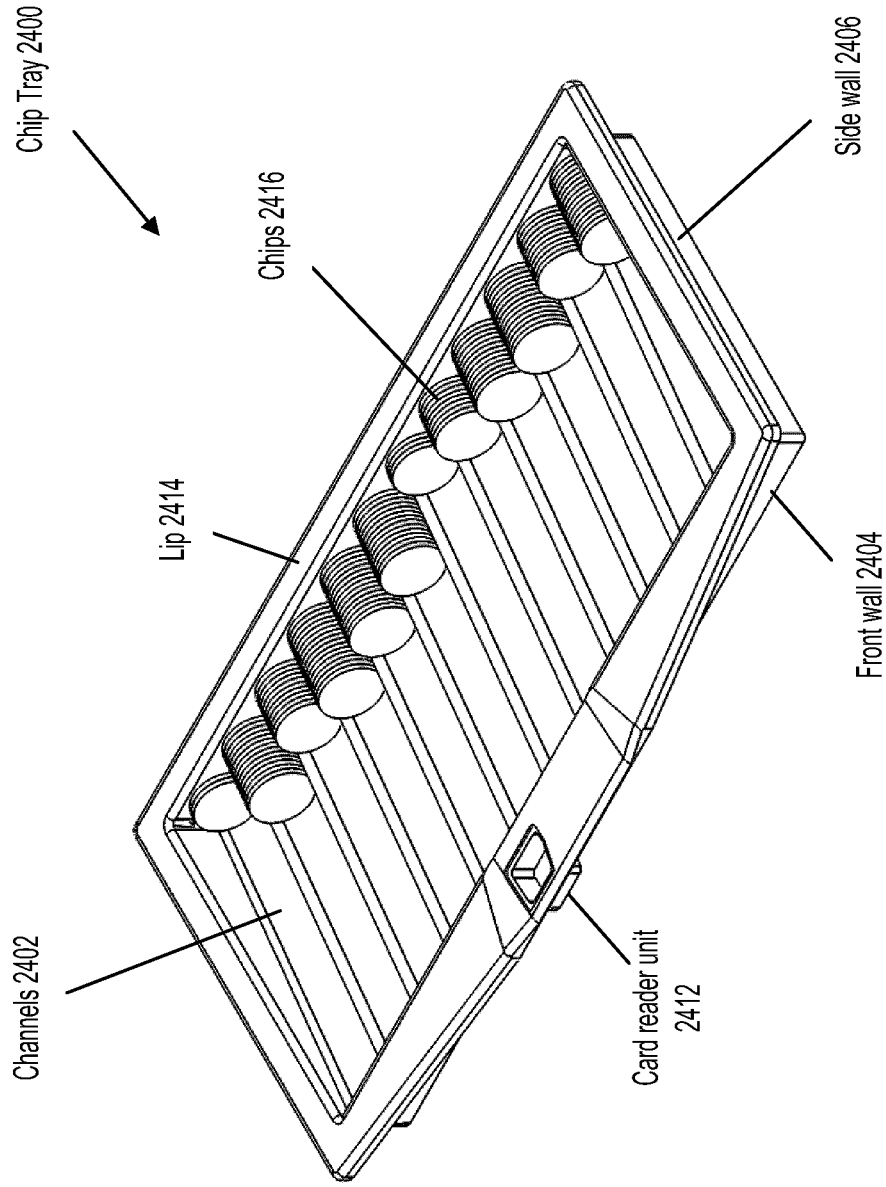
FIG. 24A illustrates a perspective view of another example chip tray according to some embodiments.
Figure 24B:
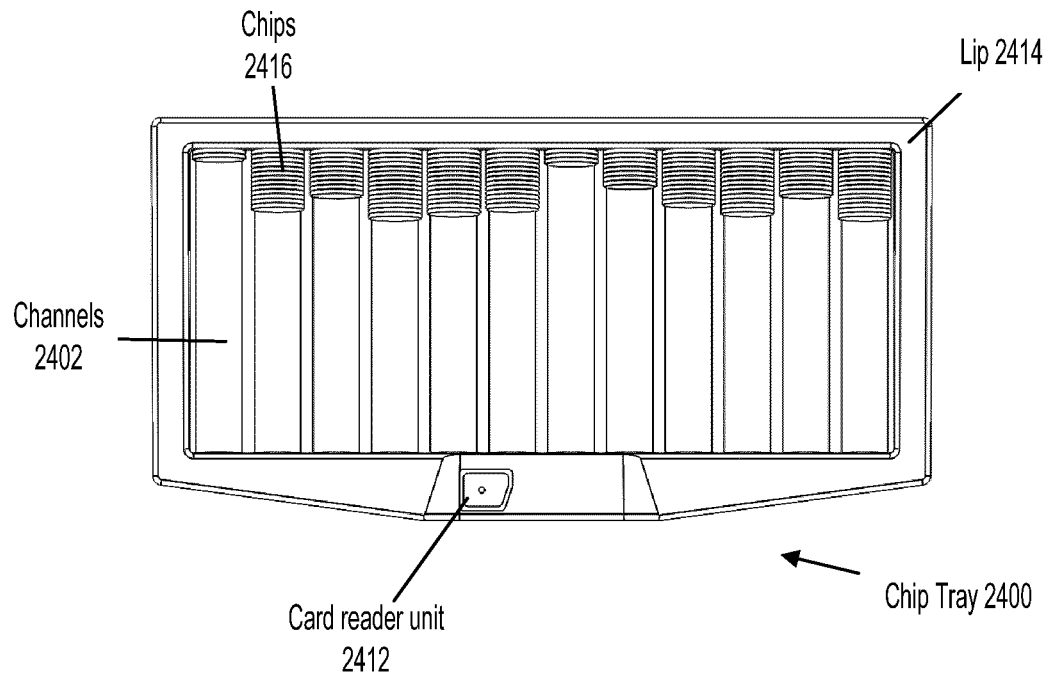
FIG. 24B illustrates a top view of the chip tray of FIG. 24A according to some embodiments.

The body of the chip tray 2400 further defines a front wall 2404, a side wall 2406, and a rear wall 2410. As depicted in FIG. 24A, unlike chip tray 2300, chip tray 2400 does not have a corner wall that is tapered relative to the front wall 2404 and the side wall 2406.

In some embodiments, the shape and geometry of the chip tray 2400, defined in part by the front wall 2404, side wall 2406, and rear wall 2410, may be complementary to a table monitoring subsystem that may be positionable on the chip tray 2400.

The geometry and shape of the chip tray 2400 is a function, in part, of the game being played on the gaming table, the viewing angle of the cameras and sensors of the imaging component of a table monitoring subsystem positionable on the chip tray 2400, and the shape of the gaming table itself. The geometry and shape of the chip tray 2400 is such that the imaging components of a table monitoring subsystem positionable on the chip tray 2400 may capture image data of chips positioned at all relevant areas of the gaming table (e.g. betting areas). In some embodiments, the accuracy of the generated table monitoring data is improved if the image data captured by the table monitoring subsystem is of the centre of the chips. Further, the geometry and shape of the chip tray 2400 is such that the imaging components of a table monitoring subsystem, when positioned on the chip tray 2400, appear complementary to the geometry and shape of the chip tray 2400.

Similar to the chip tray 2300, the chip tray 2400 is mountable to a gaming table. In some embodiments, the chip tray 2400 may be fastened to one or more sides of the gaming table using fasteners such as screws, nuts and bolts, and the like.

Similar to the chip tray 2300, in some embodiments, the chip tray 2400 comprises a lip 2414 around at least a portion of the perimeter of the chip tray. As depicted in FIG. 24A, the chip tray 2400 comprises lip 2414 extend along the front wall 2404, side walls 2406 and the rear wall 2410. When the chip tray 2400 is mounted to the gaming table, the lip 2414 may rest on the surface of the gaming table to support the chip tray 2400 against the gaming table.

In some embodiments, as depicted in FIG. 24A, the chip tray 2400 comprises a card reader unit 2412 similar to card reader unit 606 as described herein.

In some embodiments, one or more time of flight sensors 2418 is configured to capture image data corresponding to the chips 2416 in the channel 2402. The time of flight sensors 2418 are mounted to the front wall 2404 of the chip tray 2400. As depicted in FIG. 24H, the time of flight sensor 2418 is mounted at an angle generally similar to the angle of the slant of the channel 2402, such that the laser emitted from the time of flight sensor 2418 is parallel to the longitudinal axis of the channel 2402.

Figure 24C:
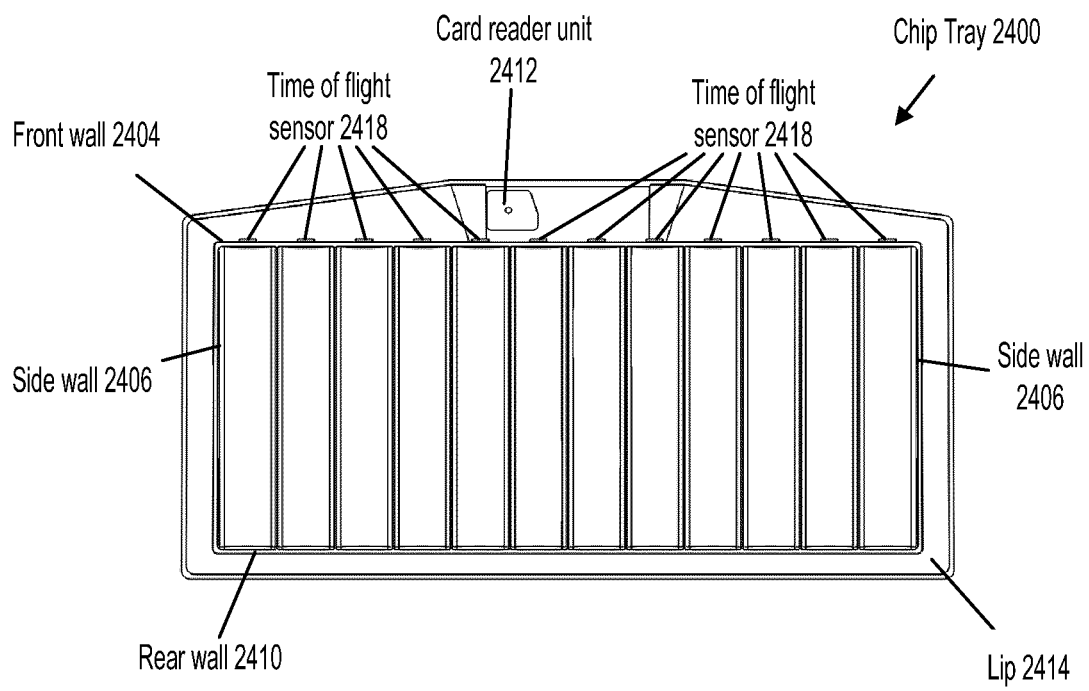
FIG. 24C illustrates a bottom view of the chip tray of FIG. 24A according to some embodiments.
Figure 24D:
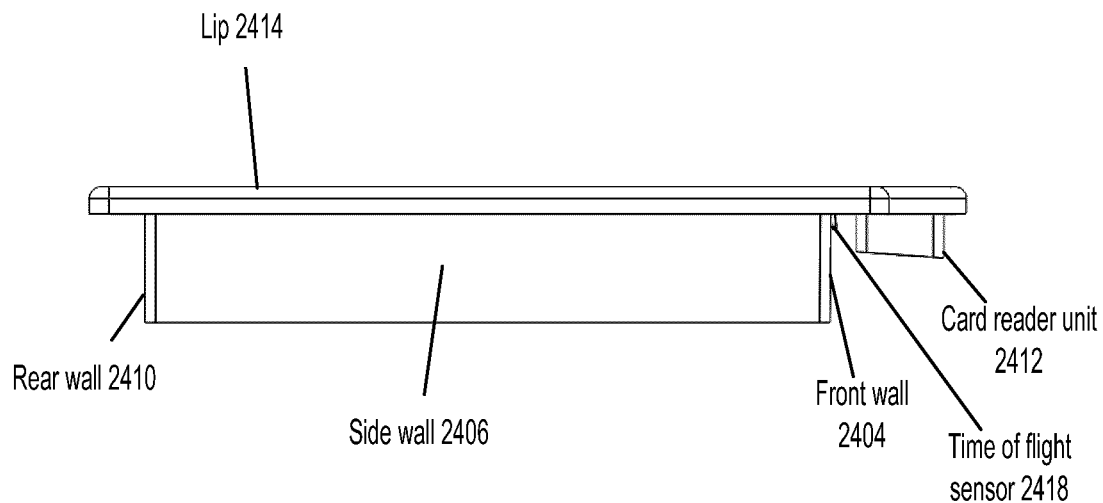
FIG. 24D illustrates a left view of the chip tray of FIG. 24A according to some embodiments.
Figure 24E:
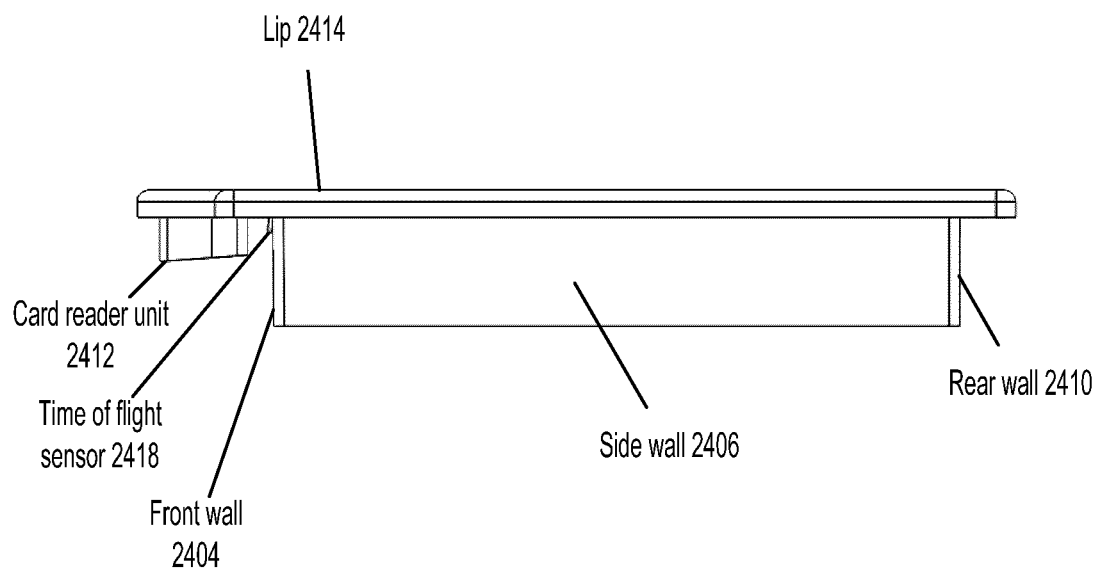
FIG. 24E illustrates a right view of the chip tray of FIG. 24A according to some embodiments.
Figure 24F:
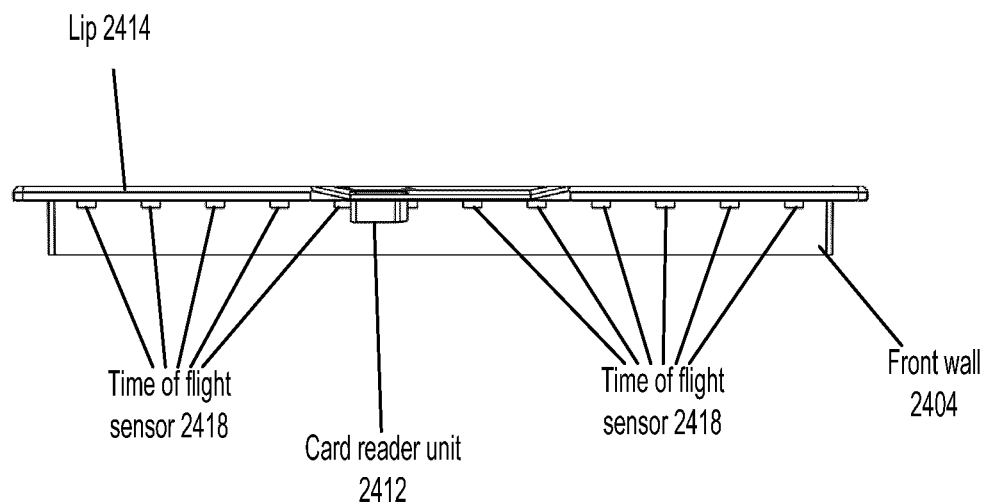
FIG. 24F illustrates a front view of the chip tray of FIG. 24A according to some embodiments.
Figure 24G:
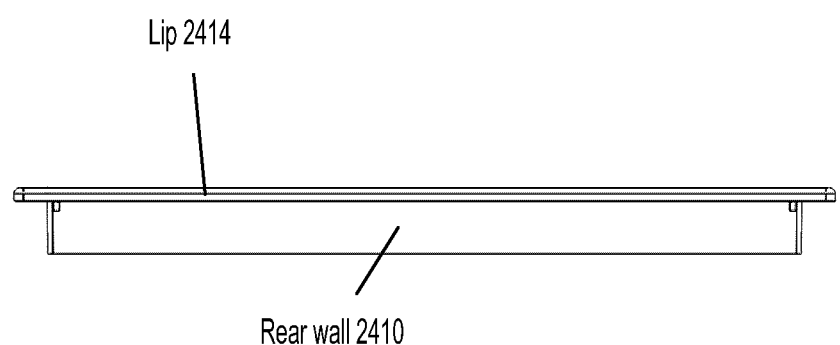
FIG. 24G illustrates a back view of the chip tray of FIG. 24A according to some embodiments.
Figure 24H:
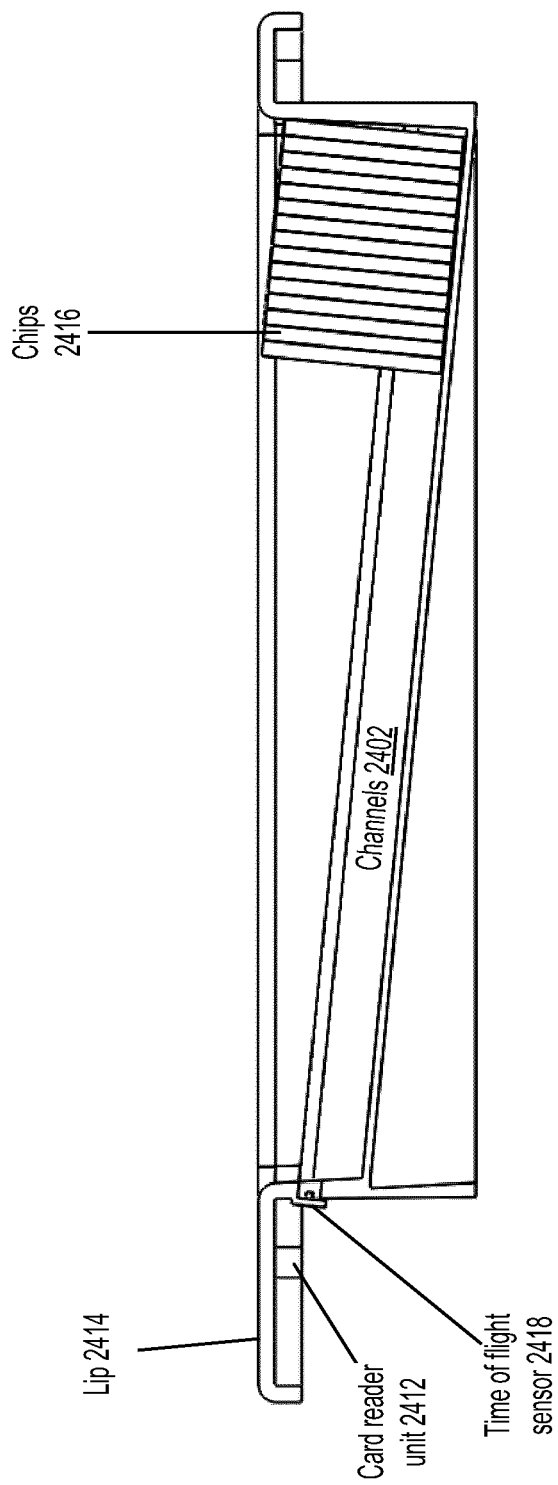
FIG. 24H illustrates a cross-sectional view of the chip tray of FIG. 24A according to some embodiments.

As depicted in FIG. 24C and FIG. 24F, one time of flight sensor 2418 may capture image data for each channel 2402 of the chip tray 2400.

In some embodiments, the one or more time of flight sensors 2418 is configured to capture image data corresponding to the amount of chips 2416 in the channel 2402. Each of the time of flight sensor 2418 may determine the depth of its corresponding channel 2402. The depth of the channel 2402, ρ, is calculated at time T with electromagnetic radiation at light speed c, is ρ=cτ. The transmitter emits radiation, which travels towards the scene and is then reflected back by the surface to the sensor receiver. The distance covered is now 2p at time τ. The relationship can be written as:

$$p = \frac{c\tau}{2}$$

The data captured by the time of flight sensor 2418 may be transmitted to the game monitoring server 104 to determine a first depth of the channel 2402, which may or may not have chips 2416 already stacked therein. Similarly, as chips 2416 are placed in or removed from the channel 2402, the time of flight sensor 2418 may make a measurement to determine a second depth of the channel 2402, and transmit the data to the game monitoring server 104. As chips 2416 have been placed in or removed from the channel 2402, the game monitoring server 104 may determine that the second depth of the channel 2402 is different from the first depth of the channel 2402, and may calculate a difference between the first depth of the channel 2402 and the second depth of the channel 2402. The thickness of each chip 2416 may be predefined for the game monitoring server 104, or the game monitoring server 104 may be calibrated to determine the thickness of each chip 2416. Accordingly, the game monitoring server 104 may determine that a number of chips 2416 have been placed in or removed from the channel 2402. Further details on the data captured by the time of flight sensor 2418 and the game monitoring server 104 for calculating depth of chips is described in U.S. patent application Ser. No. 15/309,102 and PCT Application No. PCT/CA2016/050442, the entire contents of which are hereby incorporated by reference.

In some embodiments, the game monitoring server 104 may determine when a dealer has placed their hand in the channel 2402 of the chip tray 2400. While the dealer may place chips 2416 in the channel 2402 or remove chips 2416 from the channel 2402 regularly as games are being played at the gaming table, over a period of time, the number of chips 2416 in the channel 2402 does not change. For example, while the game is ongoing, no chips 2416 are placed in or removed from the channel 2402, so the game monitoring server 104 should determine that, based on the data from the time of flight sensor 2418 transmitted to the game monitoring server 104 during a game, the number of chips 2416 in the channel 2402 does not change. Similarly, after a game is over and additional chips 2416 are placed in or removed from the channel 2402, the game monitoring server 104 may determine that the number of chips 2416 in the channel 2402 has changed, but expects that the number of chips 2416 to remain constant for a period of time (e.g. another game is ongoing). However, as a dealer places their hand in the channel 2402 to place in or remove chips 2416, the data captured by the time of flight sensor 2418 may be noisy, as the dealer's hand is not relatively flat and even like a chip 2416. In some embodiments, the game monitoring server 104 may associate that noisy data with a metatag, indicating that a dealer may have placed their hand in the channel 2402 of the chip tray 2400. Based on the noisy data, the data captured before the noisy data (indicative of a first number of chips 2416 in the channel 2402), and the data captured after the noisy data (indicative of a second number of chips 2416 in the channel 2402), the game monitoring server 104 may determine that the dealer placed chips 2416 in or removed chips 2416 from the channel 2402 of the chip tray 2400.

In some embodiments, the game monitoring server 104 may log dealer events based on processing the image data from the time of flight sensors 2418. The image data from each time of flight sensor 2418 may correspond to changes in the number of chips 2416 in the respective channel 2402. Where there is a change in the number of chips 2416 in the channel 2402, the game monitoring server 104 may associate the image data corresponding to a change in the number of chips 2416 in the channel 2402 with a dealer event. For example, where the game monitoring server 104 determines that there has been a decrease in the number of chips 2416 in a particular channel 2402, the game monitoring server 104 may associate the data corresponding to this change with a metatag, indicating that a dealer removed one or more chips from the particular channel 2402. As another example, where the game monitoring server 104 determines that there has been an increase in the number of chips 2416 in a particular channel 2402, the game monitoring server 104 may associate the data corresponding to this change with a metatag, indicating that a dealer added one or more chips from the particular channel 2402. Logging dealer events may assist in rectifying and validating table monitoring activities, such as dealer payouts, wins, denomination exchanging events, buy ins, and walk withs.

In some embodiments, for each channel 2402 of the chip tray 2400, an emitter, such as a laser emitter, may be mounted to the front wall 2404 of the chip tray 2400, and a sensor may be mounted on the rear wall 2410 of the chip tray 2400. The sensor may detect less of the laser based on how many chips 2416 are in the channel 2402. The data corresponding to the amount of radiation detected by the sensor may be transmitted to the game monitoring server 104 to determine the number of chips 2416 in the tray 2400.

In some embodiments, the tray imaging component comprises a camera positioned at a front end of a chip tray for detecting image data corresponding to chips in the channel of a chip tray. The camera may be mounted on the front end of the chip tray, such that the field of view of the camera overlaps at least one channel of the chip tray.

As discussed herein, time of flight sensors may be mounted to a front wall of a chip tray for detecting the depth of chips and the number of chips in a channel of a tray. In some embodiments, both a camera and a time of flight sensor may be mounted to a chip tray.

FIG. 25A to 25G depict an example time of fight sensor and camera assembly 2500 according to some embodiments. The assembly 2500 may be used to retrofit an existing chip tray with a camera and a time of flight sensor.

As depicted by the hashed and solid lines of FIG. 25A to FIG. 25G, the assembly 2500 comprises at least one time of flight sensor 2502 and a tray monitoring camera 2504. In some embodiments, the assembly 2500 may comprise more than one time of flight sensor 2502, based on the view angle of the camera 2504. For example, where the view angle of the camera 2504 is approximately 90°, the assembly 2500 may have two or three time of flight sensors 2502.

Figure 25A:
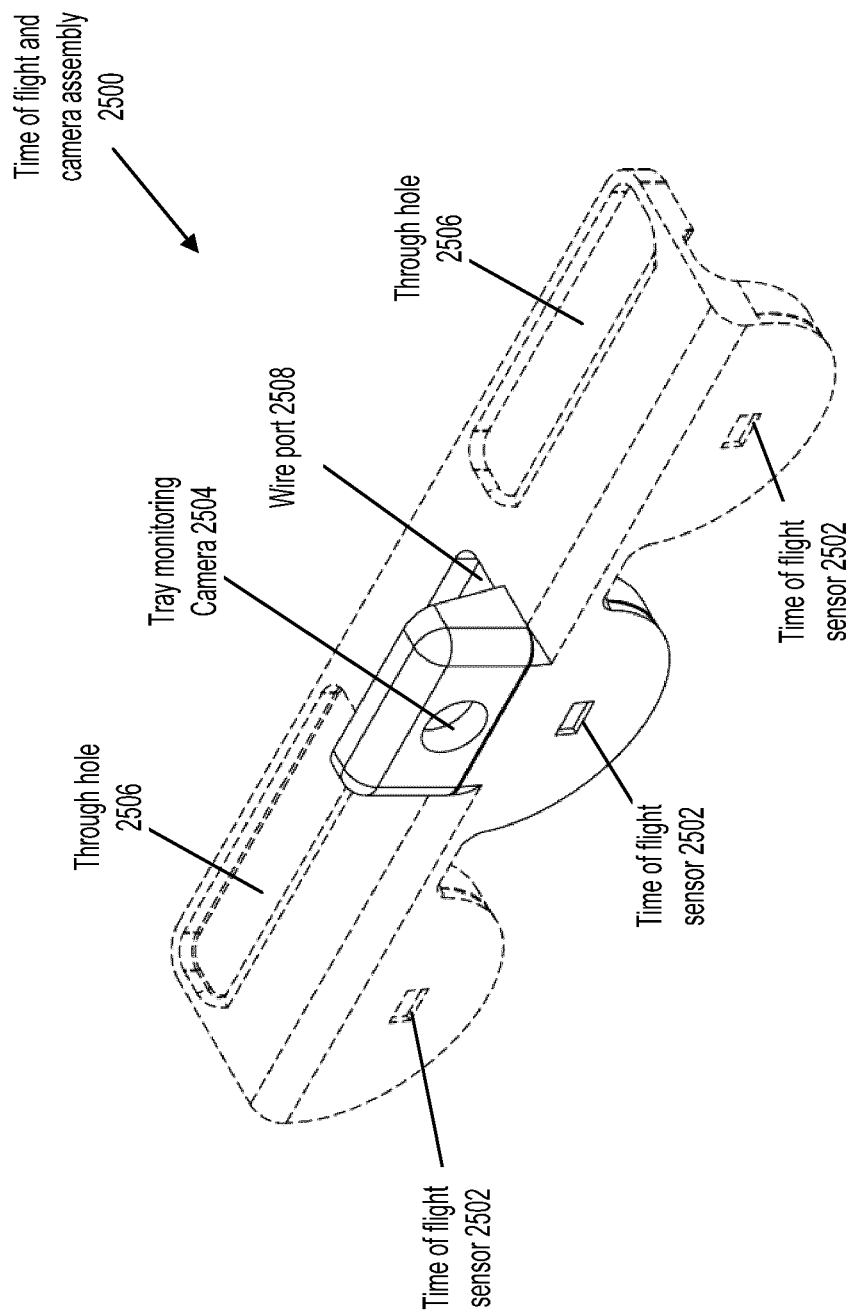
FIG. 25A illustrates a perspective view of a time of flight camera assembly according to some embodiments.
Figure 25B:
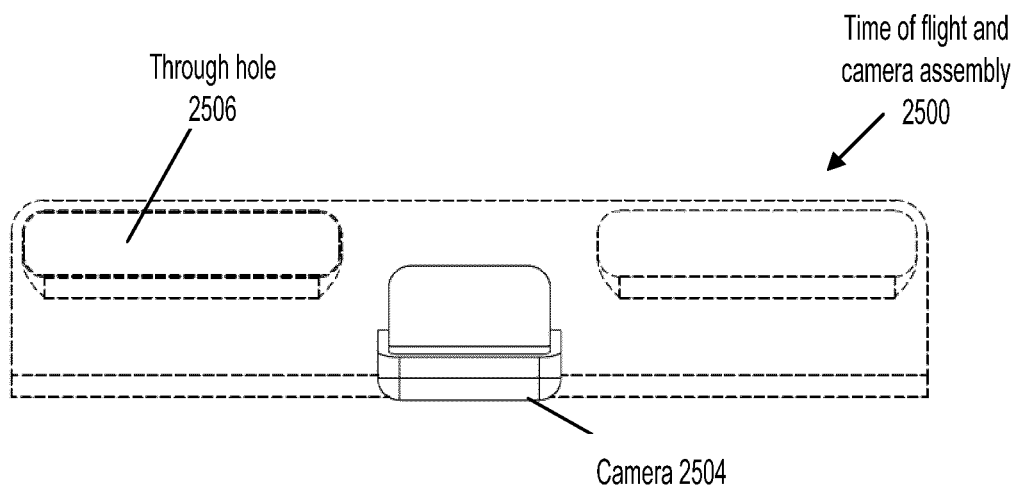
FIG. 25B illustrates a top view of the time of flight camera assembly of FIG. 25A according to some embodiments.
Figure 25C:
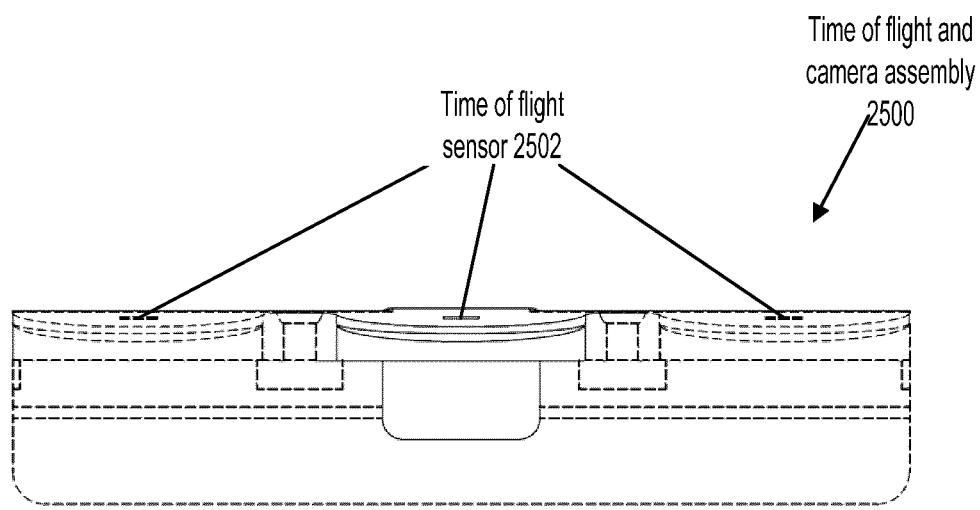
FIG. 25C illustrates a bottom view of the time of flight camera assembly of FIG. 25A according to some embodiments.
Figure 25D:
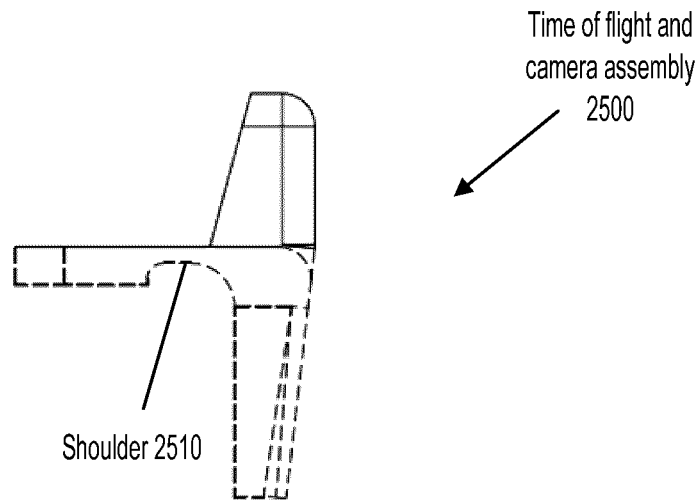
FIG. 25D illustrates a left view of the time of flight camera assembly of FIG. 25A according to some embodiments.
Figure 25E:
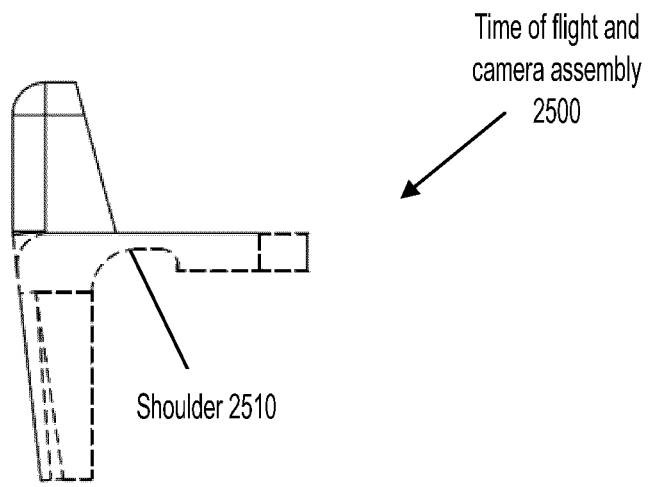
FIG. 25E illustrates a right view of the time of flight camera assembly of FIG. 25A according to some embodiments.
Figure 25F:
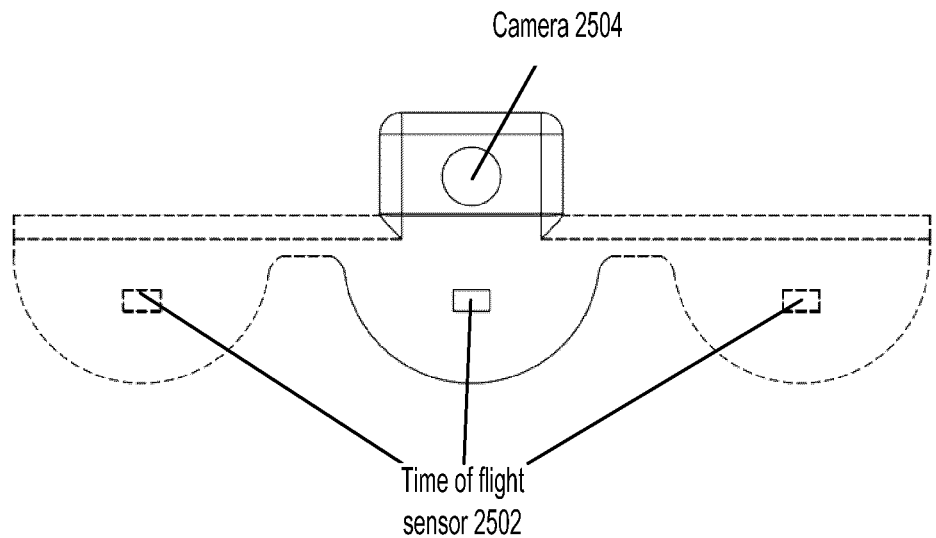
FIG. 25F illustrates a front view of the time of flight camera assembly of FIG. 25A according to some embodiments.

The assembly 2500 comprise a throughhole 2506 for mounting the assembly 2500 to a chip tray. As depicted in FIG. 25A, the assembly 2500 comprises two throughholes 2506. The assembly 2500 may be mounted to a chip tray using fasteners such as screws, nuts and bolts, and the like. The assembly 2500 may also be mounted to the chip tray using magnets.

In some embodiments, the assembly 2500 comprises one or more wire ports 2508 for guiding wires, cables, circuits, and the like, therethrough, such that the wires, cables and circuits are organized.

To mount the assembly 2500 to the chip tray, the assembly 2500 comprises a shoulder 2510 having a shape and geometry similar to the shape and geometry of a lip of the chip tray (e.g. the lip extending along a front wall of the chip tray), such that the shoulder 2510 may receive the lip and the assembly 2500 may rest along the front wall of the chip tray to direct the one or more time of flight sensors 2502 towards the channel of the chip tray and to direct the field of view of the camera 2504 towards the channels of the chip tray.

Figure 25G:
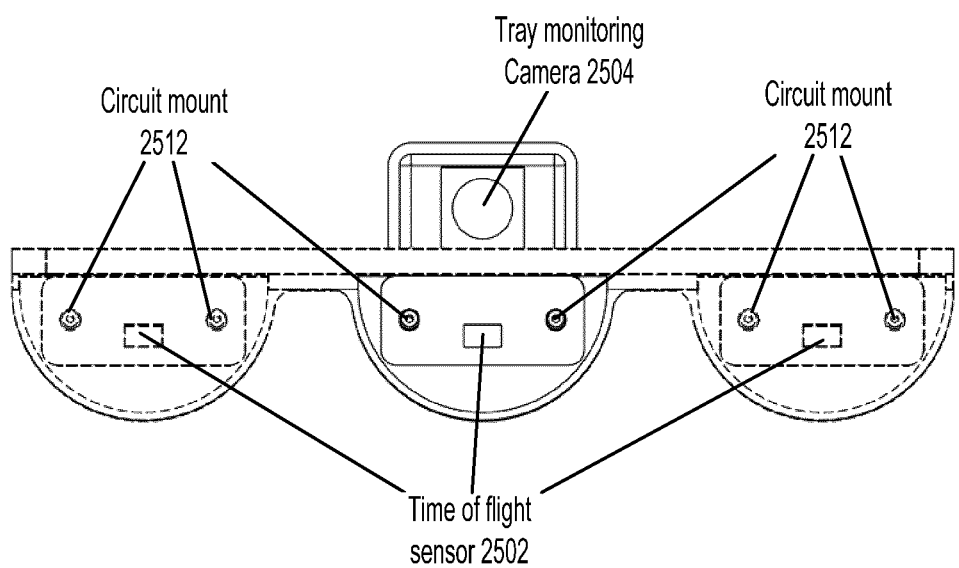
FIG. 25G illustrates a back view of the time of flight camera assembly of FIG. 25A according to some embodiments.

As depicted in FIG. 25G, the assembly 2500 comprises circuit mounts 2512 on the back side of the assembly 2500. In some embodiments, the circuit mounts 2512 may be used to mount the time of flight sensors, or may be used to mount the printed circuit board of the time of flight sensor, to the assembly 2500.

Figure 26A:
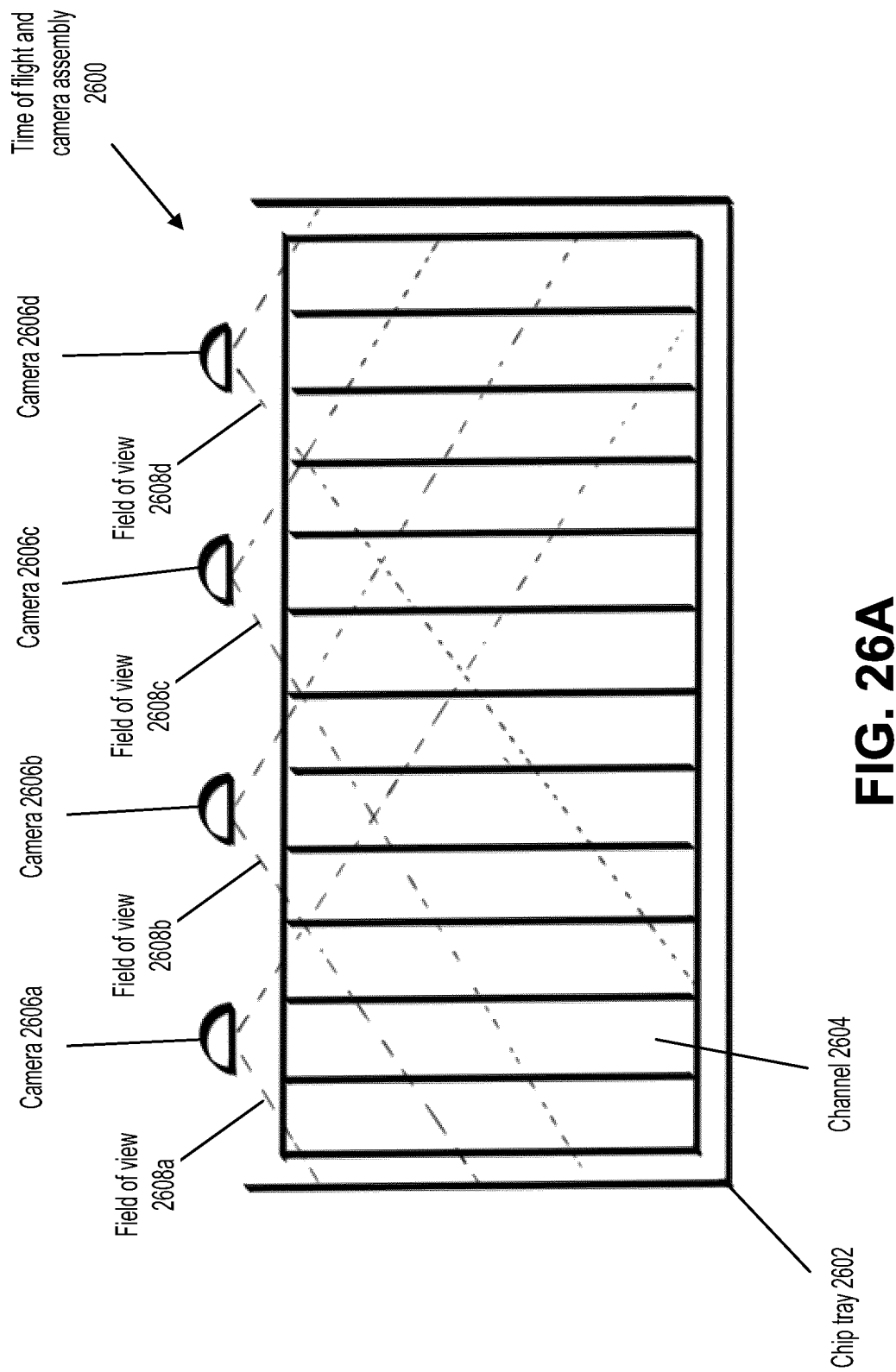
FIGS. 26A-26C illustrate schematic diagrams of a chip tray having a retrofit with time of flight and camera assemblies according to some embodiments.
Figure 26B:
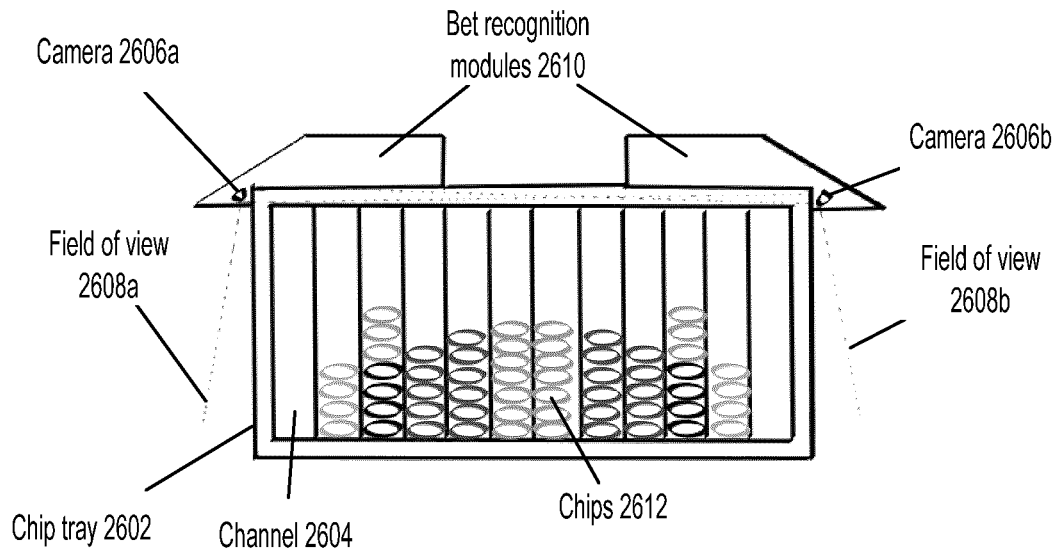
Figure 26C:
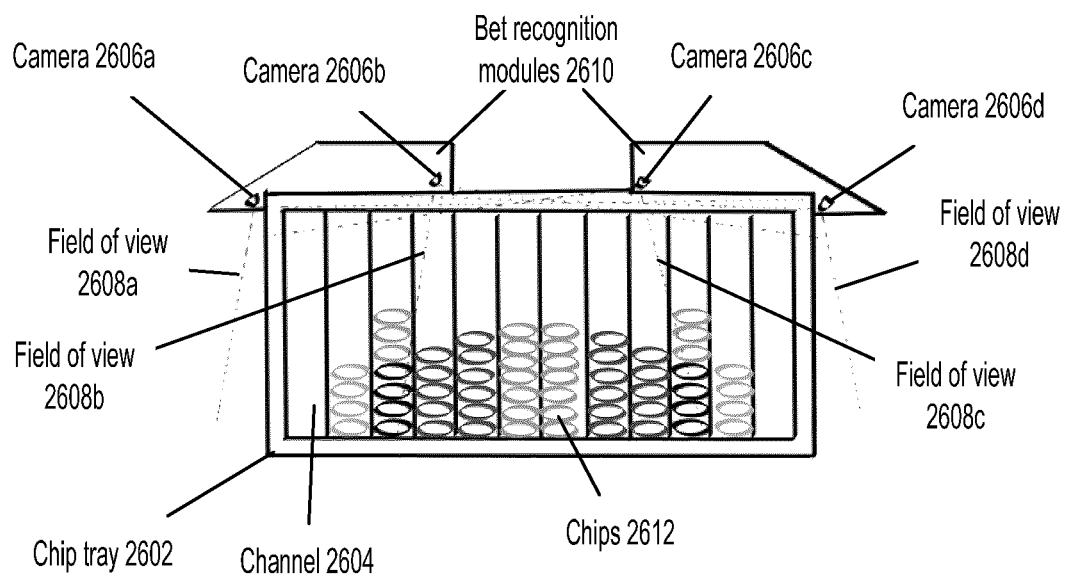

FIGS. 26A-26C illustrate schematic diagrams of a chip tray 2602 having a plurality of channels 2604 retrofit with time of flight and camera assemblies 2600 according to some embodiments. FIG. 26A depicts that the chip tray 2602 has 12 channels 2604, and four time of flight and camera assemblies 2600 are retrofit to the chip tray 2602. In some embodiments, the tray monitoring cameras 2606 and the time of flight sensors may be separately mounted to the chip tray 2602, and not as an assembly 2600.

As depicted in FIG. 26A, the fields of view 2608*a*, 2608*b*, 2608*c*, and 2608*d* of the cameras 2606*a*, 2606*b*, 2606*c*, and 2606*d* substantially overlap with the channels 2604 of the chip tray 2602. Accordingly, the image data captured by the cameras 2606*a*, 2606*b*, 2606*c*, and 2606*d* corresponds to all chips that may be placed in or removed from the tray 2602.

In some embodiments, the cameras of the tray imaging component may be mounted on a bet recognition module of a table monitoring subsystem. FIG. 26B depicts two cameras 2606*a* and 2606*b* mounted to bet recognition modules 2610 of a table monitoring subsystem. While the cameras and emitters of the bet recognition modules 2610 may be directed to the gaming table for monitoring bets of players, the tray monitoring cameras 2606*a* and 2606*b* of the tray imaging component may be directed towards the chip tray 2602 for monitoring the chips 2612 in the chip tray 2602.

Similar to FIG. 26A, the fields of view 2608*a* and 2608*b* of the cameras 2608*a* and 2608*b* as depicted in FIG. 26B substantially overlap with the channels 2604 of the chip tray 2602 for monitoring the chips 2612 in the chip tray 2602. Accordingly, the image data captured by the 2608*a* and 2608*b* corresponds to all chips that may be placed in or removed from the tray 2602.

FIG. 26B depicts four cameras 2606a, 2606b, 2606c, and 2606d mounted to bet recognition modules 2610 of a table monitoring subsystem. While the cameras and emitters of the bet recognition modules 2610 may be directed to the gaming table for monitoring bets of players, the tray monitoring cameras 2606a, 2606b, 2606c, and 2606d of the tray imaging component may be directed towards the chip tray 2602 for monitoring the chips 2612 in the chip tray 2602.

As depicted in FIG. 26C, the fields of view 2608a, 2608b, 2608c, and 2608d of the cameras 2606a, 2606b, 2606c, and 2606d substantially overlap with the channels 2604 of the chip tray 2602. Accordingly, the image data captured by the cameras 2606a, 2606b, 2606c, and 2606d corresponds to all chips that may be placed in or removed from the tray 2602.

In some embodiments, by capturing image data from more cameras 2606, it may reduce the complexity of the processing by the game monitoring server 104 to generate table monitoring data.

As depicted in FIG. 26A to FIG. 26C, the cameras 2606 are spaced evenly apart relative to the chip tray 2602. This may improve the symmetry of the images captured by the cameras 2606, which may reduce the complexity of the processing by the game monitoring server 104 to generate table monitoring data.

When the tray monitoring camera 2504 or 2606 is mounted to the chip tray, for example, by mounting the camera 2504 or 2606 itself to the chip tray or using the time of flight and camera assembly 2500, the camera 2504 or 2606 is positioned at a height above the channel of the chip tray and the chips received in the channel. This height of the camera 2504 or 2606 height above the channel of the chip tray and the chips is determined in part by the angle of the channel within the chip tray, such that the camera 2504 or 2606 can capture image data of the side of the chips in the channels 2604 of the chip tray 2602.

In some embodiments, the image data captured by the tray monitoring camera 2504 or 2606 corresponds to the side surface of the chips in the channel of the chip tray. For example, the image data captured by the tray monitoring camera 2504 or 2606 of the chips placed in the channel directly in front of the camera 2504 or 2606 corresponds to the visible side of the chips facing the camera 2504 or 2606. From the perspective of the camera 2504 or 2606, the image data captured by the camera 2504 or 2606 may correspond to chips that appear to be placed along a generally straight axis extending from the front side of the tray to the rear side of the tray, such that the image data for the chips extend along the straight axis. For a channel that is not directly in front of the camera 2504 or 2606 (i.e. offset from the camera 2504 or 2606), from the perspective of the camera 2504 or 2606, the image data captured by the camera 2504 or 2606 may correspond to chips that appear to be placed along a diagonal axis, such that the image data for the chips extend along the diagonal axis. The image data corresponding to chips stacked in a channel that is not directly in front of the camera 2504 or 2606 may be pre-processed by rotating the image data about the diagonal axis so that it extends along an axis parallel to the straight axis.

Details on the image processing conducted by the game monitoring server 104 based on image data captured by the tray monitoring camera 2504 or 2606 for calculating depth of chips, chip recognition, and chip counting is described in U.S. patent application Ser. No. 15/309,102 and PCT Application No. PCT/CA2016/050442, the entire contents of which are hereby incorporated by reference.

FIG. 27A to 27H depict an example chip tray 2700 according to some embodiments. The chip tray 2700 is generally similar to the chip tray 2400 as depicted in FIG. 24A, except the chip tray 2700 comprises a flatbed scanner for capturing image data corresponding to chips in channel 2702 of the chip tray 2700.

Figure 27A:
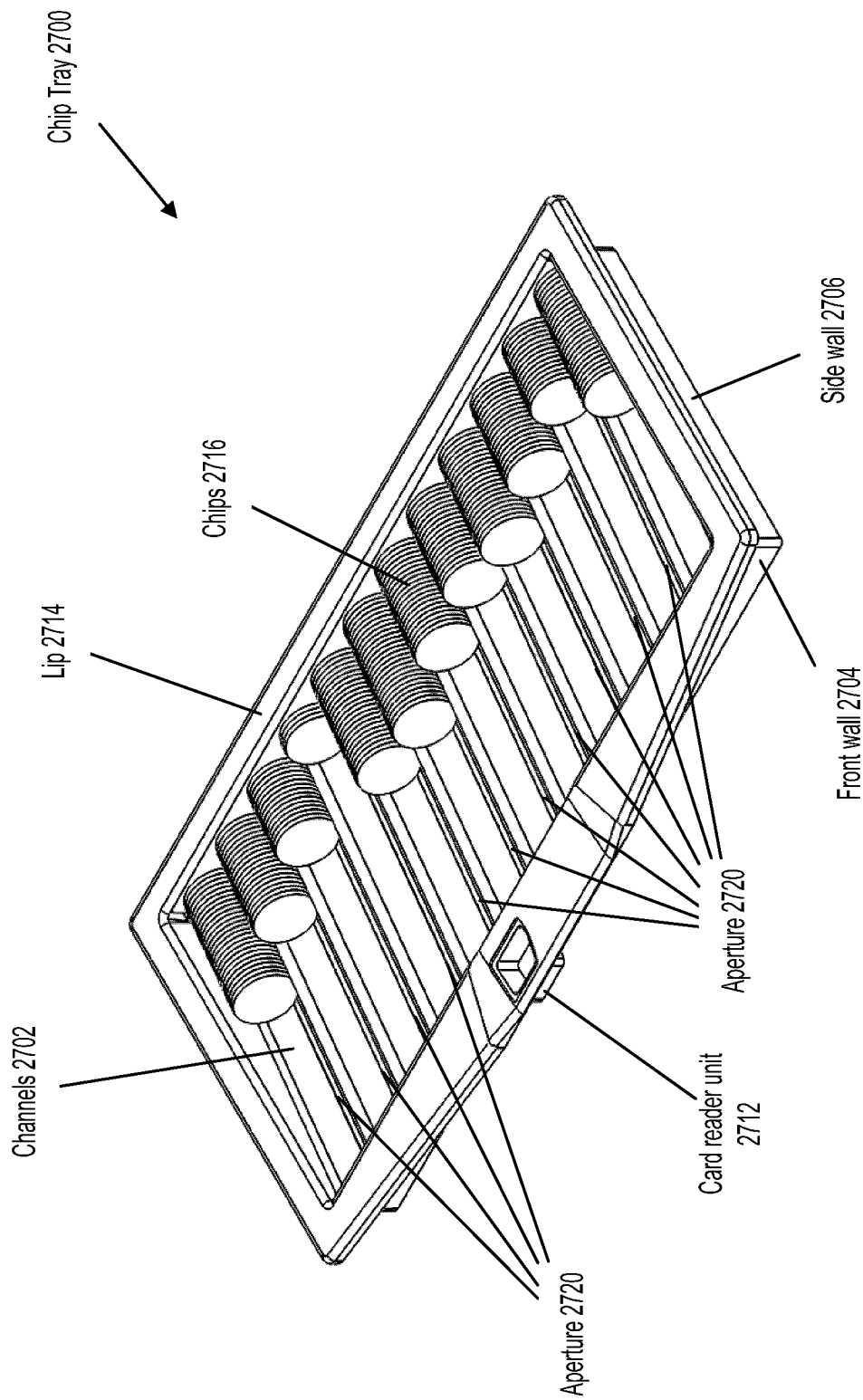
FIG. 27A illustrates a perspective view of another example chip tray according to some embodiments.
Figure 27B:
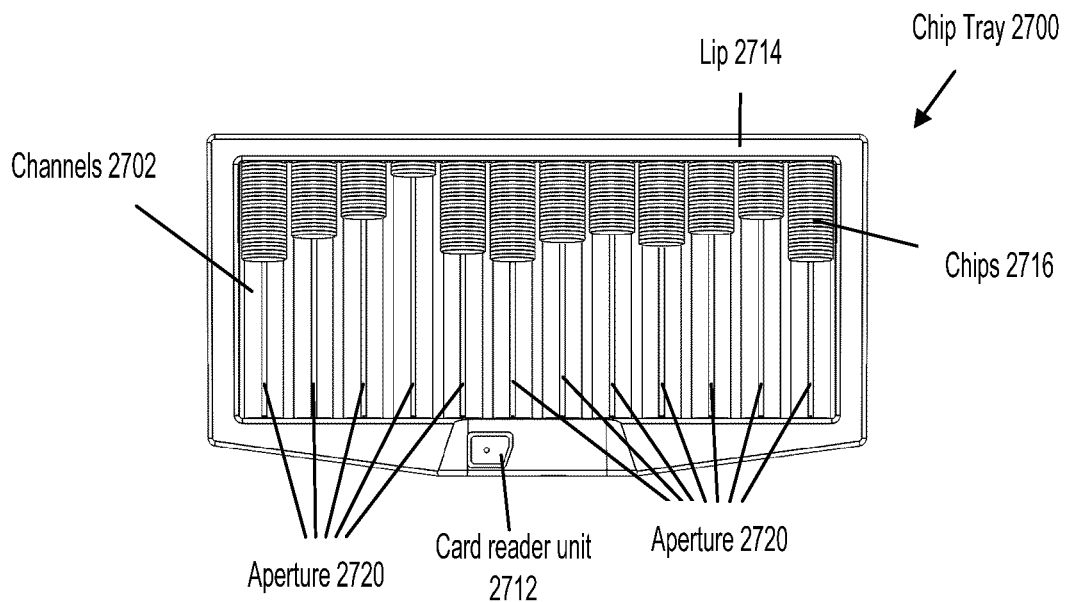
FIG. 27B illustrates a top view of the chip tray of FIG. 27A according to some embodiments.

The body of the chip tray 2700 defines a front wall 2704, a side wall 2706, and a rear wall 2710. As depicted in FIG. 27A, unlike chip tray 2300, chip tray 2700 does not have a corner wall that is tapered relative to the front wall 2704 and the side wall 2706.

In some embodiments, the shape and geometry of the chip tray 2700, defined in part by the front wall 2704, side wall 2706, and rear wall 2710, may be complementary to a table monitoring subsystem that may be positionable on the chip tray 2700.

The geometry and shape of the chip tray 2700 is a function, in part, of the game being played on the gaming table, the viewing angle of the cameras and sensors of the imaging component of a table monitoring subsystem positionable on the chip tray 2700, and the shape of the gaming table itself. The geometry and shape of the chip tray 2700 is such that the imaging components of a table monitoring subsystem positionable on the chip tray 2700 may capture image data of chips positioned at all relevant areas of the gaming table (e.g. betting areas). In some embodiments, the accuracy of the generated table monitoring data is improved if the image data captured by the table monitoring subsystem is of the centre of the chips. Further, the geometry and shape of the chip tray 2700 is such that the imaging components of a table monitoring subsystem, when positioned on the chip tray 2700, appear complementary to the geometry and shape of the chip tray 2700.

Similar to the chip tray 2300, the chip tray 2700 is mountable to a gaming table. In some embodiments, the chip tray 2700 may be fastened to one or more sides of the gaming table using fasteners such as screws, nuts and bolts, and the like.

Similar to the chip tray 2400, in some embodiments, the chip tray 2700 comprises a lip 2714 around at least a portion of the perimeter of the chip tray. As depicted in FIG. 27A, the chip tray 2700 comprises lip 2714 extend along the front wall 2704, side walls 2706 and the rear wall 2710. When the chip tray 2700 is mounted to the gaming table, the lip 2714 may rest on the surface of the gaming table to support the chip tray 2700 against the gaming table.

In some embodiments, as depicted in FIG. 27A, the chip tray 2700 comprises a card reader unit 2712 similar to card reader unit 606 as described herein.

Figure 27C:
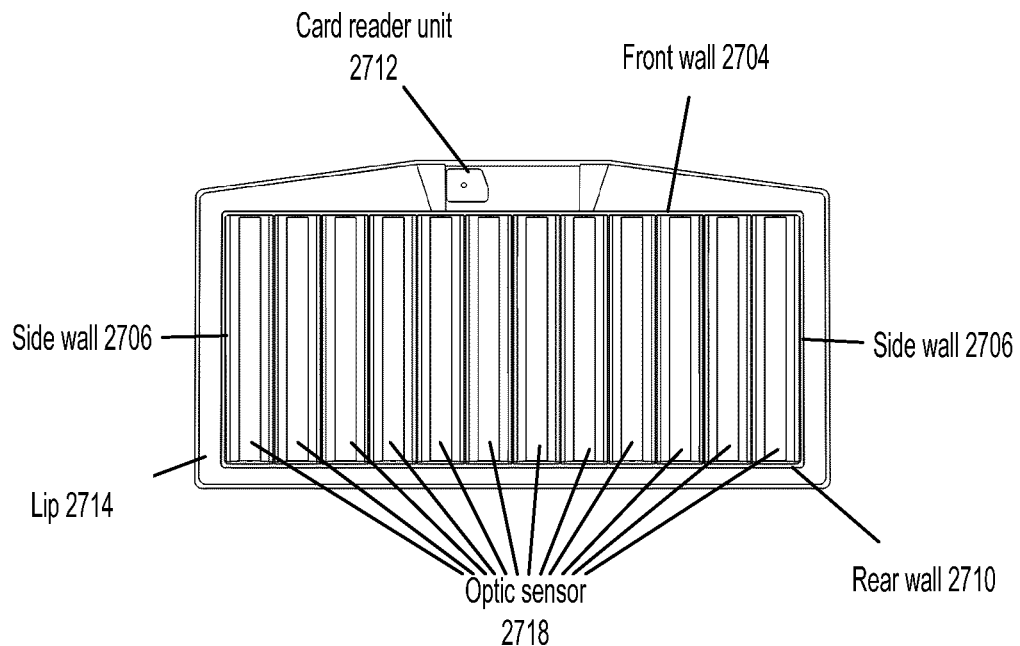
FIG. 27C illustrates a bottom view of the chip tray of FIG. 27A according to some embodiments.
Figure 27D:
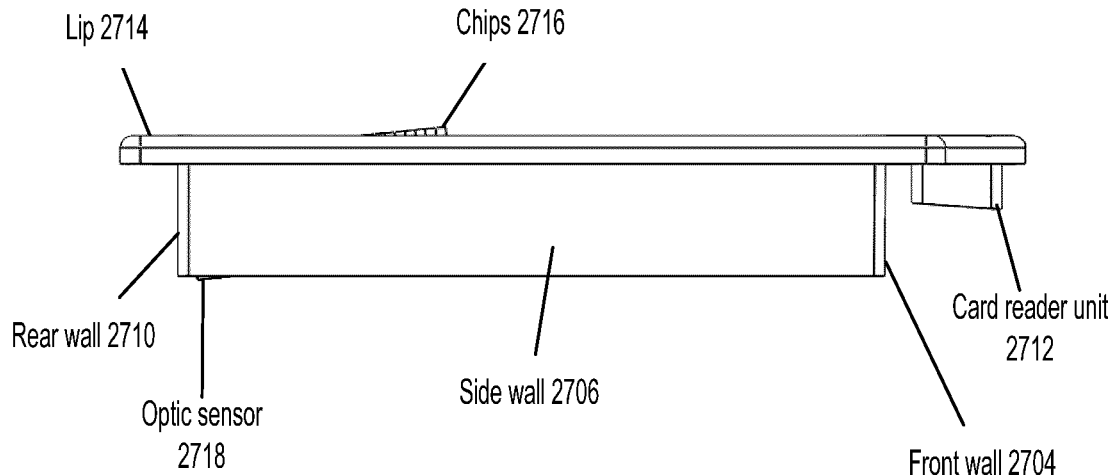
FIG. 27D illustrates a left view of the chip tray of FIG. 27A according to some embodiments.
Figure 27E:
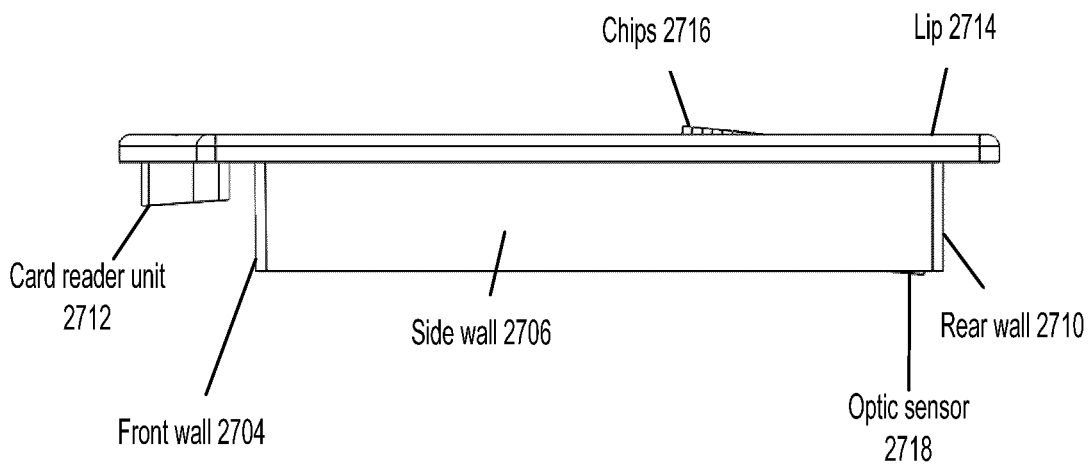
FIG. 27E illustrates a right view of the chip tray of FIG. 27A according to some embodiments.

In some embodiments, one or more optic sensors 2718 are configured to capture image data corresponding to the chips 2716 in the channel 2702. In some embodiments, the optic sensors 2718 are flat bed sensors, such as a charged couple device (CCD) sensor scanner. The optic sensors 2718 are mounted to the bottom of the tray 2700. As depicted in FIG. 27C and FIG. 27H, the optic sensor 2718 is mounted at the base of each channel 2702, such that optic sensor 2718 is generally parallel to the longitudinal axis of the channel 2702.

Figure 27F:
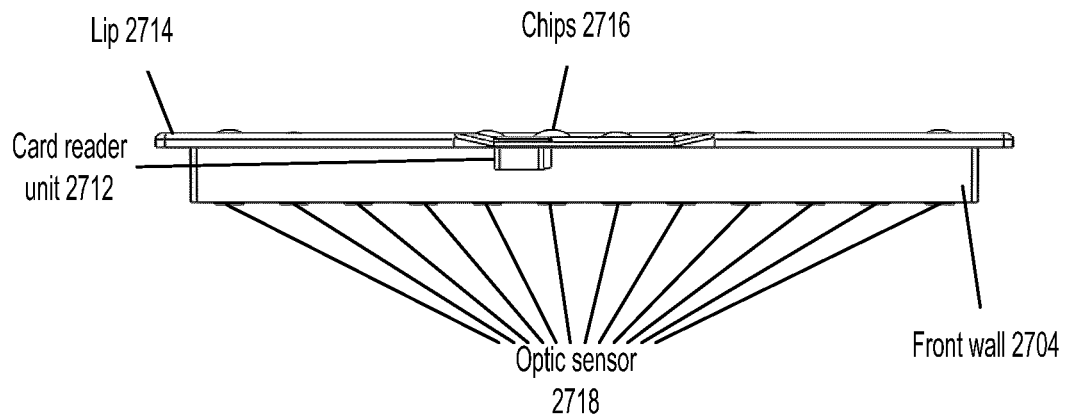
FIG. 27F illustrates a front view of the chip tray of FIG. 27A according to some embodiments.
Figure 27G:
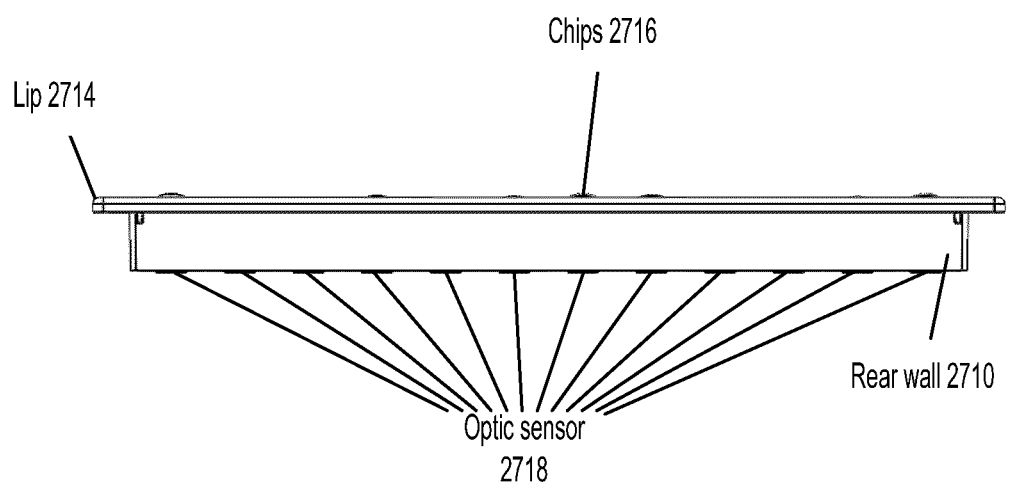
FIG. 27G illustrates a back view of the chip tray of FIG. 27A according to some embodiments.
Figure 27H:
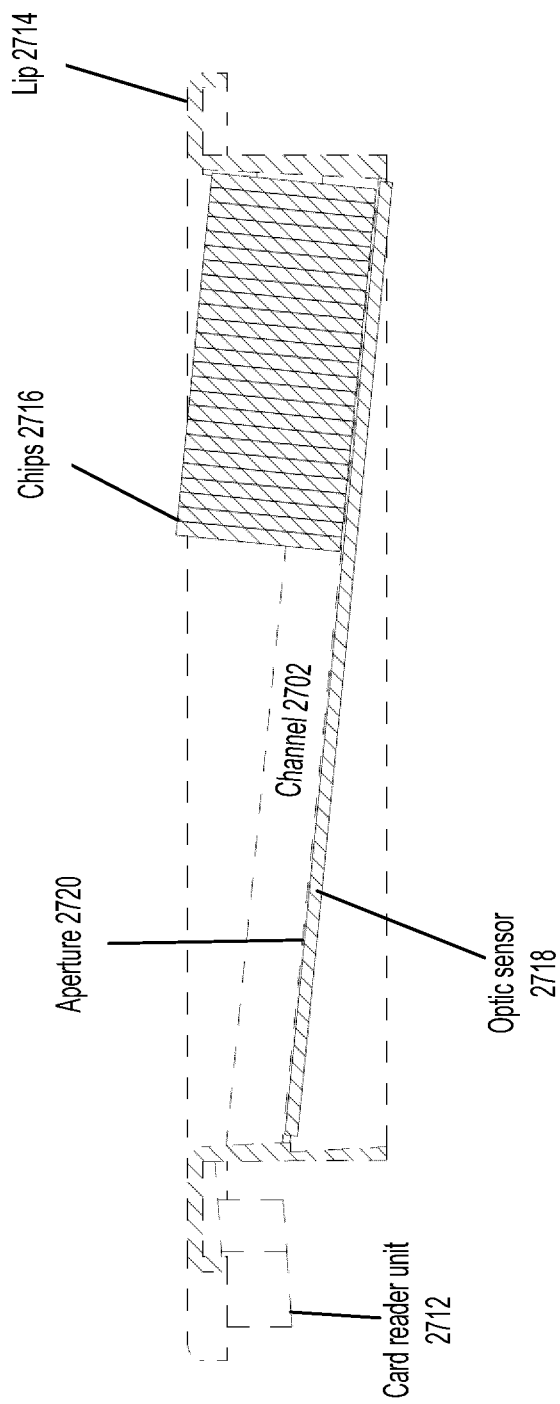
FIG. 27H illustrates a cross-sectional view of the chip tray of FIG. 27A according to some embodiments.

As depicted in FIG. 27C and FIG. 27F, there is one optic sensor 2718 to capture image data for each channel 2702 of the chip tray 2700.

In some embodiments, the optic sensor 2718 comprises both a radiation emitter and a sensor. The optic sensor 2718 emits light in in the visible spectrum. In some embodiments, the optic sensor 2718 emits infrared light. For the radiation emitted from the optic sensor 2718 mounted to the bottom of the chip tray 2700 to reflect from the chips 2716 received in the channel 2702, each channel 2702 comprises an aperture 2720, for example, a slit that runs longitudinally along the channel 2702, for each optic sensor 2718, such that the radiation emitted from the optic sensor 2718 can be reflected from the chips 2716 back to the optic sensor 2718. In some embodiments, the aperture 2720 extends down the centre of the channel 2702. In other embodiments, the aperture 2720 extends along the channel 2702 and offset from the centre of the channel 2702. In some embodiments, the aperture 2720 may have a lens therein to protect the optic sensor 2718 from damage, such as during placement or removal of chips 2716 from the channels 2702.

Figure 27I:
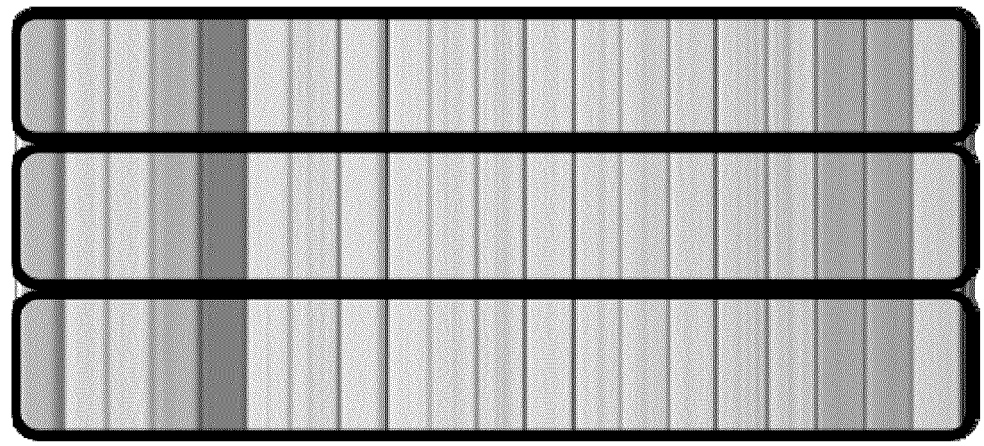
FIG. 27I illustrates an example image taken from an optical sensor mounted on the bottom of a chip tray according to some embodiments.
Figure 27I:
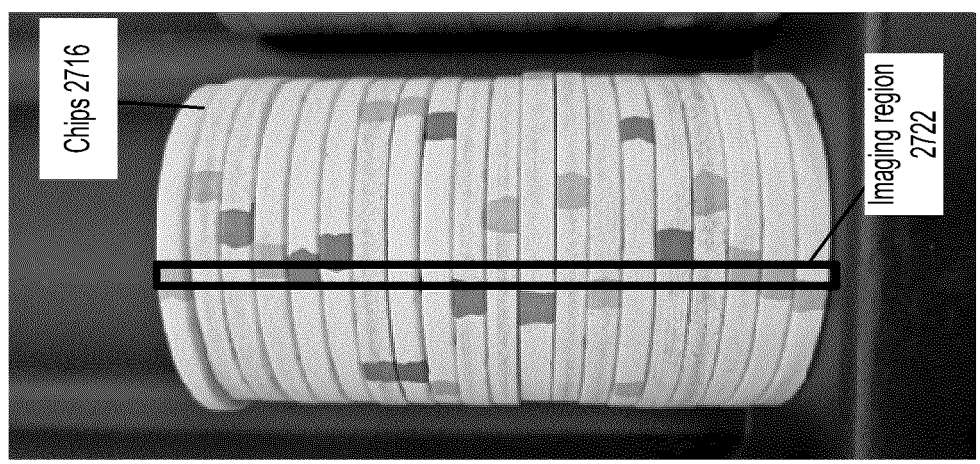

The optic sensor 2718 captures image data corresponding to chips 2716 in the channel 2702. In some embodiments, the optic sensor 2718 captures image data at an imaging region 2722 of the chips 2716, as depicted in FIG. 27I, corresponding to the side surfaces of the chips. The image data captured by the optic sensor 2718 corresponds to strips of colours. The image data captured by the optic sensor 2718 may correspond to patterns of colours defined by the colours markings of the side surfaces of the chips 2716, and the rotational orientation of the chips 2716 in the channels 2702. An expanded view 2724 of the imaging region 2722 is depicted in FIG. 27I. The image data has a certain length of pixels and a certain thickness of pixels. In some examples, the strips of colours may be approximately 1080 pixels long and 1 to 8 pixels in width. Each pixel of the image data captured by the optic sensor 2718 corresponding to three values (a red, green, and blue value). The image data captured by the optic sensor 2718 may be transmitted to the game monitoring server 104. Based on the image data captured by the optic sensor 2718, the game monitoring server 104 may determine the number of chips 2716 in the channel 2702 and recognize the value of the chips 2716. In some embodiments, the game monitoring server 104 may determine if there are any spacers (e.g. a clear disc, a silver dollar) or lammers that are placed with the chips 2716.

In some embodiments, where a chip tray comprises both a time of flight sensor and the optic sensor 2718, the game monitoring server 104 may determine the depth of the chips, and send a control command to the optic sensor 2718 to illuminate only the portion of its radiation emitter corresponding to the depth of the chips 2716, such that the optic sensor 2718 not covered by the chips 2716 does not emit radiation and distract the dealer.

The chips 2716 used in a gaming facility may have certain colours, patterns, and markings based on its denomination or value. Some of the colours, patterns, and markings may be more present on the chips 2716 than other colours, patterns, and markings. For example, a chip 2716 having a $1 denomination may be predominantly white in colour, with gold and red coloured markings and patterns on its side surface. When a plurality of the same chips 2716 are placed in a channel, the side surfaces of the chips 2716 may define an axial strip of white, red, and gold colours. As the colours, patterns, and markings of chips 2716 of different denominations are different, the chips 2716 of different denominations, when placed in the channel 2702 of the chip tray 2700, the side surfaces of the chips 2716 may define unique axial strips of colours that are related to the denomination of the particular stack of chips 2716. The optic sensors 2718 mounted to the channels 2702 may capture image data corresponding to the side surfaces of the chips having a particular axial strip of colours, and this image data may be transmitted to the game monitoring server 104. The game monitoring server 104 may process the image data to determine the denomination of the chips in the channels 2702 of the chip tray 2700.

In some embodiments, the game monitoring server 104 may process the image data corresponding to the imaging region 2722 captured by the optic sensor 2718 by processing the image data as a colour or gradient space rather than a strip of pattern colours. In some embodiments, the strips of colours as defined by the chips 2716 in the chip tray are generated by rotational orientation of each chip 2716 in the chip tray, and may be a smearing of colours corresponding to a denomination of chips. The game monitoring server 104 may recognize the chips 2716 in the chip tray by using a threshold of colour histogram values.

In some embodiments, chips that share a common denomination are placed in a particular channel of a chip tray. For example, chips of different denominations (e.g. $1, $5, $25, $100, $500, $1000, $5000) are placed in their own channel. A particular channel may not have chips with different denominations.

In some embodiments, the game monitoring server 104 may identify the denomination of the chips in the channel using a weighted checklist of colours. The game monitoring server 104 may assign a weight to colours, such that colours that are most common to a particular denomination are weighed more heavily than colours that are not common to a particular denomination, or that are common to a plurality of denominations. In some examples, the side of a chip may have four colours, with two of the colours making up the majority of the side surface of the chip. The game monitoring server 104 may detect that the image data corresponding to the imaging region 2722 comprises the two dominant colours, and may determine the value of the chip and the value of the stack of chips.

Based on the particular orientation of one chip 2716 relative to the optic scanner 2718, the optic scanner 2718 may capture image data corresponding to a less dominant colour of the side surface of the chip 2716. The less dominant colour may resemble a dominant colour for a chip of a different denomination. This may lead to an error in determining the denomination of chips in a particular channel. In some embodiments, to reduce this error, the image data captured by the optic sensor 2718 may correspond to the colours of the side surfaces of a plurality of chips 2716. By determining the colour of the side surfaces of a plurality of chips 2716, the identification of the denomination of the chips 2716 by the game monitoring server 104 may be more accurate and reliable, as the possibility of incorrectly identifying the denomination of a chip based on a less dominant colour is reduced.

In some embodiments, the side surface of the chips 2716 may predominantly be one colour. In such embodiments, the game monitoring server 104 may determine the denomination of the chips stochastically based on whether the predominant colour is detected at greater than a threshold percentage. For example, image data corresponding to the side surfaces of the chips 2716 as captured by the optic sensor 2718 may comprise a 1080-pixel by 3-pixel matrix. The game monitoring server 104 may process the image data and determine the colours corresponding to the image data. The game monitoring server 104 may further determine if the predominant colour is present at or over a threshold percentage, such as 70%. If the predominant colour is present at or over the threshold percentage, the game monitoring server 104 may determine that the channel of the chip tray comprises chips having a denomination associated with the predominant colour. For example, chips having a $1 denomination are predominantly white in colour. If the game monitoring server 104 determines that the predominant colour of the image data is white, and it is present at greater than 70%, then the game monitoring server 104 may determine that the chips 2716 are chips 2716 having $1 denomination.

In some embodiments, in a populated chip tray, there may be a plurality of chips 2716 of each denomination received in the appropriate channel 2702 of the chip tray 2700. For example, there may be 20 or more chips of each denomination in the chip tray. The game monitoring server 104 may process the image data captured by the optic sensors 2718 corresponding to the side surfaces of the chips in each channel and may determine the denomination of the chips in each channel. The game monitoring server 104 may compare its determinations of the denomination of the chips in each channel and evaluate the accuracy of its determination. For example, the gaming facility may use chips of seven denominations. The game monitoring server 104, based on processing the image data from the optic sensors 2718, may determine that the chip tray has chips of a certain number of denominations. In some embodiments, the game monitoring server 104 may determine that there are seven denominations of chips in the chip tray, which may indicate that the game monitoring server 104 properly determined the denominations of the chips in the chip tray. In some embodiments, the game monitoring server 104 may determine that there are less than or more than seven denominations of chips in the chip tray, which may indicate an error in determining the denominations of the chips in the chip tray.

Details on the image processing conducted by the game monitoring server 104 based on the image data captured by the optic sensor 2718 for calculating depth of chips, chip recognition, and chip counting is described in U.S. patent application Ser. No. 15/309,102 and PCT Application No. PCT/CA2016/050442, the entire contents of which are hereby incorporated by reference.

In some embodiments, more than one denomination of chips 2716 may be placed in a channel 2702. The chips of different denominations may be separated by a spacer (e.g. a transparent chip having no denomination, or a silver dollar). The image data captured by the optic sensor 2718 may correspond to the spacer placed in the channel 2702. The game monitoring server 104 may process the image data captured by the optic sensor 2718, and determine that there is one or more spacers placed in the channel 2702. Based on identification of the spacer in the channel 2702, the game monitoring server 104 may separately process portions of the image data captured by the optic sensor 2718, the portions of the image data as defined by the number of spacers in the channel 2702. For example, the game monitoring server 104 may determine that one spacer is placed between two stacks of chips 2716. The game monitoring server 104 may identify the spacer as a boundary between the two stacks of chips 2716, and process the image data corresponding to each of the two stacks of chips 2716 without influence from the other.

In some embodiments, a table monitoring subsystem may be positionable on a chip tray, without being in direct contact with the chip tray.

Figure 28A:
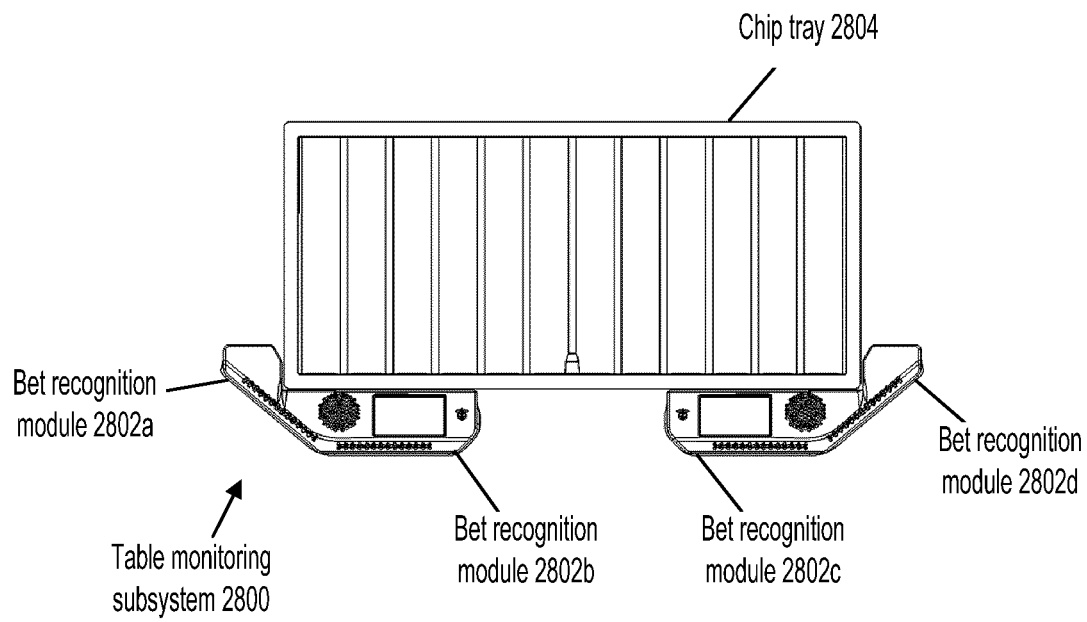
FIGS. 28A-28B illustrate schematic diagrams of mounting an example table monitoring subsystem to an example chip tray according to some embodiments.
Figure 28B:
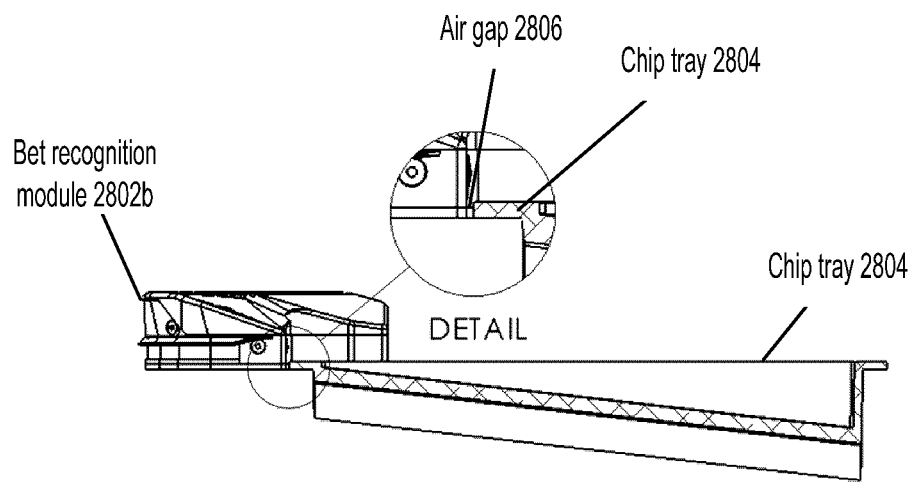

FIGS. 28A-28B illustrates schematic diagrams of positioning an example table monitoring subsystem 2800 to an example chip tray 2804 according to some embodiments. The table monitoring subsystem 2800 is generally similar to table monitoring subsystem 1900 described herein. As depicted in FIG. 28A, the table monitoring subsystem 2800 comprises a first imaging component and a second imaging component, with the first imaging component comprising bet recognition modules 2802a and 2802b, and the second imaging component comprising bet recognition modules 2802c, and 2802d. The first and second imaging components are positioned on a corner of the chip tray 2804, as depicted in FIG. 28A.

As depicted more clearly in FIG. 28B, while the table monitoring subsystem 2800 may be positioned on the corners of the chip tray 2804, the table monitoring subsystem 2800 does not directly contact the chip tray 2804, the table monitoring subsystem 2800 and the chip tray 2804 defining an air gap 2806 therebetween. That is, the table monitoring subsystem 2800 is positioned in front of the tray 2804.

In some embodiments, the table monitoring subsystem 2800 may be positioned over at least a portion of the tray 2804. In some embodiments, the table monitoring subsystem 2800 may be positioned such that the table monitoring subsystem 2800 covers at least a portion of the tray 2804.

In some embodiments, the table monitoring subsystem may be positionable relative to a chip tray using a plate.

Figure 29A:
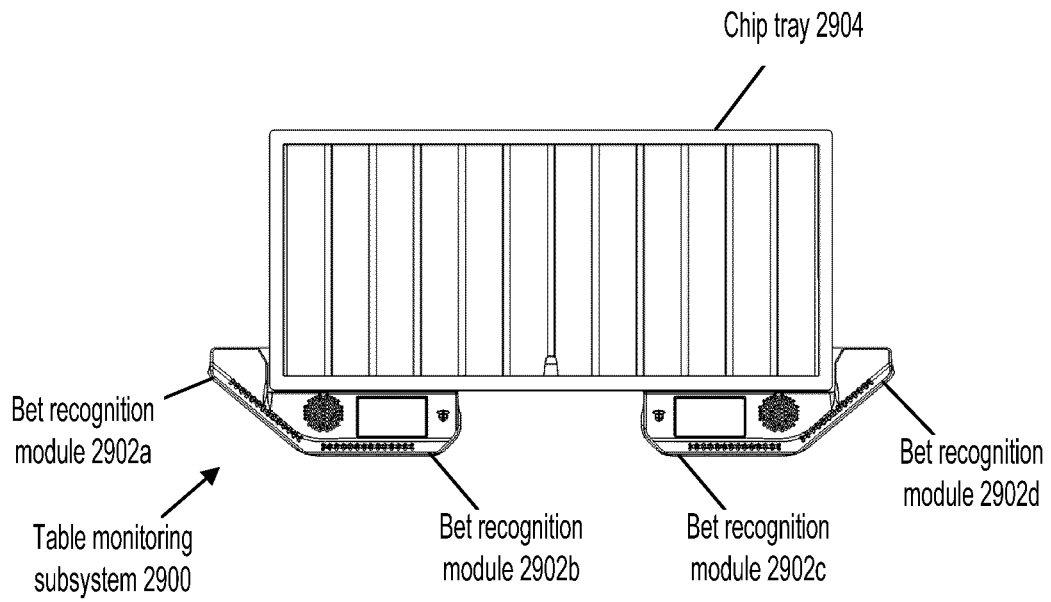
FIGS. 29A-29B illustrate schematic diagrams of mounting an example table monitoring subsystem to an example chip tray with a plate according to some embodiments.
Figure 29B:
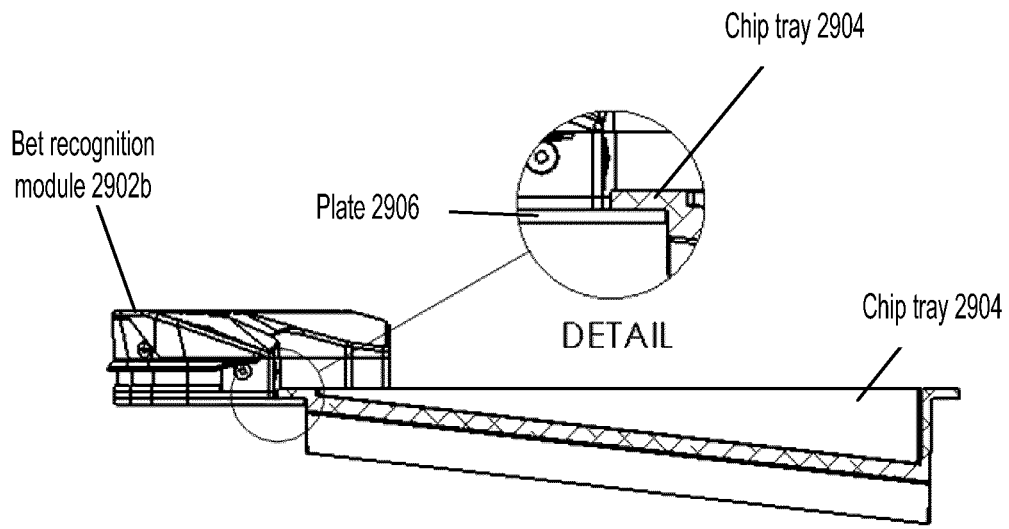

FIGS. 29A-29B illustrate schematic diagrams of positioning an example table monitoring subsystem 2900 relative to an example chip tray 2904 according to some embodiments. The table monitoring subsystem 2900 is generally similar to table monitoring subsystem 1900 described herein. As depicted in FIG. 29A, the table monitoring subsystem 2900 comprises a first imaging component and a second imaging component, with the first imaging component comprising bet recognition modules 2902a and 2902b, and the second imaging component comprising bet recognition modules 2902c, and 2902d. The first and second imaging components are positioned on a corner of the chip tray 2904, as depicted in FIG. 29A.

A plate 2906 may be fastened to the gaming table, using fasteners such as screws, nuts and bolts, and the like, for mounting the table monitoring subsystem 2900 to the gaming table. The plate may be made with a rigid material, such as metal. In some embodiments, the imaging components of the table monitoring subsystem 2900 may be mounted to the plate 2906, with the plate 2906 supporting the table monitoring subsystem. In some embodiments, the chip tray 2904 may rest on the plate 2906. In some embodiments, the table monitoring subsystem 2900 and the chip tray 2904 are mounted to the plate 2906, as depicted in FIG. 29B.

In some embodiments, there may be a plate under each of the table monitoring subsystem 2900 and the chip tray 2904 for mounting table monitoring subsystem 2900 and the chip tray 2904 to the gaming table.

When the table monitoring subsystem 2900 and the chip tray 2904 are mounted to the plate 2906, the plate provides rigidity and stability to the connection between table monitoring subsystem 2900, the chip tray 2904, and the gaming table. By mounting the table monitoring subsystem 2900 to the plate 2906 to connect the table monitoring subsystem 2900 and the gaming table, the cameras of the imaging components may be level, and there may be reduction in movement or shifting of the imaging components. This may improve the quality of the image data captured by the table monitoring subsystem.

In some embodiments, where the plate 2906 is used to support the table monitoring subsystem 2900 and the chip tray 2904 for connecting to the gaming table, wires, cables, and circuits may be slid down between a side wall of the gaming table and the game tray for connecting to the game monitoring server 104. Where only one of the table monitoring subsystem 2900 and the chip tray 2904 are connected to the plate 2906, there may be a wire port for guiding wires, cables, and circuits therethrough.

In some embodiments, the table monitoring subsystem and the chip tray may be integrally formed.

Figure 30A:
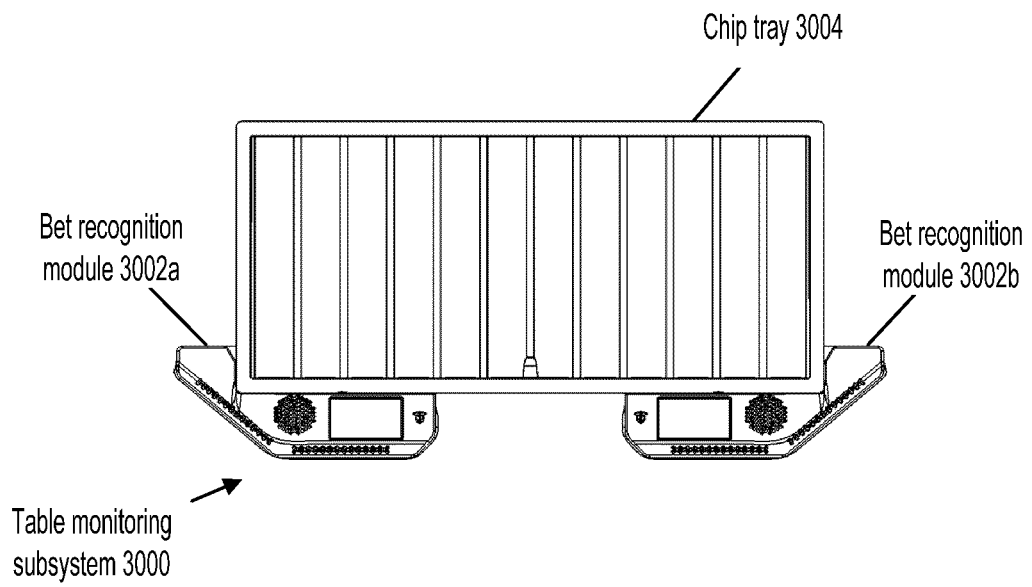
FIGS. 30A-30B illustrate schematic diagrams of an example table monitoring subsystem integral to an example chip tray according to some embodiments.
Figure 30B:
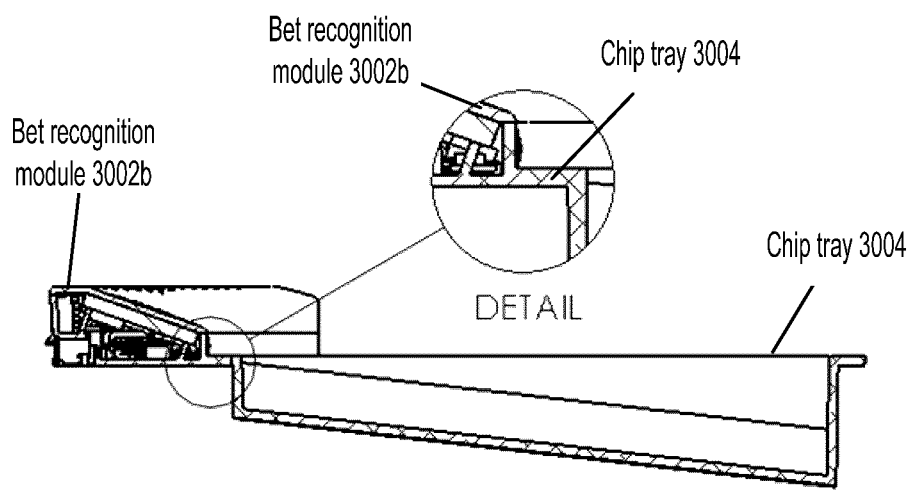

FIGS. 30A-30B illustrate schematic diagrams of positioning an example table monitoring subsystem 3000 relative to an example chip tray 3004 according to some embodiments. The table monitoring subsystem 3000 is generally similar to table monitoring subsystem 1900 described herein. As depicted in FIG. 30A, the table monitoring subsystem 3000 comprises a first imaging component and a second imaging component, with the first imaging component comprising bet recognition modules 3002a and 3002b, and the second imaging component comprising bet recognition modules 3002c, and 3002d. The first and second imaging components are positioned on a corner of the chip tray 3004, as depicted in FIG. 30A.

As depicted in FIG. 30B, the bodies of the first and second imaging components of the table monitoring subsystem 3000 are integrally formed with the chip tray 3004 to define an integral body defining the body of the table monitoring subsystem 600 and the chip tray 3004. Where the table monitoring subsystem 3000 is integrally formed with the chip tray 3004, the cameras of the first and second imaging component may be more level when the table monitoring subsystem 3000 and the chip tray 3004 are mounted to the gaming table.

FIGS. 31A-31E illustrate schematic diagrams of example table monitoring subsystems 3100 positioned on example chips trays 3104 having a plurality of chips 3106 according to some embodiments.

FIG. 31A depicts a table monitoring subsystem 3100a positioned at corners of chip tray 3104. Table monitoring subsystem 3100a comprises a bet recognition module 3102a, 3102b, 3012c, and 3102d for capturing image data corresponding to one or more chips positioned at a betting area of the gaming table. Table monitoring subsystem 3100a further comprises subsystem side wall 3112a and 3112b. As depicted in FIG. 31A, there are no bet recognition modules positioned at subsystem side wall 3112a and 3112b. In some embodiments, table monitoring subsystem 3100a may comprise bet recognition modules positioned at subsystem side wall 3112a and/or 3112b.

FIG. 31B depicts a table monitoring subsystem 3100b positioned at corners of chip tray 3104. Table monitoring subsystem 3100b comprises a bet recognition module 3102a, 3102b, 3012c, 3012d, 3012e, and 3102f for capturing image data corresponding to one or more chips positioned at a betting area of the gaming table. Table monitoring subsystem 3100a further comprises subsystem side wall 3112a and 3112b. As depicted in FIG. 31B, there are no bet recognition modules positioned at subsystem side wall 3112a and 3112b. In some embodiments, table monitoring subsystem 3100b may comprise bet recognition modules positioned at subsystem side wall 3112a and/or 3112b. In some embodiments, there may be a card reader unit 3110 positioned at subsystem side wall 3112a. In other embodiments, there may be a card reader unit 3110 positioned at subsystem side wall 3112b. In some embodiments, a bet recognition module and/or a card reader unit may be positioned between bet recognition modules 3102c and 3102d, as depicted in FIG. 31B.

FIG. 31C depicts a table monitoring subsystem 3100c positioned at corners of chip tray 3104. Table monitoring subsystem 3100c comprises a bet recognition module 3102a, 3102b, 3012c, 3012d, and 3012e for capturing image data corresponding to one or more chips positioned at a betting area of the gaming table. Table monitoring subsystem 3100c further comprises subsystem side wall 3112a, 3112b, 3112c, and 3112d. As depicted in FIG. 31C, there are no bet recognition modules positioned at subsystem side wall 3112a, 3112b, 3112c, and 3112d. In some embodiments, table monitoring subsystem 3100c may comprise bet recognition modules positioned at subsystem side wall 3112a, 3112b, 3112c, and/or 3112d.

Figure 31D:
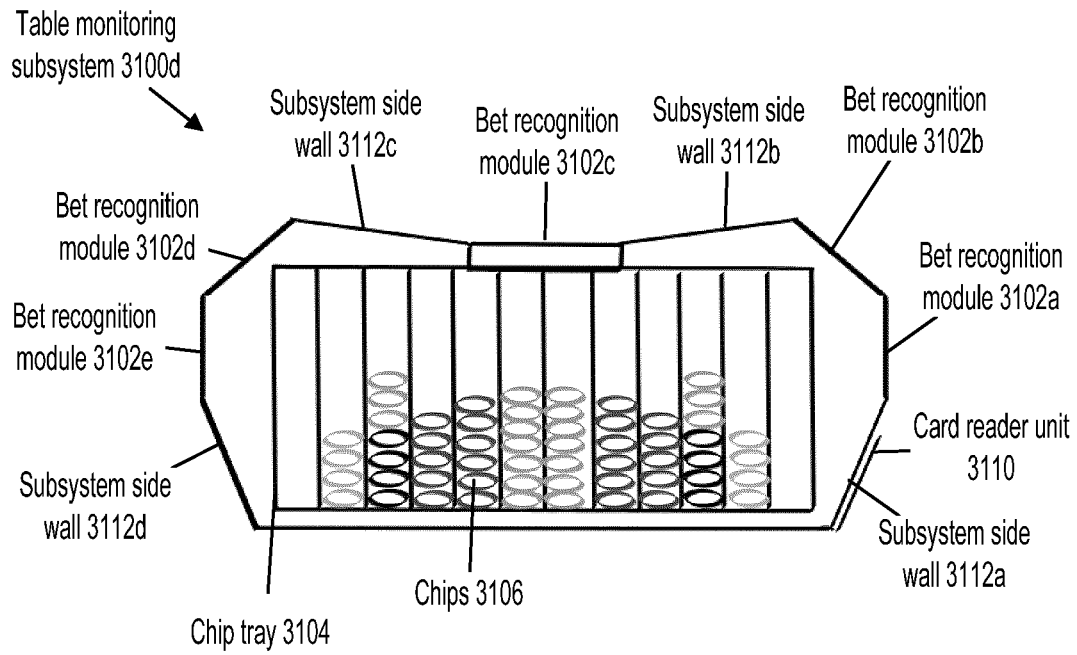

FIG. 31D depicts a table monitoring subsystem 3100d positioned at corners of chip tray 3104. Table monitoring subsystem 3100d comprises a bet recognition module 3102a, 3102b, 3012c, 3012d, and 3012e for capturing image data corresponding to one or more chips positioned at a betting area of the gaming table. Table monitoring subsystem 3100d further comprises subsystem side wall 3112a, 3112b, 3112c, and 3112d. As depicted in FIG. 31D, there are no bet recognition modules positioned at subsystem side wall 3112a, 3112b, 3112c, and 3112d. In some embodiments, table monitoring subsystem 3100d may comprise bet recognition modules positioned at subsystem side wall 3112a, 3112b, 3112c, and/or 3112d. In some embodiments, there may be a card reader unit 3110 positioned at subsystem side wall 3112a. In other embodiments, there may be a card reader unit 3110 positioned at subsystem side wall 3112a, 3112b, 3112c, and/or 3112d.

Figure 31E:
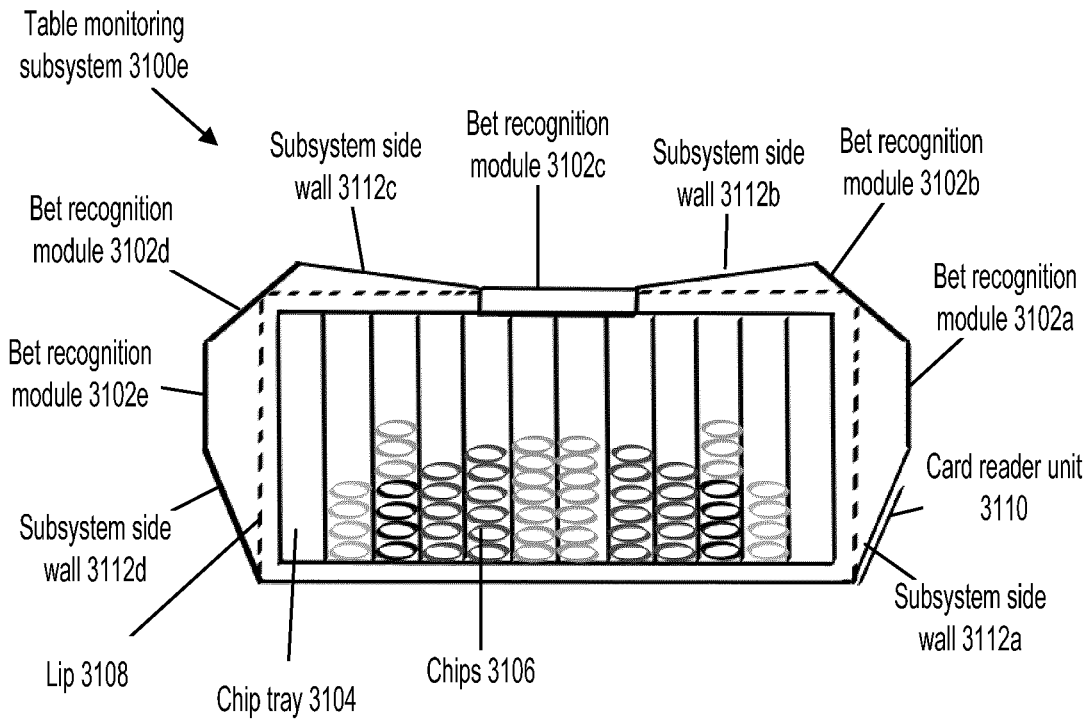

FIG. 31E depicts a table monitoring subsystem 3100e positioned at corners of chip tray 3104. The hashed line depicted in FIG. 31E depicts a lip 3108 of the tray 3104. Table monitoring subsystem 3100e comprises a bet recognition module 3102a, 3102b, 3012c, 3012d, and 3012e for capturing image data corresponding to one or more chips positioned at a betting area of the gaming table. Table monitoring subsystem 3100e further comprises subsystem side wall 3112a, 3112b, 3112c, and 3112d. As depicted in FIG. 31E, there are no bet recognition modules positioned at subsystem side wall 3112a, 3112b, 3112c, and 3112d. In some embodiments, table monitoring subsystem 3100e may comprise bet recognition modules positioned at subsystem side wall 3112a, 3112b, 3112c, and/or 3112d. In some embodiments, there may be a card reader unit 3110 positioned at subsystem side wall 3112a. In other embodiments, there may be a card reader unit 3110 positioned at subsystem side wall 3112a, 3112b, 3112c, and/or 3112d.

Figure 32A:
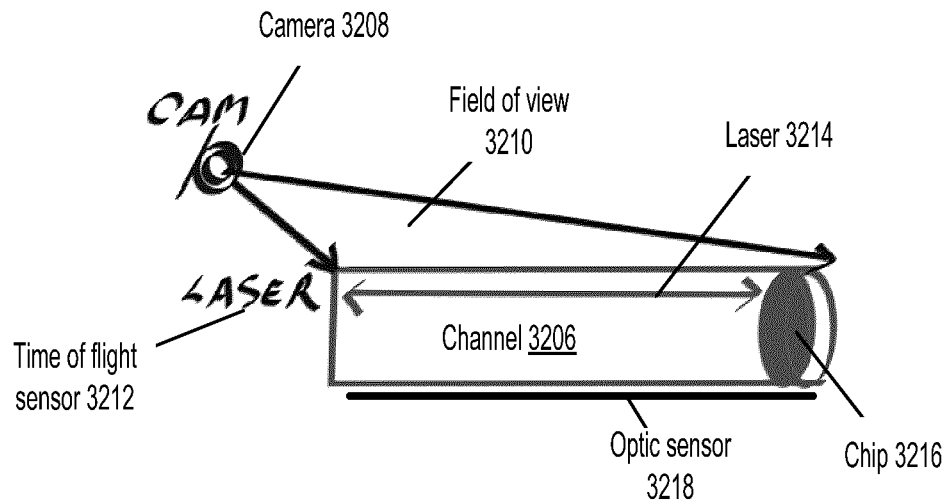
FIGS. 32A-32B illustrate schematic diagrams of chips in a chip tray being monitored by a table monitoring subsystem according to some embodiments.
Figure 32B:
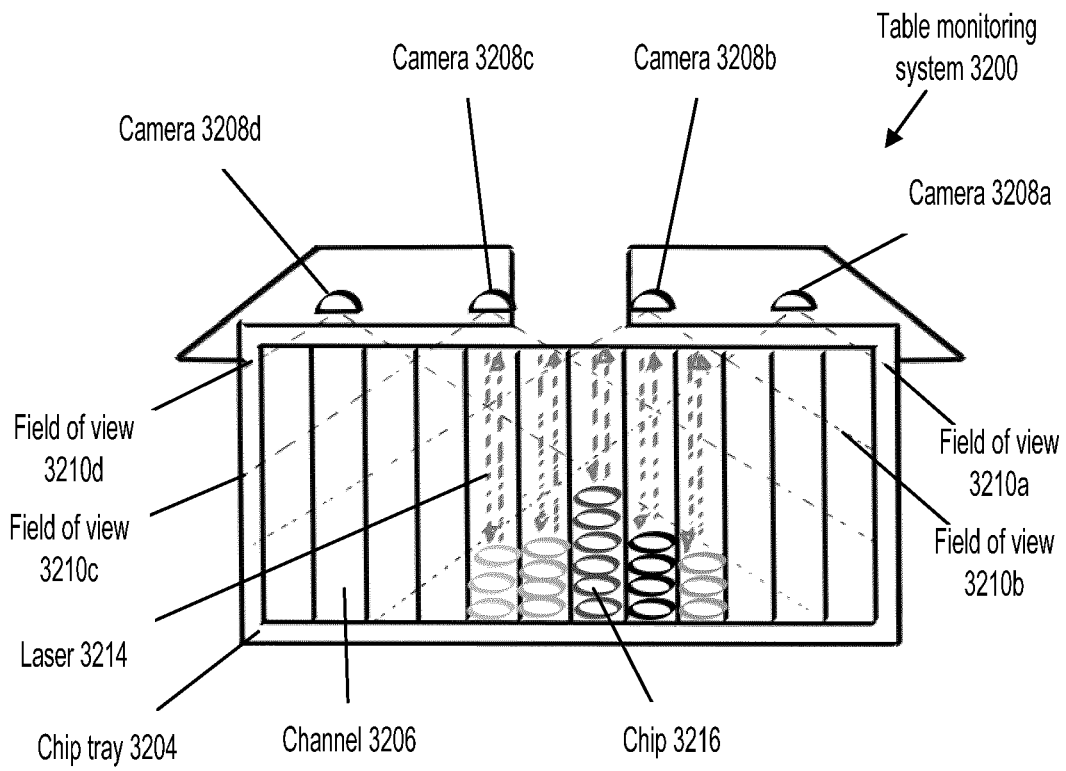

FIGS. 32A-32B illustrate schematic diagrams of chips in a chip tray being monitored by a table monitoring subsystem according to some embodiments.

In operation, each imaging component (e.g. cameras and emitters of the bet recognition device) of the table monitoring subsystem may capture image data and transmit the image data and other data (e.g. from sensors mounted to the gaming table, from a card reader unit, etc.) to table monitoring utility 106 for provision to game monitoring server 104. As depicted in FIGS. 32A-32B, each tray imaging component (e.g. time of flight sensor 3212, camera 3208, and optic sensor 3218 mounted to the bottom of the tray 3204) may transmit data corresponding to chips 3216 in the tray 3204 to table monitoring utility 106 for provision to game monitoring server 104. For example, as depicted in FIG. 32B, the table monitoring subsystem 3200 comprises four cameras 3208a, 3208b, 3208c, and 3208d having fields of view 3210a, 3210b, 3210c, and 3210d that overlap with the channels 3206 of the chip tray 3204. The cameras 3208 may capture image data corresponding to the side surfaces of the chips 3216. The time of flight sensors 3212 may emit radiation, such as a laser 3214, to the chips 3216, which is reflected back to the time of flight sensors 3212. The optic sensors 3218 may capture image data corresponding to the side surfaces of the chips 3216.

Image data corresponding to the chips on the gaming table are captured by the bet recognition modules and transmitted to the game monitoring server 104 for processing to identify bet data. Image data corresponding to the transfer of chips in the chip tray are captured by the tray imaging components (e.g. the time of flight sensor 2418, the tray monitoring camera 2504 or 2606, and the optic sensor 2718 as described herein) and transmitted to the game monitoring server 104 for processing to identify chip transfer data.

The game monitoring server 104 and the imaging components of the bet areas and the tray may undergo calibration before capture image data. Based on the data from the imaging components, the game monitoring server 104 may be configured to generate an electronic representation of the gaming table, including the chip tray. The game monitoring server 104 may calculate depth data for chips detected on the gaming table and the chip tray. The game monitoring server 104 may be configured to process the image data using a chip recognition process to determine, among other values, the number of chips used in a bet, the number of chips in the chip tray, and the value of the chips. Details on the image processing conducted by the game monitoring server 104 for calculating depth of chips, chip recognition, and chip counting is described in U.S. patent application Ser. No. 15/309, 102 and PCT Application No. PCT/CA2016/050442, the entire contents of which are hereby incorporated by reference.

In some embodiments, the game monitoring server 104 may process the image data captured by the bet recognition module and/or the tray imaging components from the top to the bottom. For example, the image data captured by the tray monitoring cameras 3208 are processed from the top to the bottom. In some embodiments, depending on the source of the image data, the image data may be processed from the bottom to top. For example, the image data captured by the optic sensors 3218 mounted at the bottom of the chip tray are processed from the bottom to the top.

In some embodiments, based on the data transmitted from the bet recognition module and the tray imaging components, the game monitoring server 104 may track the amount of chips in the chip tray, determine the value of the wagers made by players, and calculate a player's winnings and losses. Further, based on data transmitted by a card shoe and/or a card reader unit (corresponding to the value and suit of the card), and the data corresponding to the number of chips in the tray, the game monitoring server 104 may determine the value of each hand, the winners and losers of each game, if players are splitting winnings, and how much chips are being transferred for each game and each hand of a game.

Embodiments described herein provide a table monitoring subsystem with both an imaging component and a sensor component. The table monitoring subsystem captures image and sensor data for provision to table monitoring server 104 to calculate table monitoring data.

Figure 33:
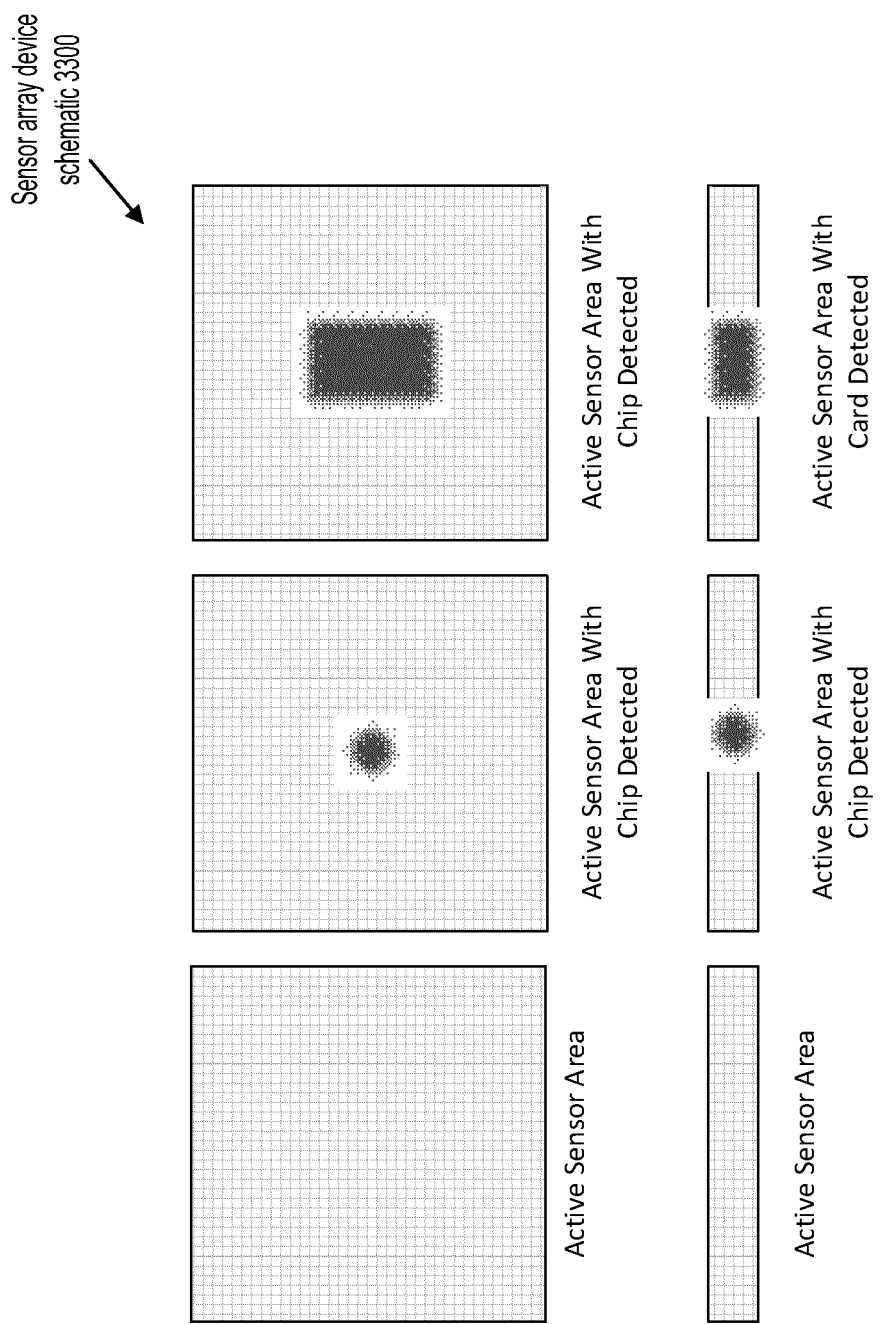
FIG. 33 illustrates a schematic diagram of a sensor array device for a table monitoring subsystem according to some embodiments.

FIG. 33 illustrates a schematic diagram of a sensor array device 3300 for table monitoring subsystem according to some embodiments. A table monitoring subsystem may include a microcontroller, a sensor array network and connection cables. The microcontroller may run the logic level code for checking onboard sensors (e.g. sensors integrated into the gaming tables via the table monitoring subsystem) for pre-defined thresholds triggering capture of image data to determine table monitoring data. The microcontroller may also emulate a serial communication protocol for the host. The sensor array network may include interconnected sensors that can communicate with each other. The sensors may be integrated with a gaming table and positioned relative to playing area of the table. They may be all connected via the microcontroller and routed accordingly. A connection cable may process the digital serial signal and allow the device to connect via USB or other protocol (e.g. wireless) to a computer with a free port. The data may be transmitted via the USB cable or other protocol and may be read by a small utility on the host computer.

In some embodiments, the sensor array device 3300 is an array of time of flight sensors. If an object is placed over the sensor array device 3300, the sensor array device 3300 recognizes that an object is placed over the sensor and transmits data to the game monitoring server 104, based on the number of sensors being triggered. The game monitoring server 104 may process this data and may determine the kind of object that is placed on the sensor array device 3300. For example, the game monitoring server 104 may process this data and may determine that the object is a card, a chip, or money.

In some gaming facilities, dealers carry their own tips. The deal may have a lock box for placing their tips. The dealer may carry the lock box as they change and work at different gaming tables. The dealer may tally their tips, and the dealer may be taxed on their tips. To avoid paying tax on their tips, some dealers break into a lock box to steal tips, such that taxes do not need to be paid. Further, chips of lower denomination are given as chips, so if these chips of lower denomination are stolen, it may lead to more frequent refills of the chip trays.

FIGS. 34A-34M illustrate schematic diagrams of tips being monitored by a table monitoring subsystem 3400 according to some embodiments.

Figure 34A:
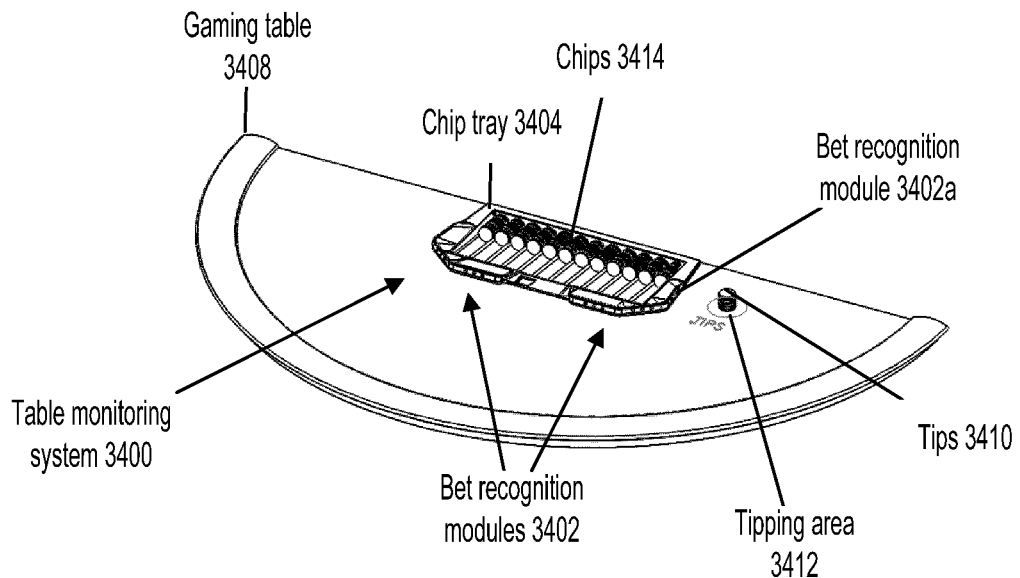
Figure 34B:
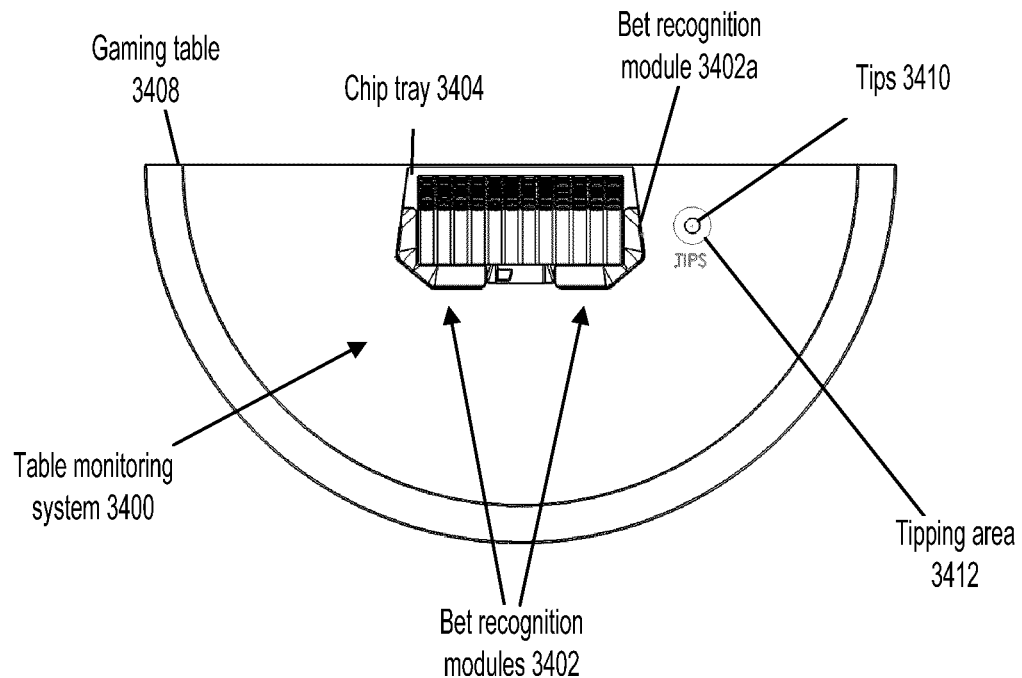

Table monitoring subsystem 3400 comprises a plurality of bet recognition modules 3402. The table monitoring subsystem 3400 is positioned on a chip tray 3404. As depicted in FIG. 34A, for example, one area of the gaming table 3408 may be defined by the table monitoring subsystem 3400 and/or the game monitoring server 104 as a tipping area 3412, where tips 3410 may be placed. The tipping area 3412 may be proximate to the bet recognition modules 3402, such as bet recognition module 3402a.

Figure 34C:
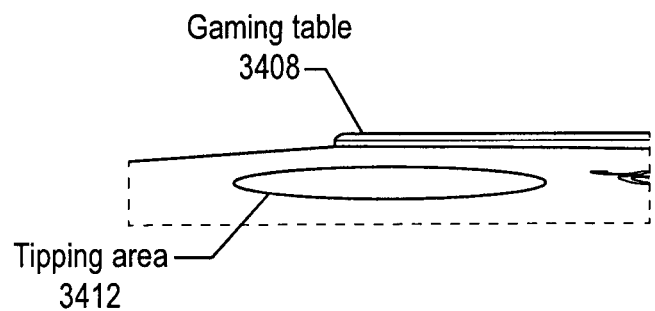
Figure 34D:
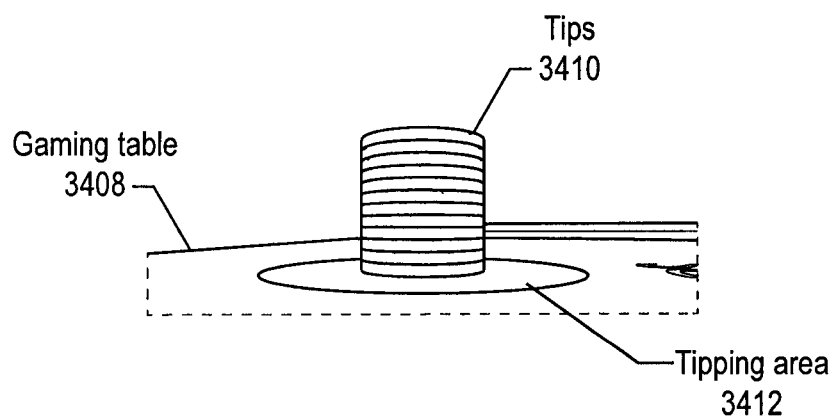

FIG. 34C depicts an example image taken from bet recognition module 3402a of the tipping area 3412 with no tips 3410 in the tipping area 3412. FIG. 34D depicts an example image taken from bet recognition module 3402a of the tipping area 3412 with tips 3410 (in the form of chips) in the tipping area 3412.

After tips 3410 have been placed in the tipping area 3412, the dealer, pit boss, or an employee of the gaming facility may approve the tip amount. The bet recognition module 3402 may capture image data corresponding to the tips 3410 in the tips area 3412. The game monitoring server may determine the amount of tips 3410 that was placed in the tip area 3412, and may associate that tip amount with a dealer, for example, by associating the tip amount with a dealer identification number.

Figure 34E:
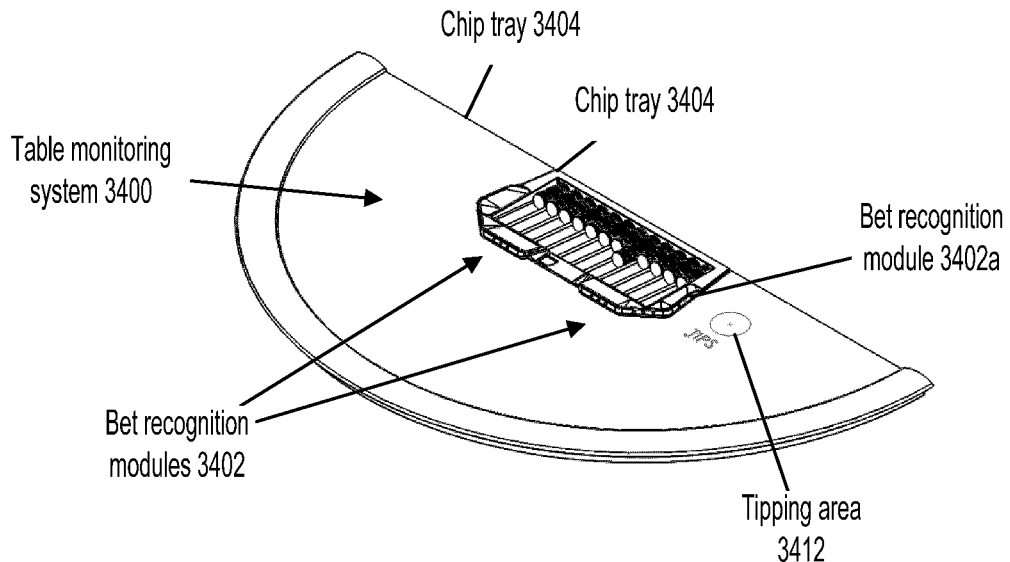
Figure 34F:
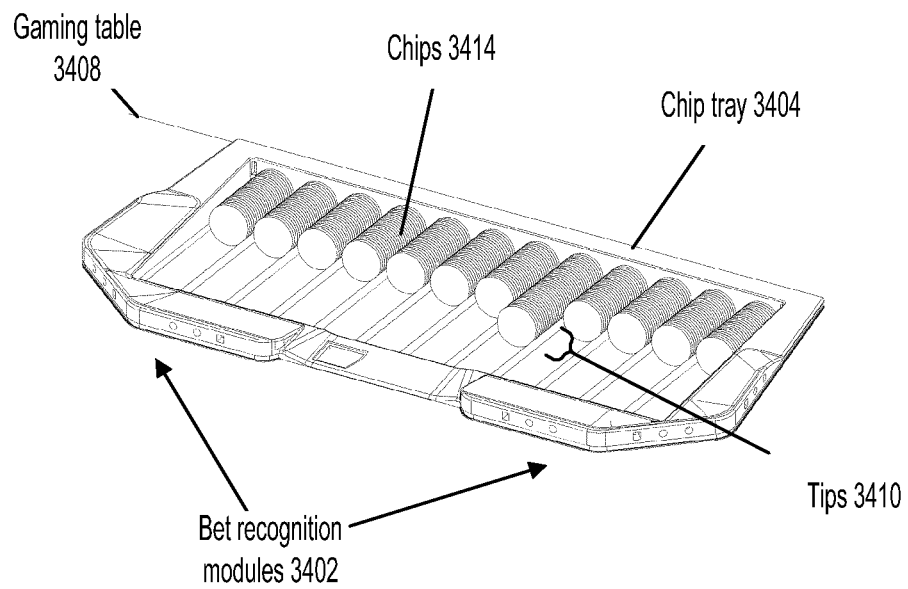
Figure 34J:
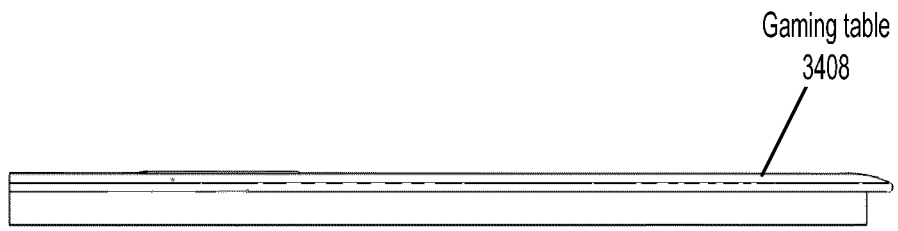
Figure 34K:
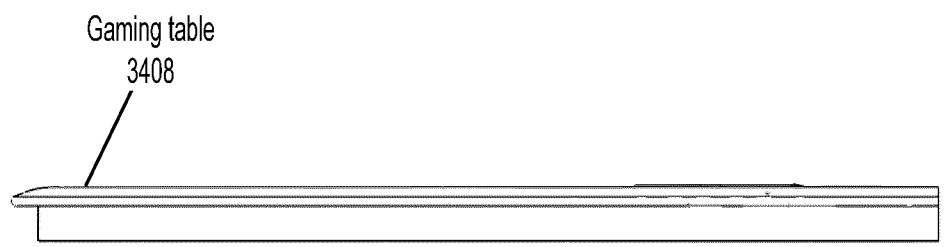
Figure 34L:
Figure 34M:
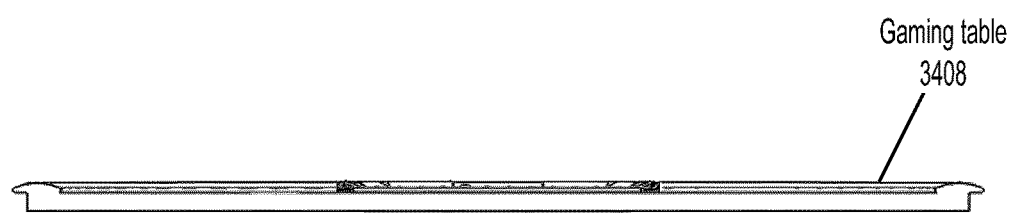

After the tips 3410 have been associated with a dealer, the chips may be placed in the chip tray for use during the game, as depicted in FIG. 34E and FIG. 34F. In this manner, the dealer may be associated with tips without having to carry the tips around or carry a lock box for storing the tips.

In some embodiments, when the tips 3410 are placed in the tipping area 3412, rather than associating the tips 3410 with a dealer, the game monitoring server 104 may count the tips 3410, determine the value of the tips 3410, and validate that the tips 3410 are not counterfeit chips.

In some embodiments, the bet recognition modules 3402 may comprise an extra camera for capturing image data corresponding to the tips 3410 placed in the tip area 3412.

Figure 35A:
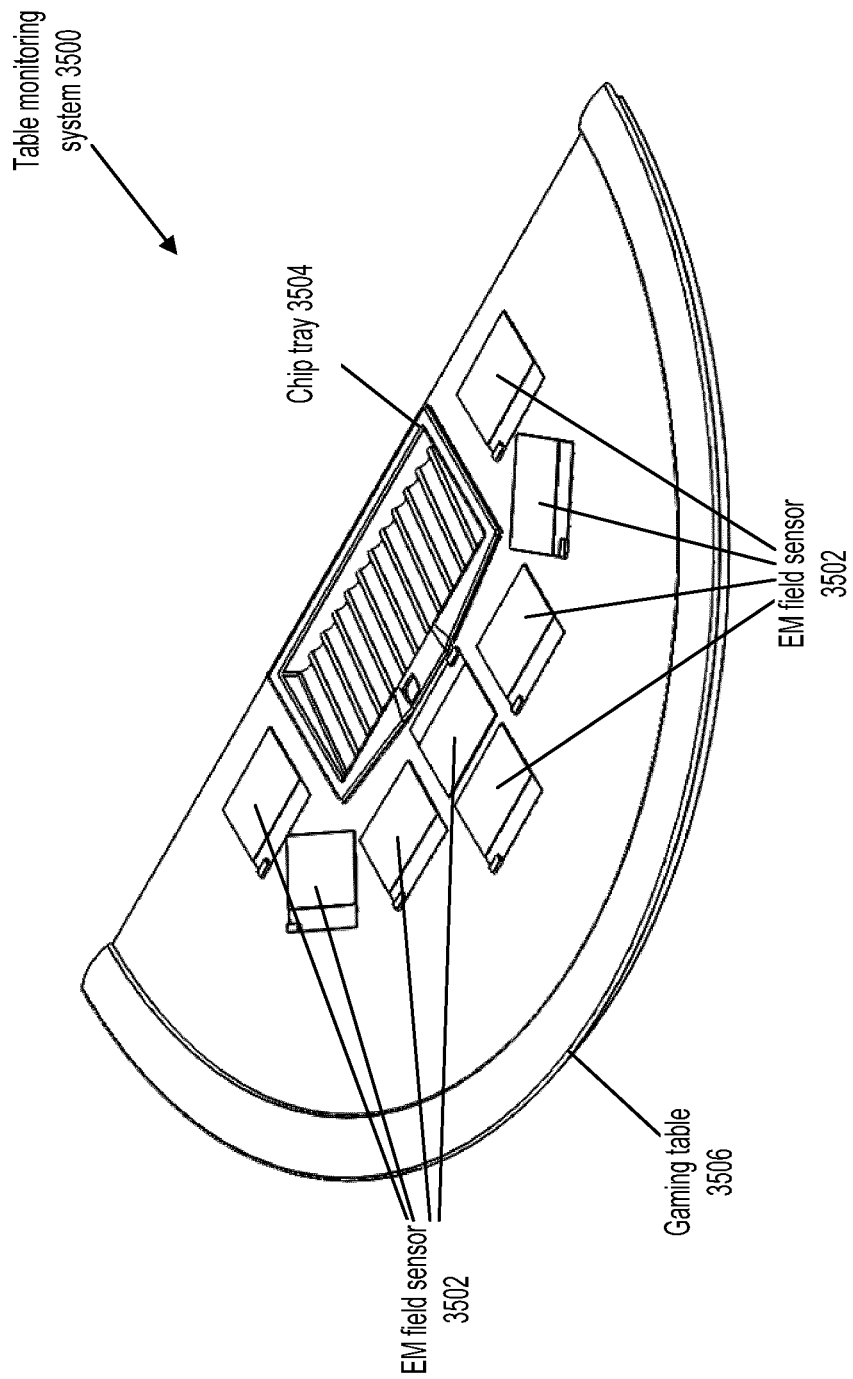
FIG. 35A illustrates a perspective view of an example gaming table having an example table monitoring subsystem according to some embodiments.
Figure 35B:
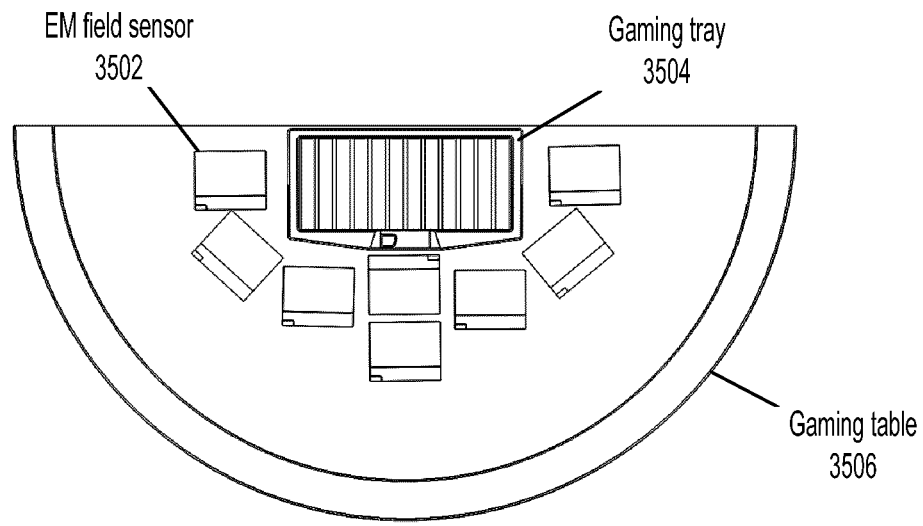
FIG. 35B illustrates a top view of the table monitoring subsystem of FIG. 35A according to some embodiments.
Figure 35C:
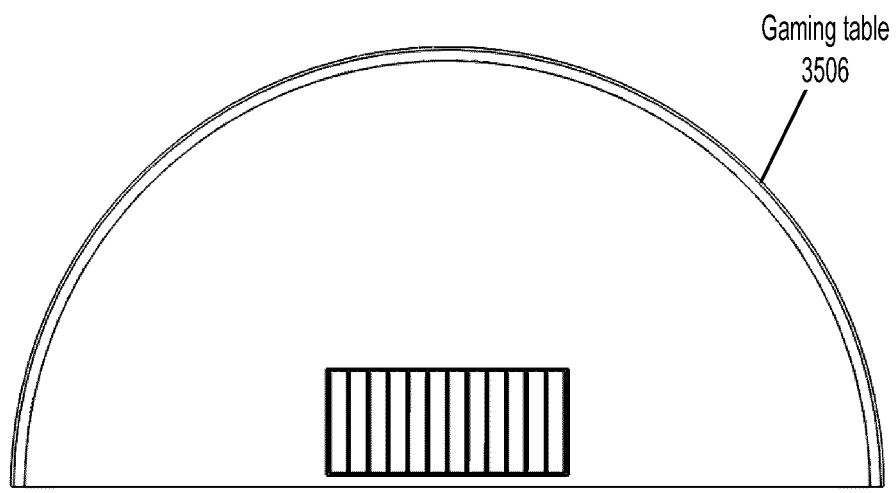
FIG. 35C illustrates a bottom view of the table monitoring subsystem of FIG. 35A according to some embodiments.
Figure 35D:
FIG. 35D illustrates a left view of the table monitoring subsystem of FIG. 35A according to some embodiments.
Figure 35E:
FIG. 35E illustrates a right view of the table monitoring subsystem of FIG. 35A according to some embodiments.
Figure 35F:
FIG. 35F illustrates a front view of the table monitoring subsystem of FIG. 35A according to some embodiments.
Figure 35G:
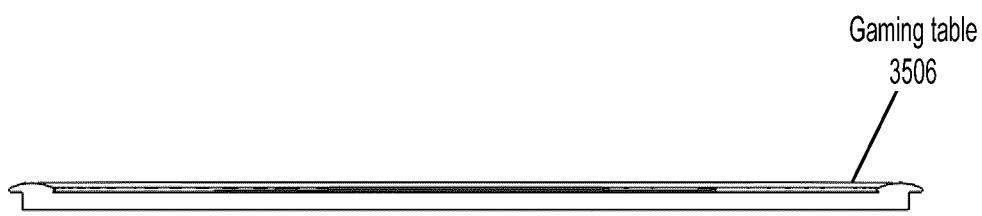
FIG. 35G illustrates a back view of the table monitoring subsystem of FIG. 35A according to some embodiments.

In some embodiments, the table monitoring subsystem comprises one or more electromagnetic field sensors 3502, as depicted in FIG. 35A and FIG. 35B. The electromagnetic field sensors 3502 may generate an electromagnetic field. The electromagnetic field sensors 3502 may also generate data corresponding to when an object, such as a hand of a player or dealer, has entered the electromagnetic field, and data corresponding to gestures that are being performed in the electromagnetic field. The data generated by the electromagnetic field sensors 3502 may correspond to interference with and distortion of the generated electromagnetic field by the object, such as the direction from which the interference occurred, the size of the object, and movement of the object (e.g. hand gestures). In some examples, the electromagnetic field sensors 3502 comprise one centre antenna and four outer antennas for generating the electromagnetic field and for detecting interference with the electromagnetic field. In some examples, the electromagnetic field sensor 3502 is a GestIC™ gesture recognition controller.

The electromagnetic field sensors 3502 may be placed under the gaming table, or between the gaming table and the felt of the gaming table, corresponding to relevant areas of the gaming table, such as betting areas.

In some embodiments, the data generated by the electromagnetic field sensors 3502 may be transmitted to the game monitoring server 104. Upon processing the data, the game monitoring server 104 may determine if a player or dealer is touching a bet. For some games, if the period for betting is over, players and/or dealers are not allowed to touch the bets that have been made. The player and/or dealer may be stealing the bets or tampering with the bets.

In some embodiments, the game monitoring server 104 may determine, based on data generated by the electromagnetic field sensors 3502, the gestures of a player. For some games, a player may perform hand gestures to convey an instruction. For example, a player may tap the surface of the gaming table to "hit" in blackjack, or to get a card from the dealer. As another example, the game monitoring server 104 may determine if the player performs a gesture indicative of passes or splits.

In some embodiments, the electromagnetic field sensors 3502 may be used to detect the authenticity of chips. The shape and appearance of counterfeit chips may appear generally similar to chips of the gaming facility, but the material used may be different. For example, authentic chips may be made using tungsten, while counterfeit chips may be made with steel, tin, or clay. The electromagnetic field sensors 3502 may generate a signal based on the interaction between the material of the chip and the magnetic field. The electromagnetic field sensors 3502 may detect the resistance or capacitance based on the interaction between the material of the chip and the magnetic field. The signal may be transmitted to the game monitoring server 104, and the game monitoring server 104, upon processing the data, may determine the authenticity of the chips in the electromagnetic field of the electromagnetic field sensors 3502.

FIGS. 36A-36C illustrate schematic diagrams of a portion of an example table monitoring subsystem 3600 configured to verify chips 3610 on a gaming table according to some embodiments. The table monitoring subsystem 3600 comprises a bet recognition module 3602. The bet recognition module comprises cameras 3604, a proximity sensor 3606 (e.g. a time of flight sensor), and an ultraviolet emitter 3608.

In some embodiments, chips 3610 may comprise a security feature 3612, such as a pattern that becomes illuminated when ultraviolet light is shined on it. The chips 3610 may be placed proximate to the emitter 3608 to illuminate the security feature 3612 of the chips 3610. When the chips 3610 are placed proximate to the emitter 3608, the proximity sensor 3606 may detect that chips 3610 are proximate to the emitter, and may cause the emitter 3608 to emit ultraviolet light. In some embodiments, the dealer may see if the security feature 3612 is illuminated to determine if any chips 3610 are counterfeit chips 3614. In some embodiments, the bet recognition module 3602 may capture image data corresponding to the chips 3610, and the game monitoring server 104 may determine if any chips 3610 are counterfeit chips 3614.

In some embodiments, the table monitoring subsystem may be triggered to recapture image data corresponding to chips in a particular betting area or chips in a particular channel of the chip tray. For example, a dealer may observe that a bet was incorrectly made at the particular bet area. The dealer may trigger the table monitoring subsystem to recapture image data at that particular bet area where the bet was incorrectly made, and the game monitoring server 104 may associate the recaptured image data with the same time stamp and other data relating to the originally captured image. As another example, the game monitoring server 104 may determine that a bet was not correctly made (e.g. wrong chips used for the bet), and may trigger the table monitoring subsystem to recapture image data.

Figures 37A, 37B:
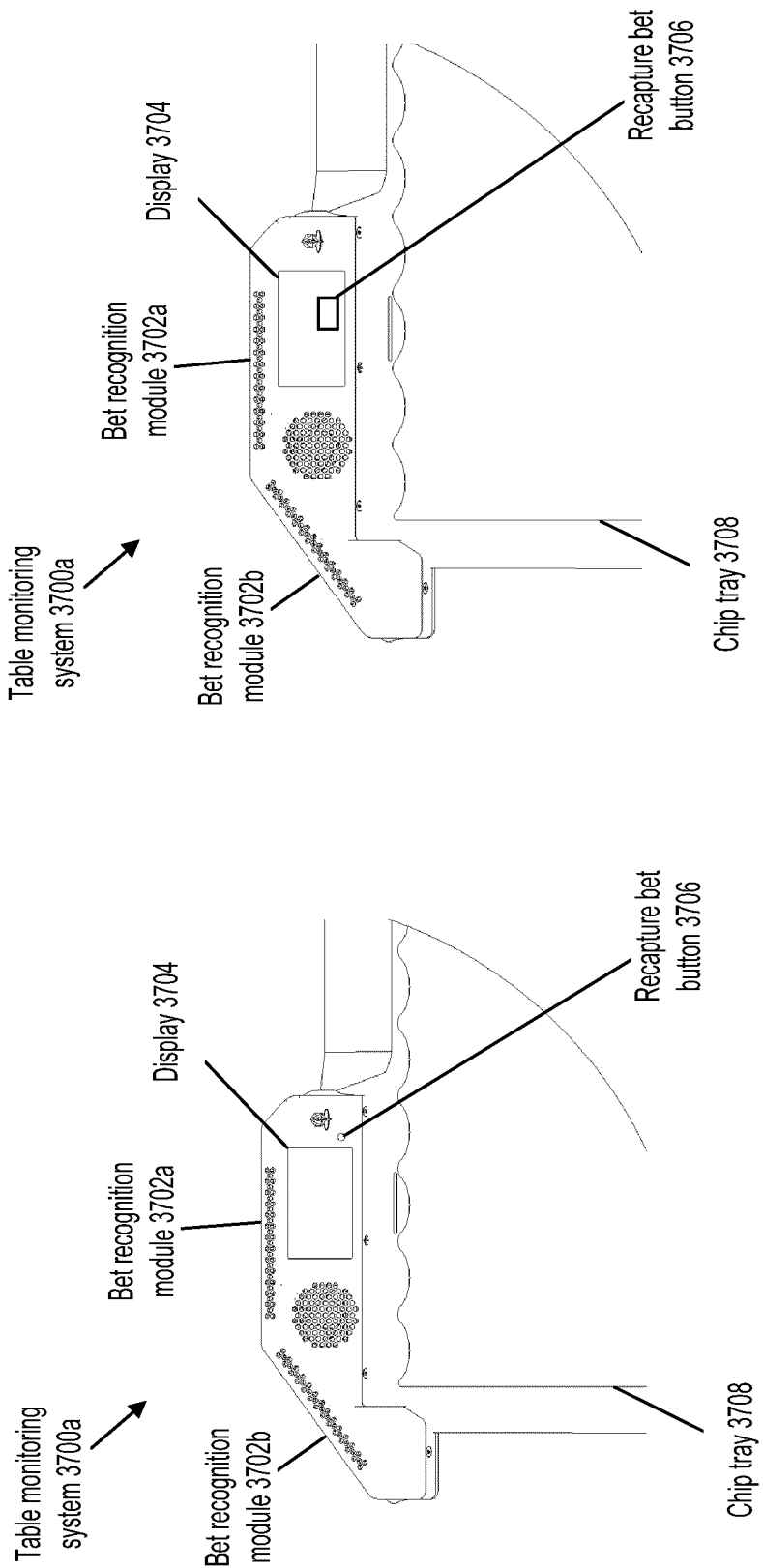
FIGS. 37A-37C illustrate schematic diagrams of an example table monitoring subsystem configured to recapture image data according to some embodiments.
Figure 37C:
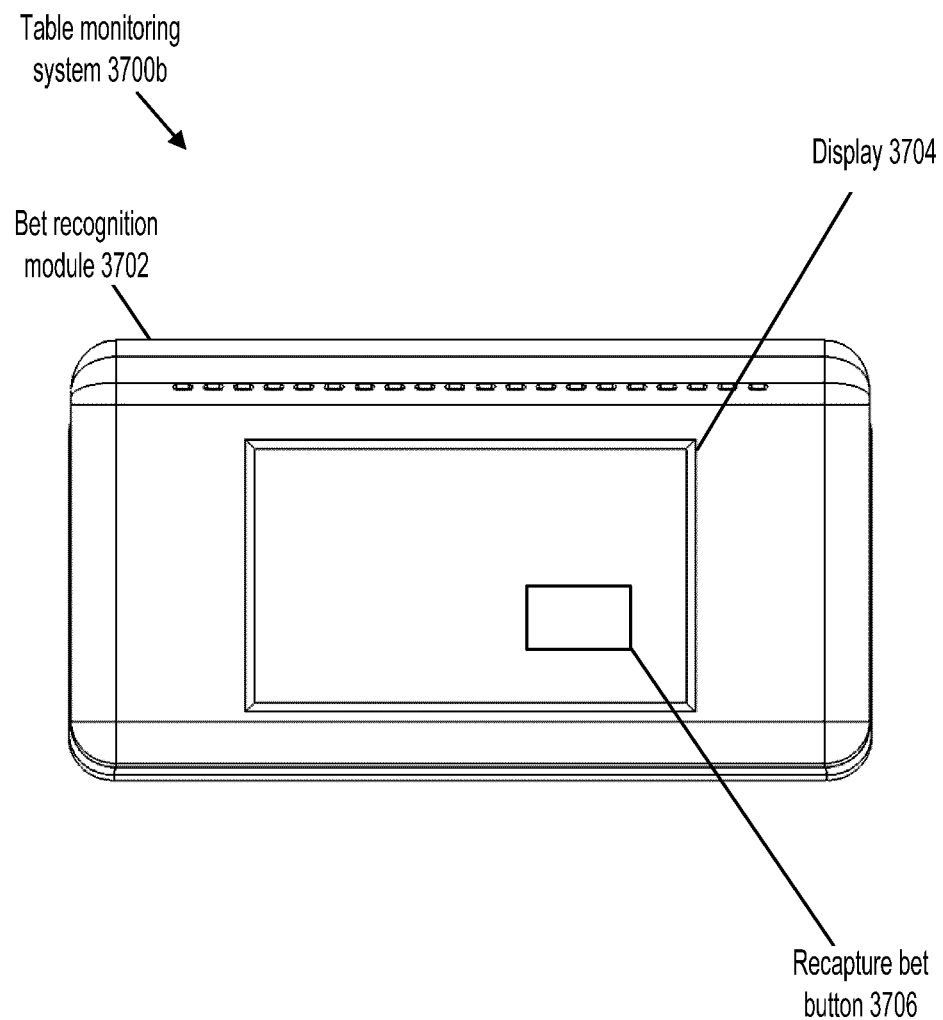

FIGS. 37A-37C illustrate schematic diagrams of an example table monitoring subsystem 3700a configured to recapture image data according to some embodiments. The table monitoring subsystem 3700a as depicted in FIG. 37A is generally similar to table monitoring subsystem 1900. The table monitoring subsystem 3700a is positioned on a chip tray 3708. The table monitoring subsystem 3700a comprises a first imaging component comprising a bet recognition module 3702a and 3702b generally to the bet recognition modules 1902 and a display 3704, except the first imaging component of the table monitoring subsystem 3700a comprises a recapture bet button 3706 for recapturing image data. For example, a dealer may press the recapture bet button 3706 to trigger the table monitoring subsystem 3700a to recapture image data of a particular bet area.

In some embodiments, the recapture bet button 3706 may be displayed on the display 3704. Where the display 3704 is a touch screen, the dealer may press the recapture bet button 3706 on the touch screen to trigger the table monitoring subsystem 3700a to recapture image data of a particular bet area.

The table monitoring subsystem 3700b as depicted in FIG. 37C is generally similar to table monitoring subsystem 2000. The table monitoring subsystem 3700b is positionable on a chip tray 3708 or on a surface of a gaming table offset from the chip tray 3708. The table monitoring subsystem 3700b comprises an imaging component comprising a bet recognition module 3702 generally similar to the bet recognition module 2002 and a display 3704.

In some embodiments, the recapture bet button 3706 may be displayed on the display 3704. Where the display 3704 is a touch screen, the dealer may press the recapture bet button 3706 on the touch screen to trigger the table monitoring subsystem 3700b to recapture image data of a particular bet area.

FIGS. 38A-38G illustrate schematic diagrams of example graphical renderings of table data gathered by a table monitoring subsystem rendered on a web-based interface according to some embodiments.

Figure 38A:
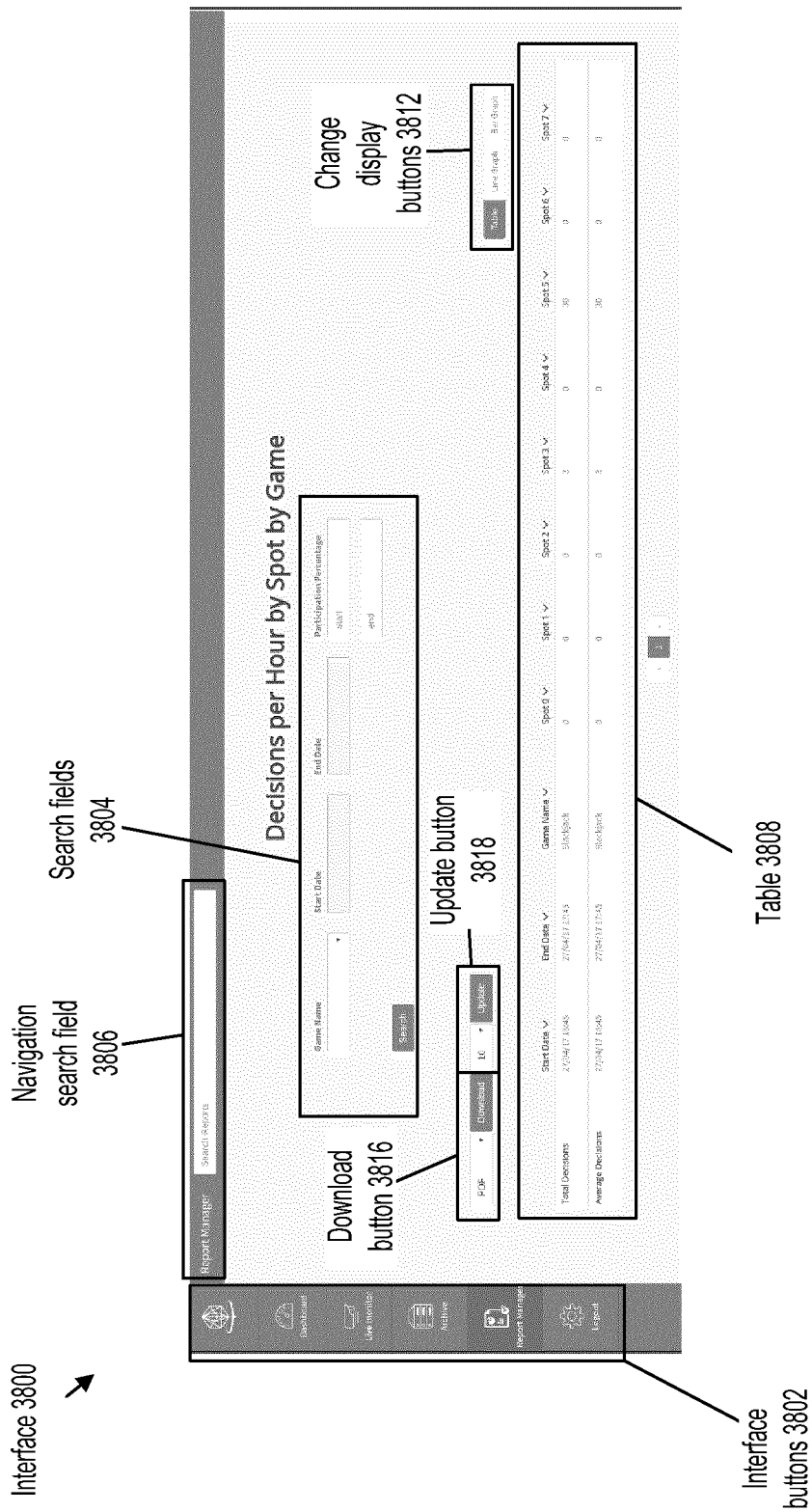
FIGS. 38A-38G illustrate schematic diagrams of example graphical renderings of table data gathered by a table monitoring subsystem rendered on a web-based interface according to some embodiments.

FIG. 38A depicts an example web-based interface 3800. The web-based interface may be provided the front end interface 110 residing on different types of devices. For example, the front end interface 110 may reside in a computer. The front end interface 110 may generate, assemble and transmit interface screens as web-based configuration, such as web-based interface 3800. As depicted in FIG. 38A to FIG. 38G, front end interface 110 may provide the interface 3800 comprising interface buttons 3802, search fields 3804, a navigation search field 3806, a table 3808 and/or graph 3810 of the data processed by the game monitoring server 104, change display buttons 3812, display option buttons 3814, a download button 3816, and/or an update button 3818.

A user may press one of the interface buttons 3802 to change the interface provided by the front end interface 110. For example, the user may press one of the interface buttons 3802 to enter a main page, a dashboard, a live monitor, an archive, or a report manager.

A user may input filter terms, such as a game name, start date, end date, and participation percentage in the search fields 3804 to filter the data presented on the interface 3800.

A user may input a search term in the navigation search field 3806 for the front end interface 110 to provide and render data relating to the search term on the interface 3800. For example, a user may input a search term for the front end interface 110 to display statistics such as dealer's hands per hour, table wages, and player wages.

Figure 38B:
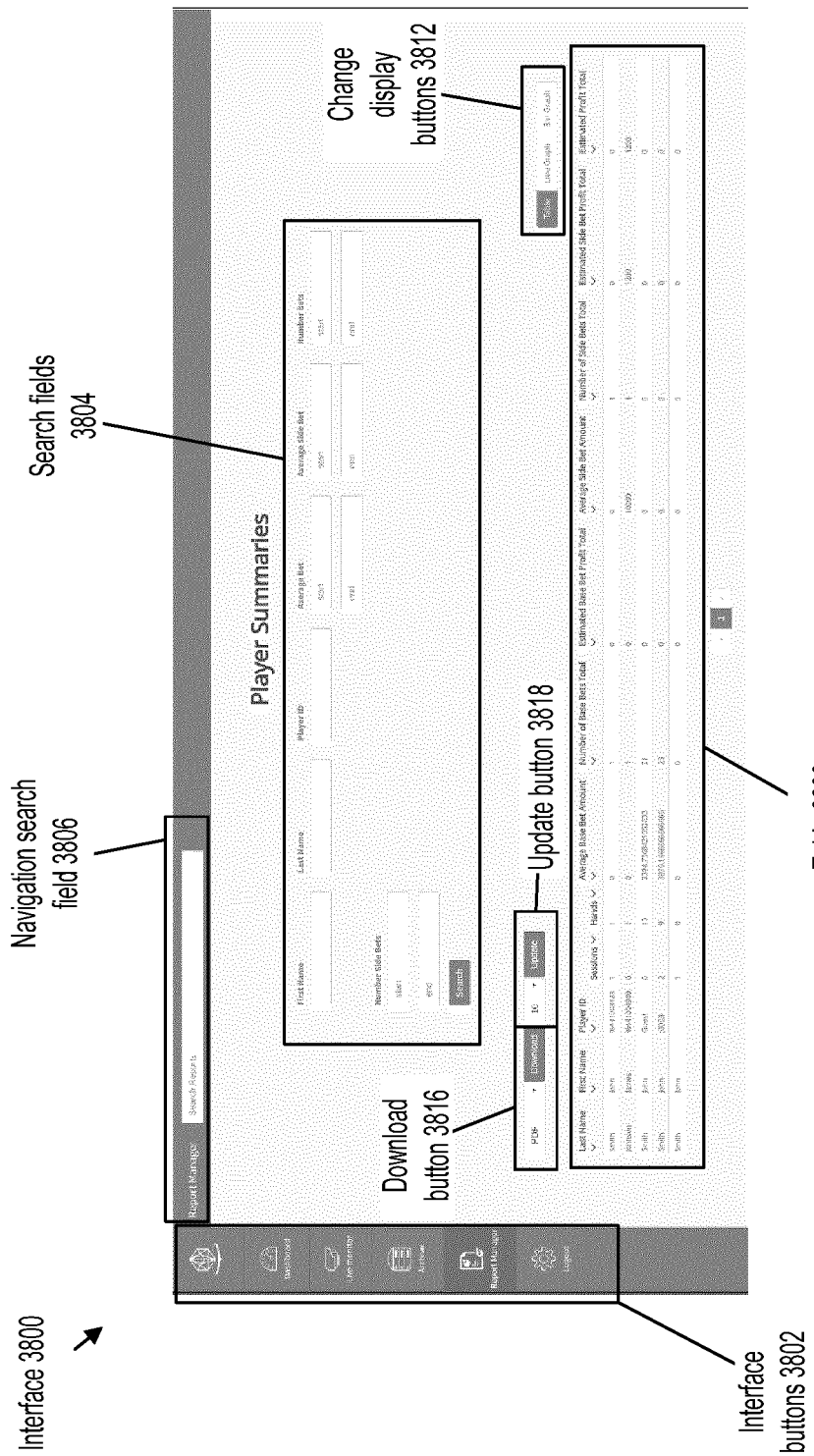
Figure 38C:
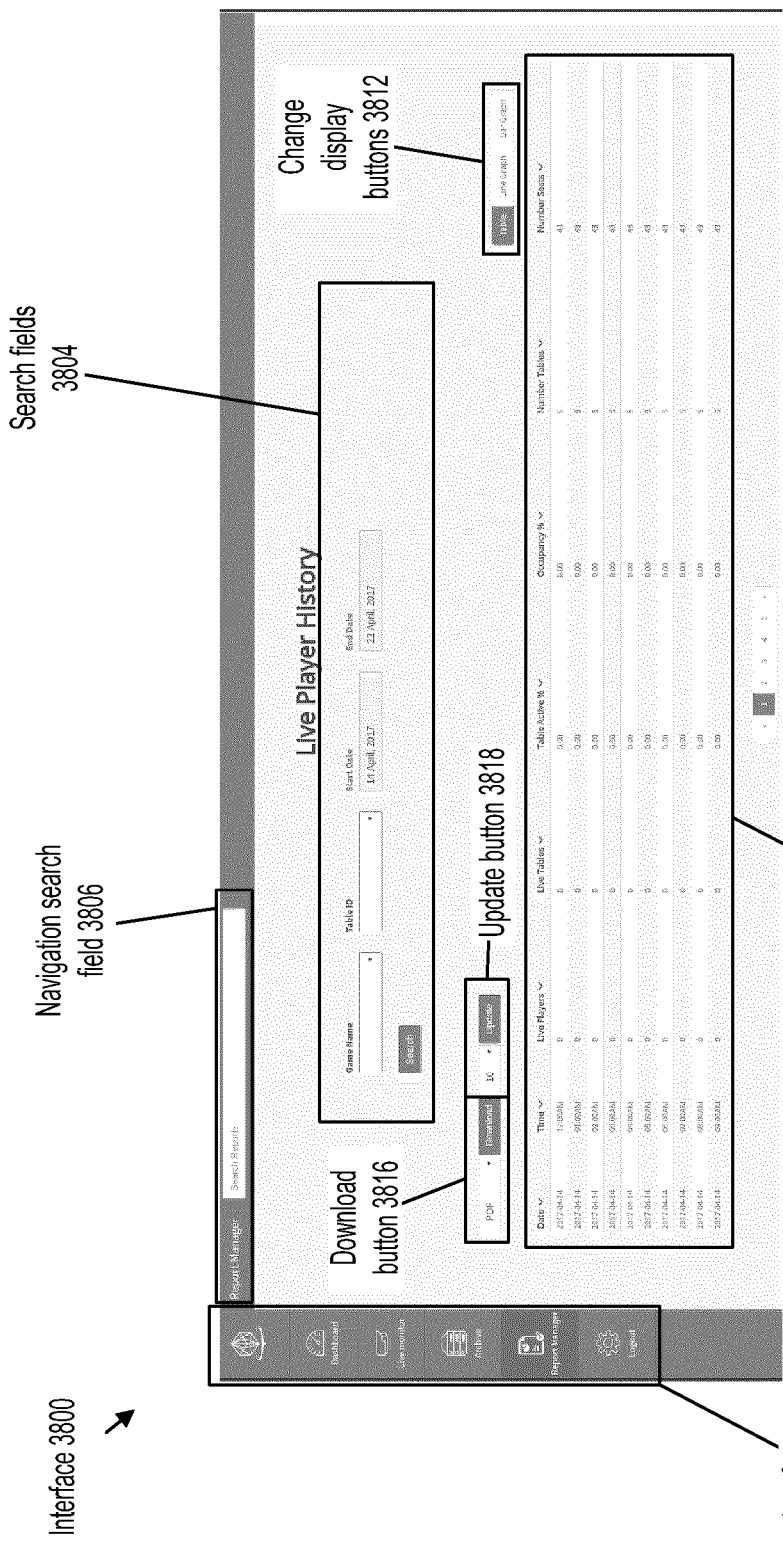
Figure 38D:
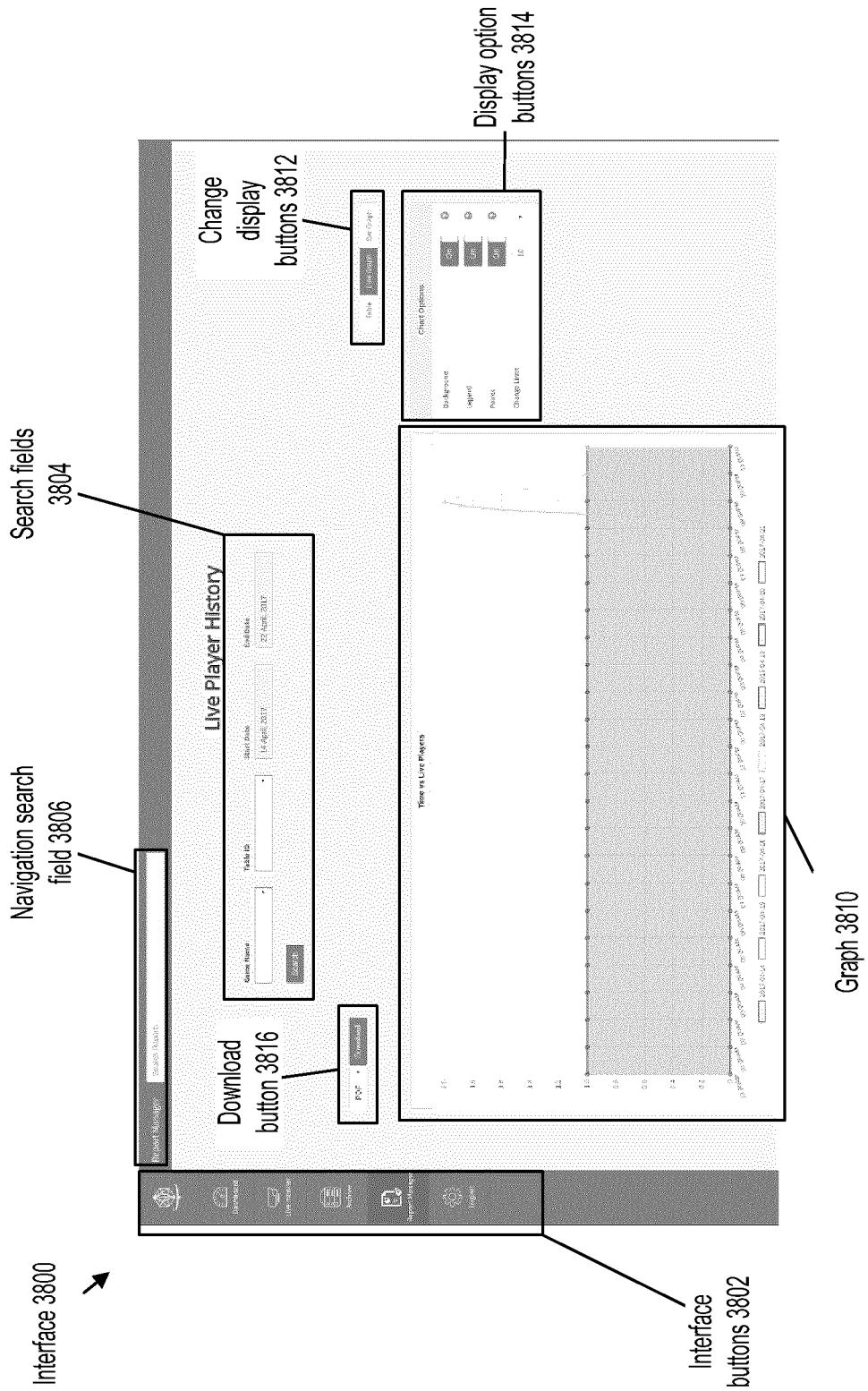
Figure 38E:
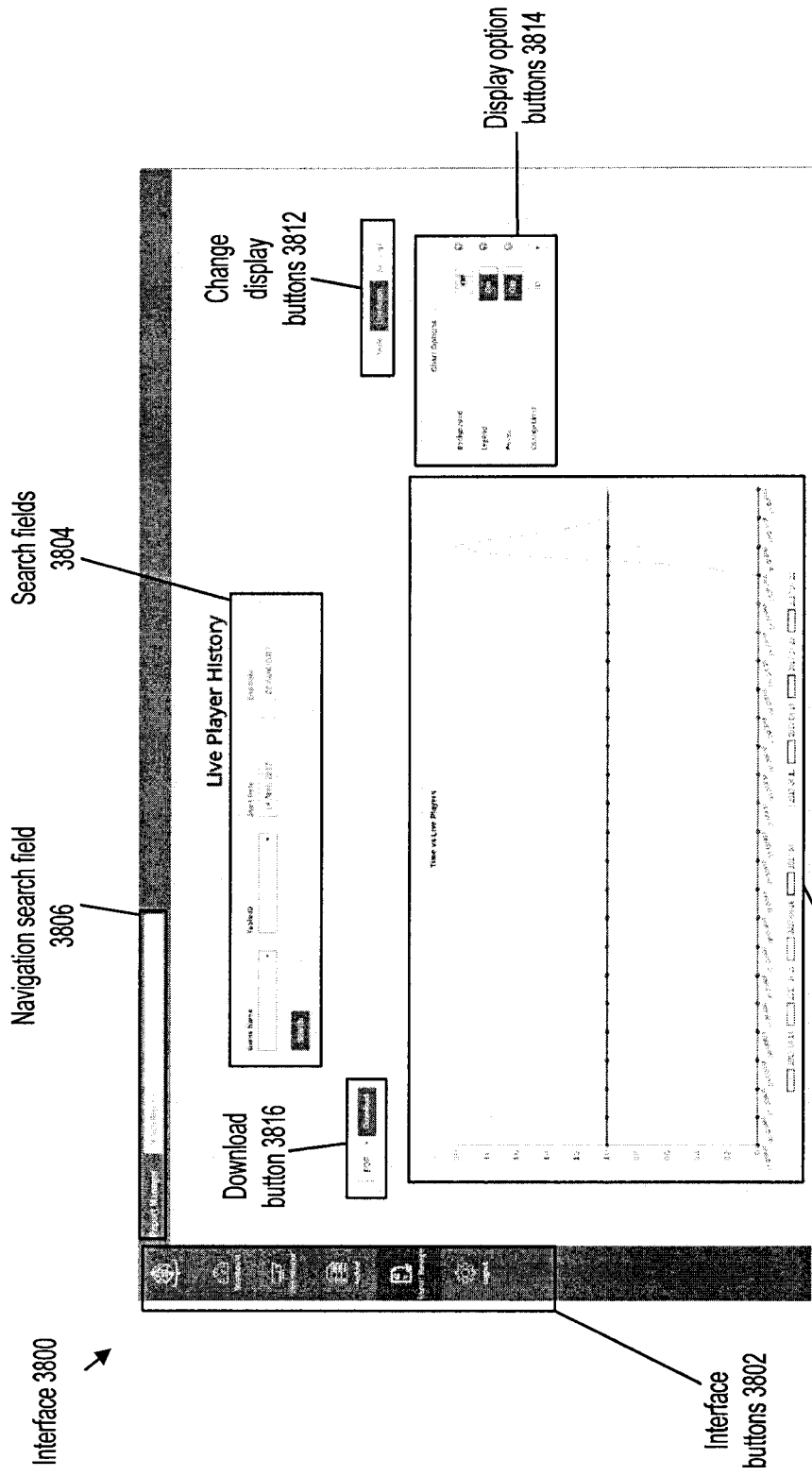
Figure 38F:
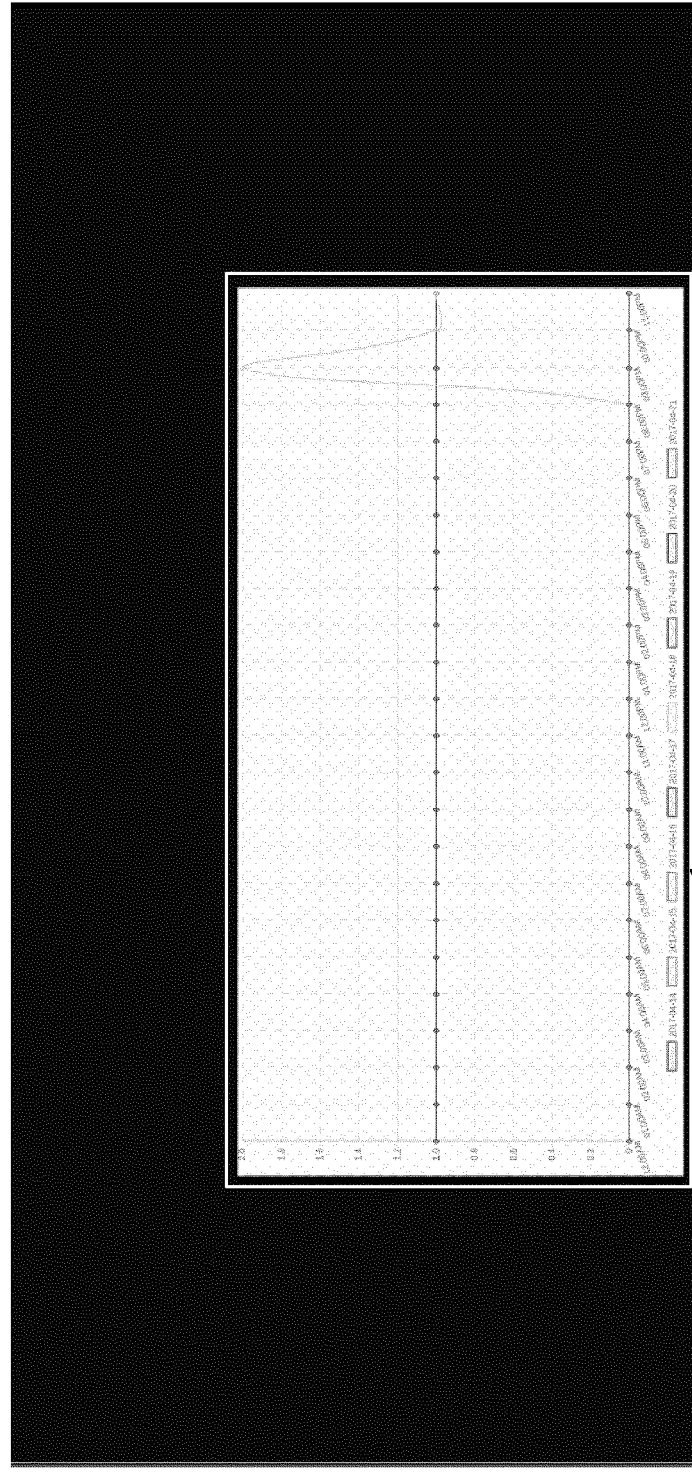
Figure 38G:
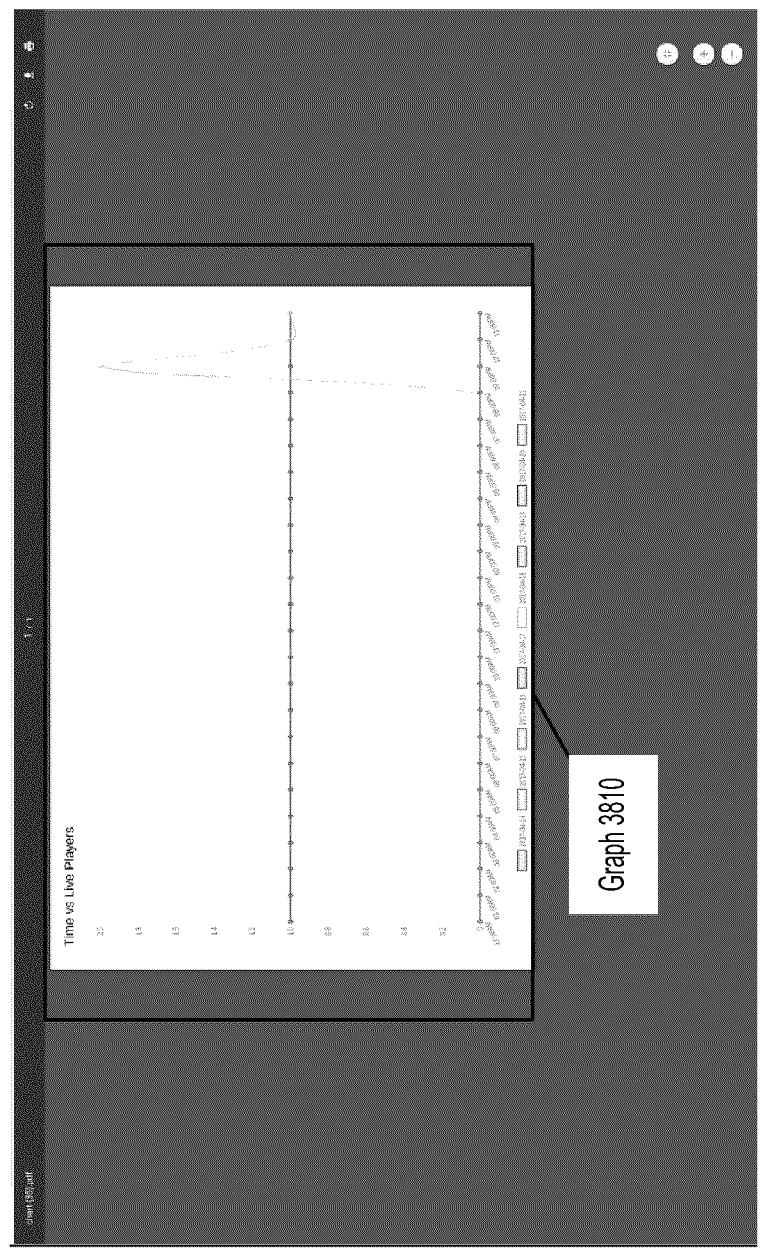

The front end interface 110 may provide the data processed by the game monitoring server 104 as a table, such as table 3808 as depicted in FIG. 38A to FIG. 38C, or a graph, such as graph 3810, as depicted in FIG. 38D to FIG. 38G. A user may toggle between a tabular or graphical display, or displaying a particular style of table of graph (e.g. live graph, bar graph) by pressing change display buttons 3812.

The user may change certain display settings of the table 3808 or graph 3810 by pressing display option buttons 3814. For example, the user may choose whether to display a background, legend, points, and a change limit.

The user may download the table 3808 or graph 3810, such as for saving or for printing, by pressing the download button 3816. The table 3808 or graph 3810 may be updated by pressing the update button 3818.

Figure 39:
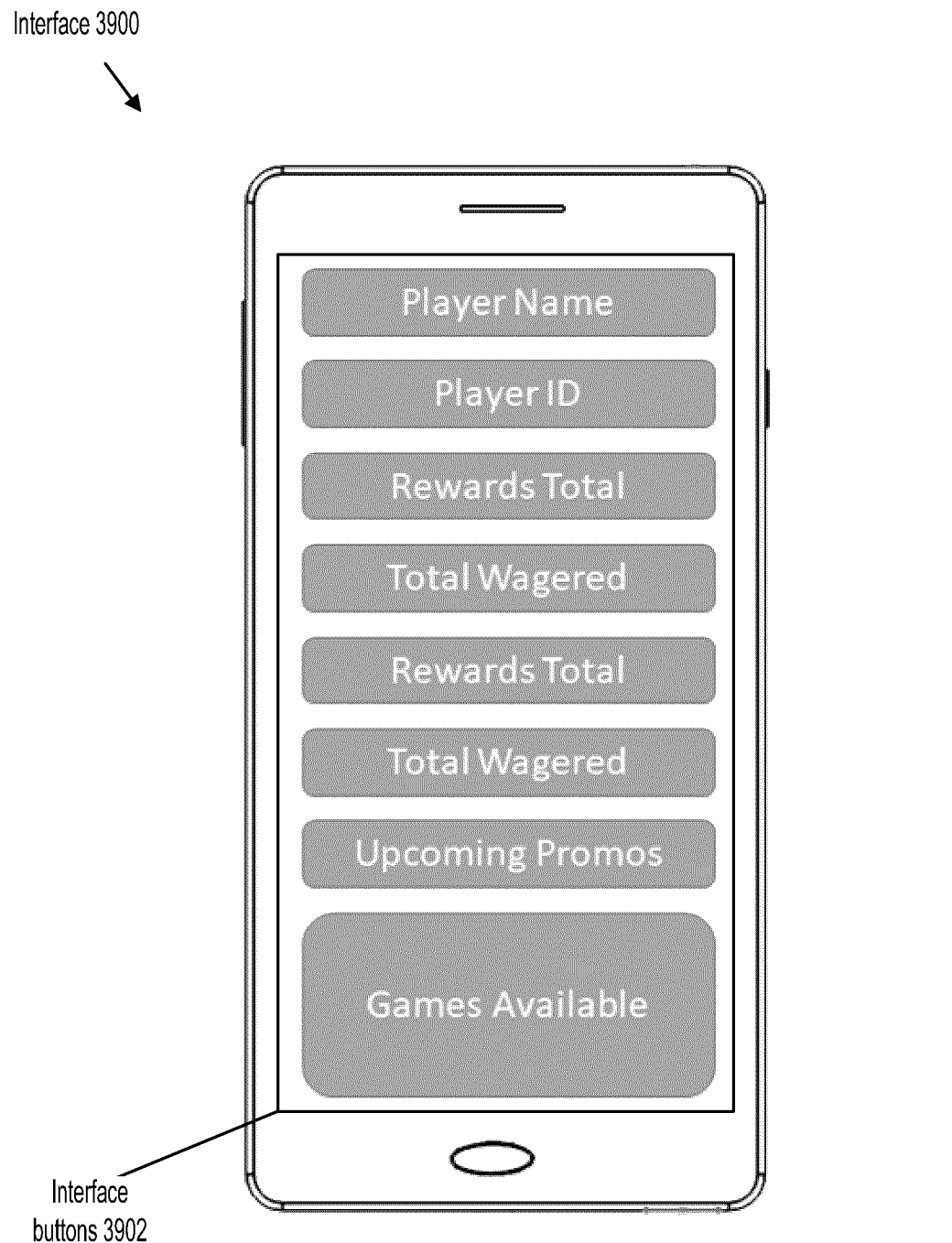
FIG. 39 illustrates a schematic diagram of an example graphical rendering rendered on a user device according to some embodiments.

A user may download an application for displaying table monitoring data generated by the game monitoring server 104 on their smart phone. FIG. 39 illustrates a schematic diagram of an example graphical rendering rendered on a user device according to some embodiments. FIG. 39 depicts an example user device interface 3900. The user device interface 3900 may be provided by the front end interface 110 residing on different types of devices. For example, the front end interface 110 may reside in a smart phone of a user. The front end interface 110 may generate, assemble and transmit interface screens for an application for a phone, such as user device interface 3900. In some embodiments, a user may download an application on their smart phone, and input log-in information, such as an identification number from a gaming facility membership card. In some embodiments, the user may input information relating to the gaming table, such as a table identification number, whole logging into the application. The game monitoring server 104 may determine that the log-in information is correct, and the front end interface 110 may provide the user device interface 3900 on the user's smart phone. Based on the log-in information that was used, front end interface 110 may provide data related to the user associated the log-in information. As depicted in FIG. 39, front end interface 110 may provide the interface 3900 comprising one or more interface buttons 3902. The user may press the interface buttons 3902 for the front end interface 110 to render data processed by the game monitoring server 104 on the device. For example, the user may press an interface buttons 3902 to review their rewards and any compensatory benefits, points or credits that have been earned through game play at the gaming facility, the amount that the player has wagered, won, and/or lost, upcoming promotions of the gaming facility, the layout of the casino, the number of players at tables, and statistics relating to dealers, such as dealers who have dealt more hands (indicative of a fast dealer), dealers who have felt fewer hands (indicative of a slow dealer), and dealers who generate good rapport with players.

In some embodiments, after the user has logged in with their log-in information to the application, as the user plays games, the game monitoring server 104 may tag the captured data to associate the captured data with the user.

In some embodiments, the image data captured by the table monitoring subsystem may be transmitted to a user. The image data captured by the table monitoring subsystem may include the chips used during a game and a background, which may include the user. For example, the captured image data may correspond to a user winning chips.

Figure 40A:
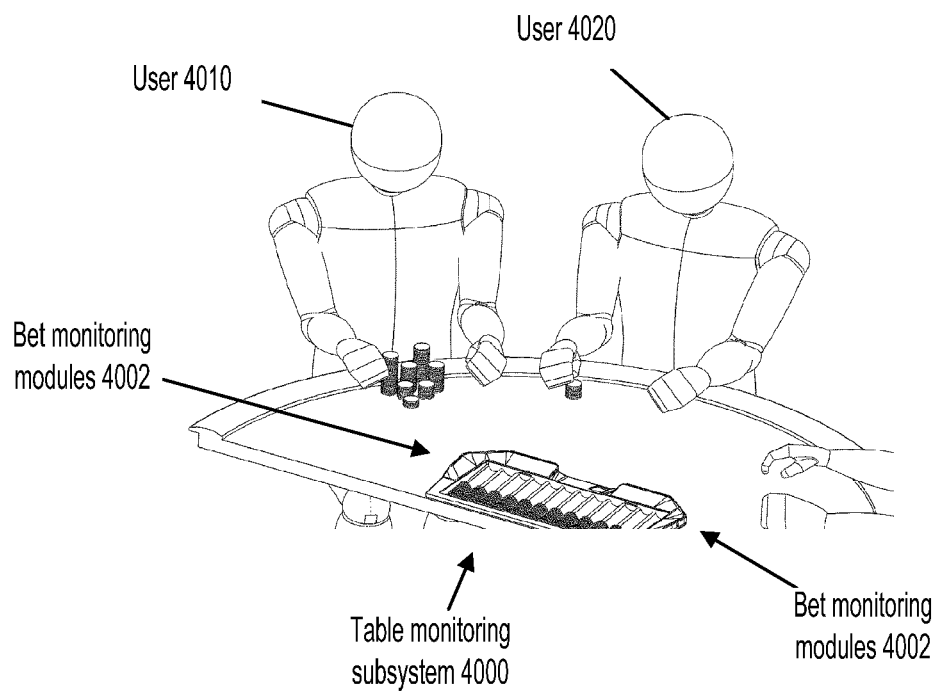
FIG. 40A illustrates a schematic diagram of players at a gaming table monitored by a table monitoring subsystem according to some embodiments.
Figure 40B:
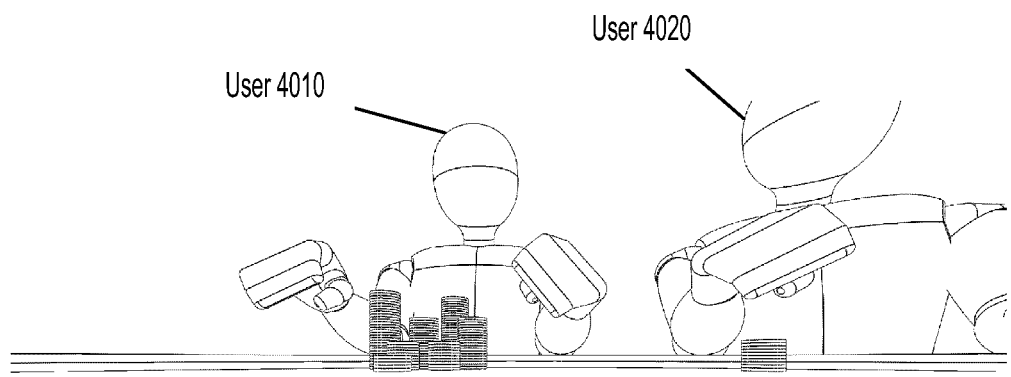
FIG. 40B illustrates an example image taken from a bet recognition device of a table monitoring assembly according to some embodiments.

FIG. 40A is a schematic diagram illustrating user 4010 and user 4020 playing a game at a gaming table. The table monitoring subsystem 4000 is monitoring the gaming table. The table monitoring subsystem 4000 comprises bet recognition modules 4002. FIG. 40B depicts an example image taken of the user 4010 from the bet recognition module 4002 of the table monitoring subsystem.

In some embodiments, after the user 4010 has won a game, the game monitoring server 104 may transmit image data corresponding to the moment that the user 4010 won the game, as depicted in FIG. 40B, for example. In some embodiments, the image data may be transmitted to the user via email. In some embodiments, the user may access the image data through the smart phone application as described with respect to FIG. 39.

In some embodiments, the game monitoring server 104 may receive image data captured from the table monitoring subsystem to generate table monitoring data. In some embodiments, the game monitoring server may receive image data captured by one or more overhead cameras, such as a security camera, for calibrating the imaging components of the table monitoring subsystem.

Figure 41A:
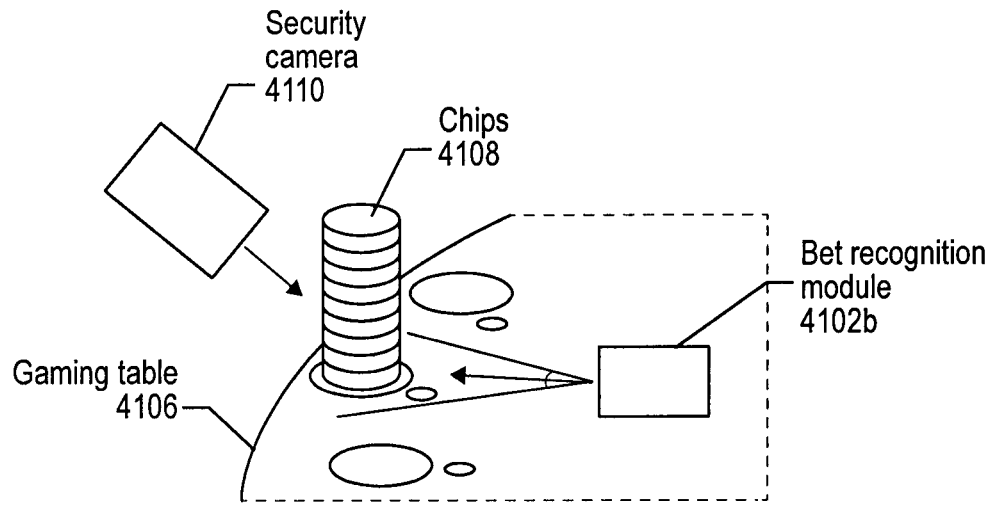

FIG. 41A depicts a schematic diagram of chips 4108 on a gaming table 4106. A bet recognition module 4102, such as bet recognition module 4102*b* of the table monitoring subsystem 4100 may be capturing image data of the chips 4108. As depicted in FIG. 41A, the bet recognition module 4102*b* may be capturing image data corresponding to the side of the stack of chips 4108.

Figure 41B:
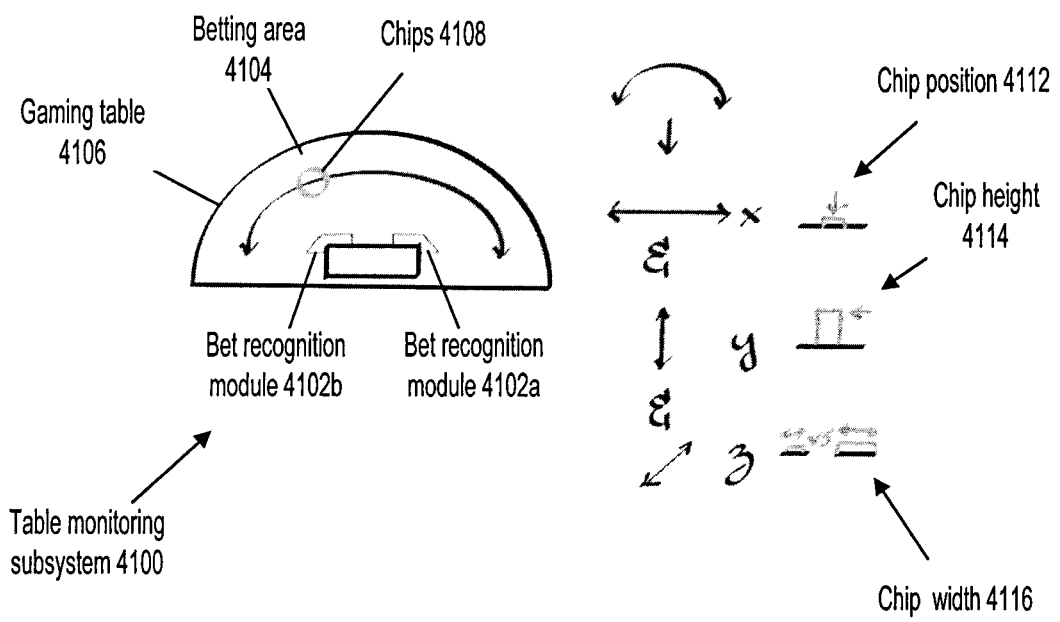

FIG. 41B depicts a schematic diagram of chips 4108 on the gaming table 4106. As depicted in FIG. 41A and FIG. 41B, the security camera 4110 may be positioned above the gaming table 4106, such that the security camera 4110 may capture image data corresponding to the gaming table 4106, the chips 4108, and the betting area 4104 where the chips 4108 are placed.

The image data captured from the security camera 4110 may be transmitted to the game monitoring server 104. The game monitoring server 104 may also know the distance from the gaming table 4106 to the security camera 4110. The game monitoring server 104 may process the image data captured from the security camera 4110 to determine the position of the chips 4108 relative to the table monitoring subsystem 4100 and the gaming table 4106, for calibrating the imaging components (e.g. cameras) of the table monitoring subsystem.

In some embodiments, based on the image data captured by the security camera 4110, the game monitoring server 104 may determine the height 4114 of the chip, and the width 4116 of the chip. The game monitoring server 104 may also determine the position 4112 of the chip in the image data captured by the imaging components of the table monitoring subsystem 4100.

In some embodiments, a distinguishing marker may be printed on the gaming table, the table monitoring subsystem, or both, for the security camera 4110 to orient itself, such that the image data captured by the security camera 4110 may be processed by the game monitoring server 104 to calibrate the table monitoring subsystem. As depicted in FIG. 41C, the table monitoring subsystem 4100 may have QR codes 4120 printed thereon. As depicted in FIG. 41D, the QR codes 4120 may be printed on both the felt of the gaming table 4106 and the table monitoring subsystem 4100. As depicted in FIG. 41E, the gaming table 4106 may have QR codes 4120 printed thereon. While FIGS. 41C, 410, and 41E depict using QR codes as the distinguishing marker, other distinguishing markers may be used that may be detected by the security camera 4110 to orient itself.

In some embodiments, the security camera 4110 may capture image data corresponding to the QR code 4120. The game monitoring server 104 may process the image data corresponding to the QR code 4120 and may determine the identification of the gaming table 4106, and may determine a three-dimensional orientation of the gaming table 4106. The game monitoring server 104 may also generate a three-dimensional model of the gaming table 4106. The QR codes may be markings that may or may not be visible to human users.

The image data captured of the QR codes 4120 printed on the table monitoring subsystem 4100 may also be processed to identify the table monitoring subsystem 4100, for example, to recall maintenance records of the table monitoring subsystem 4100 and schedule upcoming maintenance or performance review.

Figure 42A:
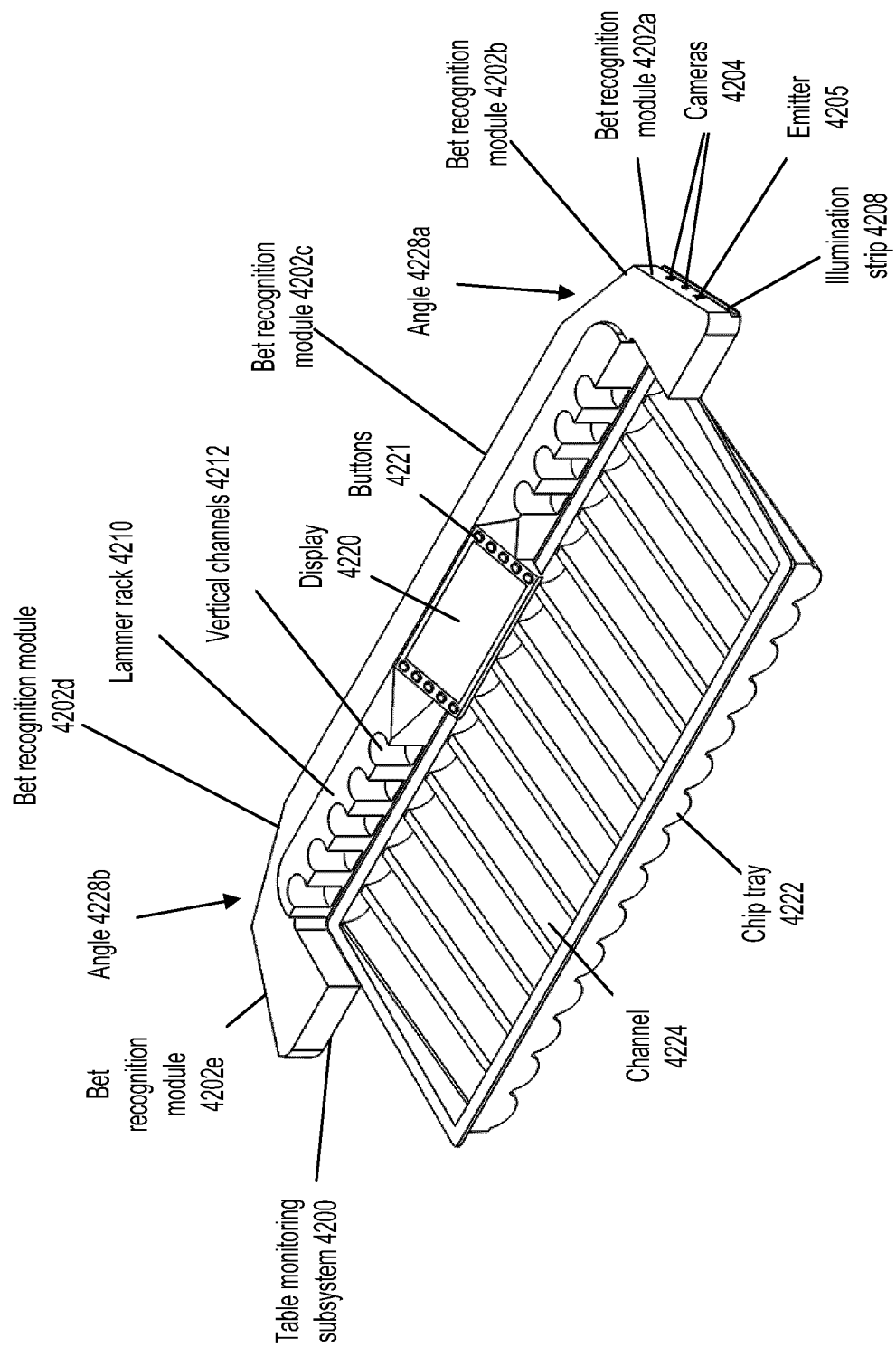
Figure 42B:
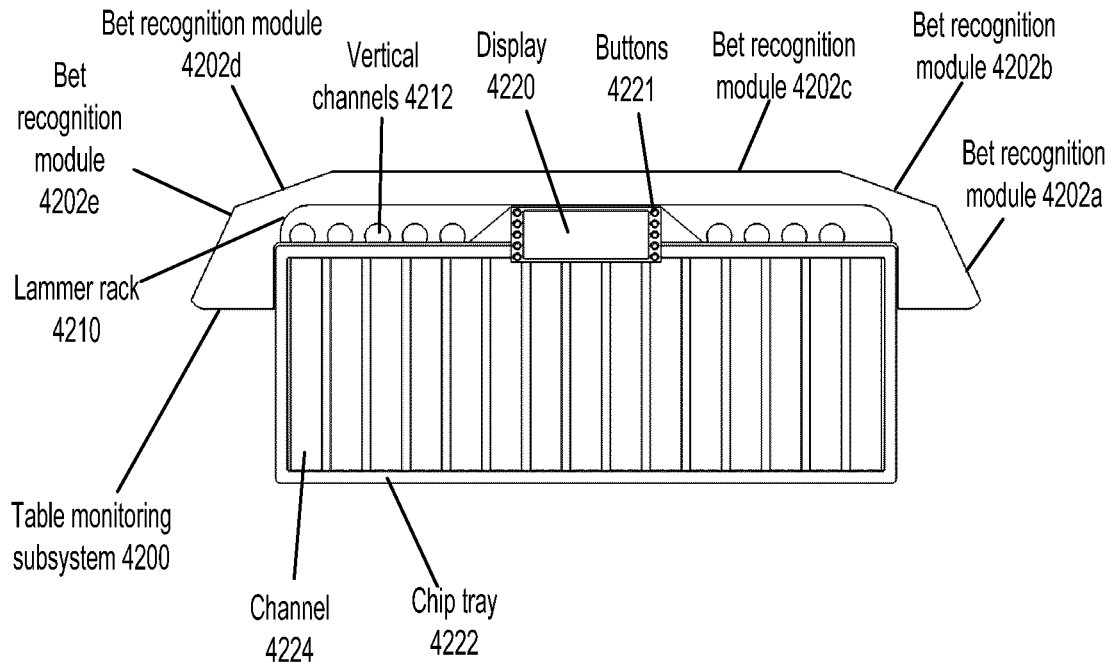
Figure 42C:
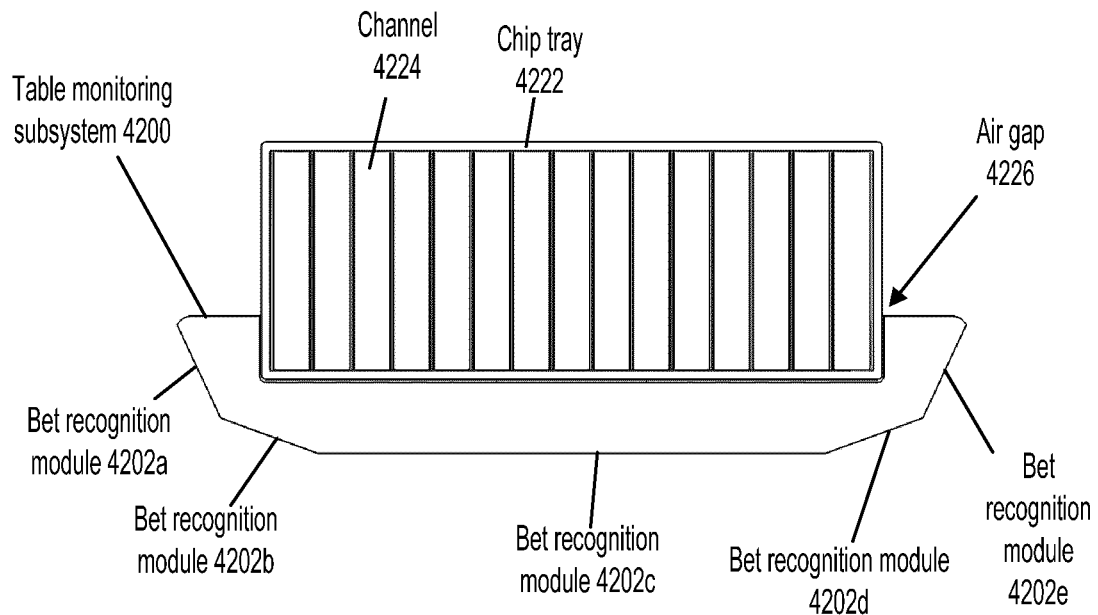
Figure 42D:
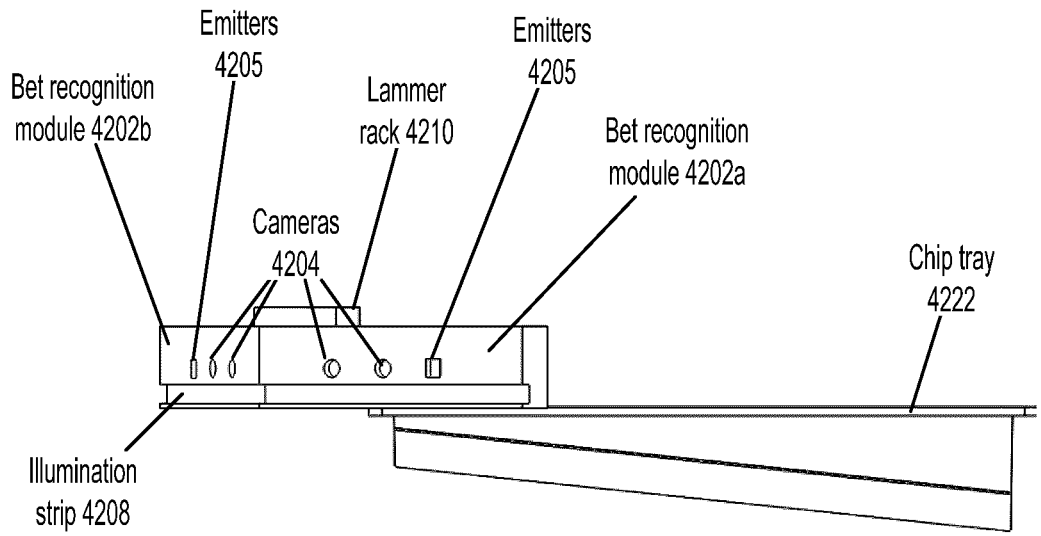
Figure 42E:
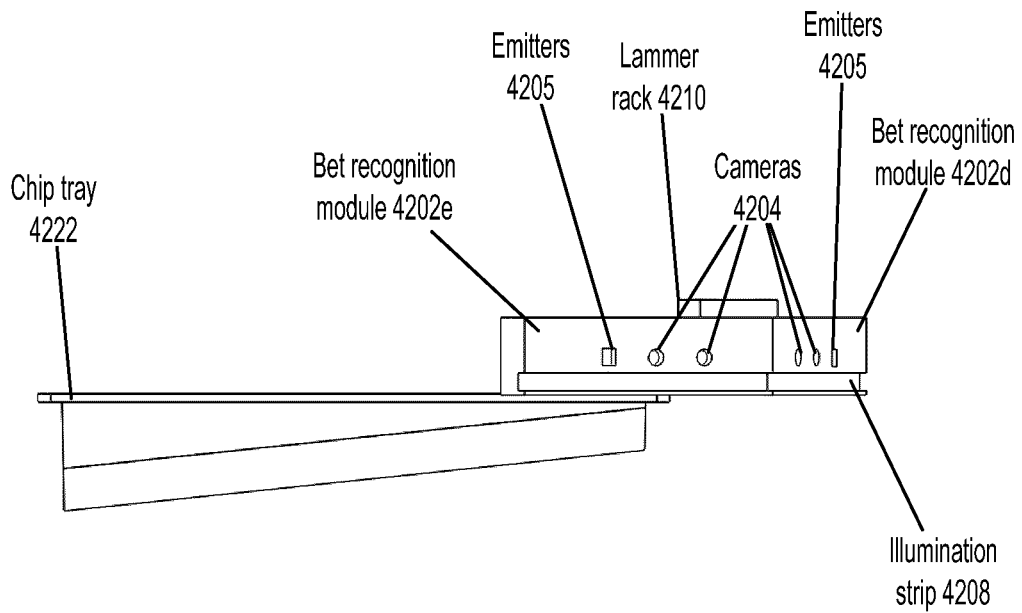
Figure 42F:
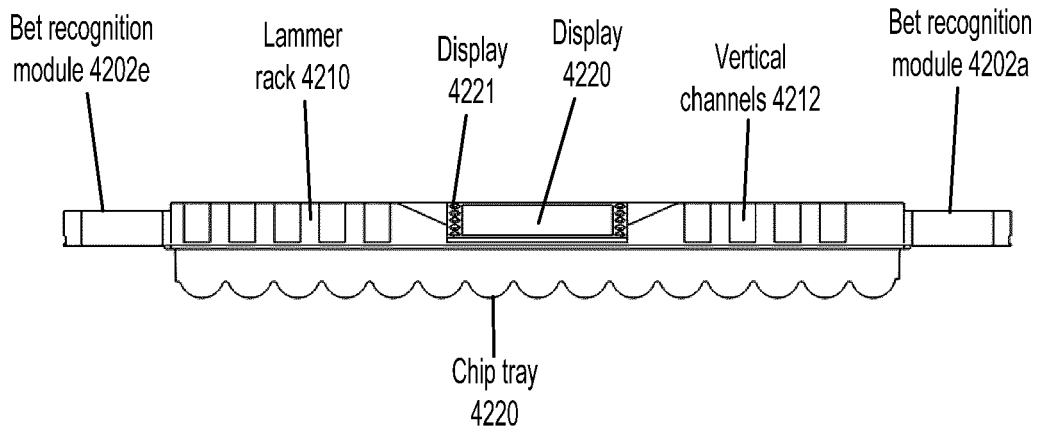
Figure 42G:
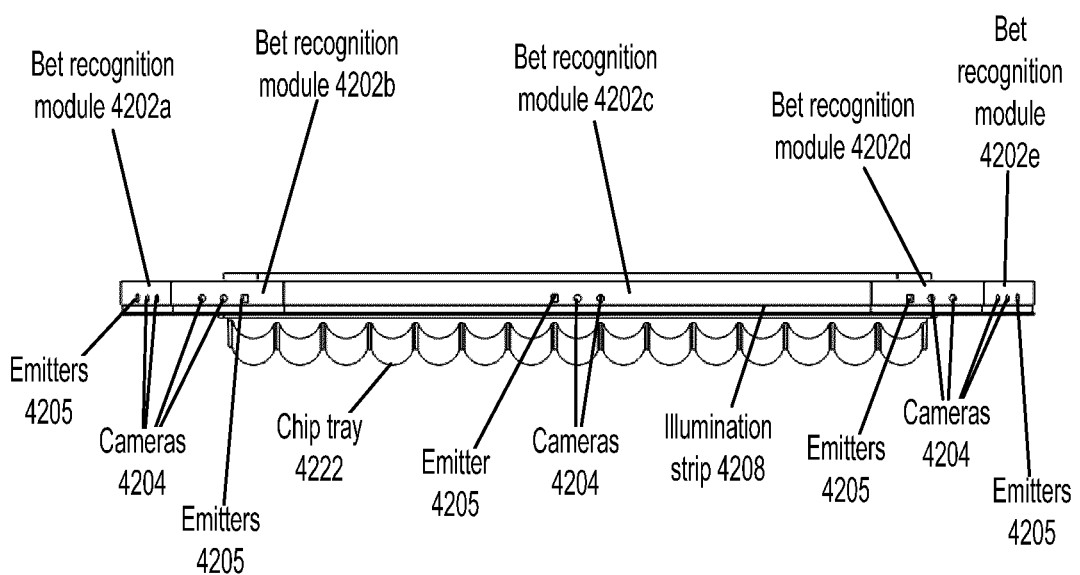

FIGS. 42A to 42G depicts another example table monitoring subsystem 4200 according to some embodiments. The table monitoring subsystem 4200 may be used to monitor a table for playing baccarat. The table monitoring subsystem 4200 is generally similar to table monitoring subsystem 600, except the table monitoring subsystem 4200 comprises a lammer rack 4210 for receiving lammers used during the play of baccarat. The table monitoring subsystem 4200 comprises a first imaging component and a second imaging component. As depicted in FIG. 42A, the first imaging component is positioned on a first corner of a chip tray 4222, and the second imaging component is positioned on a second corner of the chip tray 4222. The chip tray 4222 comprises one or more channels 4224 for receiving chips.

The imaging component of the table monitoring subsystem 4200 comprises five bet recognition modules 4202a, 4202b, 4202c, 4202d, and 4202e. Each bet recognition module 4202 comprises one or more cameras 4204 and an emitter 4205 to capture image data. As depicted in FIG. 42A, the bodies of the bet recognition modules 4202a, 4202b, 4202c, 4202d, and 4202e are joined to define an integral body of the table monitoring subsystem 4200.

In some embodiments, where the table monitoring subsystem 4200 is used for baccarat, the cameras 4204 and emitter 4205 may be positioned above the gaming table at a height such that the field of view of the cameras 4204 and emitter 4205 are not obscured by chips or playing equipment (e.g. box for collecting lammers) placed at various areas of the gaming area, such as gaming areas relatively proximate to the table monitoring subsystem 4200, or gaming areas relatively distant from the table monitoring subsystem 4200.

As depicted in FIG. 42A, similar to table monitoring subsystem 600, the bet recognition modules 4202a, 4202b, and 4202c define an angle 4228a therebetween, and the bet recognition modules 4202c, 4202d, and 4202e define an angle 4228b therebetween. The angles 4228a and 4228b substantially correspond to the first and second corners of the chip tray 4222, such that the geometry and shape of the table monitoring subsystem 4200 is complementary to the geometry and shape of the chip tray 4222 upon which the table monitoring subsystem 4200 is positioned.

In some embodiments, similar to table monitoring subsystem 600, the table monitoring subsystem 4200 may comprise a card reader unit generally similar to card reader unit 606 for capturing image data corresponding to one or more cards used during the play of a game.

Similar to table monitoring subsystem 600, the table monitoring subsystem 4200 comprises an illumination strip 4208 generally similar to illumination strip 608 and may provide illumination in all or a portion of the field of view of the imaging component.

Similar to table monitoring subsystem 600, the table monitoring subsystem 4200 comprises a display 4220 and buttons 4221 generally similar to display 610 and buttons 612 for displaying data processed by the game monitoring server 104.

In some embodiments, the table monitoring subsystem 4200 may comprise tray imaging components, such as time of flight sensors, tray monitoring cameras, and optic sensors, generally similar to time of flight sensors 2418, tray monitoring cameras 2504 and 2606, and optic sensors 2718, as described herein, to capture data corresponding to the chips in the chip tray 4222 for transmitting to the game monitoring server 104.

As depicted in FIG. 42A, the table monitoring subsystem 4200 comprises a lammer rack 4210. The lammer rack 4210 comprises a plurality of vertical channels 4212 for receiving lammers used while playing baccarat. In some embodiments, the lammer may represent commission owed to a dealer, and the lammer may be exchanged for chips when convenient. The diameter of the channels 4212 may be sized to receive the lammers used when playing baccarat.

In some embodiments, the table monitoring subsystem 4200 and the lammer rack 4210 are joined. In other embodiments, the table monitoring subsystem 4200 and the lammer rack 4210 are removably joined.

In some embodiments, one or more optic sensors generally similar to the optic sensors 2718 may be mounted to the axially along the channels 4212 for capturing image data of the lammers in the channels 4212. The game monitoring server 104 may process the data to determine the number of lammers in the channels 4212.

In some embodiments, a table monitoring subsystem may be positionable on a chip tray, without being in direct contact with the chip tray. As depicted in FIG. 42A, the table monitoring subsystem 2800 is positioned on a front side of the chip tray 4222. As depicted more clearly in FIG. 42C, while the table monitoring subsystem 4200 may be positioned on the chip tray 4222, the table monitoring subsystem 4200 does not directly contact the chip tray 4222, the table monitoring subsystem 4200 and the chip tray 4222 defining an air gap 4226 therebetween. That is, the table monitoring subsystem 4200 is positioned in front of the tray 4222.

In some embodiments, the table monitoring subsystem 4200 may be positioned over at least a portion of the tray 4222. In some embodiments, the table monitoring subsystem 4200 may be positioned such that the table monitoring subsystem 4200 covers at least a portion of the tray 4222.

In some embodiments, the table monitoring subsystem 4200 may be positioned relative to a set of double-stacked chip trays. A first tray may be positioned above a second tray, and the first tray may be lifted upward and pushed forward to reveal the second tray. The first tray and the second tray may have a sufficient clearance between them such that displacement and positioning of the first tray does not damage the second tray, such as by the first tray colliding with the second tray.

In some embodiments, the table monitoring subsystem 4200 may comprise tray imaging components, such as time of flight sensors, tray monitoring cameras, and optic sensors, generally similar to time of flight sensors 2418, tray monitoring cameras 2504 and 2606, and optic sensors 2718, as described herein, to capture data corresponding to the chips in the first tray and the second tray configured in the double-stacked chip tray configuration for transmitting to the game monitoring server 104.

FIG. 43A to 43G depicts another example table monitoring subsystem 4300 according to some embodiments. The table monitoring subsystem 4300 may be used to monitor a table for playing baccarat. The table monitoring subsystem 4300 is generally similar to table monitoring subsystem 4200, except the table monitoring subsystem 4300 is integrally formed with the chip tray on which it is positioned. The table monitoring subsystem 4300 comprises a first imaging component and a second imaging component. As depicted in FIG. 43A, the first imaging component is positioned on a first corner of a chip tray 4322, and the second imaging component is positioned on a second corner of the chip tray 4322. The chip tray 4322 comprises one or more channels 4324 for receiving chips.

The imaging component of the table monitoring subsystem 4300 comprises five bet recognition modules 4302a, 4302b, 4302c, 4302d, and 4302e. Each bet recognition module 4302 comprises one or more cameras 4304 and an emitter 4305 to capture image data. As depicted in FIG. 43A, the bodies of the bet recognition modules 4302a, 4302b, 4302c, 4302d, and 4302e are joined to define an integral body of the table monitoring subsystem 4300.

In some embodiments, where the table monitoring subsystem 4300 is used for baccarat, the cameras 4304 and emitter 4305 may be positioned above the gaming table at a height such that the field of view of the cameras 4304 and emitter 4305 are not obscured by chips or playing equipment (e.g. box for collecting lammers) placed at various areas of the gaming area.

As depicted in FIG. 43A, similar to table monitoring subsystem 4200, the bet recognition modules 4302a, 4302b, and 4302c define an angle 4328a therebetween, and the bet recognition modules 4302c, 4302d, and 4302e define an angle 4328b therebetween. The angles 4328a and 4328b substantially correspond to the first and second corners of the chip tray 4322, such that the geometry and shape of the table monitoring subsystem 4300 is complementary to the geometry and shape of the chip tray 4322 upon which the table monitoring subsystem 4300 is positioned.

In some embodiments, similar to table monitoring subsystem 600, the table monitoring subsystem 4300 may comprise a card reader unit generally similar to card reader unit 606 for capturing image data corresponding to one or more cards used during the play of a game.

Similar to table monitoring subsystem 4200, the table monitoring subsystem 4300 comprises an illumination strip 4308 generally similar to illumination strip 4208 and may provide illumination in all or a portion of the field of view of the imaging component.

Similar to table monitoring subsystem 4200, the table monitoring subsystem 4300 comprises a display 4320 and buttons 4321 generally similar to display 4220 and buttons 4221 for displaying data processed by the game monitoring server 104.

In some embodiments, the table monitoring subsystem 4300 may comprise tray imaging components, such as time of flight sensors, tray monitoring cameras, and optic sensors, generally similar to time of flight sensors 2418, tray monitoring cameras 2504 and 2606, and optic sensors 2718, as described herein, to capture data corresponding to the chips in the chip tray 4322 for transmitting to the game monitoring server 104.

As depicted in FIG. 43A, the table monitoring subsystem 4300 comprises a lammer rack 4310 similar to lammer rack 4210 of the table monitoring subsystem 4200. The lammer rack 4310 comprises a plurality of vertical channels 4312 for receiving lammers used while playing baccarat. In some embodiments, the lammer may represent commission owed to a dealer, and the lammer may be exchanged for chips when convenient. The diameter of the channels 4312 may be sized to receive the lammers used when playing baccarat.

In some embodiments, the table monitoring subsystem 4300 and the lammer rack 4310 are joined. In other embodiments, the table monitoring subsystem 4300 and the lammer rack 4310 are removably joined.

In some embodiments, one or more optic sensors generally similar to the optic sensors 2718 may be mounted to the axially along the channels 4312 for capturing image data of the lammers in the channels 4312. The game monitoring server 104 may process the data to determine the number of lammers in the channels 4312.

In some embodiments, the table monitoring subsystem and the chip tray may be integrally formed. As depicted in FIG. 43C, the table monitoring subsystem 4300 are integrally formed with the chip tray 4322 to define an integral body defining the body of the table monitoring subsystem 4300 and the chip tray 4322. Where the table monitoring subsystem 4300 is integrally formed with the chip tray 4322, the cameras of the imaging components may be more level when the table monitoring subsystem 4300 and the chip tray 4322 are mounted to the gaming table.

FIG. 44A to 44G depicts another example table monitoring subsystem 4400 according to some embodiments. The table monitoring subsystem 4400 may be used to monitor a table for playing baccarat. The table monitoring subsystem 4400 is generally similar to table monitoring subsystems 4200 and 4300, except the table monitoring subsystem 4400 does not have a lammer rack. The table monitoring subsystem 4400 may not have a lammer rack if baccarat is played without commission. The table monitoring subsystem 4400 comprises a first imaging component and a second imaging component. As depicted in FIG. 44A, the first imaging component is positioned on a first corner of a chip tray 4404, and the second imaging component is positioned on a second corner of the chip tray 4404. FIG. 44A depicts a card shoe 4406 on the gaming table 4410 for dispensing cards to be used when playing baccarat.

The imaging component of the table monitoring subsystem 4400 comprises five bet recognition modules. Each bet recognition module comprises one or more cameras and an emitter to capture image data. In some embodiments, the cameras on the bet recognition module of the table monitoring subsystem 4400 may comprise an auxiliary camera, such as a high-resolution camera or an ultraviolet camera.

As depicted in FIG. 44A, the cameras and the emitter of the bet recognition module have a combined field of view 4408. The combined fields of view 4408*a*, 4408*b*, 4408*c*, 4408*d*, and 4408*e* of the five bet recognition modules generally overlap with the gaming table 4410 where chips may be placed, for example, to make bets. For example, where the gaming table 4410 has a generally semi-circular shape, the combined fields of view 4408*a*, 4408*b*, 4408*c*, 4408*d*, and 4408*e* of the five bet recognition modules may substantially cover the surface of the semi-circular gaming table where chips may be placed (e.g. where bets may be made), depending on the radius of the semi-circular gaming table.

In some embodiments, at least a portion of the field of views of adjacent bet recognition modules overlap. As depicted in FIG. 44A, a portion of combined field of view 4408*a* overlaps with combined field of view 4408*b*, a portion of combined field of view 4408*b* overlaps with combined field of view 4408*c*, a portion of combined field of view 4408*c* overlaps with combined field of view 4408*d*, and a portion of combined field of view 4408*d* overlaps with combined field of view 4408*e*.

In some embodiments, a table monitoring subsystem, such as table monitoring subsystem 2000, may be positioned such that its field of view covers an area of the gaming table that is obscured from the field of view of the table monitoring subsystem 4400, such as by the card shoe 4406. Based on the data captured by the table monitoring subsystem 4400 and processed by the game monitoring server 104, the game monitoring subsystem 4400 may determine that a part of the field of view of the table monitoring subsystem 4400 is obscured. In some embodiments, the game monitoring server 104 may display a message on the display of the table monitoring subsystem 4400 for the dealer to trigger recapturing image data for that particular area.

When processing the image data transmitted from the table monitoring subsystem 4200, 4300, or 4400, the game monitoring server 104 may be sensitive to the distance or depth of chips placed on the gaming table used for playing baccarat, as the depth of the chips may indicate a game play feature of baccarat, such as the type of wager the player made, thereby providing an accurate win or loss determination for each player.

Embodiments described herein may provide automatic calculation of manual casino shoes and associated statistics including, for example, shuffle per hour.

The "casino shoe" is the card release mechanism on casino tables, which may contain several decks of cards. Dealers use the casino shoe to source cards for dealing each hand.

A casino "shoe" may be monitored by hardware components to provide a measure of how many shuffles occurred per hour, how many cards were dealt to players (including the dealer) per hour, and so on. For example, to count cards on a manual shoe, a magnet and a magnetic sensor may be attached to the shoe and used to trigger when the shoe is empty of cards.

Alternatively, a dealer procedure could require the shoe to be turned on its side with the shoe weighted wedge removed. This can be recognized with the retrofitting of the tilt switch (i.e., single-axis gyroscope) inside or outside of the shoe. This may recognize when a shoe has been depleted and must be refilled. The table monitoring subsystem 104 can thus collect data on cards such as, for example, how many shuffles occur per hour (which varies because shoes are depleted at different depths based on different gameplay scenarios) and indicate when the table monitoring process does not need to look for player bets or placement or removal of chips from the chip tray.

Embodiments described herein automate the process of counting "shoe" related statistics (e.g., the number of shoes). Prior attempts may require data to be collected manually by the pit manager.

Figure 45A:
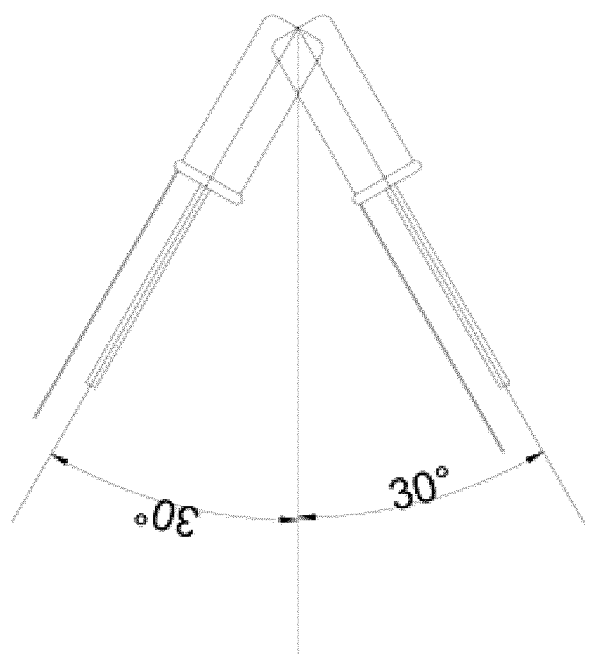
Figure 45D:
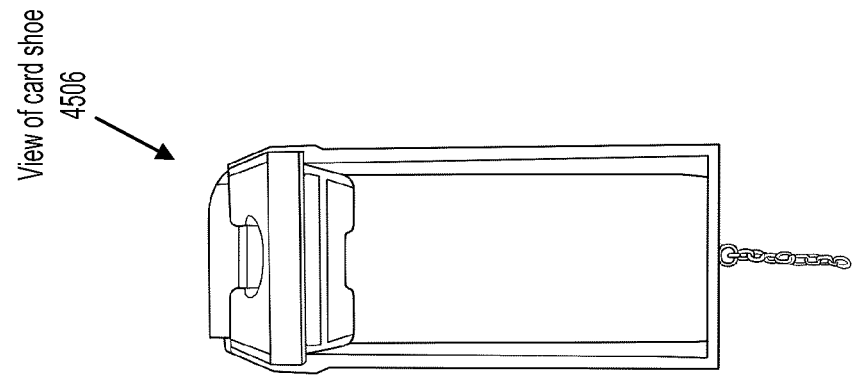
Figure 45C:
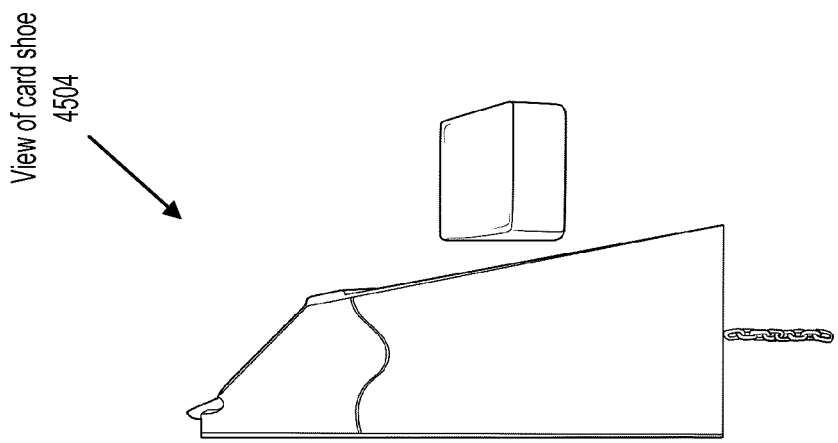
Figure 45B:
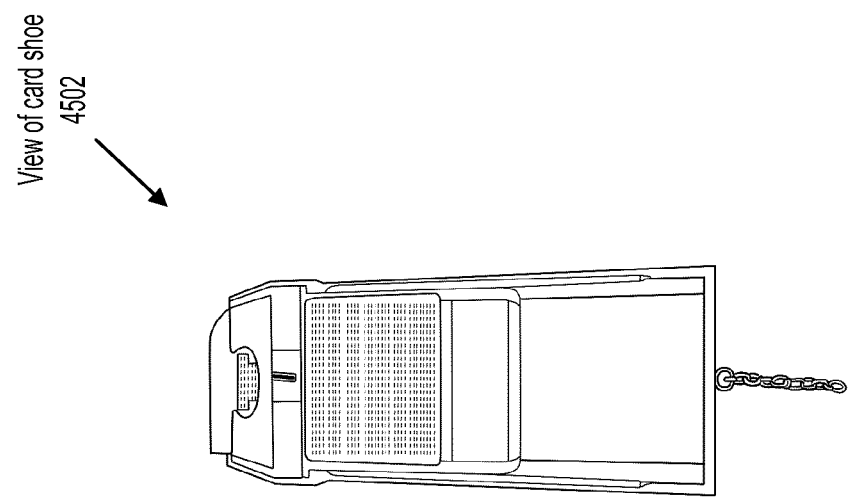
Figure 45F:
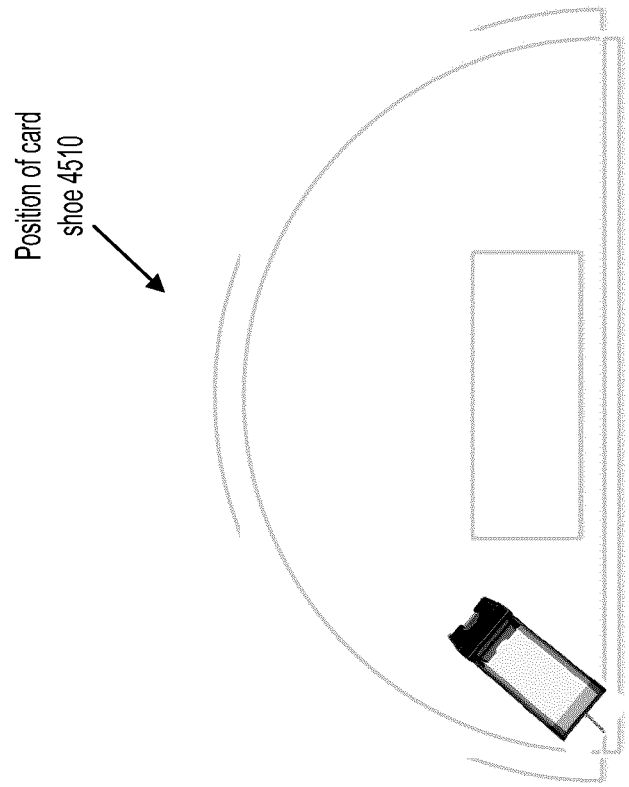
Figure 45E:
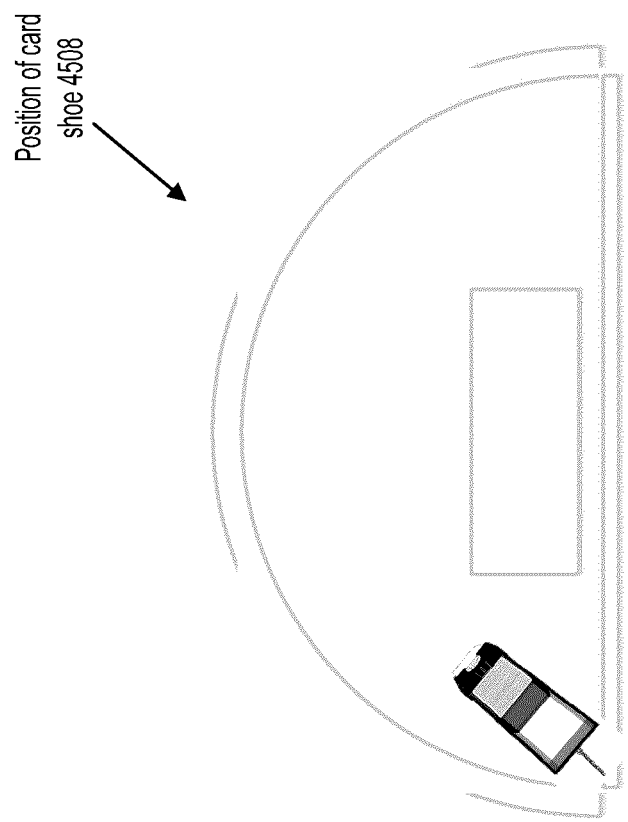
Figure 45G:
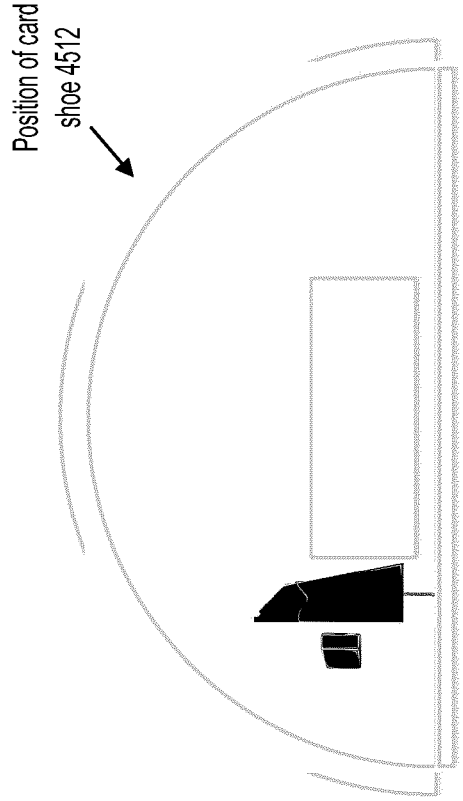
Figure 45H:
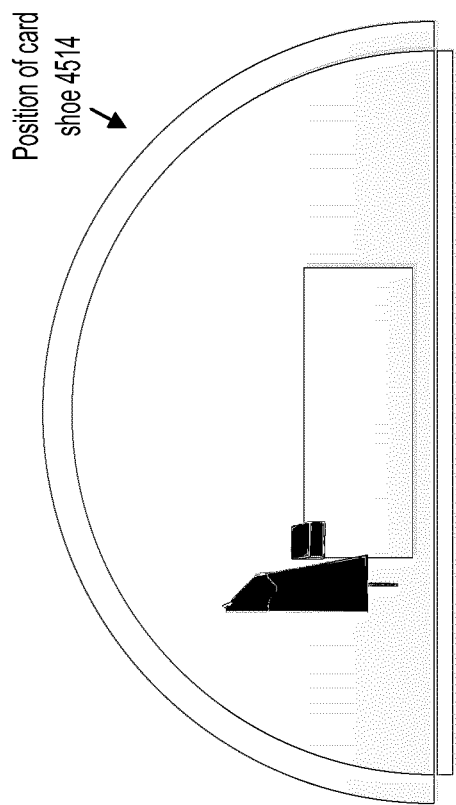
Figure 45I:
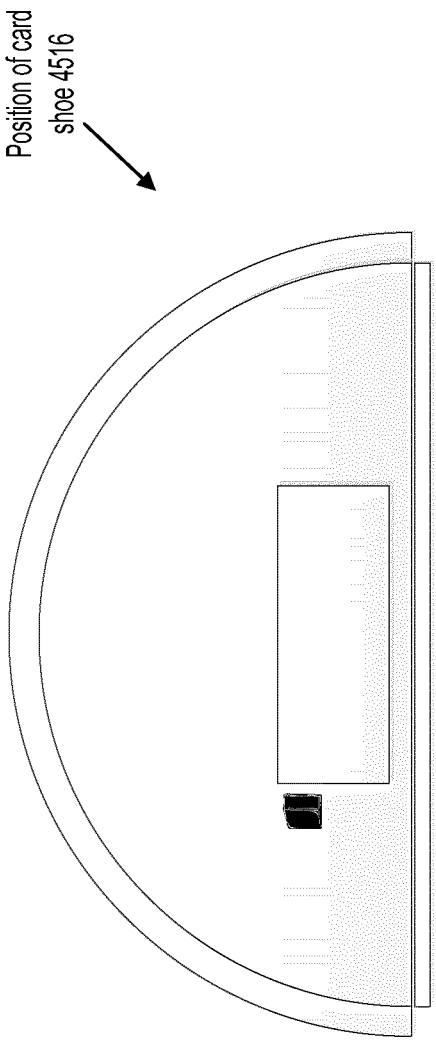

FIG. 45A illustrates that a shoe 4500 may be positioned at various inclines (increasing, decreasing). FIGS. 45B to 45D illustrate different views 4502, 4504, 4506 of a card shoe which may be used in example embodiments. FIGS. 45E to 45I illustrate different example positions 4508, 4510, 4512, 4514, 4516 of a card shoe on a gaming table according to some example embodiments.

In some embodiments, a QR code may be printed on the shoe 4500, such as at the right side bottom front corner. For example, the table monitoring subsystem 4400 may capture image data corresponding to the QR code, and the game monitoring server 104 may process the image data and determine the distance between the shoe 4500 and the table monitoring subsystem 4400. The game monitoring subsystem 104 may compare this distance with a threshold distance, and may determine if the shoe may obstruct the field of view of the table monitoring subsystem 4400 such that it reduces the quality of the image data captured by the table monitoring subsystem 4400.

FIG. 46A to 46G depicts another example table monitoring subsystem 4600 according to some embodiments. The table monitoring subsystem 4600 may be used to monitor a table for playing baccarat. The table monitoring subsystem 4600 is generally similar to table monitoring subsystem 4200 and 4300. The table monitoring subsystem 4600 comprises a first imaging component and a second imaging component. As depicted in FIG. 46A, the first imaging component is positionable on a first corner of a chip tray, and the second imaging component is positionable on a second corner of a chip tray.

The imaging component of the table monitoring subsystem 4600 comprises five bet recognition modules 4602*a*, 4602*b*, 4602*c*, 4602*d*, and 4602*e*. Each bet recognition module 4602 comprises one or more cameras 4604 and an emitter 4605 to capture image data. As depicted in FIG. 46A, the bodies of the bet recognition modules 4602*a*, 4602*b*, 4602*c*, 4602*d*, and 4602*e* are joined to define an integral body of the table monitoring subsystem 4600.

In some embodiments, where the table monitoring subsystem 4600 is used for baccarat, the cameras 4604 and emitter 4605 may be positioned above the gaming table at a height such that the field of view of the cameras 4604 and emitter 4605 are not obscured by chips or playing equipment (e.g. box for collecting lammers) placed at various areas of the gaming area.

As depicted in FIG. 46A, FIG. 46B, and FIG. 46C, similar to table monitoring subsystem 4200 and 4300, the bet recognition modules 4602*a*, 4602*b*, and 4602*c* define an angle 4628*a* therebetween, and the bet recognition modules 4602*c*, 4602*d*, and 4602*e* define an angle 4628*b* therebetween. The angles 4628*a* and 4628*b* substantially correspond to first and second corners of a chip tray on which the table monitoring subsystem is positionable, such that the geometry and shape of the table monitoring subsystem 4600 is complementary to the geometry and shape of the chip tray upon which the table monitoring subsystem 4600 is positionable.

In some embodiments, similar to table monitoring subsystems 4200 and 4300, the table monitoring subsystem 4600 may comprise a card reader unit generally similar to card reader unit 606 for capturing image data corresponding to one or more cards used during the play of a game.

Similar to table monitoring subsystems 4200 and 4300, the table monitoring subsystem 4600 comprises an illumination strip 4608 generally similar to illumination strip 608 and may provide illumination in all or a portion of the field of view of the imaging component.

Similar to table monitoring subsystem 4200 and 4300, the table monitoring subsystem 4600 comprises a display 4620 generally similar to display 610 for displaying data processed by the game monitoring server 104.

In some embodiments, the table monitoring subsystem 4600 may comprise tray imaging components, such as time of flight sensors, tray monitoring cameras, and optic sensors, generally similar to time of flight sensors 2418, tray monitoring cameras 2504 and 2606, and optic sensors 2718, as described herein, to capture data corresponding to the chips in the chip tray for transmitting to the game monitoring server 104.

As depicted in FIG. 46A, the table monitoring subsystem 4600 comprises a lammer rack 4610 similar to the lammer rack 4210 and 4310 of table monitoring subsystems 4200 and 4300. The lammer rack 4610 comprises a plurality of vertical channels 4612 for receiving lammers used while playing baccarat. In some embodiments, the lammer may represent commission owed to a dealer, and the lammer may be exchanged for chips when convenient. The diameter of the channels 4612 may be sized to receive the lammers used when playing baccarat.

In some embodiments, the table monitoring subsystem 4600 and the lammer rack 4610 are joined. In other embodiments, the table monitoring subsystem 4600 and the lammer rack 4610 are removably joined.

In some embodiments, one or more optic sensors generally similar to the optic sensors 2718 may be mounted to the axially along the channels 4612 for capturing image data of the lammers in the channels 4612. The game monitoring server 104 may process the data to determine the number of lammers in the channels 4612.

The bet recognition module 4602*a* and 4602*e* may define a distance 4630 therebetween. In some embodiments, distance 4630 may have a length such that it may accommodate the shape and geometry of standard baccarat chip trays. For example, the distance 4630 may have a length to accommodate the shape and geometry of the eight most commonly used baccarat chip trays.

In some embodiments, the table monitoring subsystems described herein may be manufactured using a strong and waterproof material. For example, the table monitoring subsystems described herein may be manufactured with nylon using a 3D printing process.

FIG. 47A to FIG. 47G illustrates an example gaming table 4702 with a side display 4704 according to some embodiments. As depicted in FIG. 47A, a chip tray 4700 may be mounted to the gaming table 4702. In some embodiments, the gaming table 4702 has a generally semi-circular shape.

The display 4704 may be mounted on the gaming table 4702 such that the display 4704 is positioned above the gaming table 4702. The display 4704 may be configured to display bets and limits of a progressive betting system. As depicted in FIG. 47A, the display 4704 is generally cylindrical in shape.

In some embodiments, the display 4704 may be an LCD panel, comprising fibre optic strands. When light enters the fibre optic strands, the light exits in the same manner, such that an object behind the fibre optic strands appears to be pushed to the front of the fibre optic strands.

In some embodiments, the LCD panel of the display 4704 may be curved to create a reverse curve screen. The LCD panel may be convex and not naturally concave.

The content displayed on the display 4704 may allow players sitting at the gaming table 4702 to read the content from the player's position.

In some embodiments, a camera may be mounted on top of the display 4704 for capturing image data corresponding to the gaming table and the chips on the gaming table, and the data may be transmitted to the game monitoring server 104 for processing.

FIG. 48A to FIG. 48G illustrates an example gaming table 4802 with a side display 4804 according to some embodiments. As depicted in FIG. 48A, a chip tray 4800 may be mounted to the gaming table 4802. In some embodiments, the gaming table 4802 has a generally semi-circular shape.

The display 4804 may be mounted on the gaming table 4802 such that the display 4704 is positioned above the gaming table 4702. The display 4804 may be configured to display bets and limits of a progressive betting system. The display 4804 is generally similar to the display 4704 as depicted in FIG. 47A, except the display 4804 has a convex shape, as depicted in FIG. 48A.

FIG. 49 is an example workflow 4900 illustrative of some embodiments. Workflow 4900 includes various steps, and the steps provided are examples, and different, alternate, less, more steps may be included. While steps may be performed in the order depicted, other orders may be possible.

At 4902, detecting, by an imaging component, that one or more chips have been placed in one or more defined bet areas on a gaming surface or detecting that one or more chips have been placed in or removed from a chip tray, each chip of the one or more chips having one or more visual identifiers representative of a face value associated with the chip. The chips on the gaming table may be arranged in one or more stacks of chips. The chips in the chip tray may be arranged in a channel of the chip tray.

At 4904, capturing, by the imaging component, image data corresponding to the one or more chips positioned on the gaming surface or in the chip tray, the capturing triggered by the detection that the one or more chips have been placed in the one or more defined bet areas or in the chip tray.

At 4906, transforming, by an image processing engine, the image data to generate a subset of the image data relating to the one or more chips, the subset of image data isolating images of the chips from the image data.

At 4908, recognizing, by an image recognizer engine, the one or more chips in the betting area or in the chip tray, the recognizer engine generating and associating metadata representative of (i) a timestamp corresponding to when the image data was obtained, (ii) one or more estimated position values associated with the one or more chips, and (iii) one or more face values associated with the one or more chips based on the presence of the one or more visual identifiers.

At 4910 segmenting, by the image recognizer engine, the subset of image data and with the metadata representative of the one or more estimated position values with the one or more chips to generate one or more processed image segments, each processed image segment corresponding to a chip of the one or more chips and including metadata indicative of an estimated face value and position.

At 4912, determining, by a game monitoring engine, one or more table monitoring data values, each table monitoring data value corresponding to a bet area of the one or more defined bet areas or the chip tray, and determined using at least the number of chips visible in each of the one or more bet areas or chip tray extracted from the processed image segments and the metadata indicative of the face value of the one or more chips.

The advantages of the some embodiments are further illustrated by the following examples. The examples and their particular details set forth herein are presented for illustration only and should not be construed as limitations.

In implementation, the process of patching together images may begin with capturing a particular number of samples from each camera that is mounted to the table.

Different scenarios of chips are used for each sample. These scenarios also include extreme situations so that the machine can learn, which allows it to handle simpler scenarios with a greater relative ease. The captured samples are then labeled by denomination to create the file that is used in training.

The capturing tools developed by the Applicant have been capable of focusing mainly on the bet area or the channels of the chip tray, while omitting any surrounding environments that might cause discrepancies. The removal of surrounding environments helps the system to ignore any background chips during training and testing processes.

During testing, it was noted that the removal of background chips improved accuracy. In the process of training and testing, higher accuracy of datasets and successful training were found through capturing and labelling samples in a brightly lit setting and testing them in a dimly lit setting, or executing both processes in a brightly lit setting. This approach was found to produce a higher accuracy than performing both of the process in a dimly lit setting or performing the first process in a dimly lit setting while next in bright light.

Applicant also found that providing more light from the side helped the system identify colors better.

The embodiments of the devices, systems and methods described herein may be implemented in a combination of both hardware and software. These embodiments may be implemented on programmable computers, each computer including at least one processor, a data storage system (including volatile memory and non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The table monitoring subsystems described herein can allow for the calculation of wagers, table analytics, and data relating to the player and dealer as real-time streams of data, while checking that all the software and hardware components are functioning correctly, and being repaired or restarted as needed.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

These are example embodiments.

What is claimed is:

1. A tray for monitoring chips in the tray, the tray comprising:
   a body defining a channel for receiving the chips, the channel having a first end;
   a tray imaging component mounted at the first end of the channel, the tray imaging component configured to capture image data associated with presence of chips in the channel, the tray imaging component including a time of flight sensor positioned in the channel and mounted at the first end of the channel for emitting an initial electromagnetic signal in a direction substantially parallel to a longitudinal axis of the channel and detecting a reflected electromagnetic signal corresponding to the initial electromagnetic signal operating in conjunction with an optic sensor mounted axially to the base of the channel, the optic sensor configured to capture image data corresponding to the side surfaces of the chips having a particular axial strip of colors, the tray imaging component configured to capture image data associated with presence of chips in the channel;
   one or more sensors responsive to an activation event to trigger capture of the image data by the tray imaging component;
   a processor coupled to the tray imaging component and the one or more sensors; and
   a memory coupled to the processor and storing instructions that, when executed, configure the processor to determine an amount of chips received in the tray, based on a depth of the chips in the channel determined from a time difference between when the initial electromagnetic signal was emitted and when the reflected electromagnetic signal was detected, and to determine a type of the chips received in the tray based on the image data corresponding to the side surfaces of the chips;
   wherein the optic sensor includes a radiation emitter that is controllable to illuminate only a portion of the emitter is activated based upon the information from the time of flight sensor.

2. The tray of claim 1, wherein the time of flight sensor emits laser radiation to the chips that is reflected back to the time of flight sensors.

3. The tray of claim 2, wherein the activation event is associated with an electromagnetic signal reflected from a non-planar surface.

4. The tray of claim 2, wherein the direction substantially parallel to the longitudinal axis of the channel allows for an offset angle for capture to increase a total number of pixels available for capture.

5. The tray of claim 4, wherein the emitted electromagnetic signal is incident on a chip at an angle that is substantially 90 degrees to a surface of the chip.

6. The tray of claim 2, wherein the time of flight sensor includes a laser emitter.

7. The tray of claim 1, wherein the tray imaging component comprises a camera mounted at the first end of the channel for detecting the image data corresponding to chips received in the channel.

8. The tray of claim 7, wherein the body includes a plurality of channels configured to receive chips, and wherein the camera includes a field of view associated with two or more of the plurality of channels.

9. The tray of claim 7, wherein instructions, when executed, configure the processor to determine a denomination of at least one chip received within the channel based on the image data.

10. The tray of claim 1, wherein the channel includes an elongate aperture extending parallel to a longitudinal axis of the channel, and wherein the optic sensor is mounted adjacent the elongate aperture and configured to detect presence of the chips received in the channel.

11. The tray of claim 10, wherein the optic sensor comprises at least one of a charged couple device (CCD) sensor, or an infrared light emitter/detector.

12. The tray of claim 10, wherein the optic sensor comprises an image capture device configured to capture, via the elongate aperture, image data for determining at least one of the amount of chips within the channel or a denomination of at least one chip within the channel based on at least one of a color or stripe pattern.

13. The tray of claim 1, wherein the activation event is associated with at least one of an activation signal associated with a push button, an activation signal associated with a touch screen display button, or an activation signal received at the chip tray from a game monitoring server.

14. A chip tray comprising:
   a body defining a channel for receiving at least one betting chip, the channel comprising an elongate aperture extending parallel to a longitudinal axis of the channel;
   a tray imaging component mounted adjacent the elongate aperture and configured to detect presence of betting chips within the channel, the tray imaging component including a time of flight sensor positioned in the channel and mounted at the first end of the channel for emitting an initial electromagnetic signal in a direction substantially parallel to a longitudinal axis of the channel and detecting a reflected electromagnetic signal corresponding to the initial electromagnetic signal operating in conjunction with an optic sensor mounted axially to the base of the channel, the optic sensor configured to capture image data corresponding to the side surfaces of the chips having a particular axial strip of colors, the tray imaging component configured to capture image data associated with presence of chips in the channel;
   a processor coupled to the tray imaging component; and
   a memory coupled to the processor and storing instructions that, when executed, configure the processor to determine chip quantity within the channel based on tray imaging component data, based on a depth of the chips in the channel determined from a time difference between when the initial electromagnetic signal was emitted and when the reflected electromagnetic signal was detected, and to determine a type of the chips received in the tray based on the image data corresponding to the side surfaces of the chips;
   wherein the optic sensor includes a radiation emitter that is controllable to illuminate only a portion of the emitter is activated based upon the information from the time of flight sensor.

15. The chip tray of claim 14, wherein the tray imaging component comprises an optic sensor is a flat bed sensor mounted at a base of the channel such that the optic sensor is generally parallel to the longitudinal axis of the channel.

16. The chip tray of claim 14, wherein the time of flight sensor emits laser radiation to the chips that is reflected back to the time of flight sensors.

17. The chip tray of claim 14, wherein the direction substantially parallel to the longitudinal axis of the channel allows for an offset angle for capture to increase a total number of pixels available for capture.

18. The chip tray of claim 14, wherein the optic sensor is an elongate emitter extending parallel the elongate aperture, and wherein the instructions, when executed, configure the processor to:
 determine, based on time of flight data, that the portion of the channel is occupied with betting chips; and
 activate a subset portion of the elongate emitter corresponding to the portion of the channel occupied with betting chips.

19. The chip tray of claim 18, wherein the activation event is associated with at least one of an activation signal associated with a push button, an activation signal associated with a touch screen display button, or an activation signal received from a game monitoring server.

20. The chip tray of claim 14, wherein the tray imaging component includes an image capture device configured to capture, through the elongate aperture, image data for determining at least one of a quantity of betting chips within the channel or a denomination of at least one betting chip within the channel based on at least one of a color or a stripe pattern.

\* \* \* \* \*